(12) United States Patent
Huang et al.

(10) Patent No.: US 11,899,899 B2
(45) Date of Patent: Feb. 13, 2024

(54) TECHNIQUES FOR ADJUSTING A DETACHABLE DISPLAY CAPSULE OF A WRIST-WEARABLE DEVICE TO OPERATIONALLY COMPLEMENT A WEARABLE-STRUCTURE ATTACHMENT, AND WEARABLE DEVICES AND SYSTEMS FOR PERFORMING THOSE TECHNIQUES

(71) Applicant: Meta Platforms Technologies, LLC, Menlo Park, CA (US)

(72) Inventors: Willy Huang, San Francisco, CA (US); Nicolas Ramirez, Brooklyn, NY (US); Yuxiao Tan, Chestnut Hill, MA (US); Tanner Wirig Rhodes, Vineyard, UT (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/310,507

(22) Filed: May 1, 2023

(65) Prior Publication Data

US 2023/0359320 A1    Nov. 9, 2023

Related U.S. Application Data

(60) Provisional application No. 63/382,697, filed on Nov. 7, 2022, provisional application No. 63/415,607, filed (Continued)

(51) Int. Cl.
*G06F 3/0481* (2022.01)
*G06F 1/16* (2006.01)
(Continued)

(52) U.S. Cl.
CPC ............ *G06F 3/0481* (2013.01); *G06F 1/163* (2013.01); *G06F 1/1686* (2013.01);
(Continued)

(58) Field of Classification Search
CPC .... G06F 3/0481; G06F 3/016; G06F 3/04845; G06F 1/163; G06F 1/1686; G06F 1/1698
See application file for complete search history.

(56) References Cited

U.S. PATENT DOCUMENTS

| | | | |
|---|---|---|---|
| 2018/0059714 A1* | 3/2018 | Martin | G06F 1/1635 |
| 2022/0014680 A1* | 1/2022 | Cotoros | G06F 3/1423 |

(Continued)

OTHER PUBLICATIONS

Liangye Li et al., Wearable Smartwatch based on Optical Fiber for Continuous Blood Pressure Monitoring, Mar. 1, 2022, Optica Publishing Group, pp. 1-3 (Year: 2022).*

(Continued)

*Primary Examiner* — Tam T Tran
(74) *Attorney, Agent, or Firm* — Morgan, Lewis & Bockius LLP

(57) ABSTRACT

An example method of adjusting a detachable display capsule of a wrist-wearable device to operationally complement a wearable-structure attachment is disclosed. The method includes, while a display capsule is configured to use a default set of display characteristics for operating-system or application-level user interfaces, receiving identifying information for a respective wearable structure, the display capsule being configured to detachably couple to one of a plurality of wearable structures to form a wrist-wearable device. In accordance with a determination that the display capsule should be adjusted based on the identifying information, the method further includes adjusting the display capsule (i) to cease using the first set of display characteristics and (ii) to instead use a customized set of display characteristics associated with the respective wearable struc- (Continued)

ture. The customized set is distinct from the default set and is also used in conjunction with the operating-system or application-level user interfaces.

20 Claims, 73 Drawing Sheets

Related U.S. Application Data on Oct. 12, 2022, provisional application No. 63/404,535, filed on Sep. 7, 2022, provisional application No. 63/338,892, filed on May 6, 2022.

(51) Int. Cl.
*G06F 3/04845* (2022.01)
*G06F 3/01* (2006.01)

(52) U.S. Cl.
CPC ............ *G06F 1/1698* (2013.01); *G06F 3/016* (2013.01); *G06F 3/04845* (2013.01)

(56) References Cited

U.S. PATENT DOCUMENTS

| | | | | |
|---|---|---|---|---|
| 2023/0152753 | A1* | 5/2023 | Fulfagar | A61B 5/681 368/11 |
| 2023/0157645 | A1* | 5/2023 | Lee | G01N 21/31 600/477 |

OTHER PUBLICATIONS

Sandeep Pirbhulal et al., A Biometric Security Model for Wearable Healthcare, Nov. 1, 2018, IEEE International Conference on Data Mining Workshops, pp. 136-143 (Year: 2018).*

* cited by examiner

400 →

401
A display capsule is configured to use a default set of display characteristics in conjunction with operating-system or application-level user interfaces available via the display capsule

↓

403
Receive, at the display capsule, identifying information for a respective wearable structure of a plurality of wearable structures, the display capsule being configured to detachably couple to one of the plurality of wearable structures to form a wrist-wearable device

↓

405
In accordance with a determination that the display capsule should be adjusted based on the identifying information for the respective wearable structure:

407
Adjust the display capsule:

(i) to cease using the first set of display characteristics in conjunction with the operating-system or application-level user interfaces and
    (ii) to use a customized set of display characteristics associated with the respective wearable structure, where the customized set of display characteristics is distinct from the default set of display characteristics and is also used in conjunction with the operating-system or application-level user interfaces.

501
While a user of an electronic device has performed less than a first threshold amount of a self-care activity, displaying, on a display of the electronic device or another electronic device that is in communication with the electronic device, a user interface without displaying a hidden user-interface feature that is associated with the user interface

503
In accordance with a determination that the user of the electronic device has performed more than the first threshold amount of the self-care activity:

505
Reveal, on the display, a first portion of the hidden user-interface feature within the user interface

507
In accordance with a determination that the user of the electronic device has performed more than a second threshold amount of the self-care activity, the second threshold amount being an amount that is greater than the first threshold amount:

509
Continue to display, on the display, the first portion of the hidden user-interface feature within the user interface

511
Reveal, on the display, a second portion of the hidden user-interface feature within the user interface.

1402 Cause a display capsule, uncoupled from any holding structure, to display a user interface at a touch-sensitive display, where the user interface has a first set of display characteristics.

1404 The display capsule includes (i) a touch-sensitive display and (ii) a housing integrally formed with the touch-sensitive display.

1406 The housing defines a first outer perimeter that extends beyond a second outer perimeter of the touch-sensitive display.

1408 A display-coupling edge is defined by the portion of the housing between the first outer perimeter of the housing, and a housing-coupling edge being generally orthogonal to the display-coupling edge.

1410 The display capsule includes at least one Hall effect sensor configured to cause an operation to be performed based on a magnetic change detected by the Hall effect sensor.

1412 Place the display capsule in a holding structure that has a device identifier.

1414 The display-coupling edge and the housing are configured to be surrounded by a holding structure, where the holding structure is configured to fixedly hold the display capsule in place.

1416 The device identifier includes an RFID tag.

1418 The holding structure defines an opening, and the opening includes a lip that extends towards a lateral center of the opening.

1420 The display capsule is configured to be removably coupled with the holding structure such that the display capsule is pushed through the opening such that the display-coupling edge is fixedly held by the lip of the holding structure when the display-coupling edge and the housing-coupling edge are surrounded by the holding structure.

1422 The holding structure includes a peripheral button structure that is configured to align with the Hall effect sensor locations of the display capsule.

1424 A unitary structure is formed by the combination of the holding structure and a band portion configured to be worn around a wrist of the user.

1426 The holding structure is attached to an accessory device that is not configured to be worn by a user.

1428 Upon coupling the display capsule with the holding structure, the holding structure is configured to customize at least one display characteristic of the display capsule based on the device identifier.

> 1430 The at least one display characteristic includes display properties of a clock user interface element of a user interface of the display capsule.

> 1432 The holding structure is configured to customize at least one non-display characteristic of the display capsule based on the device identifier.

>> 1434 The at least one non-display characteristic includes a notification delivery preference of the user.

>> 1436 The non-display characteristic is customized based on the display capsule not being surrounded by another holding structure with a different device identifier.

1438 After the holding structure has customized at least one display characteristic or non-display characteristic of the display capsule, cause an operation to be performed at the holding structure, based in part on the device identifier of the holding structure.

> 1440 The non-display characteristic is based on usage data associated with the device identifier of the holding structure.

1442 While the display-coupling edge and the housing-coupling edge are surrounded by the holding structure, a lower retaining portion of the holding structure is configured to surround a bottom edge of the housing of the display capsule that extends below the coupling edge.

> 1444 A bottom surface of the bottom edge of the housing includes one or more peripheral sensors configured to contact a user, and the lower retaining portion of the holding structure defines a sensor gap, such that while the lower retaining portion is surrounding the bottom edge of the housing, the one or more peripheral sensors on the bottom surface of the housing are exposed via the sensor gap, and not covered by the lower retaining portion.

>> 1446 The lower retaining portion of the holding structure defines a sensor gap, such that while the lower retaining portion is surrounding the bottom edge of the housing, at least one of the peripheral sensors on the bottom surface of the housing are exposed to a user's body via the sensor gap.

Figure 14B

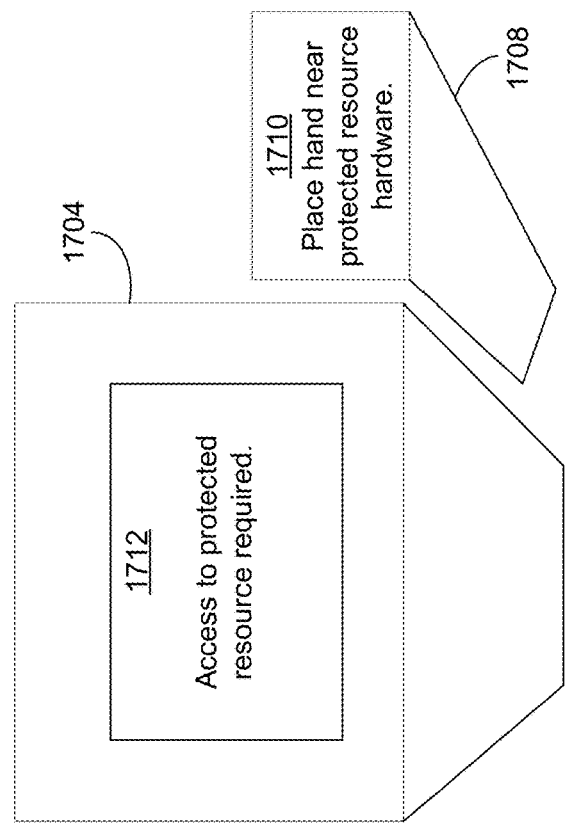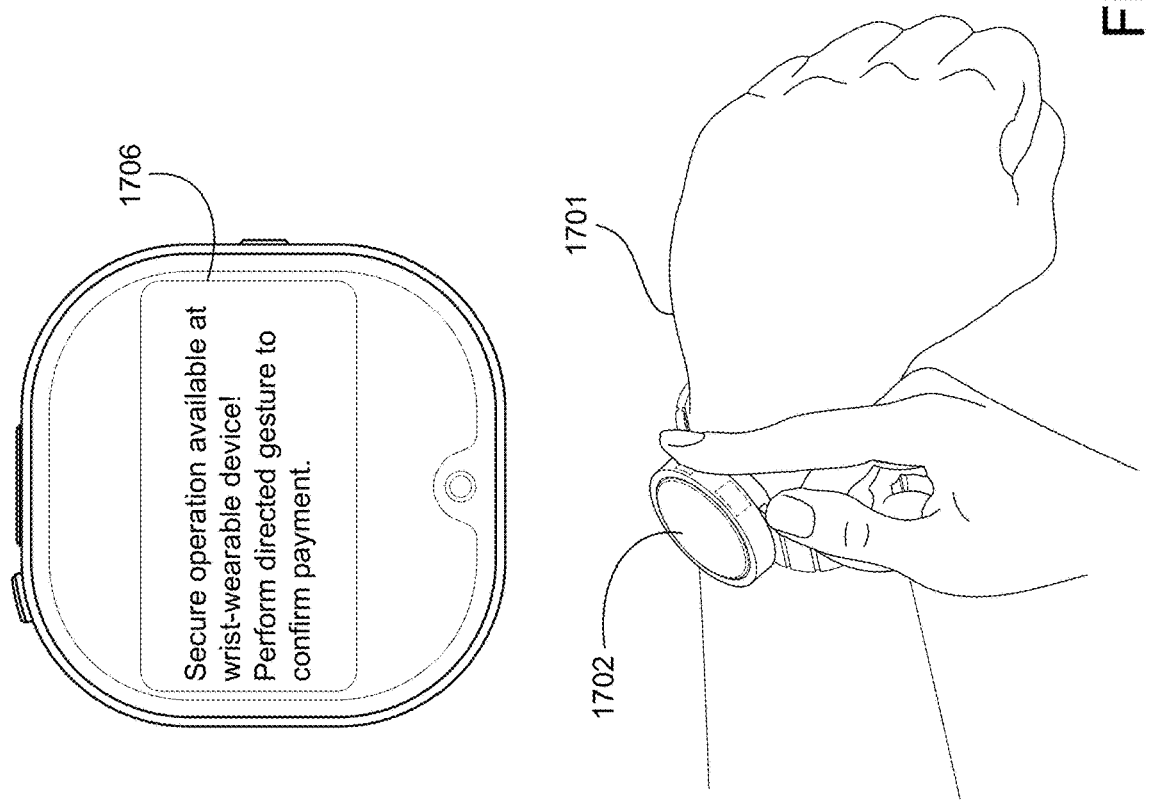
Figure 17A

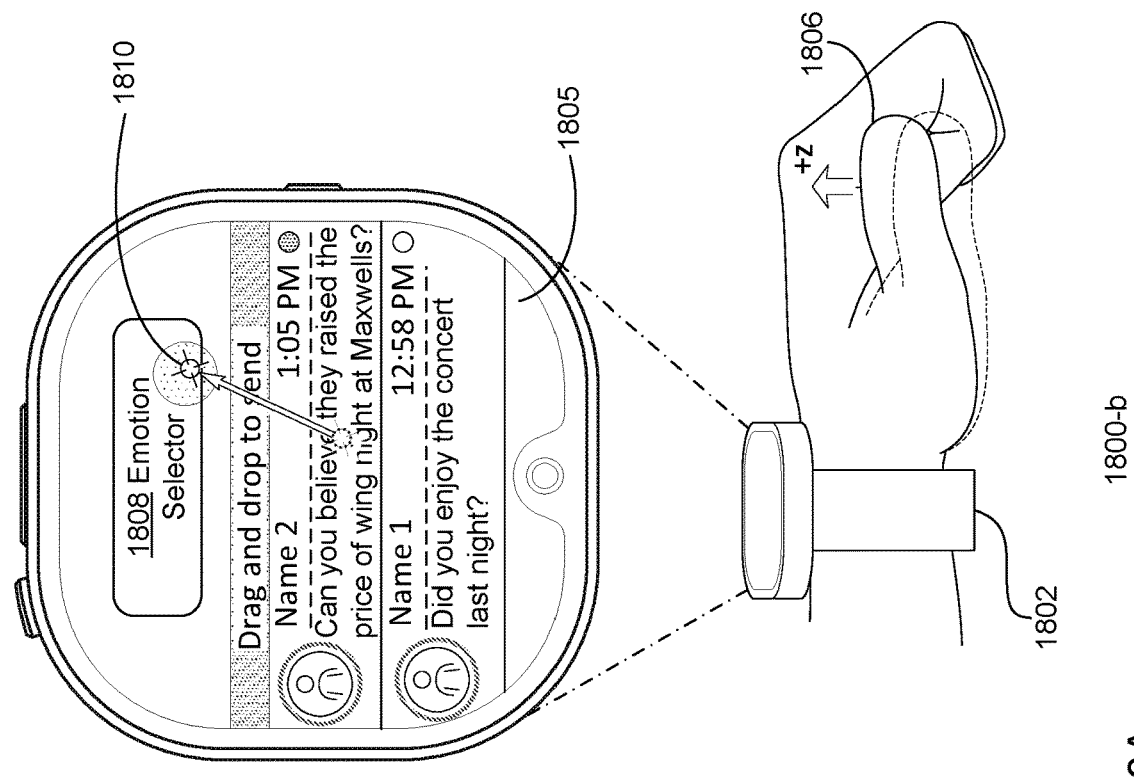
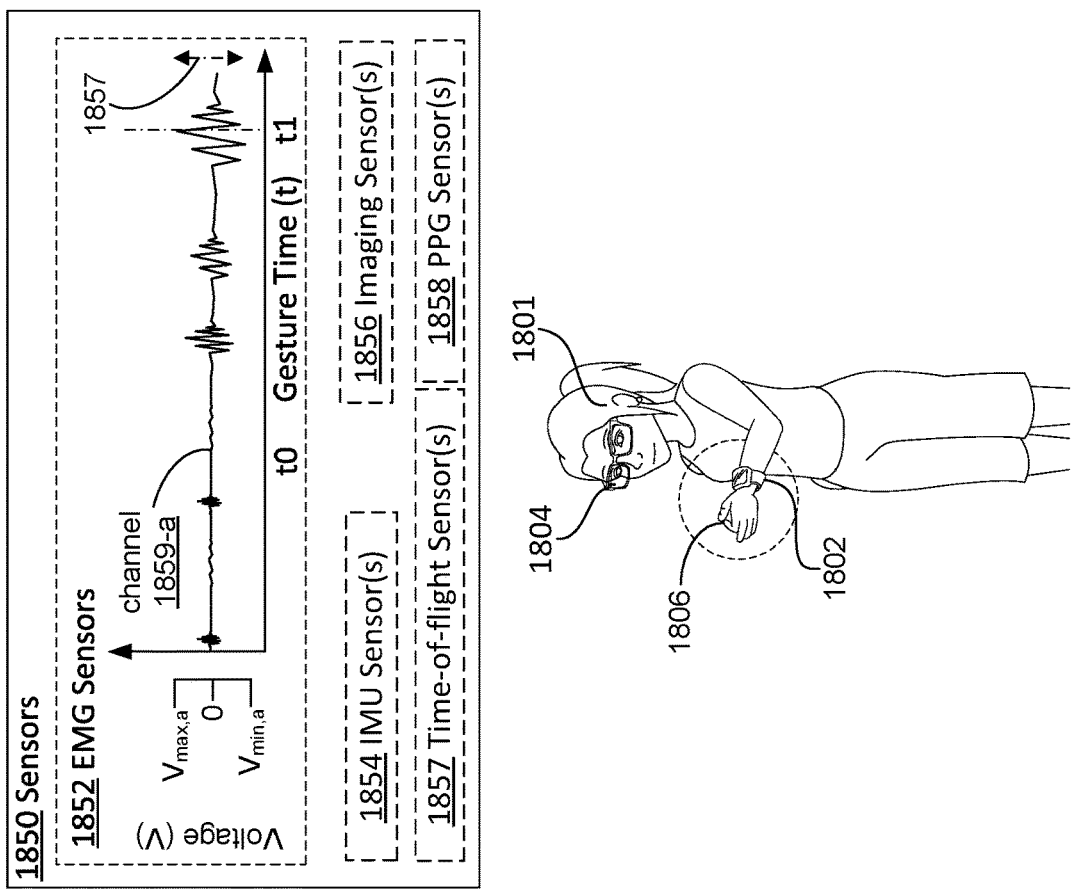
Figure 18A

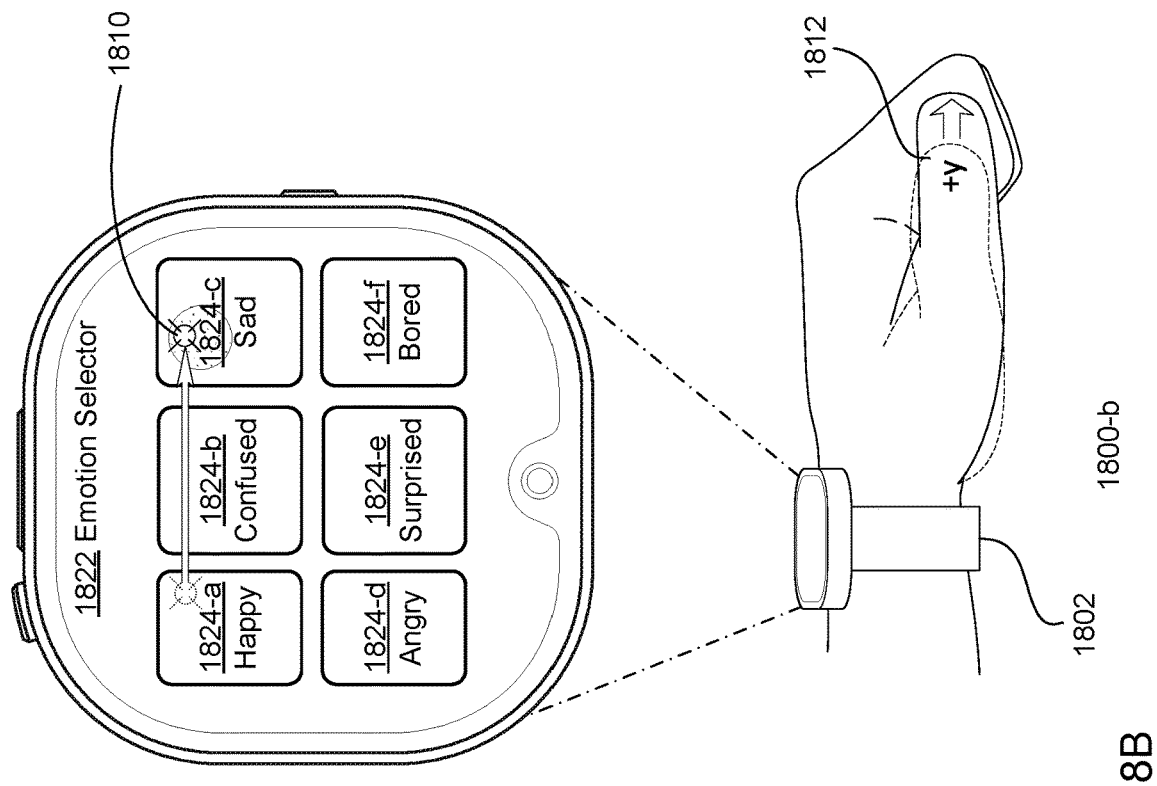
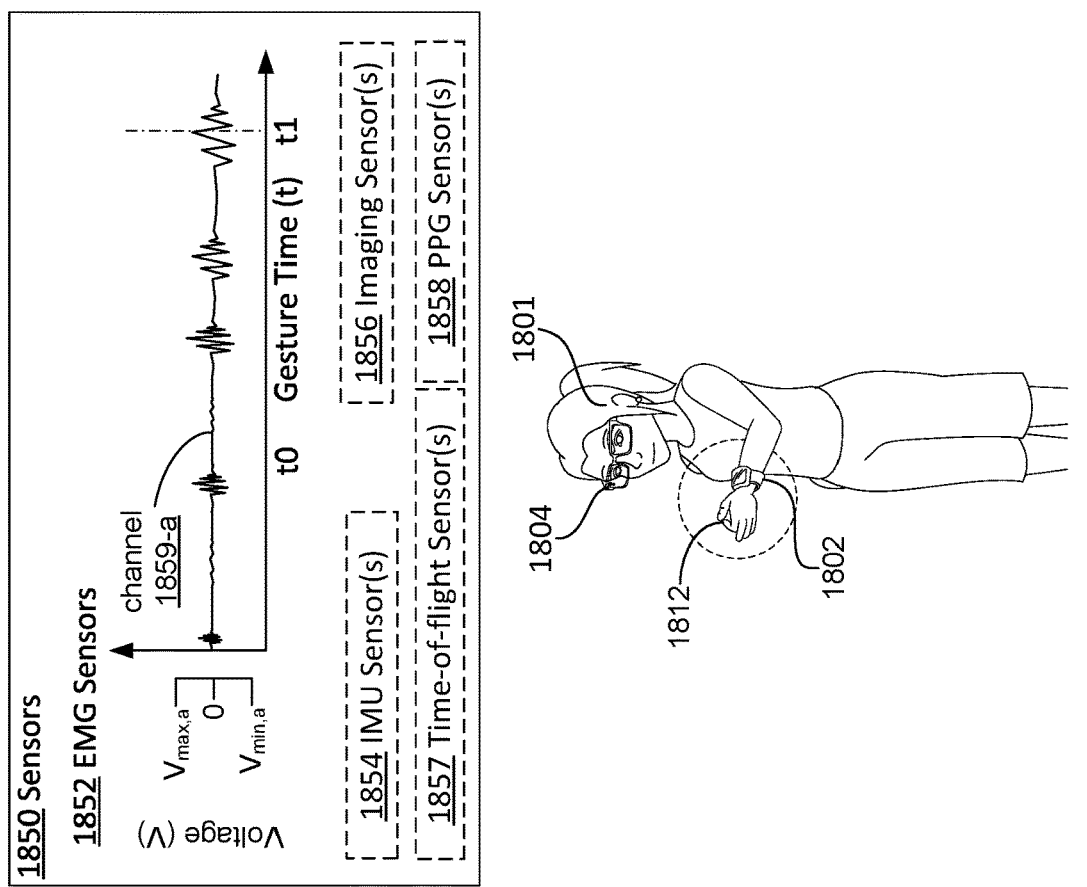
Figure 18B

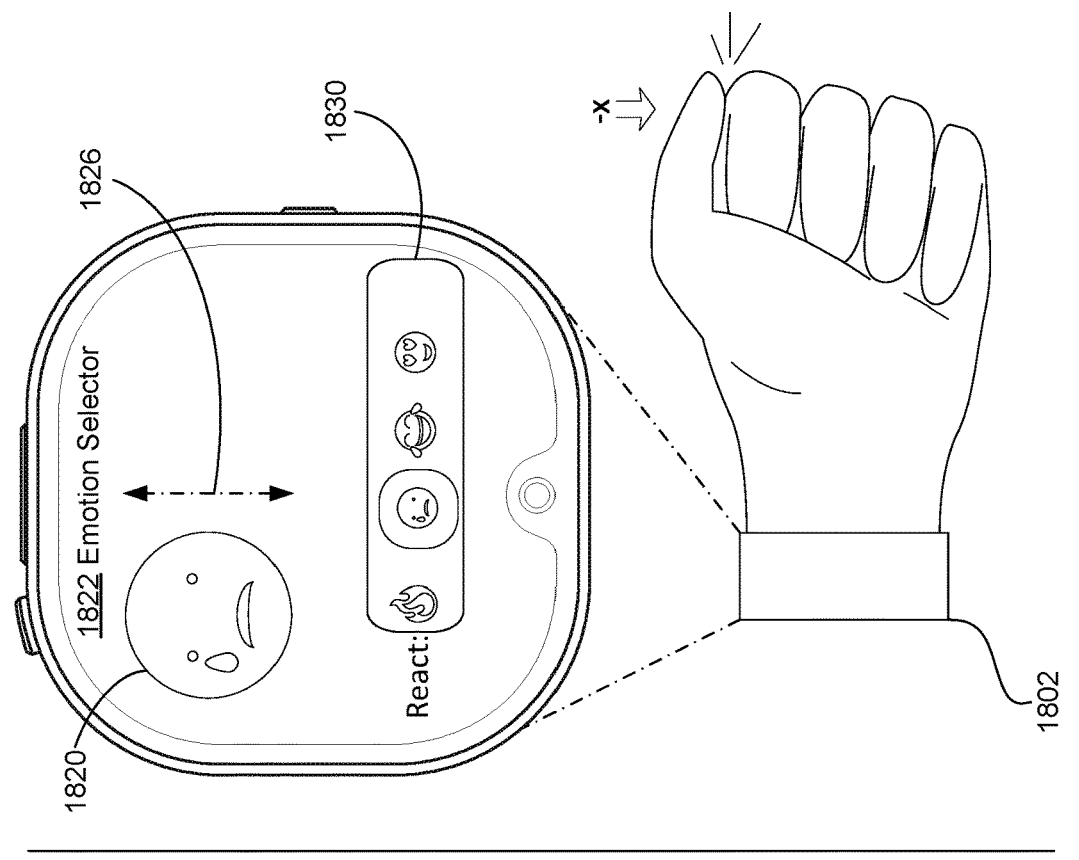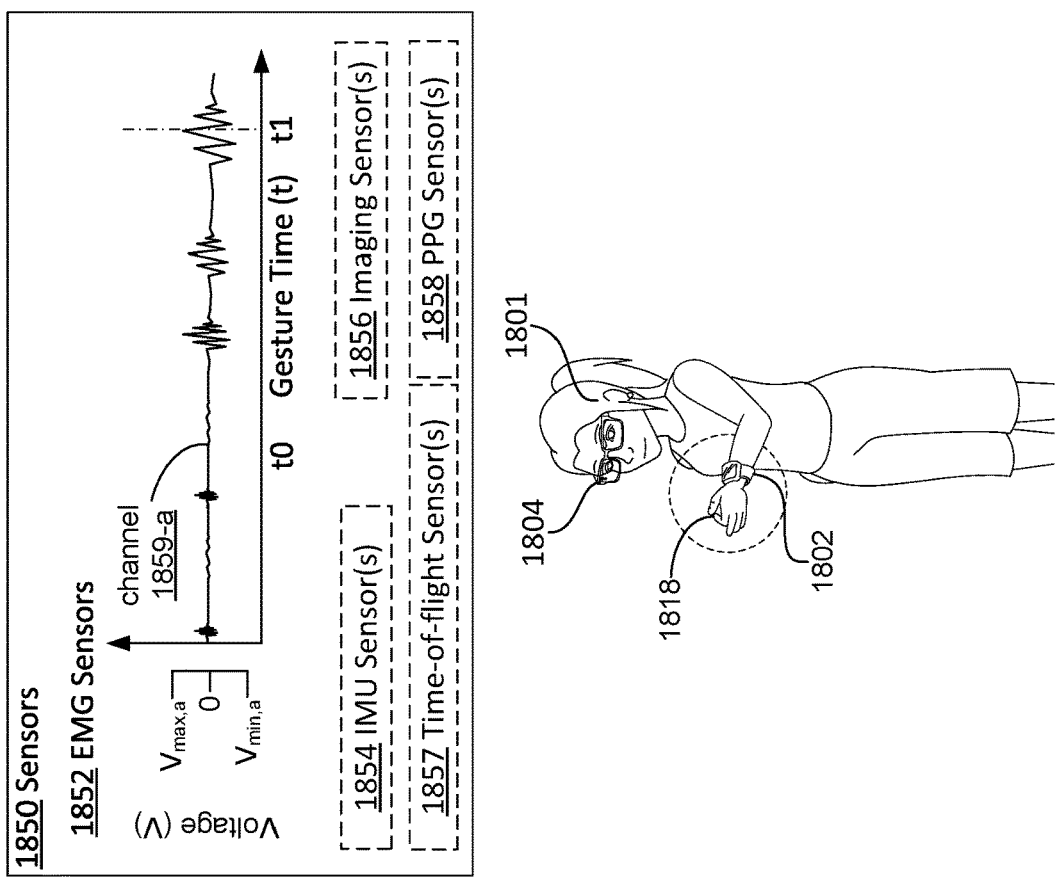
Figure 18C

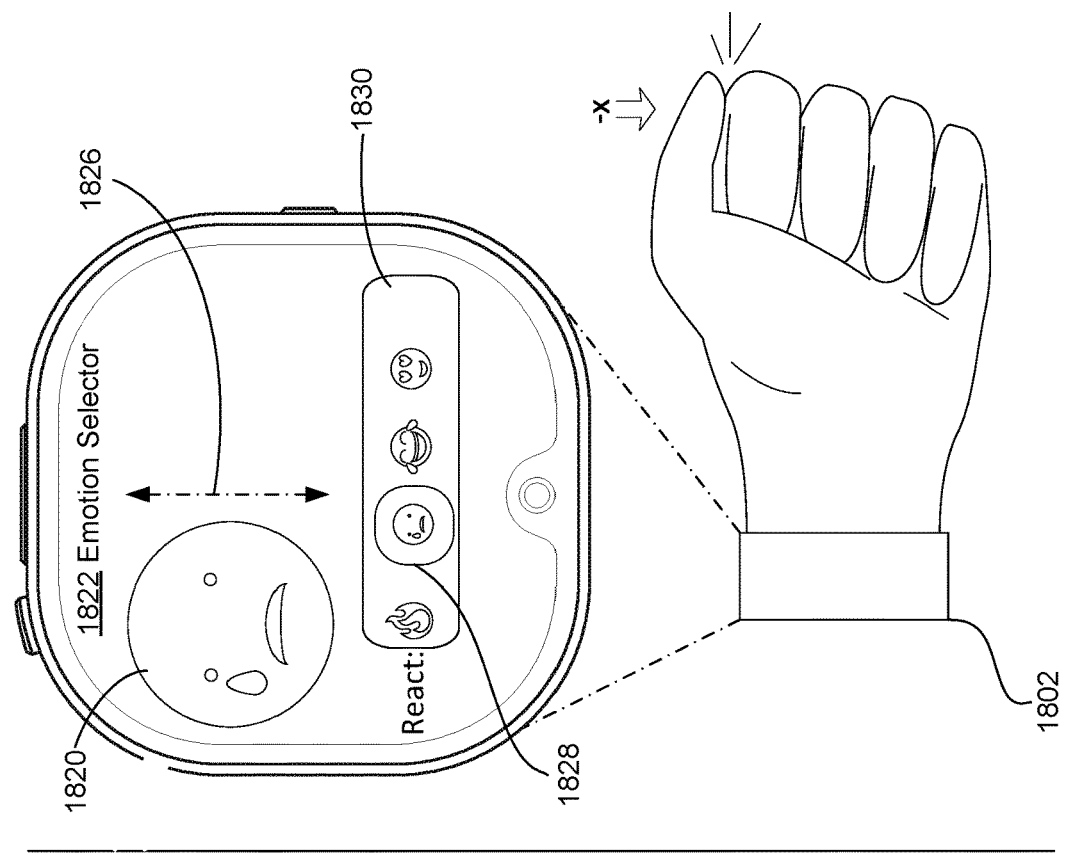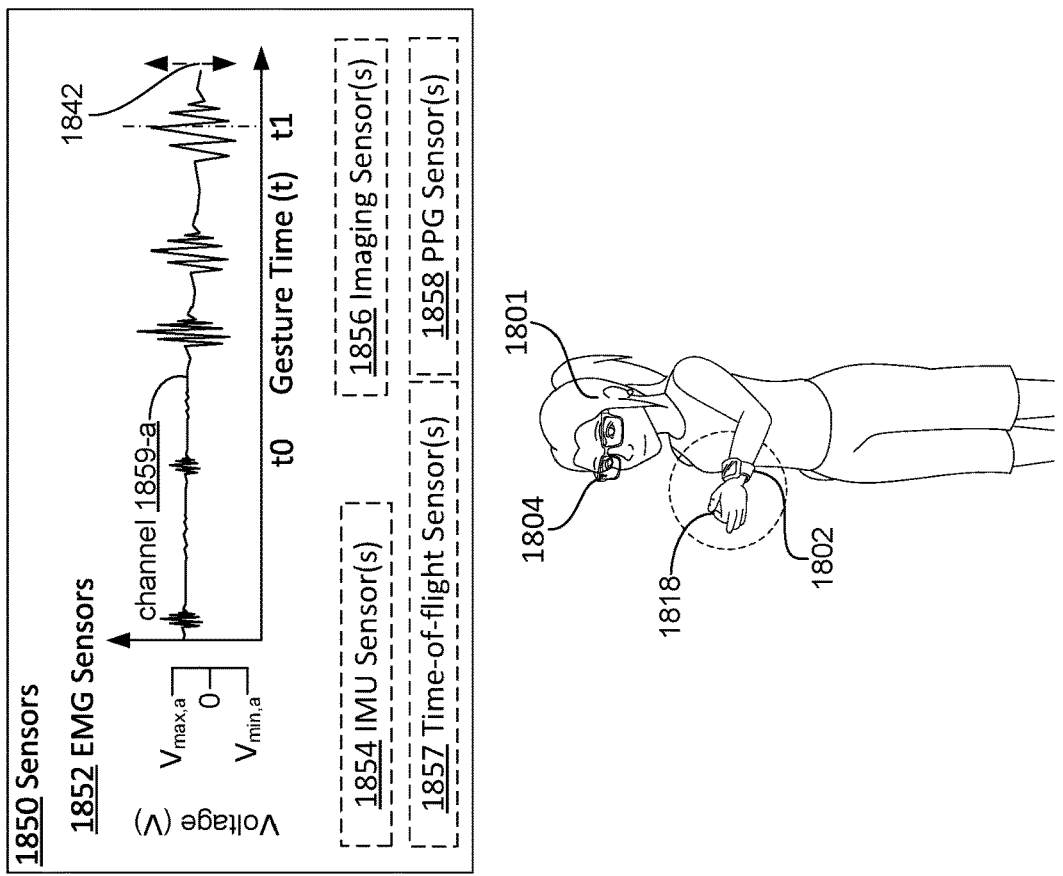
Figure 18D

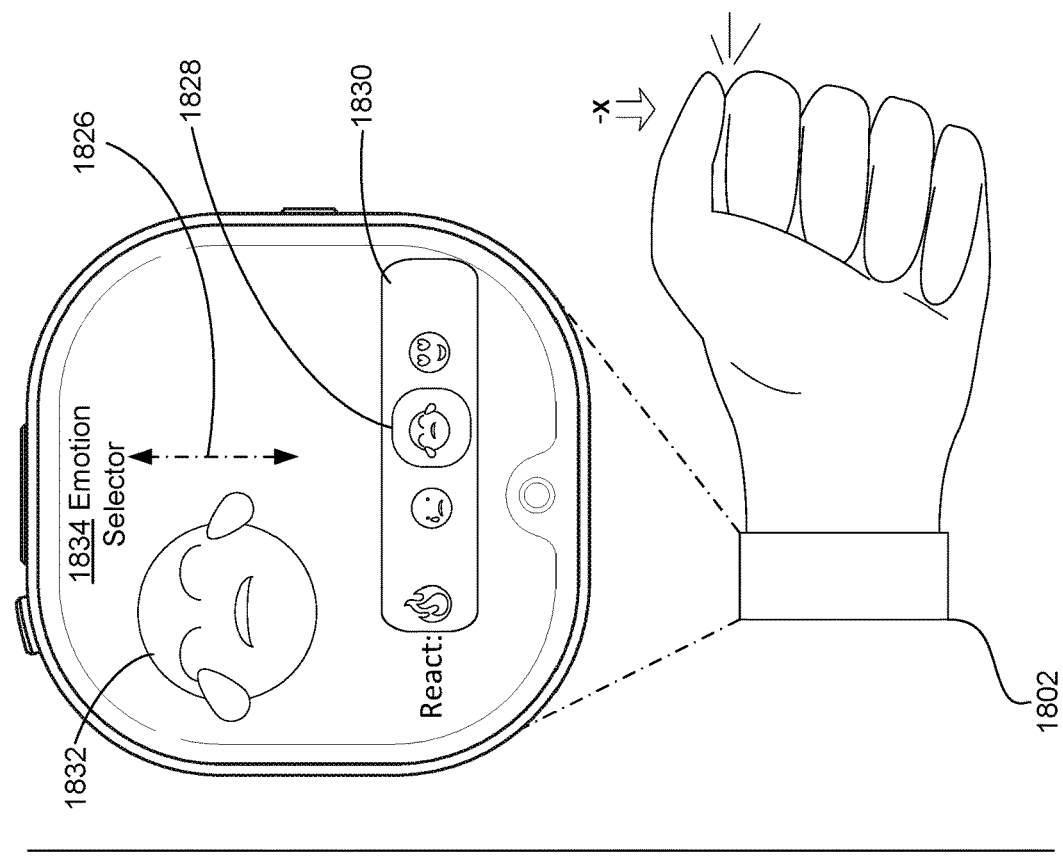
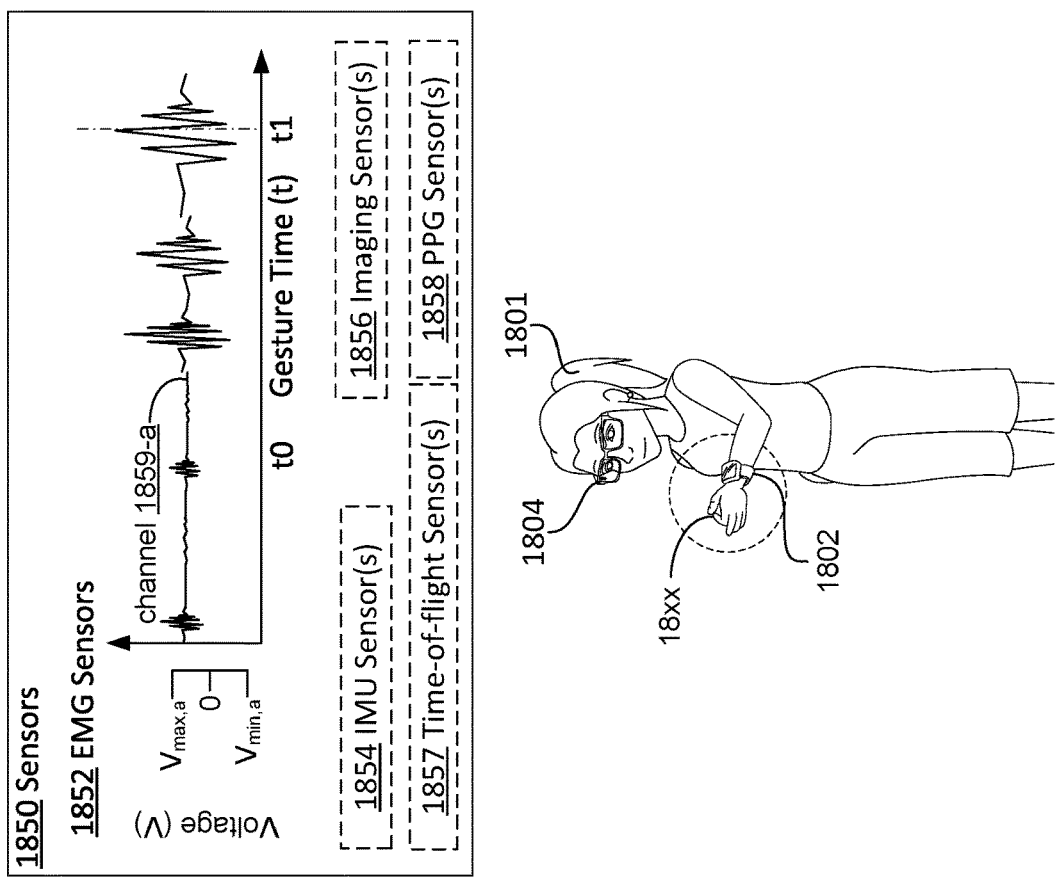
Figure 18E

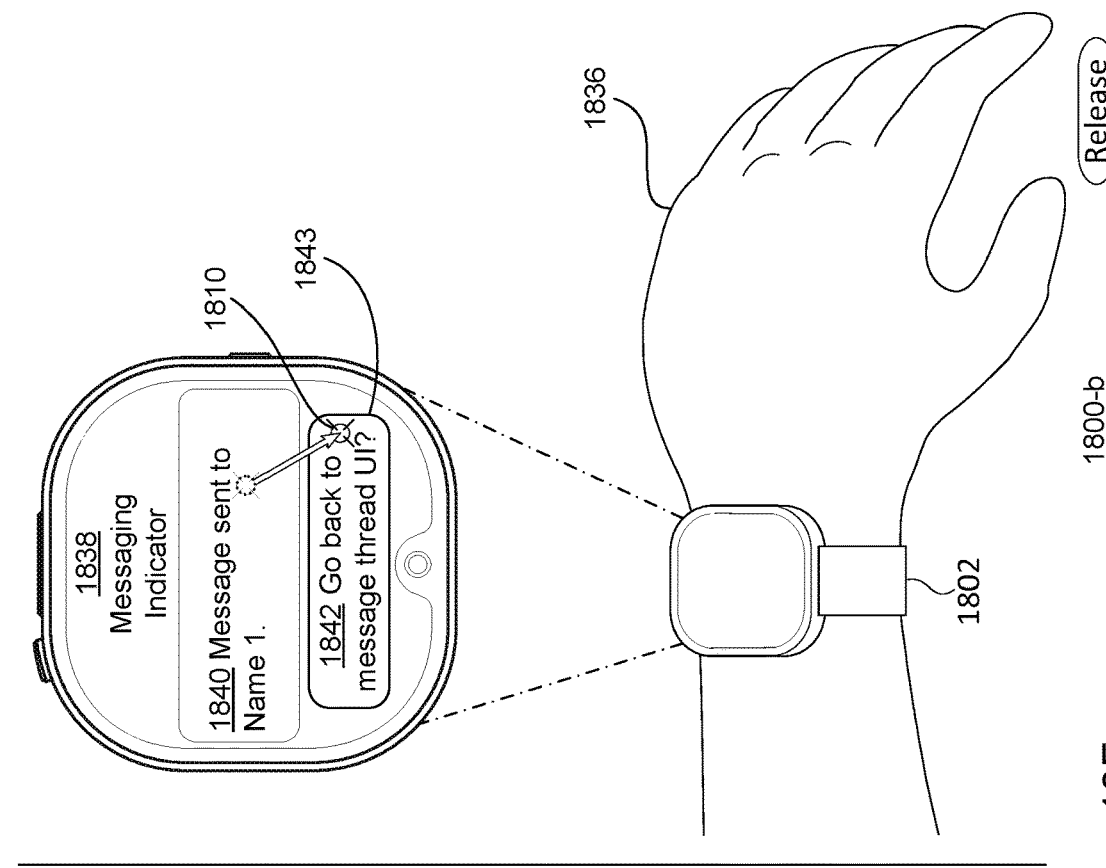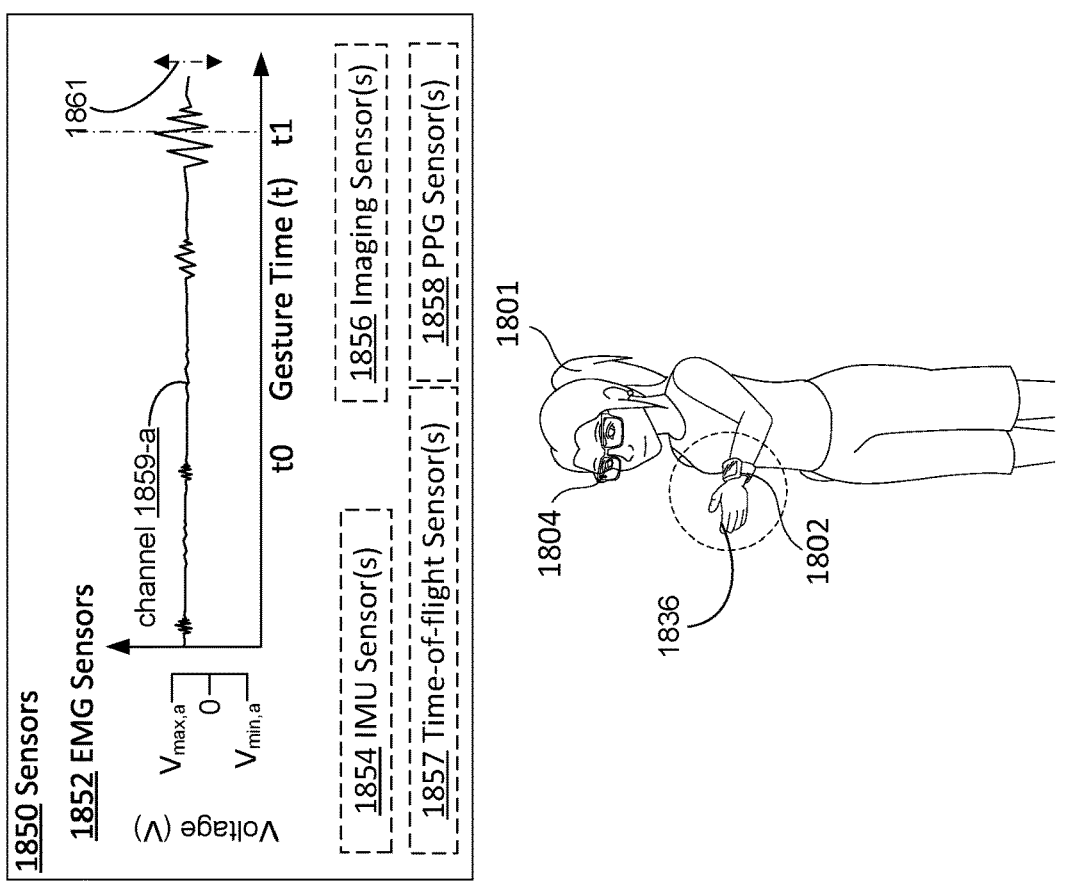
Figure 18F

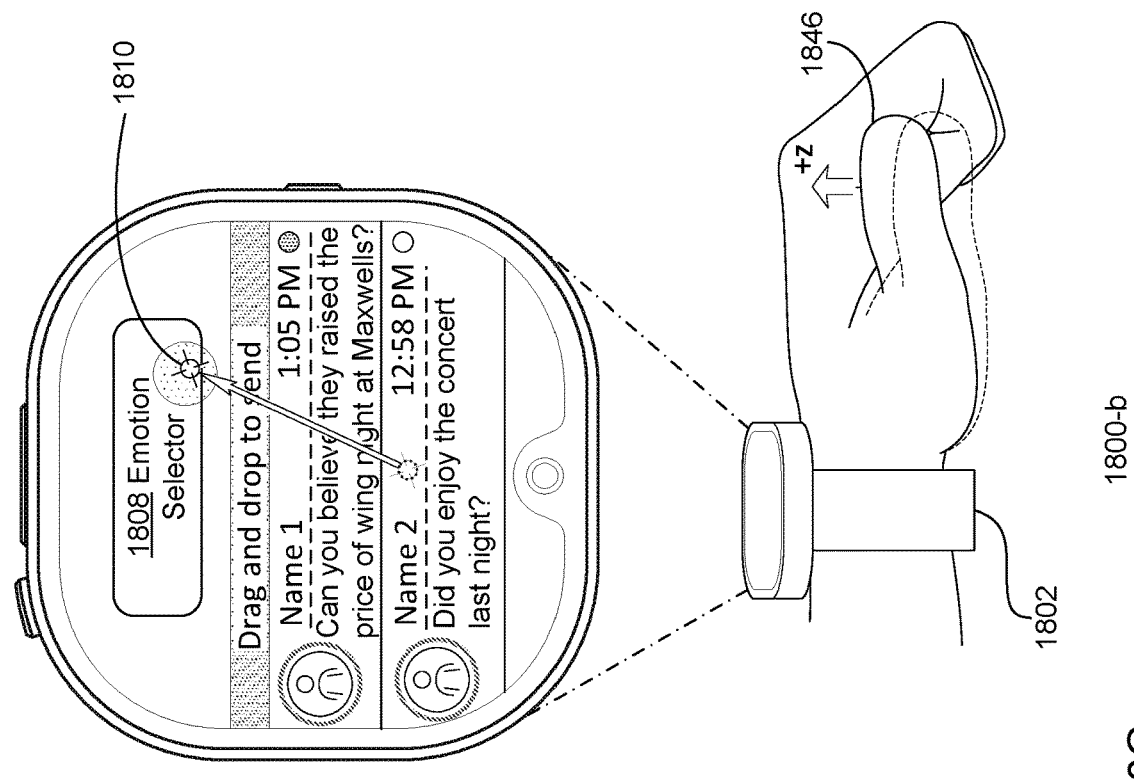
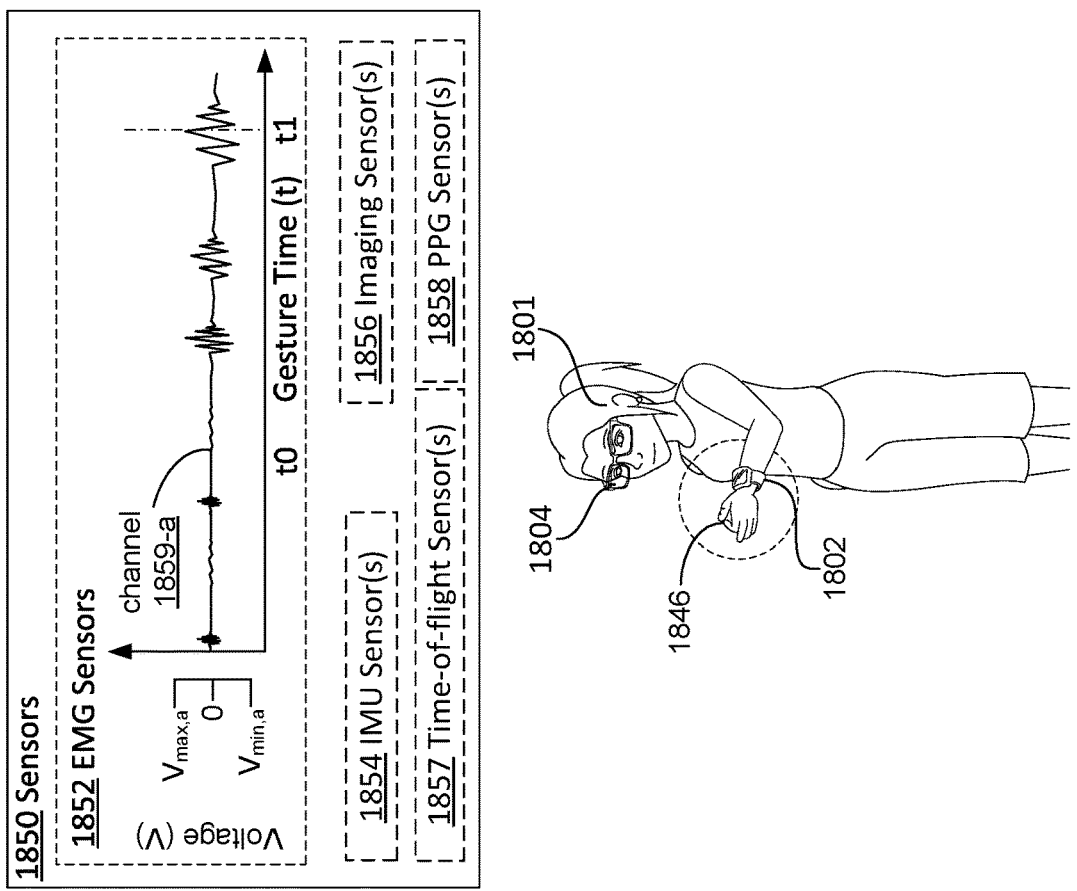
Figure 18G

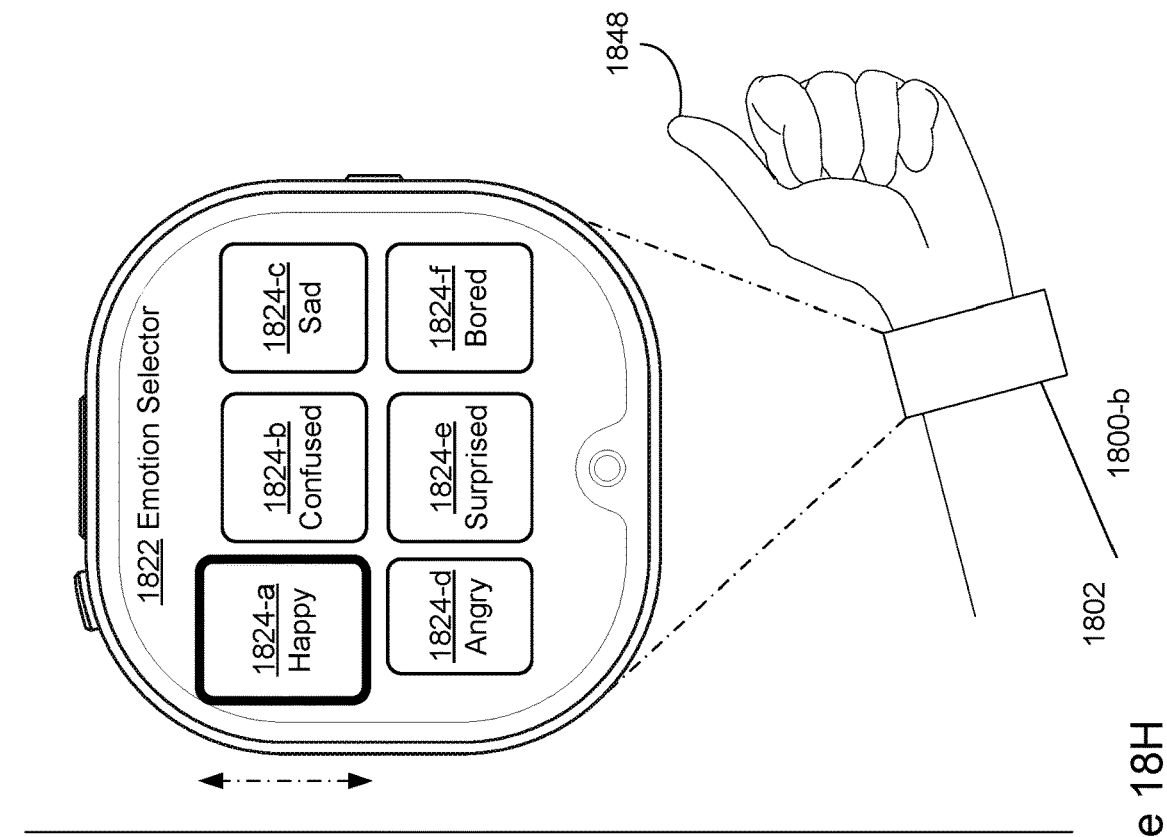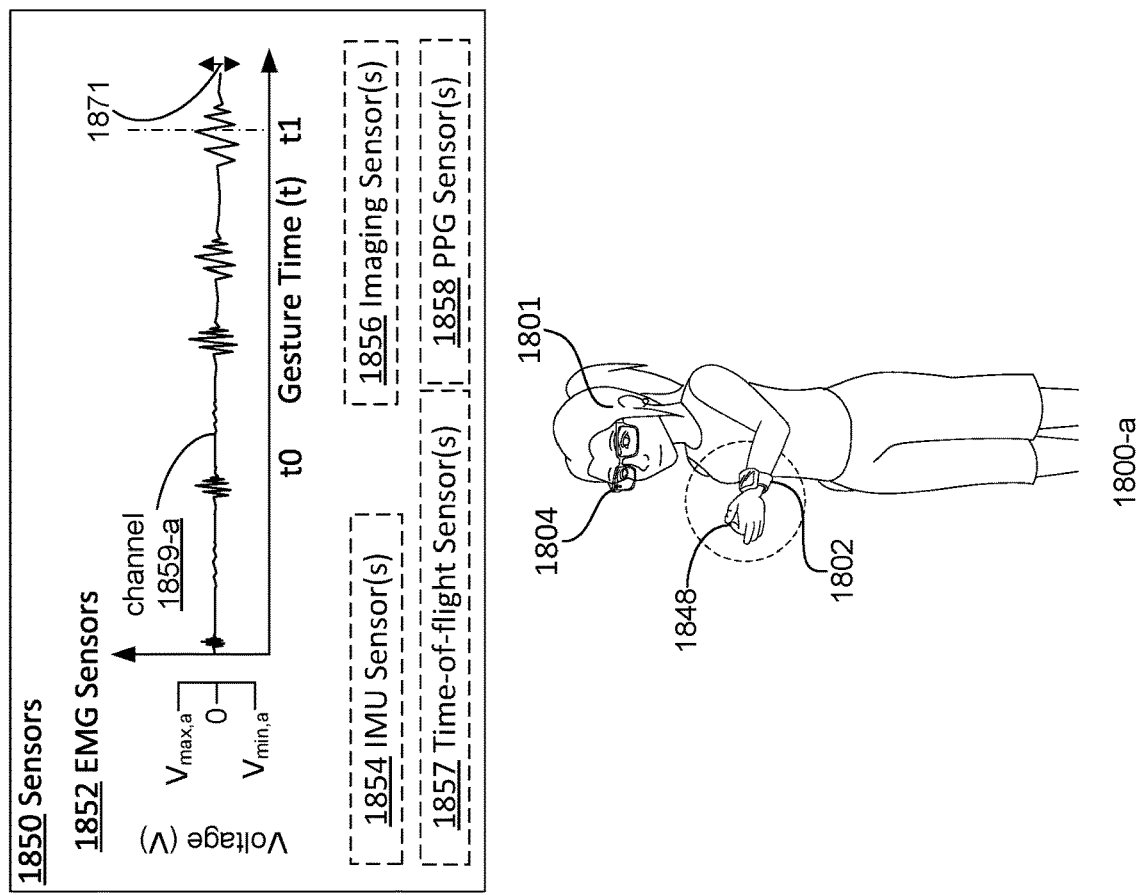
Figure 18H

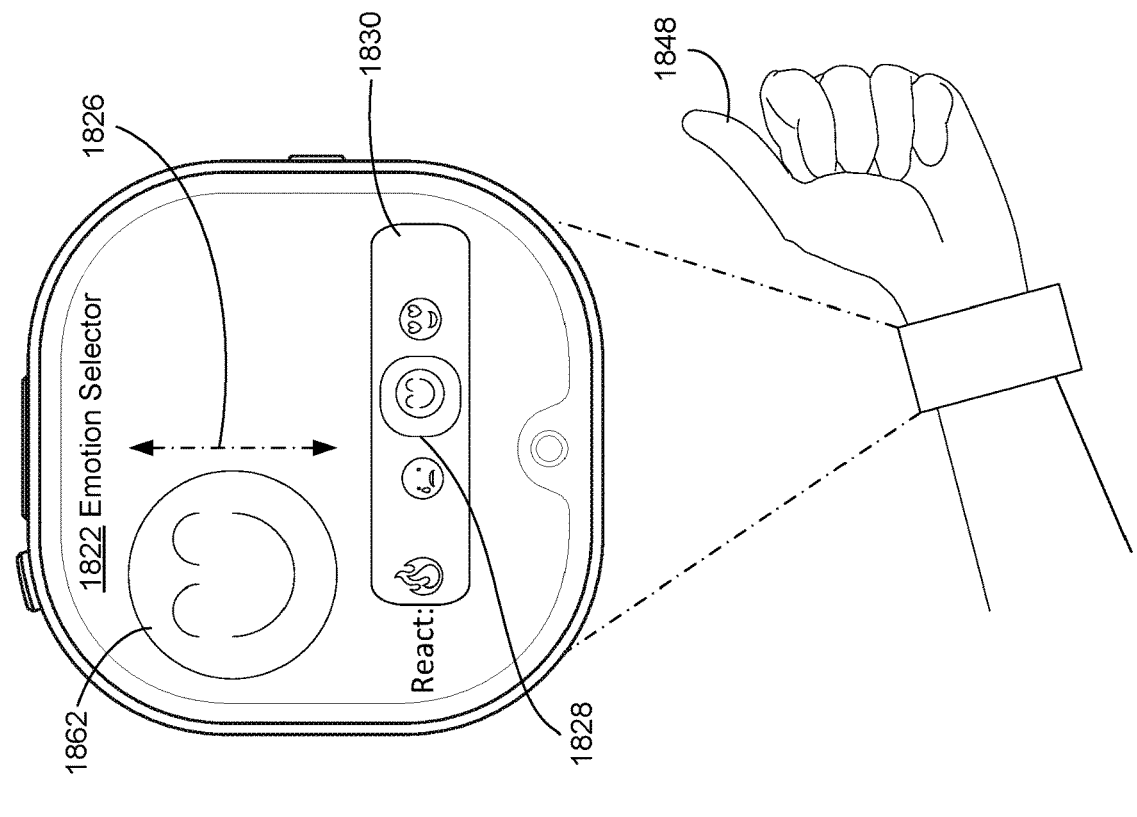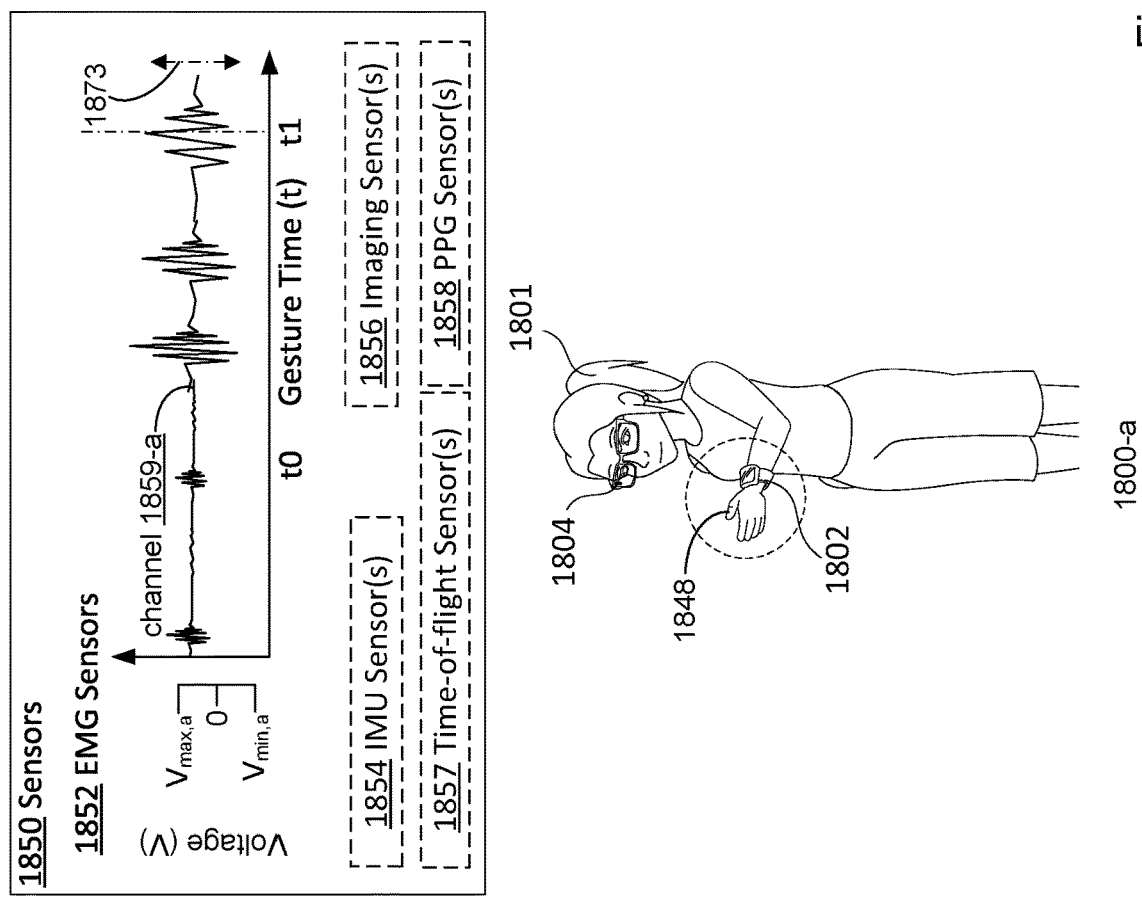
Figure 18I

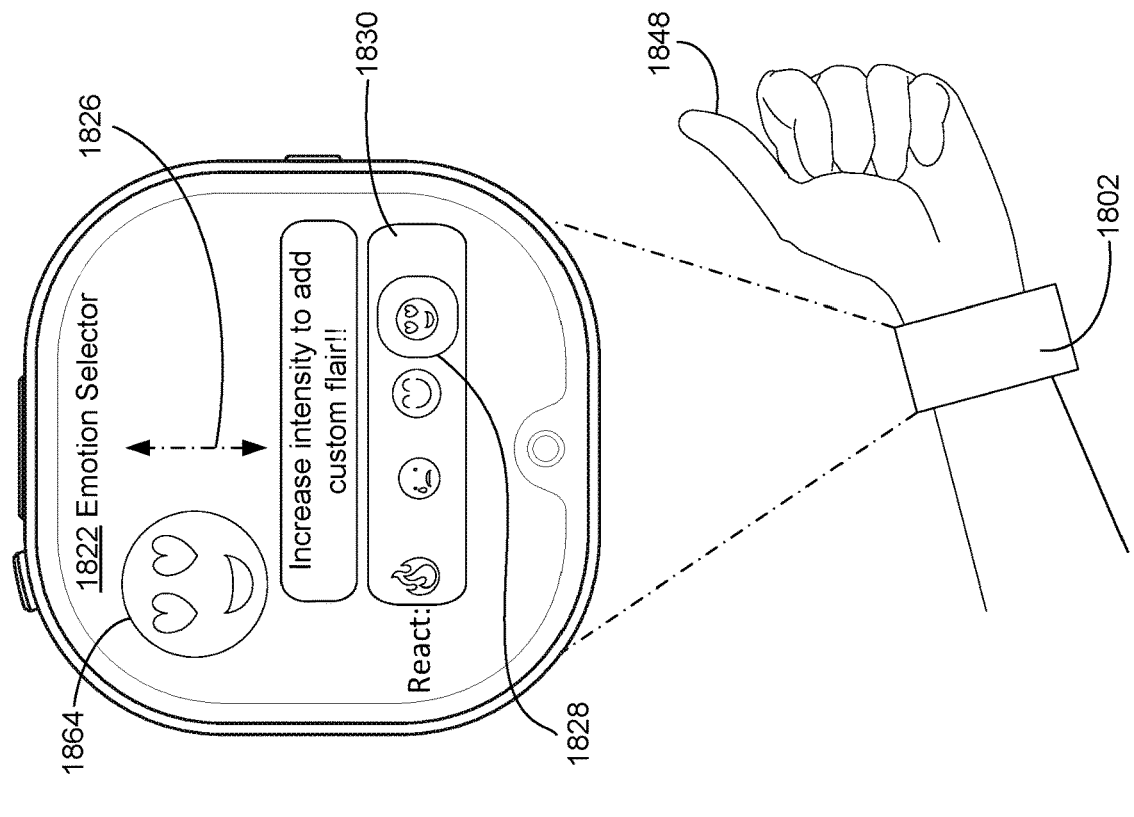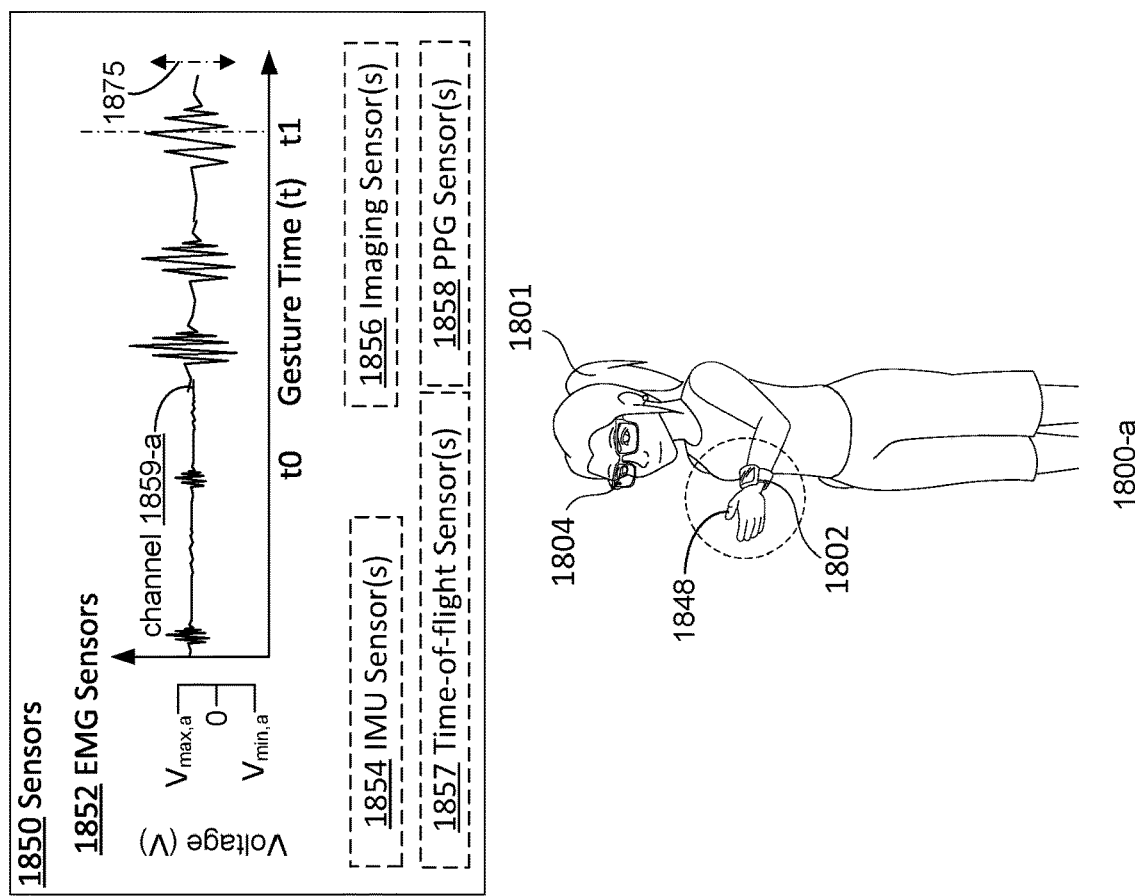
Figure 18J

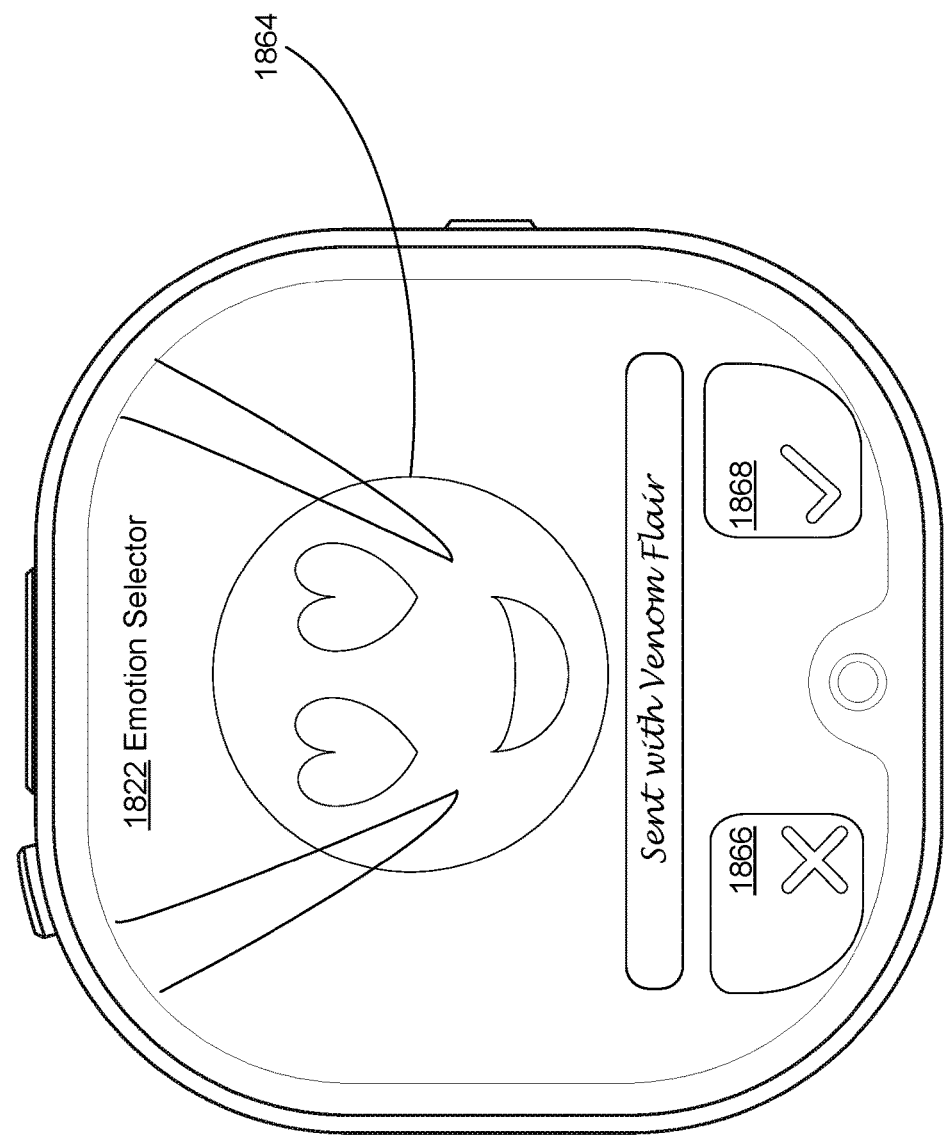
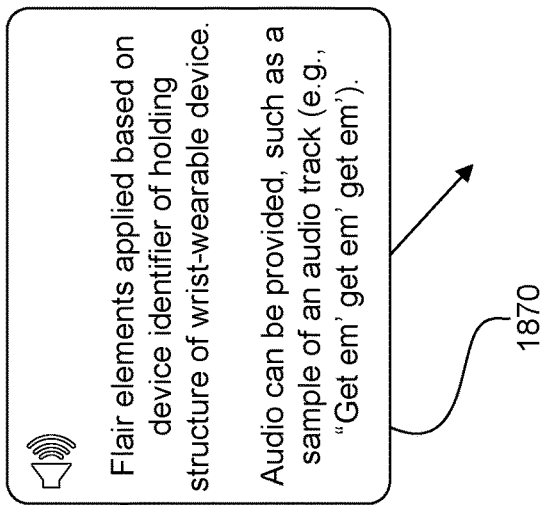
Figure 18K

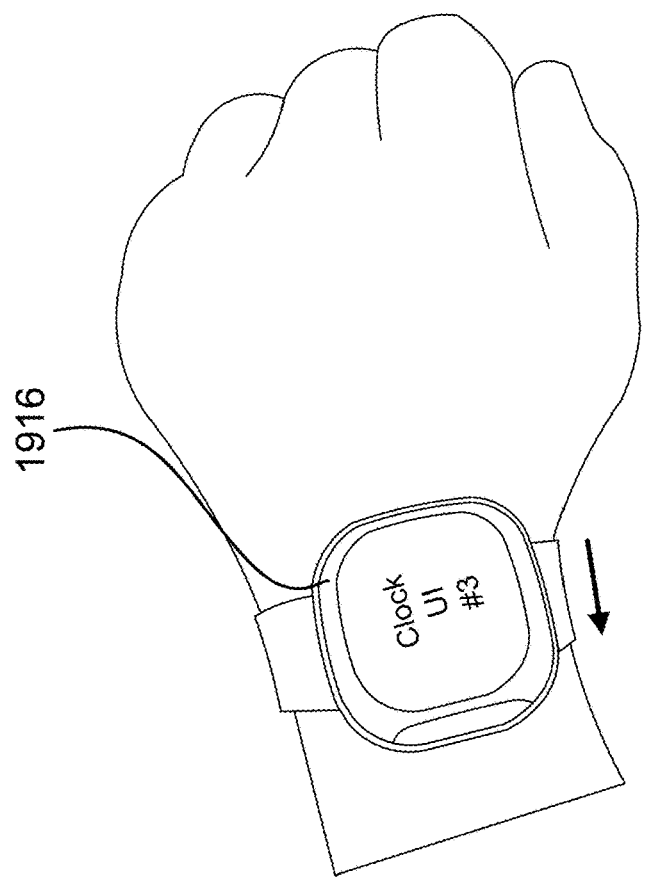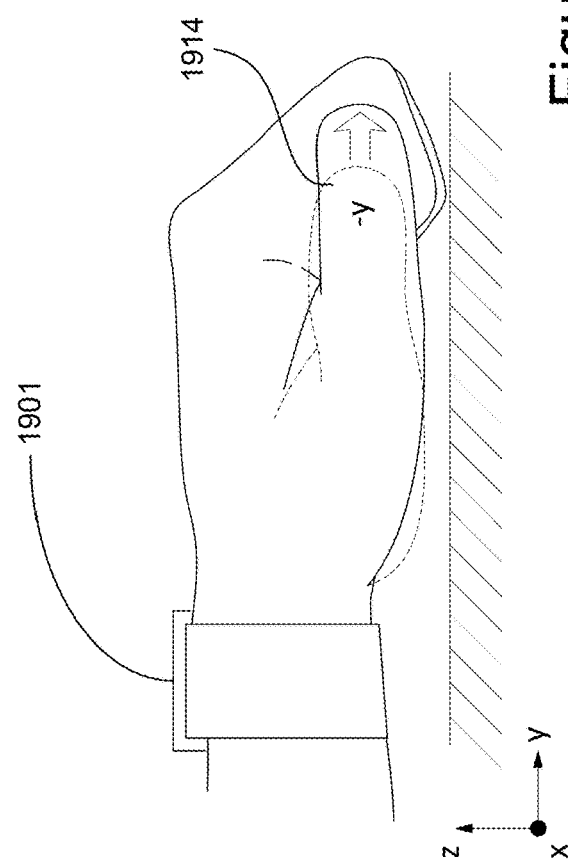
Figure 19D

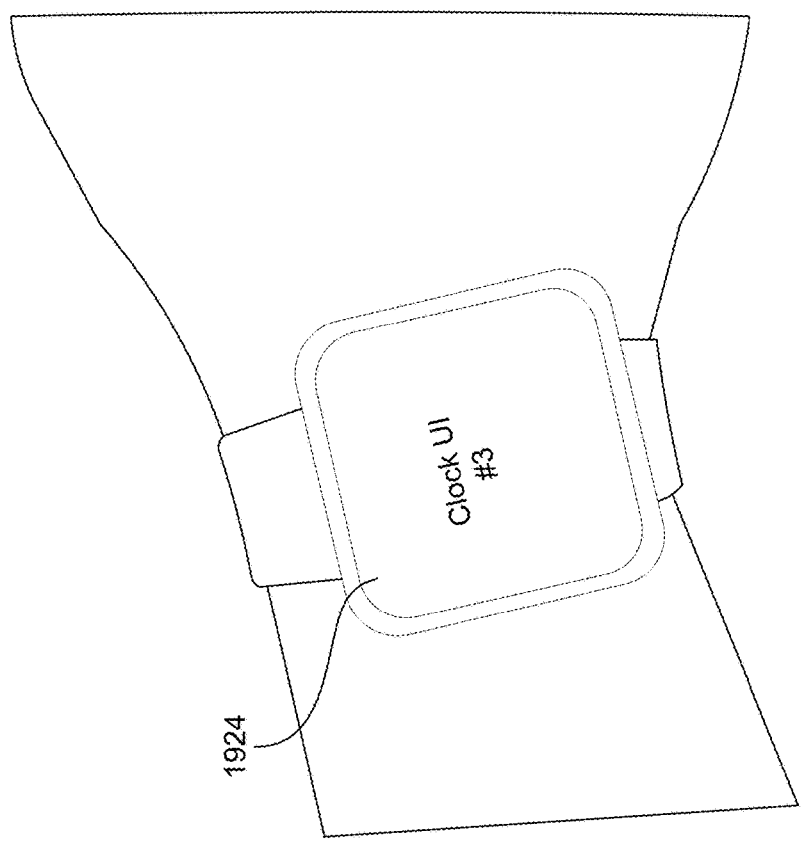
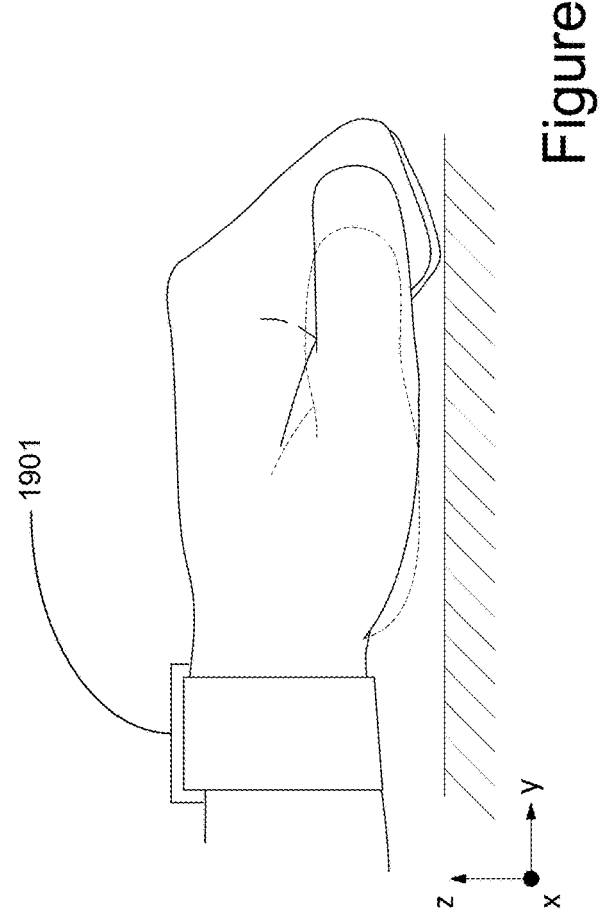
Figure 19F

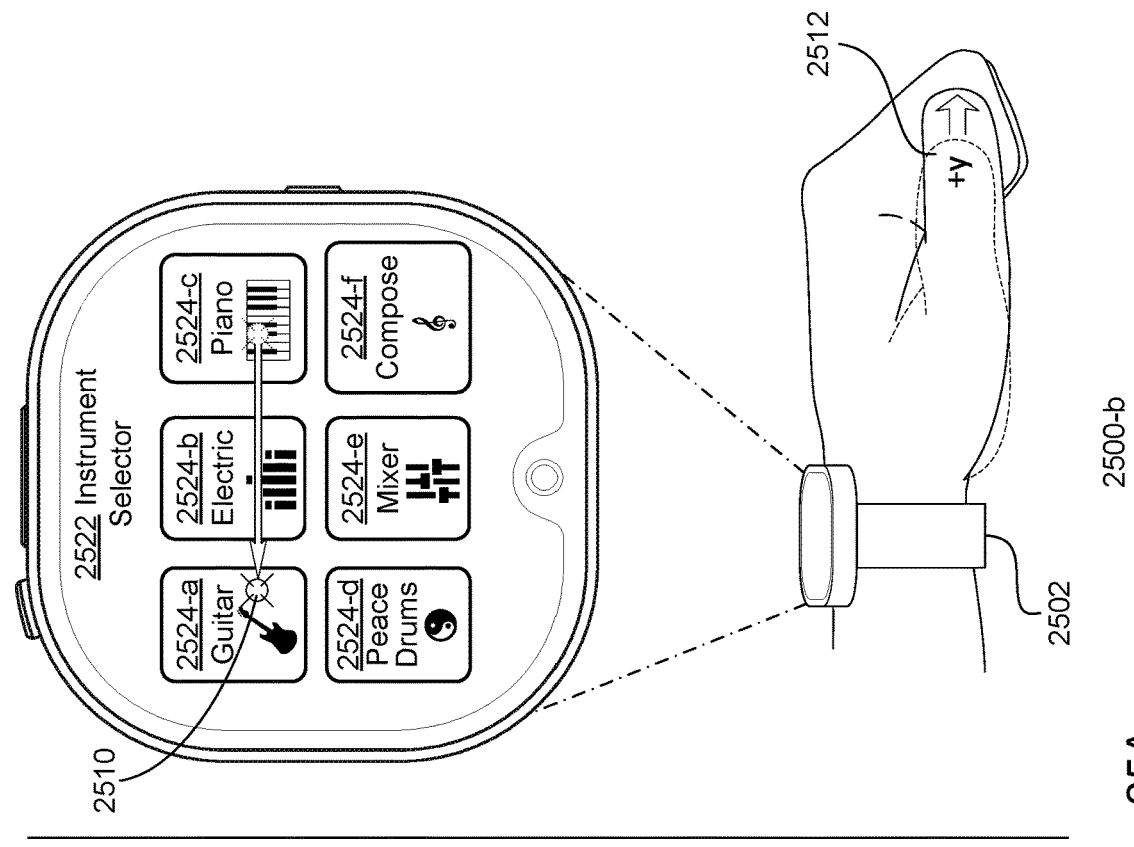
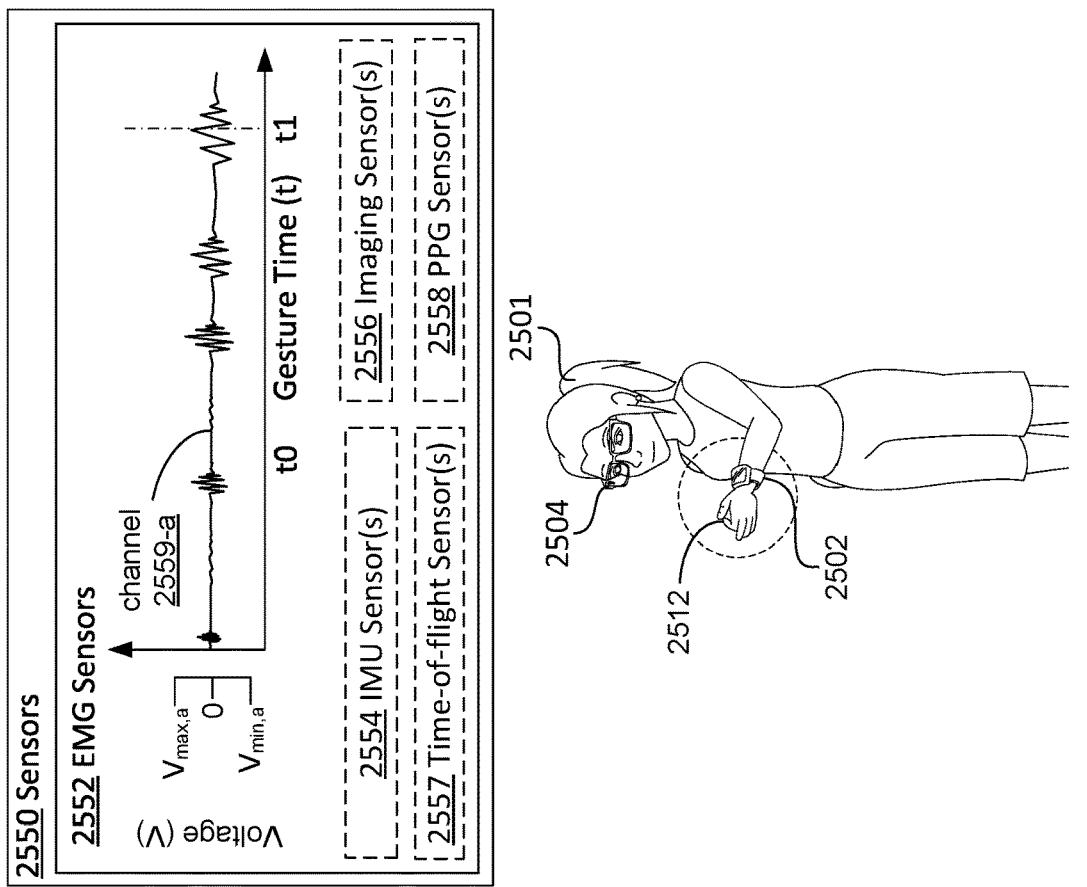
Figure 25A

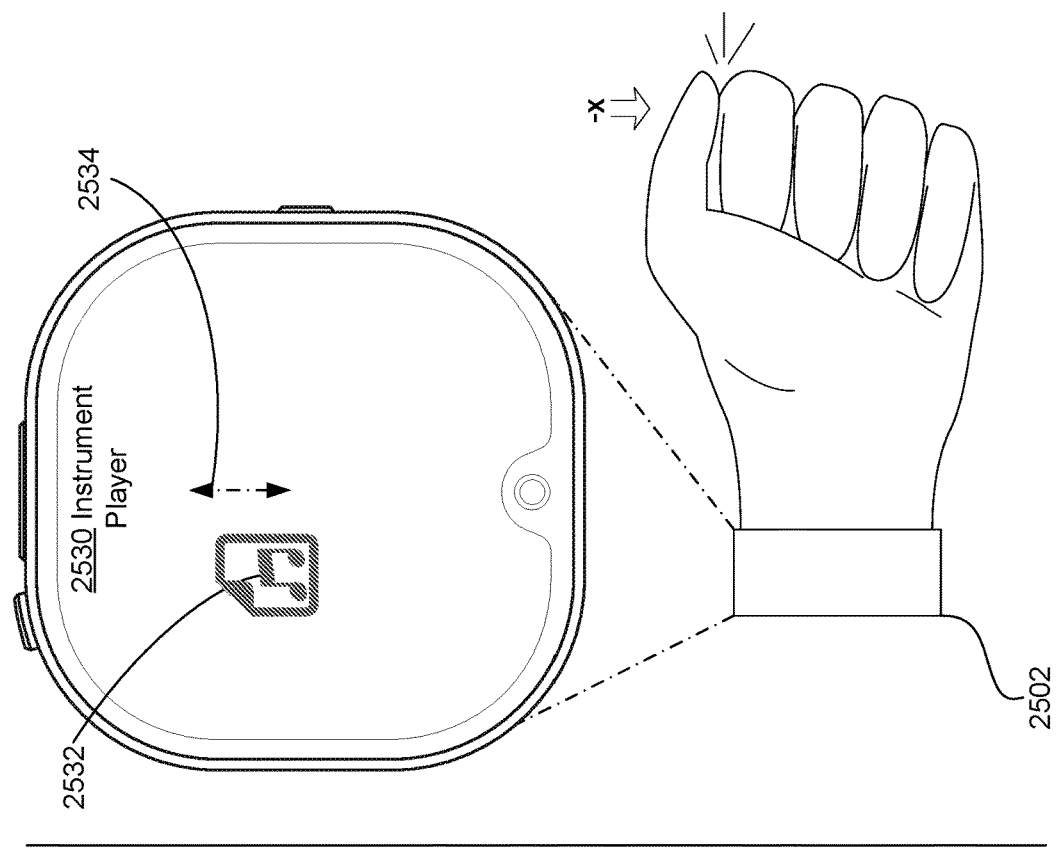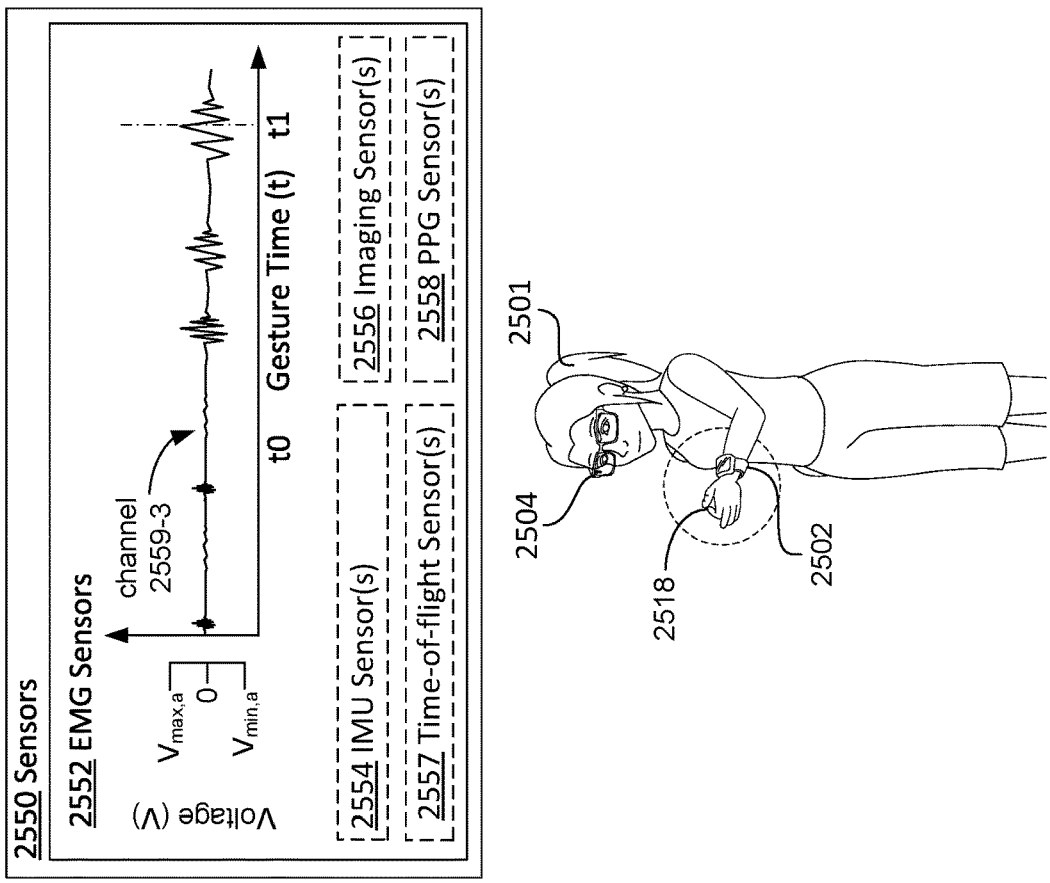
Figure 25B

TECHNIQUES FOR ADJUSTING A DETACHABLE DISPLAY CAPSULE OF A WRIST-WEARABLE DEVICE TO OPERATIONALLY COMPLEMENT A WEARABLE-STRUCTURE ATTACHMENT, AND WEARABLE DEVICES AND SYSTEMS FOR PERFORMING THOSE TECHNIQUES

RELATED APPLICATIONS

This application claims priority to U.S. Prov. App. No. 63/382,697, filed on Nov. 7, 2022, and entitled "Controlling A Plurality Of Available Electronic Devices Based On In-Air Hand Gestures Detected Via A Wrist-Wearable Device, Using In-Air Hand Gestures To Modify Graphical Images Before Sending The Graphical Images Via A Messaging Application"; U.S. Prov. App. No. 63/415,607, filed on Oct. 12, 2022, and entitled "Adjusting a Detachable Display Capsule to Operationally Complement a Wearable-Structure Attachment, Revealing a Hidden User-Interface Feature During a Self-Care Activity, and Adjusting a Background Image Based on Receipt of an Electronic Notification"; U.S. Prov. App. No. 63/404,535, filed on Sep. 7, 2022, and entitled "Adjusting A Detachable Display Capsule To Operationally Complement A Wearable-Structure Attachment, Revealing A Hidden User-Interface Feature During A Self-Care Activity, And Adjusting A Background Image Based On Receipt Of An Electronic Notification"; and U.S. Prov. App. No. 63/338,892, filed on May 6, 2022, and entitled "Adjusting A Detachable Display Capsule To Operationally Complement A Wearable-Structure Attachment, Revealing A Hidden User-Interface Feature In Accordance With A User's Performance Of A Self-Care Activity, And Systems And Methods Of Use Thereof," each of which is incorporated herein by reference.

TECHNICAL FIELD

The present disclosure relates generally to wearable devices and methods for customizing experiences on wearable devices by presenting user-interface experiences (e.g., rendered on a display capsule of a wearable device which complement a characteristic of a wearable-structure attachment), including but not limited to techniques for adjusting a detachable display capsule of a wrist-wearable device to operationally complement a wearable-structure attachment (e.g., if a band portion of the wrist-wearable device has a certain theme, then user-experience features at the display capsule of the wrist-wearable device can be customized to complement the theme of the band portion of the wrist-wearable device).

BACKGROUND

Some wearable devices include detachable components (e.g., a detachable band of a smartwatch). When detachable components are swapped out for other detachable components, display features and characteristics on the wearable devices remain unchanged. To get a new smartwatch experience, users typically must purchase an entirely new device and learn a whole new ecosystem of user options, user interfaces, and the like. And the users cannot easily utilize different interactive experiences using a single device.

Wearable devices can attempt to motivate users to participate in exercise activities in various ways (e.g., by providing textual or graphic reminders). But these current motivational techniques have become overused and are less interesting (and too familiar) and thus less motivating for many users. Explorations around new ways to motivate users to participate in exercise activities and to participate in self-care activities more generally are needed.

As such, there is a need for addressing one or more of the drawbacks discussed above by leveraging opportunities to provide customized experiences for different detachable components, thereby improving the mechanical coupling of the detachable components, and by developing new ways to motivate users to complete self-care activities, and these needs are particularly strong for wrist-wearable devices.

SUMMARY

Methods and devices (e.g., wearable devices) for addressing one or more of the drawbacks discussed above are provided herein. Several example methods will now be briefly summarized. A skilled artisan will appreciate that the example methods described herein are not exhaustive illustrations of the possible use cases for the devices and systems described herein, and aspects of each respective example can be combined with aspects of other respective examples, in accordance with some embodiments.

A first example method involves adjusting a detachable display capsule of a wrist-wearable device (e.g., a smartwatch) to operationally complement a wearable structure. In some embodiments, the wearable structure includes a band portion to allow for wearing the wrist-wearable device and/or a cradle portion to which the display portion can be securely attached. With this first example method, the wrist-wearable devices discussed herein can provide customized display experiences in the user interfaces that are coordinated with and complement an aesthetic theme of a wearable structure, such that a user can quickly and easily attach the display capsule with different bands to then activate a customized experience for each band. In some embodiments, aspects of the customized experiences can include color schemes of the displayed user interfaces, haptic feedback provided when notifications are received, how electronic messages are delivered, and other examples).

The first example method can include, while a display capsule is configured to use a default set of display characteristics in conjunction with operating-system or application-level user interfaces available via the display capsule, receiving, at the display capsule, identifying information for a respective wearable structure of a plurality of wearable structures. The display capsule can be configured to detachably couple to one of the plurality of wearable structures to form a wrist-wearable device (e.g., as shown between FIGS. 1A-1D and 2A-2D, the display capsule can be coupled with different wearable structures). In accordance with a determination that the display capsule should be adjusted based on the identifying information for the respective wearable structure, the method further includes, adjusting the display capsule (i) to cease using the first set of display characteristics in conjunction with the operating-system or application-level user interfaces, and (ii) to instead use a customized set of display characteristics associated with the respective wearable structure (e.g., in FIG. 1B, after the display capsule has been coupled with the wearable structure that has a particular aesthetic theme, visual characteristics of the display capsule are adjusted to complement the particular aesthetic theme of the wearable structure). The customized set of display characteristics is distinct from the default set of display characteristics and is also used in conjunction with the operating-system or application-level user interfaces (e.g., as shown in FIG. 1A, when the default set is utilized, a watch-face user interface has a different visual appearance as compared to when the customized set of visual characteristics is utilized).

Turning next to the second example method, this one involves gradually revealing a hidden user-interface feature (e.g., a background portion of a user interface, such as a background of a watch-face user interface) in accordance with performance of a self-care activity (e.g., a physical, meditative, or breathing exercise, or activity involving attendance at health-related appointments). This helps to motivate users to perform, and complete performance of, self-care activities to ensure they are able to reveal all of the hidden user-interface feature.

The second example method can include, while a user of an electronic device has performed less than a first threshold amount of a self-care activity, displaying, on a display of the electronic device or another electronic device that is in communication with the electronic device, a user interface without displaying a hidden user-interface feature that is associated with the user interface (e.g., in FIG. 3A, a workout user interface is shown and a hidden user-interface feature in the form of a picture is not currently displayed). In accordance with a determination that the user of the electronic device has performed more than the first threshold amount of the self-care activity (e.g., the first threshold can correspond to 30% completion of the self-care activity), the method also includes, revealing, on the display, a first portion of the hidden user-interface feature within the user interface (e.g., in FIG. 3B, since the user has performed more than the first threshold amount of the self-care activity, a first portion of the hidden user-interface feature is then displayed). In accordance with a determination that the user of the electronic device has performed more than a second threshold amount of the self-care activity, the second threshold amount being an amount that is greater than the first threshold amount, the method additional includes, continuing to display, on the display, the first portion of the hidden user-interface feature within the user interface, and revealing, on the display, a second portion of the hidden user-interface feature within the user interface.

Turning next to third example device, this one involves the mechanical aspects of the detachable display capsule and a holding structure, which can be a part of a mechanical structure that includes a wearable band portion (e.g., a wrist-wearable band), configured to receive the display capsule. With this third example device, users are provided with an efficient and intuitive experience for coupling a display capsule with one or more of a plurality of potential holding structures. The display capsule and/or the holding structure can include magnetic components for activating operations at the display capsule that correspond to peripheral elements of the holding structure (e.g., depressible and/or rotatable elements (e.g., dials or buttons)), such that the peripheral elements are properly positioned to interact with the magnetic components of the display capsule.

The third example device can include a display capsule (e.g., the display capsule shown in FIGS. 9A-9B) that includes (i) a touch-sensitive display and (ii) a housing integrally formed with the touch sensitive display. The housing can define a first outer perimeter that extends beyond a second outer perimeter of the touch sensitive display, such that (i) a display-coupling edge is defined by a portion of the display capsule that extends above the first outer perimeter of the housing and (ii) a housing-coupling edge is defined by the portion of the housing between the first outer perimeter of the housing and the second outer perimeter of the touch-sensitive display, the housing-coupling edge being generally orthogonal to the display coupling edge. The display-coupling edge and the housing-coupling edge are configured to be surrounded by a holding structure, wherein the holding structure is configured to fixedly hold the display capsule in place. The holding structure can be a component of a band of a wrist-wearable device, such as holding structure 1004 in FIG. 10B.

Turning next to a fourth example method, this one involves adjusting a background image on a lock-screen user interface to identify an electronic notification.

The fourth example method can include displaying, on a lock-screen user interface of an electronic device, a background image that has a default value for a visual characteristic. The method further includes, in response to receiving an electronic notification, updating the lock-screen user interface to include an indication that the electronic notification was received. And the method includes modifying the presentation of a background image displayed on the lock-screen user interface such that a notification-alert value for the visual characteristic is utilized instead of the default value for the visual characteristic, where the notification-alert value for the visual characteristic causes the background image to visually direct a user of the electronic device to the indication that the electronic notification was received.

Turning next to a fifth example method, this one involves using a wrist-wearable device to obtain device identifiers of other electronic devices that the user is able to control via in-air hand gestures that can be detected by neuromuscular-signal sensors of the wrist-wearable device.

The fifth example method includes obtaining respective identifiers for a plurality of available electronic devices configured to communicate with a wrist-wearable device, the wrist-wearable device configured to monitor neuromuscular signals corresponding to respective commands to be performed at one or more of the plurality of available electronic devices. The method includes determining that a first in-air hand gesture, detected using a neuromuscular-signal sensor of a wrist-wearable device, is directed towards a first available electronic device of the plurality of available electronic devices, wherein the determining includes analyzing (i) a direction associated with the gesture, and (ii) a configuration of the first available electronic device. The method includes, based on determining that the first in-air hand gesture is directed towards the first available electronic device, causing an operation to be performed at the first available electronic device. The method includes determining that a second in-air hand gesture, distinct from the first in-air hand gesture, detected using the neuromuscular-signal sensor of the wrist-wearable device, is directed towards the wrist-wearable device. And the method includes, based on determining that the second in-air hand gesture is directed towards the wrist-wearable device, causing an operation to be performed at the wrist-wearable device.

Turning next to a sixth example method, this one involves performing a two-part gesture detected by neuromuscular-signal sensors of a wrist-wearable device to (i) select a graphical image to present, and (ii) adjust a visual aspect of the graphical image based on data from the neuromuscular-signal sensor.

The sixth example method includes, while causing display of a user interface associated with a messaging application: (i) detecting, based at least in part on data from a neuromuscular-signal sensor, a first in-air hand gesture performed by a user of a wrist-wearable device, the first in-air hand gesture corresponding to a graphical image available within the messaging application, and (ii) in response to detecting the in-air hand gesture, presenting a representation of the graphical image within the messaging application. The method includes, while presenting the representation of the graphical image, detecting, based at least in part on data from the neuromuscular-signal sensor, a second in-air hand gesture performed by the user, the second in-air hand gesture corresponding to an adjustment to the graphical image. And the method includes, in response to detecting the second in-air hand gesture, adjusting the presentation of the graphical image in accordance with a characteristic of the second in-air hand gesture.

The seventh example method includes, after receiving a request to use a protected resource, (i) detecting, via a neuromuscular-signal sensor of a wrist-wearable device, an in-air hand gesture, and (ii) in accordance with a determination that the in-air hand gesture is an authentication gesture associated with the protected resource, authorizing use of the protected resource.

Further improvements are necessary to mechanical components of such devices to make swapping of components more efficient for users to improve the man-machine interface of the devices. Additionally, further improvements to customization of display characteristics of electronic devices based on device identifiers cause a customized experience to be provided to users based on their respective intended uses and interests at that particular time. For example, a user may wish to experience one set of display characteristics when they are performing the basic functions of their day (e.g., school, work, etc.). And the same user may wish to be provided with a different experience when they are performing a fitness activity or attending social gatherings. The devices, systems, and methods described herein allow users to use the same display capsule (e.g., compute core) in conjunction with a variety of housing structures (e.g., wearable bands, mountable cams, desk stands, etc.) in order to adapt the computing experience accordingly intuitively and efficiently.

Because of the additional engagement and excitement that these new methods offer (e.g., by encouraging users to explore the new visual characteristics activated as the users make use of different wearable structures and by motivating users to stay engaged with their self-care routines), these methods help to further the important goals of achieving sustained user interactions with wearable devices, and with electronic devices more generally. Improved man-machine interfaces are also achieved. These and more advantages are described in detail below, but attention is first directed to a brief description of the drawings.

BRIEF DESCRIPTION OF THE DRAWINGS

A more particular description may be had by reference to the features of various embodiments, some of which are illustrated in the appended drawings. The appended drawings illustrate pertinent example features of the present disclosure. The description may admit to other effective features as the person of skill in this art will appreciate upon reading this disclosure.

FIG. 4 is a flow diagram of a method of adjusting a detachable display capsule of a wrist-wearable device to operationally complement a wearable-structure attachment, in accordance with some embodiments.

FIG. 5 is a flow diagram of a method of gradually revealing a hidden user-interface feature in accordance with performance of a self-care activity, in accordance with some embodiments.

FIGS. 14A-14B illustrate a flow diagram of an example method for using a display capsule that is configured to be coupled with a holding structure.

FIGS. 17A-17E illustrate an example sequence in which a user performs a multi-part gesture that causes an operation to be performed at a protected resource electronic device.

FIGS. 19A-19F illustrate another example sequence in which a user is performing gesture to cause an operation to be performed at a wrist-wearable device.

FIGS. 25A-25B illustrate an example sequence in which a user performs a gesture that causes an audio track to be obtained, in accordance with some embodiments.

In accordance with common practice, like reference numerals are used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

FIGS. 1A-1E illustrate a sequence in which a display capsule (e.g., display capsule 121) is detachably coupled with a first wearable structure. The first wearable structure includes a band portion 102 and a cradle portion 103 in the illustrated example, and the cradle portion is also referred to as a holding structure in conjunction with other embodiments discussed below) to then cause the display to present display characteristics that are coordinated with the first wearable structure, in accordance with some embodiments. In some embodiments, the display characteristics presented by the display of the display capsule 121 are based in part on a device identifier stored at the wearable structure while the display capsule is detachably coupled to the first wearable structure. In some embodiments the device identifier is a radio frequency identification (RFID) tag. A wearable structure can include a band portion and a cradle portion/ holding structure such that once a display capsule is coupled to the wearable structure, a wrist-wearable device is formed.

Figure 1A:
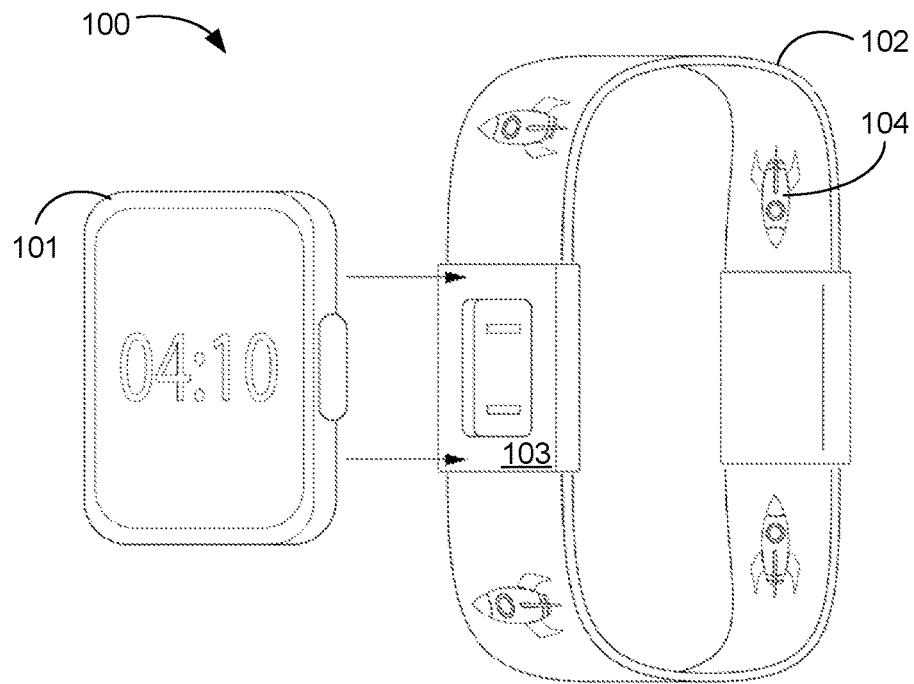
FIGS. 1A-1D illustrate a sequence in which a display capsule (e.g., display capsule 121) is detachably coupled with a first wearable structure (which includes a band portion 102 and a cradle portion 103 in the illustrated example) to then cause the display portion to present display characteristics that are coordinated with the first wearable structure, in accordance with some embodiments. A cradle portion is also referred to as a holding structure herein for certain embodiments.

At a first time in the sequence, FIG. 1A shows that a display capsule 101 has not yet been coupled with the wearable structure (which includes a cradle portion 103 and a band portion 102). As illustrated, when the display capsule 101 has not yet been coupled with the wearable structure, the display capsule 121 can be using a default set of display characteristics. For example, the watch-face user interface shown on the display capsule 121 in FIG. 1A does not include any extra icons or features, but only displays a current time (e.g., 04:10 in the illustrated example). In some embodiments, the default display characteristics include a digital clock interface element shown in FIG. 1A.

Figure 1B:
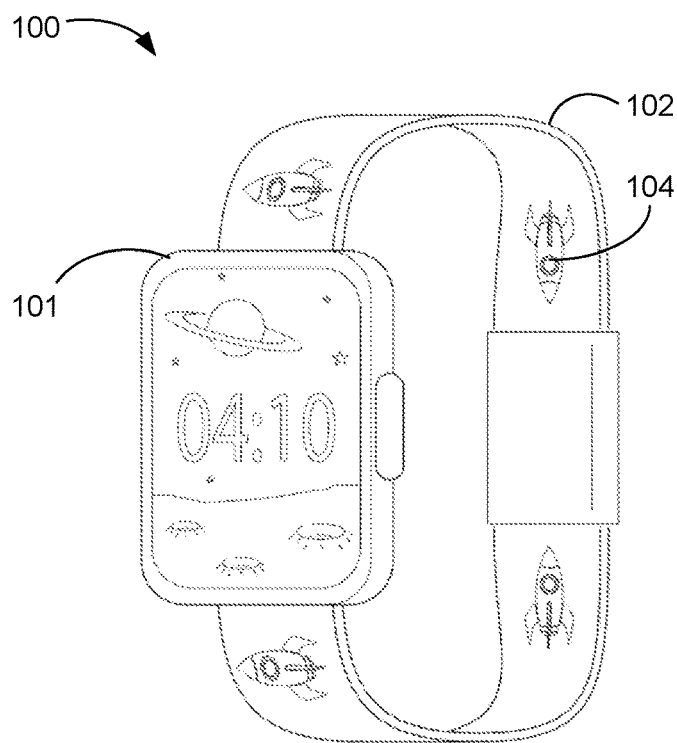

At a second point in time in the sequence, FIG. 1B shows that the display capsule 101 has been coupled with the wearable structure by attaching it to the cradle portion 103. This attachment can be made using frictional forces, magnetic-attractive forces, and combinations of both, in some embodiments. Because the display capsule 121 is now coupled with the wearable structure, FIG. 1B also shows that customized display characteristics can now be utilized. For example, the watch-face user interface no longer uses the default set of display characteristics, but instead includes display features that correspond to an aesthetic theme of the wearable structure (e.g., a space/rocket theme as depicted by theme element 104 on the band portion 102). In some embodiments, some default display characteristics are not overridden by customized display characteristics of respective wearable structures.

Figure 1C:
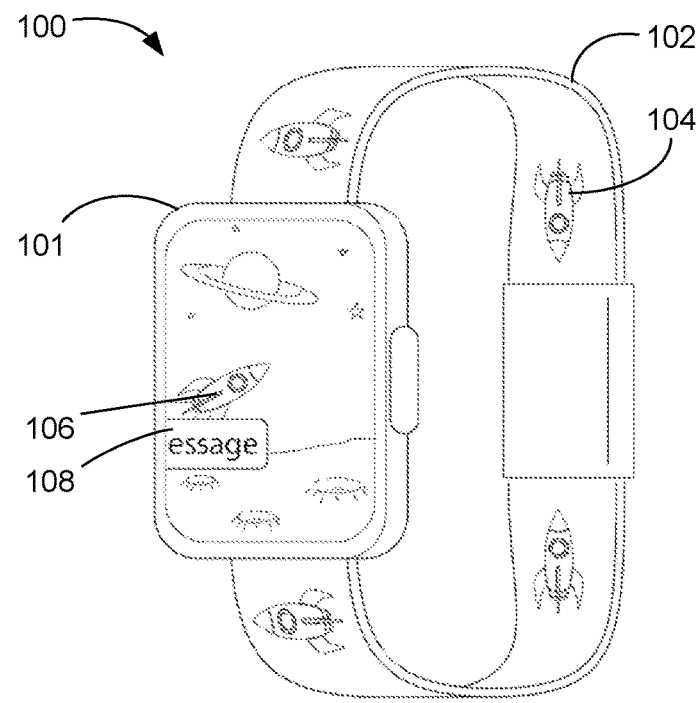
Figure 1D:
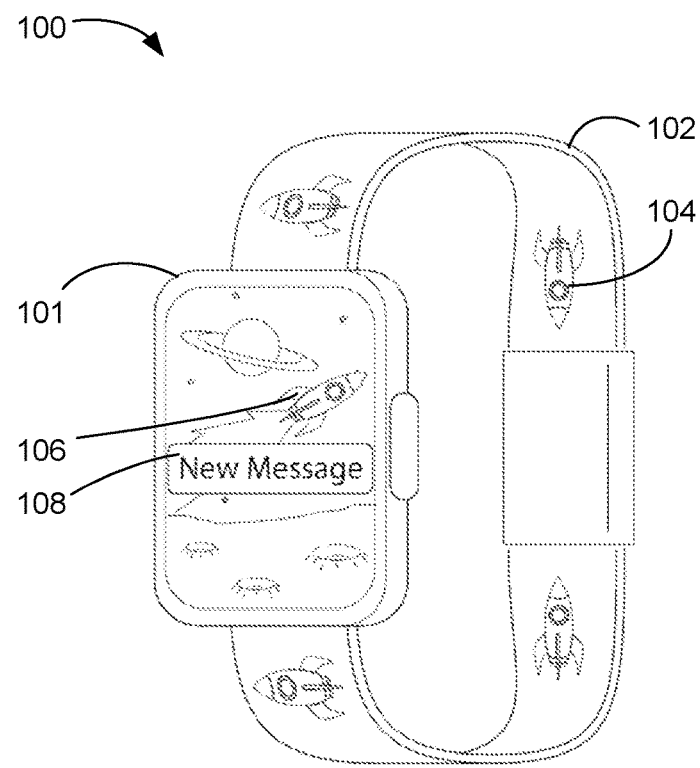

In some embodiments, additional customized display characteristics are applied based on the wearer of the wrist-wearable device causing one or more particular operations to be performed (e.g., sending and/or receiving a message from another user of a different electronic device). For instance, FIGS. 1C-1D show a display customization being applied an electronic message is received, the wrist-wearable device can use customized elements to assist in animating a presentation of the receipt of the electronic message 108 (e.g., in the depicted example of FIGS. 1C-1D, a rocket ship 106 is shown carrying the electronic message on to the screen and, then once that electronic message has been carried on screen, the rocket ship can move away from the electronic message and off screen). In some embodiments, additional animation steps can be presented, including that an indication of a sending user can be shown (which can be a textual or graphic indication of the sending user's name and/or avatar), followed by the user of the customized elements to carry the electronic message on to the screen.

Figure 1E:
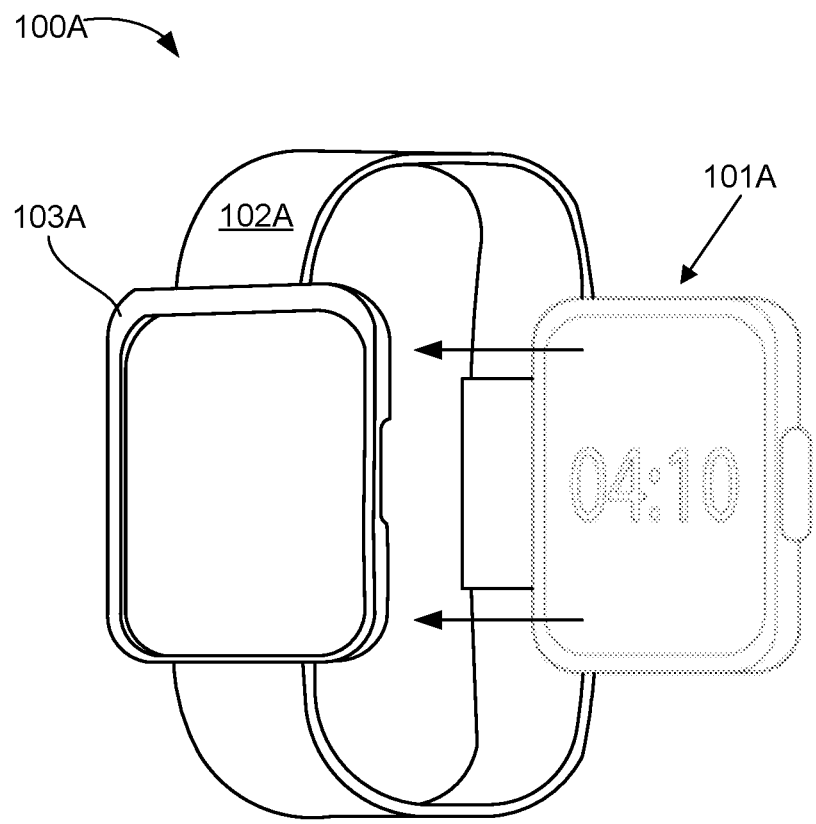
FIG. 1E depicts an alternative configuration in which the display capsule is attached to the wearable structure by pushing the display capsule in an upward direction to couple it with the cradle, in accordance with some embodiments. Additional details concerning embodiments of this mechanical coupling design are provided in reference to FIGS. 9A-10B.
Figure 2A:
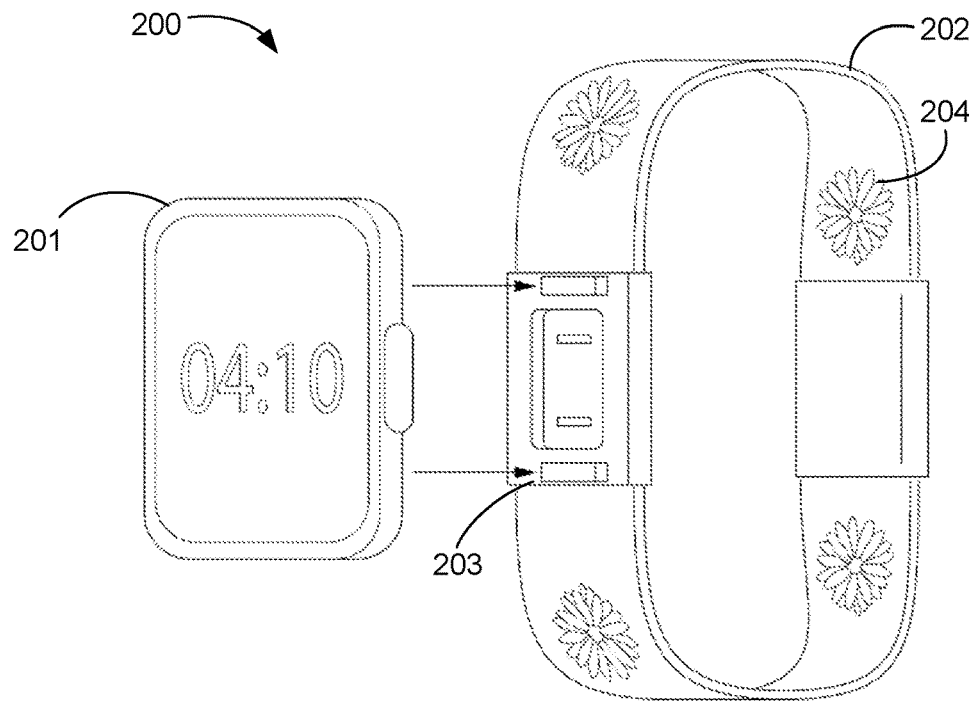
FIGS. 2A-2D illustrate a sequence in which a display capsule (e.g., display capsule 121) is detachably coupled with a second wearable structure, distinct from the first wearable structure of FIGS. 1A-1D, (which includes a band portion 102 and a cradle portion 103 in the illustrated example) to then cause the display portion to present display characteristics that are coordinated with the second wearable structure, in accordance with some embodiments.
Figure 2B:
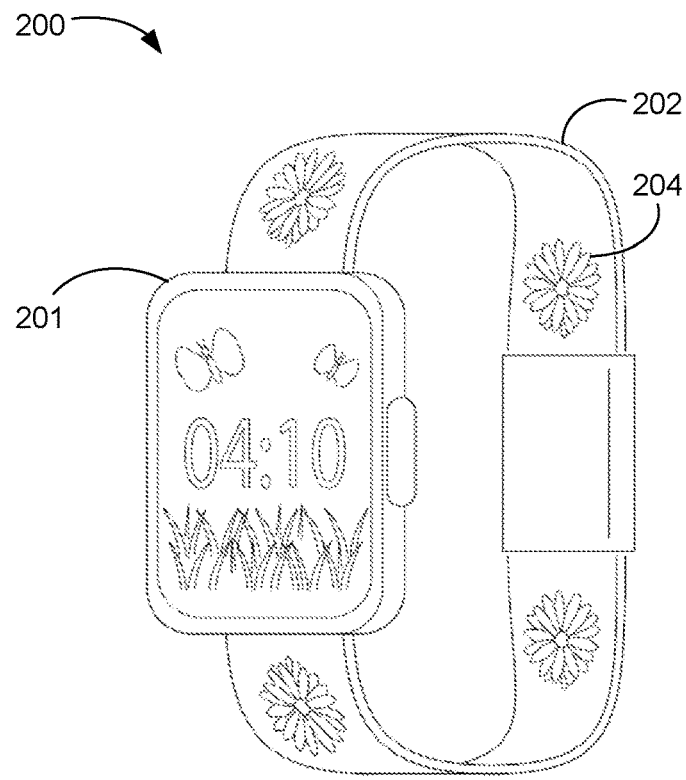
Figure 2C:
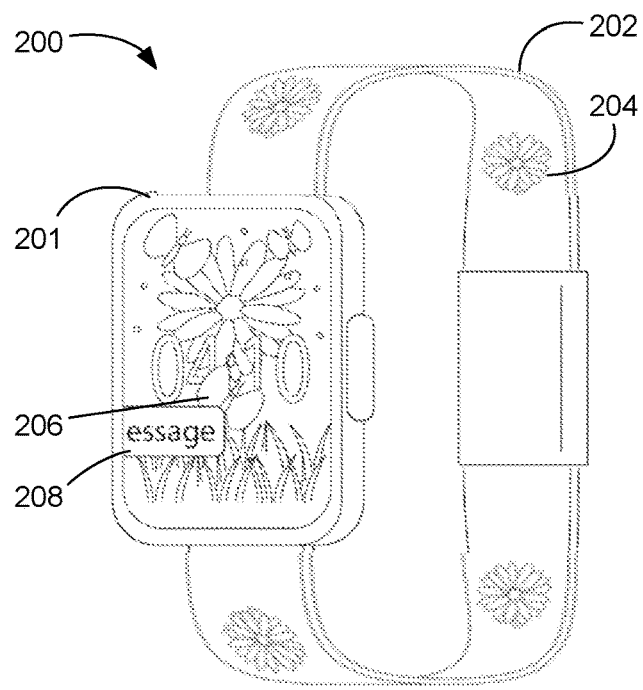
Figure 2D:
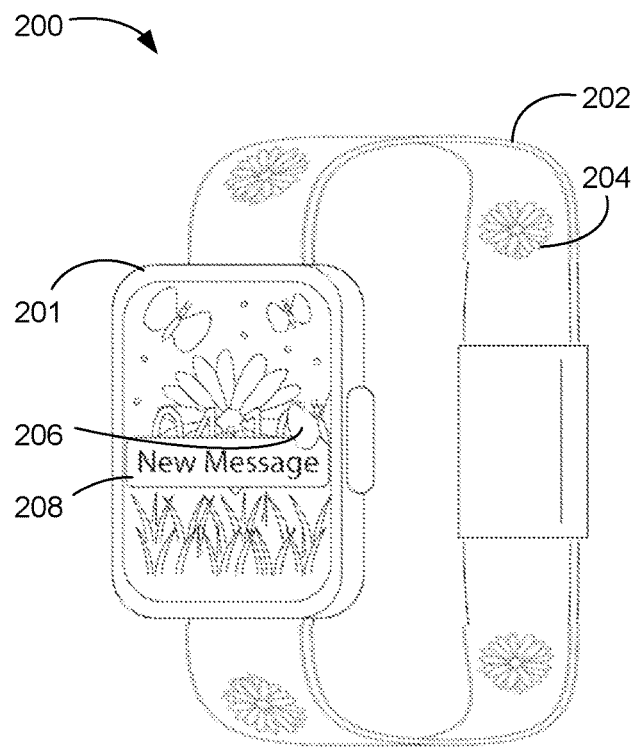

FIG. 1E depicts an alternative configuration in which the display capsule is attached to the wearable structure by pushing the display capsule in an upward direction to couple it with the cradle (rather than pushing the display capsule down into the cradle as shown in the FIG. 1A-1B example), in accordance with some embodiments. Once the display capsule is pushed upward into the cradle for the alternative configuration of FIG. 1E, the display capsule can then be held in place by a magnetic force and/or using a frictional coupling of a portion of the cradle such that it can surround part of the display capsule to further hold it in place. Other mechanical elements can also be utilized to further secure this attachment. In some embodiments, as will be discussed below with respect to FIGS. 9A-9B, the display capsule includes a housing that has a cornered edge that includes a display-coupling edge and a housing-coupling edge, where the cornered edge formed by the display-coupling edge and the housing-coupling edge is configured to couple with components of a holding structure (e.g., the frictional coupling portion of the cradle shown in FIG. 1E).

Attention is next directed to FIGS. 2A-2D, which generally show a wearable structure different from the one shown in FIGS. 1A-1D, which then results in a presentation of different customized experiences. In this way, users can quickly and easily swap in and out of using different wearable structures and then receive a customized experience that complements some characteristic of the band. In one more simplistic example, a color of the band can be used to allow the wrist-wearable device to select appropriate color hues to use through the operating system of the wrist-wearable device (e.g., if the band portion of the wearable structure has a blue color, then the customizations of the display capsule can include using a blue hue around certain icons and within certain user interfaces on an operating-system-wide basis).

More specifically, FIGS. 2A-2D illustrate a sequence in which a display capsule (e.g., display capsule 201) is detachably coupled with a second wearable structure, distinct from the first wearable structure of FIGS. 1A-1D, (which includes a band portion 202 and a cradle portion 203 in the illustrated example) to then cause the display portion to present display characteristics that are coordinated with the second wearable structure, in accordance with some embodiments. In some embodiments, as shown in FIGS. 13A-13D, other holding structures can be part of non-wearable devices (e.g., the bike cradle shown in FIG. 13A, the desk-mounted loop structure in FIG. 13C, etc.). As shown in FIGS. 2A-2D, because the wearable structure is associated with a flowery/garden theme 204, once it is coupled with the display capsule, customizations of the display capsule are made to complement the flowery/garden theme of the wearable structure (e.g., in FIG. 2B, flowery/garden themed elements are included on the watch-face user interface, and in FIGS. 2C-2D, an animated sequence is used in which a received electronic message 208 is brought onscreen using a butterfly 206). Other example wearable structures, and associated customized experiences that are provided upon coupling of those wearable structures with a display capsule, are described below in conjunction with FIGS. 10A-12F. FIGS. 13A-13D further illustrate that the display capsule can also be coupled with many different accessory devices to result in customized experiences upon coupling of the display capsule with those different accessory devices.

FIGS. 3A-3F illustrate a scenario in which a user of a wearable device is able to reveal a hidden user-interface feature while progressing through performance of a self-care activity (e.g., running in the illustrated example), in accordance with some embodiments. As discussed below with respect to Example Aspect B, such techniques can be used to reveal a plurality of different types of features while performing a variety of different activities, including activities that are not self-care activities. For example, a user could be motivated to attain a streak of sharing at a particular set of sharing applications (e.g., social-media applications, messaging applications, etc.).

As shown in the sequence depicted by FIGS. 3A-3F, as the user continues their run, they cross various activity thresholds. As those activity thresholds as each crossed, then wrist-wearable device reveals more and more of a hidden user-interface feature (e.g., first portion 302A is revealed in FIG. 3B after a first activity threshold is crossed, second portion 302B is revealed in FIG. 3C after a second activity threshold is crossed, and third portion 302C is revealed in FIG. 3D after a third activity threshold is crossed). Some embodiments can also cease displaying some of the portions if the user's activity level decreases (e.g., they discontinue their self-care activity for some period of time, then one of the respective portions 302 can cease to be displayed). Motivating messages can also be displayed, such as the example motivating message 306 of FIG. 3D.

Figure 3A:
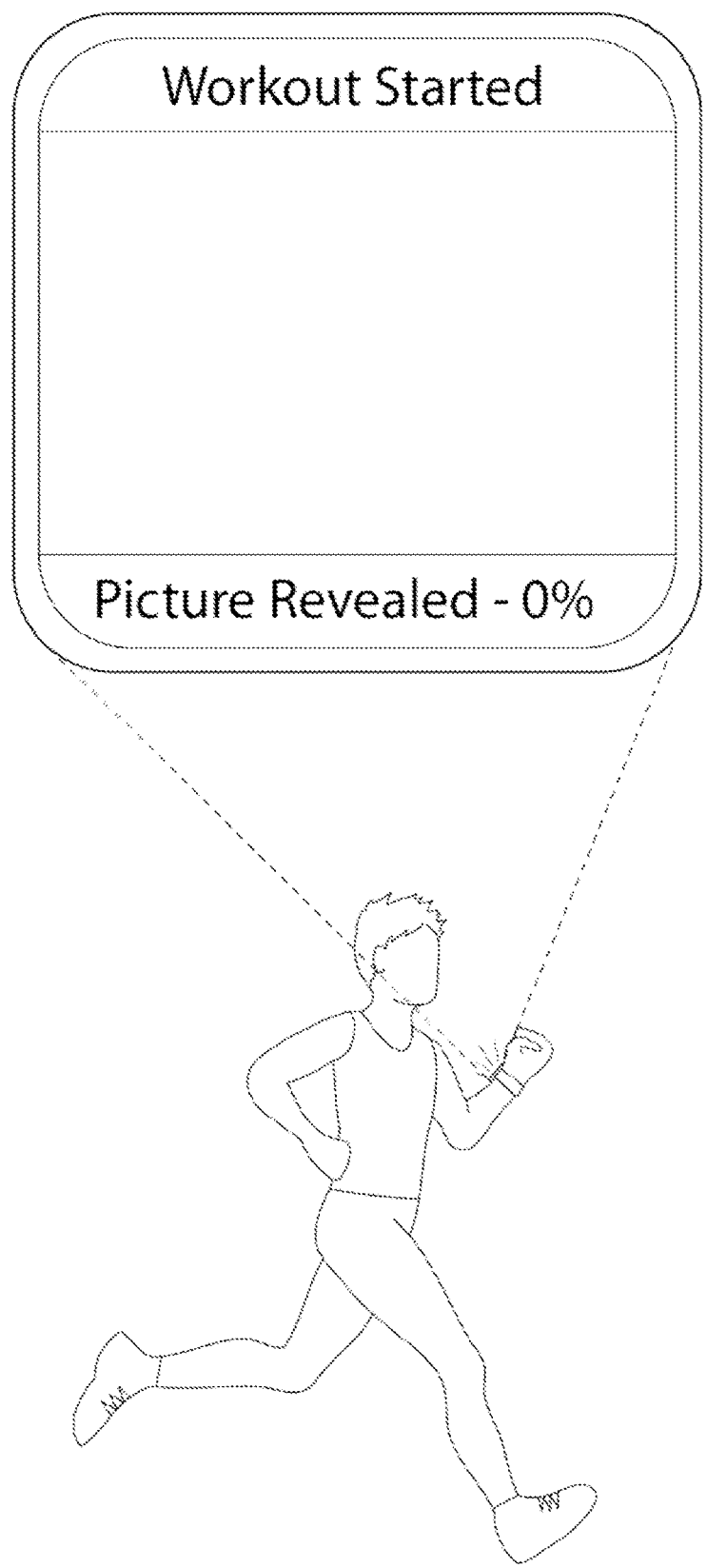
FIGS. 3A-3F illustrate a scenario in which a user of a wearable device is able to reveal a hidden user-interface feature while progressing through performance of a self-care activity (e.g., running in the illustrated example), in accordance with some embodiments.
Figure 3B:
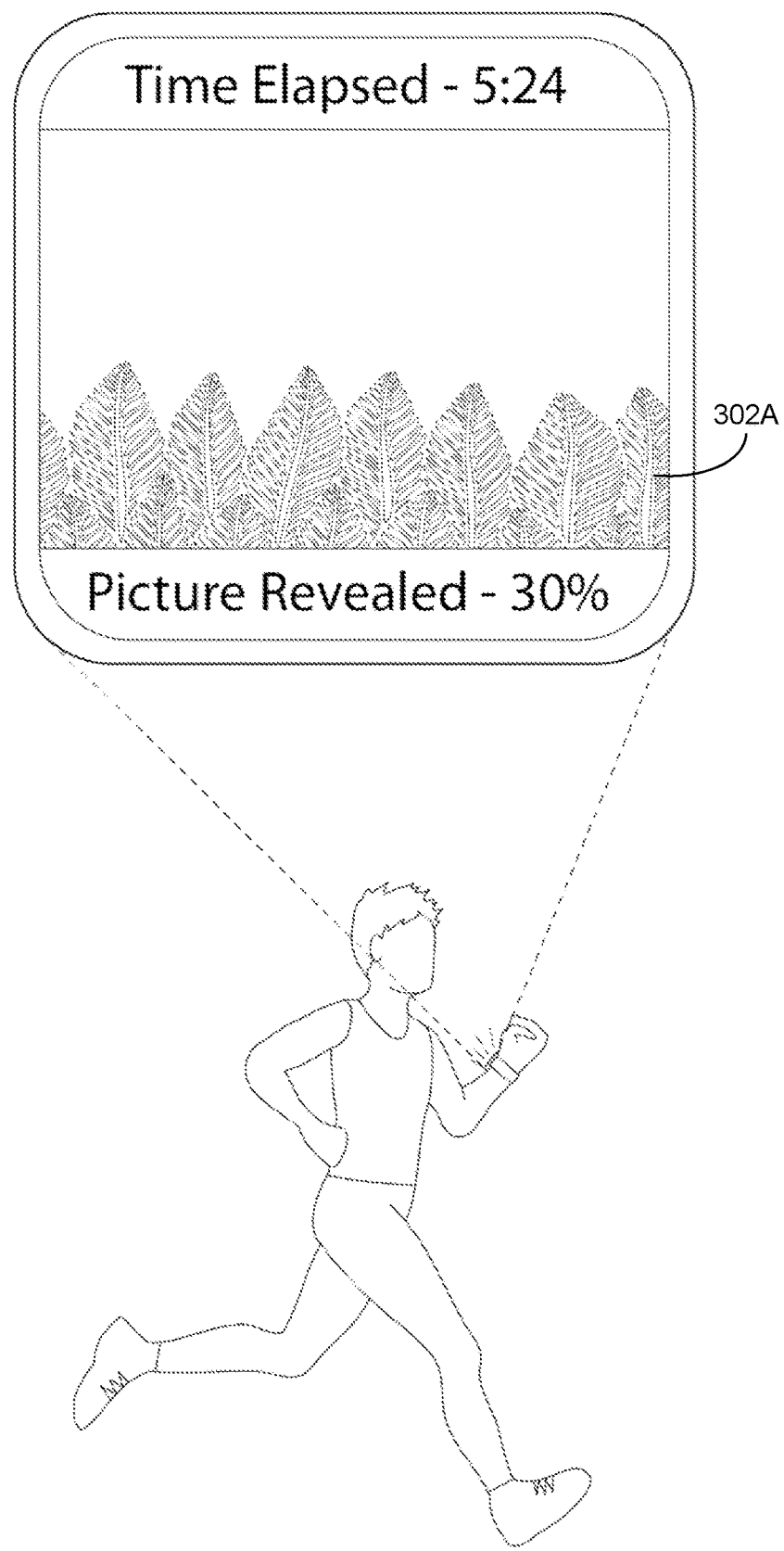
Figure 3C:
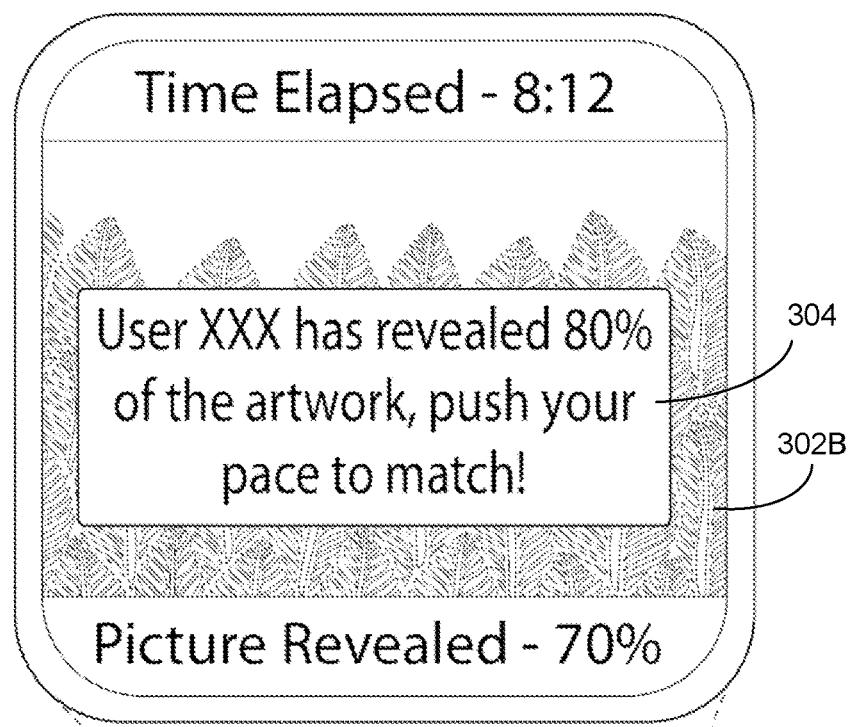
Figure 3D:
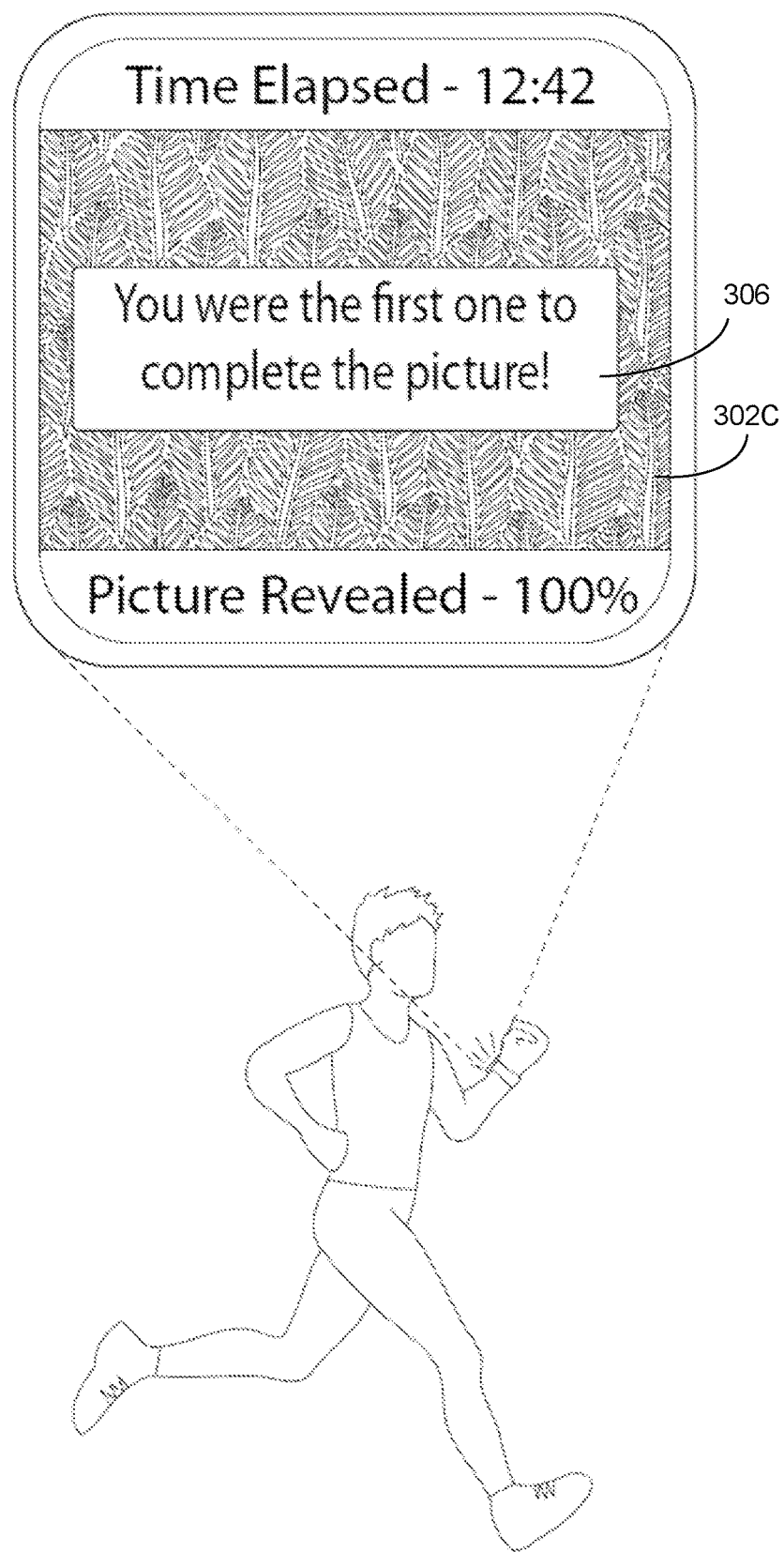
Figure 3E:
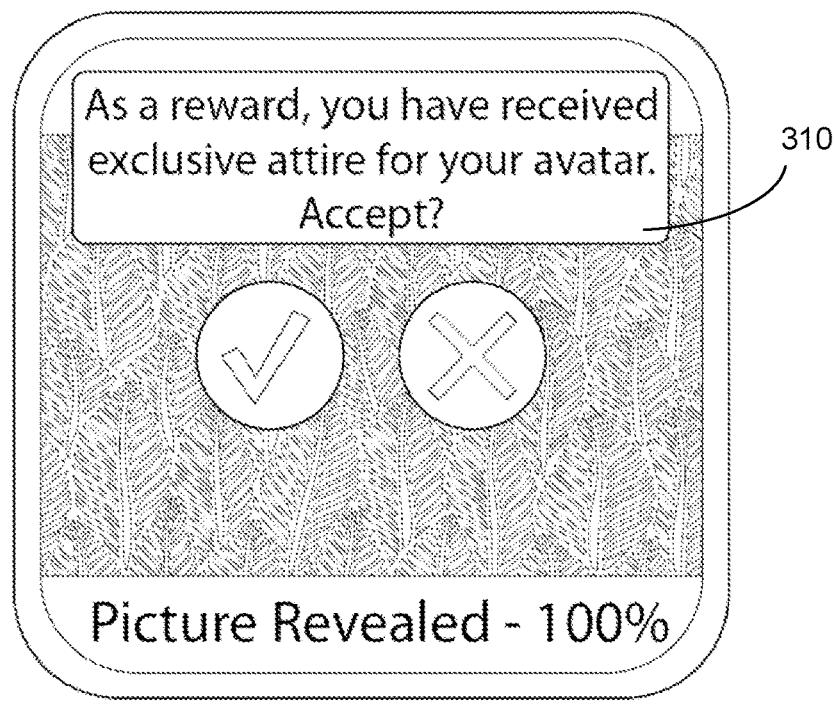

Further, in some embodiments, additional motivations in the form of rewards can also be provided, as is depicted for the reward user interface element 310 in FIG. 3E, which can then be accepted or rejected by selecting the checkmark or X elements, respectively. If the reward is accepted, then the reward can, in one example, be used to further attire an avatar of the user, as is shown for the avatar 312 in FIG. 3F.

While FIGS. 3A-3F illustrate a particular subset of user interface adjustments based on the user performing self-care activities, other user interface adjustment can occur based on the same set of events with the same set of event characteristics. Additional examples of techniques and scenarios for motivating users to perform activities will now be described in more detail.

In accordance with some embodiments, a visual characteristic of an avatar associated with the user can be adjusted (e.g., muscular features of the avatar) based on the user performing the physical activity. In another example, an avatar associated with a user can be displayed on the wrist-wearable device, or another electronic device that is in communication with the wrist-wearable device. While the user performs physical activities, the presentation of the avatar can be adjusted at the respective electronic device where the avatar is being displayed, where the adjusting is based on the user's completion of physical activities.

In some embodiments, an activity-completion metric is presented on a home-screen user interface (e.g., a wake screen). In some embodiments, the activity-completion metric can be visually modified (e.g., glow brighter or change colors, different haptic events caused at a respective set of user-worn electronic devices) as the user meets respective activity-completion goals. In some embodiments, a themed character associated with the coupled band or associated with a location at which the device is determined to be is caused to visually animate based on such activity goals being completed.

In some embodiments, the user is motivated to perform other activities besides self-care activities, and the wrist-wearable device can provide similar adjustments to the display of the wrist-wearable device to promote such activities. For example, the wrist-wearable device can be caused to motivate the user to perform communications-based activities (e.g., sharing applications), such as promoting the user to interact with colleagues via workplace communication applications. In some embodiments, the wrist-wearable device is configured to motivate the user to interact with other users of different electronic devices via one or more social-media applications. For example, a user's avatar can be caused to visually update (e.g., visually increasing in muscle size, performing new animations, and/or updating the visual appearance of the avatar's outfit) based on the user increasing their respective level of social engagement.

FIG. 4 is a flow diagram of a method of adjusting a detachable display capsule of a wrist-wearable device to operationally complement a wearable-structure attachment, in accordance with some embodiments. Operations of the method 400 can be performed by one or more processors of a wrist-wearable device 950 (FIG. 6A) or 1000 (FIG. 7), and which wrist-wearable devices can be configured to perform the operations described with reference to the wearable devices of FIGS. 1A-3F. At least some of the operations shown in FIG. 4 correspond to instructions stored in a computer memory or computer-readable storage medium. Operations of the method 400 can be performed by the wrist-wearable device alone or in conjunction with one or more processors and/or hardware components of another device (e.g., a head-wearable device and/or an intermediary device described below in reference to FIG. 8) communicatively coupled to the wrist-wearable device and/or instructions stored in memory or computer-readable medium of the other device communicatively coupled to the wrist-wearable device.

As depicted in FIG. 4, the method 400 begins at operation 401 with the provision of a display capsule that is configured to use a default set of display characteristics (e.g., these display characteristics can include an operating system's color palette, haptic patterns, sounds, app icons, notifications style, animation style, faces, favorite artists (e.g., musical artists), one or more sets of audio track elements, event-ticketing information (e.g., digital concert tickets), one or more sets of electronic devices configured to receive in-air hand gestures, and the like) in conjunction with operating-system or application-level user interfaces available via the display capsule.

At operation 403, the method 400 includes, receiving, at the display capsule, identifying information (e.g., a device identifier) for a respective wearable structure (e.g., a holding structure as discussed in FIGS. 10A-10H) of a plurality of wearable structures, the display capsule being configured to detachably couple to one of the plurality of wearable structures to form a wrist-wearable device. As discussed below, the identifying information can be conveyed by scanning a QR code and/or by having the wearable structure provide the identifying information directly to the display capsule (e.g., by communicating the identifying information to the display capsule using a wireless-communication protocol). In some embodiments, the identifying information is conveyed via RFID, UWB, NFC, Hall effect sensing, etc.).

At operation 405, a determination is made and, in accordance with a determination that the display capsule should be adjusted based on the identifying information for the respective wearable structure, operation 407 is then performed. At operation 407, the display capsule is adjusted (i) to cease using the first set of display characteristics in conjunction with the operating-system or application-level user interfaces and (ii) to instead use a customized set of display characteristics associated with the respective wearable structure. The customized set of display characteristics is distinct from the default set of display characteristics and is also used in conjunction with the operating-system or application-level user interfaces. As depicted in the sequences of FIGS. 1A-1D and 2A-2D, attachment of the display capsule to differently-themed wearable structures results in presentation of different display characteristics at the display capsule that are complementing the themes of each wearable structure. From the user's perspective, making use of such wearable structure attachments thus allows them to experience a newly-customized wrist-wearable device each time they try a different wearable-structure attachment. Likewise, for embodiments that also make use of head-worn devices (e.g., head-wearable devices 510 or 110, or both, FIG. 8), the customization of the interactive experiences can also be applied to features presented at the head-worn devices (e.g., the customized display characteristics can also be used at the head-worn devices in some embodiments).

In some embodiments of the method 400, one of the display characteristics corresponds to a manner in which an electronic message is presented. The method 400 can also include, while the display capsule is configured to use the default set of display characteristics, receiving a first electronic message, and presenting a static representation of the first electronic message on the display capsule (e.g., a static representation can be one which does not move across or screen or at least is not carried across a screen using an animated character or other user interface element). The method 400 can further include, while the display capsule is configured to use the customized set of display characteristics associated with the respective wearable structure, receiving a second electronic message, and presenting a dynamic representation of the second electronic message such that the dynamic representation of the second electronic message moves along with a representation of a character associated a theme of the respective wearable structure. Illustrative examples of this are shown in FIGS. 1C-1D and 2C-2D, where the depicted dynamic representations are the ones in which an animated sequence is used to deliver the second electronic message (the depicted sequences can include other steps as well, such as first step in which the sending user's name or other identifying information, e.g., an avatar is shown before the second electronic message is shown).

In some embodiments of the method 400, the display characteristics include one or more of a color palette used in conjunction with the operating-system-level user interfaces, icons associated with applications available via the display capsule, a style used to present notifications on the display capsule, an animation style used by the display capsule, and a manner in which faces of avatars are presented on the display capsule. Again, as was noted above, the display characteristics can, in some embodiments also be applied at the head-worn devices as well (e.g., 110 or 510, FIG. 8).

In some embodiments of the method 400, the method further includes, in conjunction with adjusting the display capsule to instead use the customized set of display characteristics, adjusting the wrist-wearable device to use a new non-display setting associated with the respective wearable structure. The new non-display setting can be a setting used to generate haptic responses at the wrist-wearable device (e.g., ones that can correspond to a rocket blasting off to carry forward the depicted example of FIGS. 1A-1D).

Figure 10B:
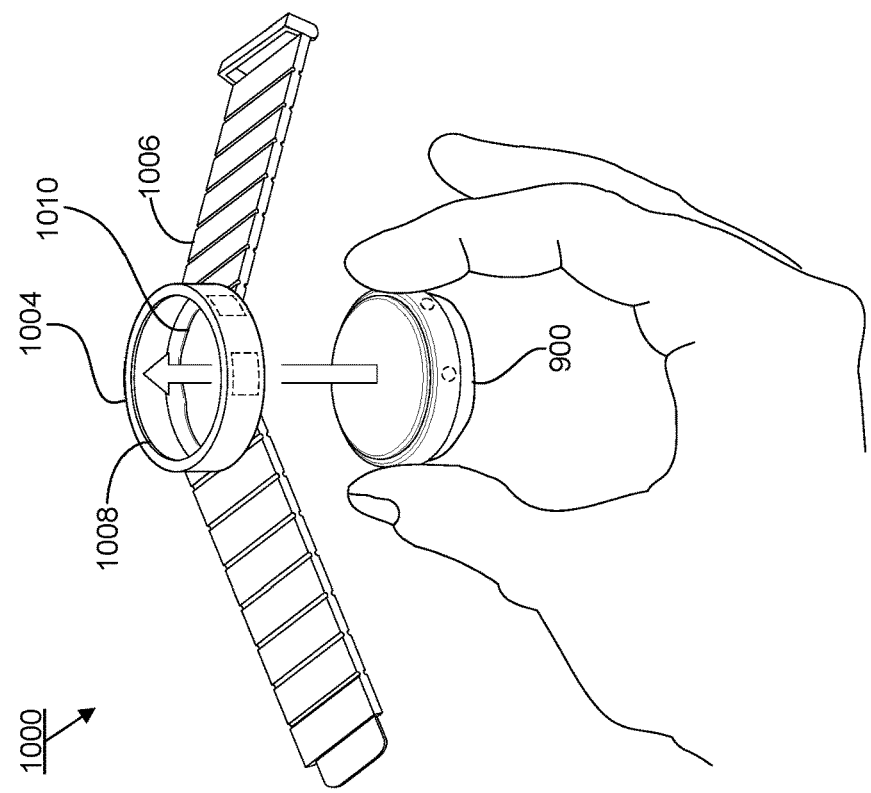
FIGS. 10A-10H illustrate a sequence for coupling an example display capsule with an example wearable device that includes a band portion and a holding structure, in accordance with some embodiments.

In some embodiments of the method 400, the customized set of display characteristics is used to generate a watch-face user interface that is presented via the display capsule while it is attached to the respective wearable structure. Examples of different watch-face user interfaces associated with attachments to different wearable structures are shown in the FIGS. 1A-1D and 2A-2D sequences. As is further described below, a sequence of available features can also be customized for different wearable structure attachments, e.g., as shown in FIG. 10G, a first sequence of available features (Contacts, Messages, Games, Calendar) can be available with a certain wearable structure attachment and a different sequence of available features can be available with a different wearable structure attachment (e.g., Trendy Restaurants, Top Night Clubs, New Stores, Avatar Gear, FIG. 11D).

In some embodiments of the method 400, the determination that the display capsule should be adjusted based on the identifying information for the respective wearable structure is: (i) made after a camera of the display capsule is used to scan a QR code associated with the respective wearable structure, and/or (ii) made based on data communicated to the display capsule from the respective wearable structure. In some embodiments, the adjusting the display capsule is performed only after the display capsule has been attached to the respective wearable structure, such that the identifying information can be received slightly before (e.g., 5 milliseconds or less) before the adjusting is actually performed such that a delay is utilized to ensure that the display capsule is not adjusted too early and before the display capsule has actually been attached to the respective wearable structure.

In some embodiments of the method 400, the respective wearable structure is associated with a company, and a user of the wrist-wearable device is granted access to limited-access user interface elements associated with the company while using the respective wearable structure. In some embodiments, the user interface elements include one or more of stickers for adding to images and attire used to dress up an avatar of a user of the wrist-wearable device. Access to such limited-access user interface elements can, under some circumstances, be allowed at the display capsule only while it is attached to the respective wearable structure that is associated with the company.

In some embodiments of the method 400, the method also includes, adjusting one or more additional visual characteristics at the display capsule when it is determined that a predetermined event is occurring. For example, if a user's birthday is taking place on a same day that the rocket-themed wearable structure is attached to the display capsule, then the additional visual characteristics can include those associated with celebrating the user's birthday, such as a rocket ship carrying a birthday cake across the screen.

In some embodiments of the method 400, the respective wearable structure is one integrated structure that includes a band that is configured to be worn around a user's wrist and a cradle to which the display capsule is attached, and the display capsule is attached to the cradle by pushing the display capsule in an upward direction to fit into the cradle such that a perimeter of the cradle is securely coupled around a portion of the display capsule. An example of this configuration is shown in FIG. 1E.

In some embodiments of the method 400, the respective wearable structure includes two band portions that are each separately attached to the display capsule to form the wrist-wearable device. In other words, the cradle piece can be optional in some embodiments and, instead, such a band portion can be directly coupled to the display capsule to then cause the customized experiences described herein to take place.

Having described the method 400, the method 500 of FIG. 5 will next be described. The methods 400 and 500, as well as many of the example aspects described later below can exist on the wrist-wearable device together and can be accessed at different points in time or user together (e.g., the hidden user-interface element that is discussed below can be one of the customized set of display characteristics used in conjunction with the method 400).

FIG. 5 is a flow diagram of a method of gradually revealing a hidden user-interface feature in accordance with performance of a self-care activity, in accordance with some embodiments. Similar to method 400 of FIG. 4, operations of the method 500 can be performed by one or more processors of a wrist-wearable device 950 (FIG. 6A) or 1000 (FIG. 7), and which wrist-wearable devices can be configured to perform the operations described with reference to the wearable devices of FIGS. 1A-3F. At least some of the operations shown in FIG. 5 correspond to instructions stored in a computer memory or computer-readable storage medium. Operations of the method 500 can be performed by the wrist-wearable device alone or in conjunction with one or more processors and/or hardware components of another device (e.g., a head-wearable device and/or an intermediary device described below in reference to FIG. 8) communicatively coupled to the wrist-wearable device and/or instructions stored in memory or computer-readable medium of the other device communicatively coupled to the wrist-wearable device.

As depicted in FIG. 5, the method 500 begins at operation 501. At operation 501, while a user of an electronic device has performed less than a first threshold amount (e.g., 20-30%) of a self-care activity, the method includes displaying, on a display of the electronic device (e.g., a wrist-wearable device) or another electronic device (e.g., a head-worn device such as those described with reference to FIG. 8) that is in communication with the electronic device, a user interface without displaying a hidden user-interface feature that is associated with the user interface. The method 500 also includes, determining at operation 503 and, in accordance with a determination that the user of the electronic device has performed more than the first threshold amount of the self-care activity, the method includes revealing (505), on the display, a first portion of the hidden user-interface feature within the user interface. The method 500 further includes, determining at operation 507, and, in accordance with a determination that the user of the electronic device has performed more than a second threshold amount of the self-care activity (e.g., between 31% to 55%), the second threshold amount being an amount that is greater than the first threshold amount, performing operations 509 and 511. Operation 509 is continuing to display, on the display, the first portion of the hidden user-interface feature within the user interface. Operation 511 is revealing, on the display, a second portion of the hidden user-interface feature within the user interface. An example of these operations is depicted in the sequence shown in FIGS. 3A-3D, in which the user's performance of a running self-care activity causes revealing of a hidden user-interface feature (e.g., in the depicted example of FIGS. 3A-3D, a piece of artwork with many various leaves is revealed).

In some embodiments of the method 500, the method includes, in accordance with a determination that all applicable threshold amounts of the self-care activity are satisfied, revealing, on the display, all of the hidden user-interface feature within the user interface (e.g., FIG. 3D shows one example in which all of the hidden user-interface feature has been revealed).

In some embodiments of the method 500, the hidden user-interface feature is background artwork displayed for the user interface (e.g., this is shown in the example of FIGS. 3A-3D). In some embodiments, the user interface is a watch-face user interface that also displays a current time of day (e.g., the revealed artwork can be used as background artwork on a watch-face user interface).

In some embodiments of the method 500, the hidden user-interface feature is (i) a representation of a face of the user, or (ii) a representation of a face associated with a contact of the user. After all of the representation of the face of the user has been revealed within the user interface, the representation of the face of the user can be displayed with user interface elements for modifying the face of the user. Similarly, after all of the representation of the face of the contact of the user has been revealed within the user interface, the representation of the face of the contact of the user can be displayed with user interface elements for modifying the face of the contact of the user. In some embodiments, after a modification to the representation of the face of the contact of the user is made, the method includes sending a modified version of the representation of the face of the contact of the user to a device associated with the contact of the user.

In some embodiments of the method 500, (i) a physical-exercise activity, (ii) a meditative-exercise activity, (iii) a breathing exercise, or (iv) attendance at health-related appointments (e.g., doctor's appointments, mental-health visits, etc.).

In some embodiments of the method 500, the self-care activity is a first self-care activity and performance of other self-care activities, distinct from the self-care activity, causes revealing of portions of respective hidden user-interface features, distinct from the hidden user-interface feature, that are each associated with one of the other self-care activities based on the user's performance of one of the other self-care activities. In this way, the user of the wrist-wearable device can participate in many different self-care activities and reveal a wide variety of different hidden user-interface features in conjunction with performance of those different self-care activities.

In some embodiments of the method 500, the method also includes, displaying, within the user interface, at least one user interface element that is selected for display to visually correspond to a current holiday or season (e.g., in one example, a polar bear can be presented as part of an animation used on a watch-face user interface during the winter season, such that the polar bear can be part of the a clockface or can be used to deliver electronic messages on screen in like fashion to that shown in FIGS. 1C-1D and 2C-2D).

In some embodiments of the method 500, the method also includes, while displaying the first and second portions of the hidden user-interface feature: (i) receiving an indication that another user has revealed a third portion of the hidden user-interface feature in conjunction with the other user's performance of the self-care activity and (ii) providing a notification, on the display, indicating that the other user has revealed the third portion of the hidden user-interface. An example of this is shown in FIG. 3C.

In some embodiments of the method 500, the display is a display of a wrist-wearable device or a display of a head-worn device (e.g., 110 or 510, FIG. 8) that is in communication with the wrist-wearable device. In some embodiments, the display is the display of the head-worn device, and one or more sensors of the wrist-wearable device are used to monitor the user's performance of the self-care activity. In some embodiments, the revealing of the hidden user-interface feature can be performed at both devices or can be performed at one device and then transferred to a different device, e.g., can be started at the display of the wrist-wearable device but switch to the display of the head-worn device if the user ceases to be looking at the display of the wrist-wearable device.

Example Wrist-Wearable Devices

Several examples of embodiments of wrist-wearable devices that include one or more of the components and/or capabilities for performing one or more of the operations described herein are discussed in more detail below.

Figure 6A:
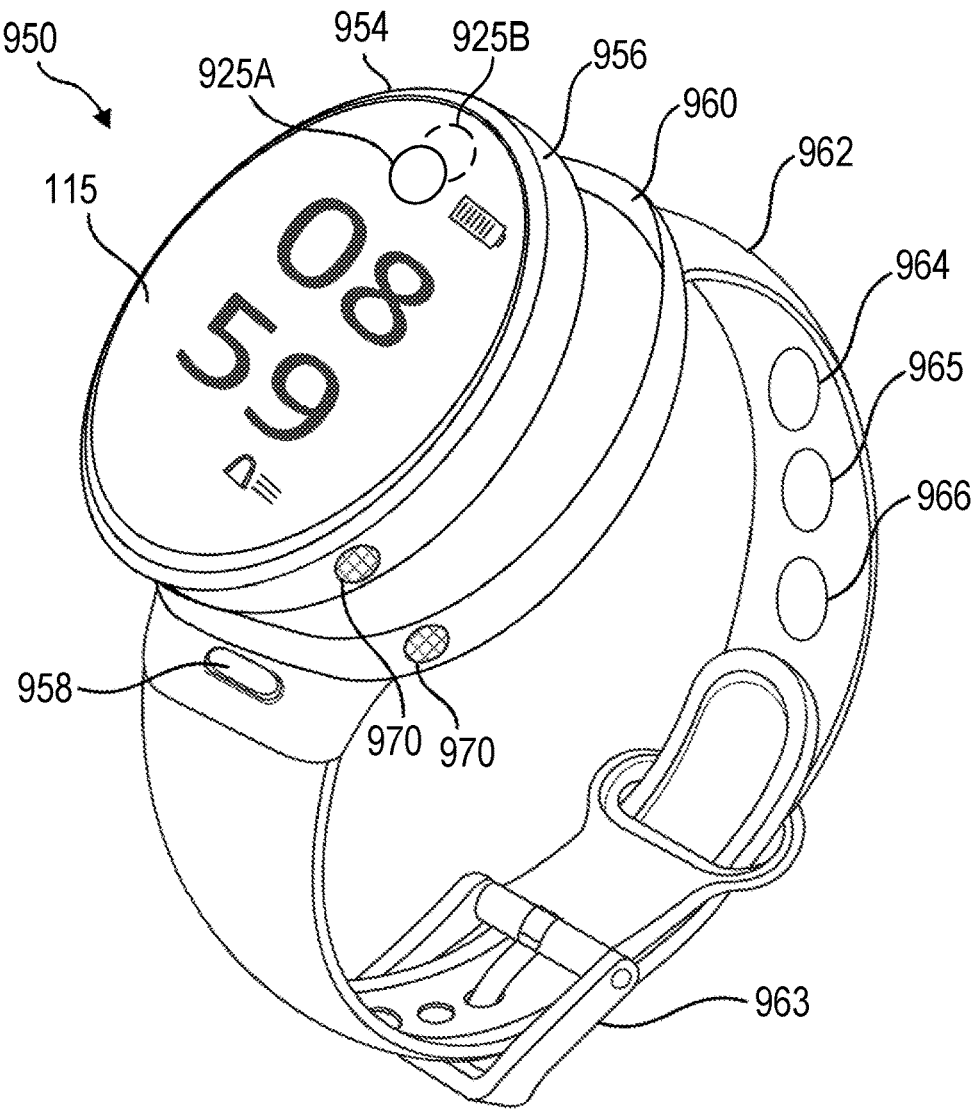
FIGS. 6A-6B illustrate an example wrist-wearable device used in conjunction with the techniques described herein, in accordance with some embodiments.
Figure 6B:
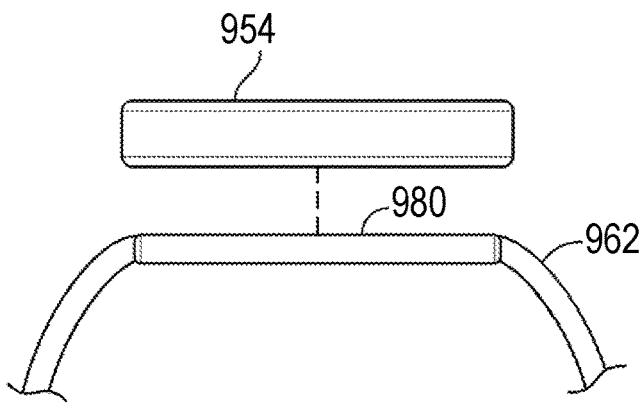

Embodiments of the devices described herein can include any or all of the components described with respect FIGS. 6A and 6B. FIGS. 6A and 6B illustrate an example wrist-wearable device 950, in accordance with some embodiments. The wrist-wearable device 950 is an instance of the wearable devices discussed above (e.g., 100, 200, and those shown in FIGS. 3A-3F and 9A-12F as well) in reference to FIGS. 1A-5, such that the wearable devices used as examples in conjunction with these earlier figures (e.g., wearable devices 100, 100A, 200, and those in FIGS. 3A-3F) should be understood to have the features of wearable device 950 and vice versa.

FIG. 6A illustrates a perspective view of the wrist-wearable device 950 that includes a watch body 954 decoupled from a watch band 962. The watch body 954 and the watch band 962 can have a substantially rectangular or circular shape and can be configured to allow a user to wear the wrist-wearable device 950 on a body part (e.g., a wrist). The wrist-wearable device 950 can include a retaining mechanism 963 (e.g., a buckle, a hook and loop fastener, etc.) for securing the watch band 962. The wrist-wearable device 950 can also include a coupling mechanism 960 (e.g., a cradle) for detachably coupling a capsule (e.g., the watch body 954), via a coupling surface 956 of the watch body 954, to the watch band 962.

The wrist-wearable device 950 can perform various functions associated with the user interfaces and interactions as described above with reference to FIGS. 1A-3F and operations of the methods depicted in FIGS. 4-5. As will be described in more detail below with reference to FIG. 7, functions executed by the wrist-wearable device 950 can include, without limitation, display of visual content to the user (e.g., visual content displayed on display screen 115, which can be a touch-sensitive surface and/or display screen in accordance with some embodiments), sensing user input (e.g., sensing a touch on button 958, sensing biometric data on sensor 964, sensing neuromuscular signals on neuromuscular sensor 965, etc.), messaging (e.g., text, speech, video, etc.), image capture, wireless communications (e.g., cellular, near field, Wi-Fi, personal area network, etc.), location determination, financial transactions, providing haptic feedback, alarms, notifications, biometric authentication, health monitoring, sleep monitoring, etc. These functions can be executed independently in watch body 954, independently in watch band 962, and/or in communication between watch body 954 and watch band 962. In some embodiments, functions can be executed on the wrist-wearable device 950 in conjunction with an artificial-reality environment which includes, but is not limited to, virtual-reality (VR) environments (including non-immersive, semi-immersive, and fully-immersive VR environments), augmented-reality environments (including marker-based augmented-reality environments, marker less augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

The watch band 962 can be configured to be worn by a user such that an inner surface of the watch band 962 is in contact with the user's skin. When worn by a user, sensor 964 is in contact with the user's skin. The sensor 964 can be a biosensor that senses a user's heart rate, saturated oxygen level, temperature, sweat level, muscle intentions, or a combination thereof. The watch band 962 can include multiple sensors 964 that can be distributed on an inside and/or an outside surface of the watch band 962. Additionally, or alternatively, the watch body 954 can include the same or different sensors than the watch band 962 (or the watch band 962 can include no sensors at all in some embodiments). For example, multiple sensors can be distributed on an inside and/or an outside surface of watch body 954. As described below with reference to FIG. 7, the watch body 954 can include, without limitation, front-facing image sensor 925A and/or rear-facing image sensor 925B, a biometric sensor, an IMU, a heart rate sensor, a saturated oxygen sensor, a neuromuscular sensor(s) (e.g., EMG sensors 1046, FIG. 7), an altimeter sensor, a temperature sensor, a bioimpedance sensor, a pedometer sensor, an optical sensor, a touch sensor, a sweat sensor, etc. The sensor 964 can also include a sensor that provides data about a user's environment including a user's motion (e.g., an IMU), altitude, location, orientation, gait, or a combination thereof. The sensor 964 can also include a light sensor (e.g., an infrared light sensor, a visible light sensor) that is configured to track a position and/or motion of watch body 954 and/or watch band 962. Watch band 962 can transmit the data acquired by the sensor 964 to watch body 954 using a wired communication method (e.g., a UART, a USB transceiver, etc.) and/or a wireless communication method (e.g., near field communication, Bluetooth, etc.). Watch band 962 can be configured to operate (e.g., to collect data using sensor 964) independent of whether watch body 954 is coupled to or decoupled from watch band 962.

The watch band 962 and/or watch body 954 can include a haptic device 966 (e.g., a vibratory haptic actuator) that is configured to provide haptic feedback (e.g., a cutaneous and/or kinesthetic sensation, etc.) to the user's skin. The sensor 964 and/or haptic device 966 can be configured to operate in conjunction with multiple applications including, without limitation, health monitoring, social media, game playing, and artificial reality (e.g., the applications associated with artificial reality).

In some examples, the watch band 962 can include a neuromuscular sensor 965 (e.g., an electromyography (EMG) sensor, a mechanomyogram (MMG) sensor, a sonomyography (SMG) sensor, etc.). Neuromuscular sensor 965 can sense a user's intention to perform certain motor actions. The sensed muscle intention can be used to control certain user interfaces displayed on the display 115 of the wearable device 100 and/or can be transmitted to device responsible for rendering an artificial-reality environment (e.g., a head-mounted display) to perform an action in an associated artificial-reality environment, such as to control the motion of a virtual device displayed to the user.

Signals from neuromuscular sensor 965 can be used to provide a user with an enhanced interaction with a physical object and/or a virtual object in an artificial-reality application generated by an artificial-reality system (e.g., user interface objects presented on the display of the wrist-wearable device, or another computing device (e.g., a head-mounted display)). Signals from neuromuscular sensor 965 can be obtained (e.g., sensed and recorded) by one or more neuromuscular sensors 965 of watch band 962. Although FIG. 6A shows one neuromuscular sensor 965, watch band 962 can include a plurality of neuromuscular sensors 965 arranged circumferentially on an inside surface of watch band 962 such that the plurality of neuromuscular sensors 965 contact the skin of the user. Watch band 962 can include a plurality of neuromuscular sensors 965 arranged circumferentially on an inside surface of watch band 962. Neuromuscular sensor 965 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The wrist-wearable device 950 can include a coupling mechanism (also referred to as a cradle) for detachably coupling watch body 954 to watch band 962. A user can detach watch body 954 from watch band 962 in order to reduce the encumbrance of the wrist-wearable device 950 to the user. The wrist-wearable device 950 can include a coupling surface 956 on the watch body 954 and/or coupling mechanism(s) 960 (e.g., a cradle, a tracker band, a support base, a clasp). A user can perform any type of motion to couple watch body 954 to watch band 962 and to decouple watch body 954 from watch band 962. For example, a user can twist, slide, turn, push, pull, or rotate watch body 954 relative to watch band 962, or a combination thereof, to attach watch body 954 to watch band 962 and to detach watch body 954 from watch band 962. An additional example cradle configuration that relies on an upward pushing force to attach the display capsule to the cradle was provided in FIG. 1E.

As shown in the example of FIG. 6A, watch band coupling mechanism 960 can include a type of frame or shell that allows watch body 954 coupling surface 956 to be retained within watch band coupling mechanism 960. Watch body 954 can be detachably coupled to watch band 962 through a friction fit, magnetic coupling, a rotation-based connector, a shear-pin coupler, a retention spring, one or more magnets, a clip, a pin shaft, a hook and loop fastener, or a combination thereof. In some examples, watch body 954 can be decoupled from watch band 962 by actuation of release mechanism 970. The release mechanism 970 can include, without limitation, a button, a knob, a plunger, a handle, a lever, a fastener, a clasp, a dial, a latch, or a combination thereof.

The wrist-wearable device 950 can include a single release mechanism 970 or multiple release mechanisms 970 (e.g., two release mechanisms 970 positioned on opposing sides of the wrist-wearable device 950 such as spring-loaded buttons). As shown in FIG. 6A, the release mechanism 220 can be positioned on watch body 954 and/or watch band coupling mechanism 960. Although FIG. 6A shows release mechanism 970 positioned at a corner of watch body 954 and at a corner of watch band coupling mechanism 960, the release mechanism 970 can be positioned anywhere on watch body 954 and/or watch band coupling mechanism 960 that is convenient for a user of wrist-wearable device 950 to actuate. A user of the wrist-wearable device 950 can actuate the release mechanism 970 by pushing, turning, lifting, depressing, shifting, or performing other actions on the release mechanism 970. Actuation of the release mechanism 970 can release (e.g., decouple) the watch body 954 from the watch band coupling mechanism 960 and the watch band 962 allowing the user to use the watch body 954 independently from watch band 962. For example, decoupling the watch body 954 from the watch band 962 can allow the user to capture images using rear-facing image sensor 925B.

FIG. 6B is a side view of the wrist-wearable device 950. The wrist-wearable devices 950 of FIG. 6B can include a watch body interface 980 (another example of a cradle for the capsule portion also referred to as a display capsule herein). The watch body 954 can be detachably coupled to the watch body interface 980. Watch body 954 can be detachably coupled to watch body interface 980 through a friction fit, magnetic coupling, a rotation-based connector, a shear-pin coupler, a retention spring, one or more magnets, a clip, a pin shaft, a hook and loop fastener, or a combination thereof.

In some examples, watch body 954 can be decoupled from watch body interface 980 by actuation of a release mechanism. The release mechanism can include, without limitation, a button, a knob, a plunger, a handle, a lever, a fastener, a clasp, a dial, a latch, or a combination thereof. In some examples, the wristband system functions can be executed independently in watch body 954, independently in watch body interface 980, and/or in communication between watch body 954 and watch body interface 980. Watch body interface 980 can be configured to operate independently (e.g., execute functions independently) from watch body 954. Additionally, or alternatively, watch body 954 can be configured to operate independently (e.g., execute functions independently) from watch body interface 980. As will be described in more detail below with reference to the block diagram of FIG. 7, watch body interface 980 and/or watch body 954 can each include the independent resources required to independently execute functions. For example, watch body interface 980 and/or watch body 954 can each include a power source (e.g., a battery), a memory, data storage, a processor (e.g., a CPU), communications, a light source, and/or input/output devices.

In this example, watch body interface 980 can include all of the electronic components of watch band 962. In additional examples, one or more electronic components can be housed in watch body interface 980 and one or more other electronic components can be housed in portions of watch band 962 away from watch body interface 980.

Figure 7:
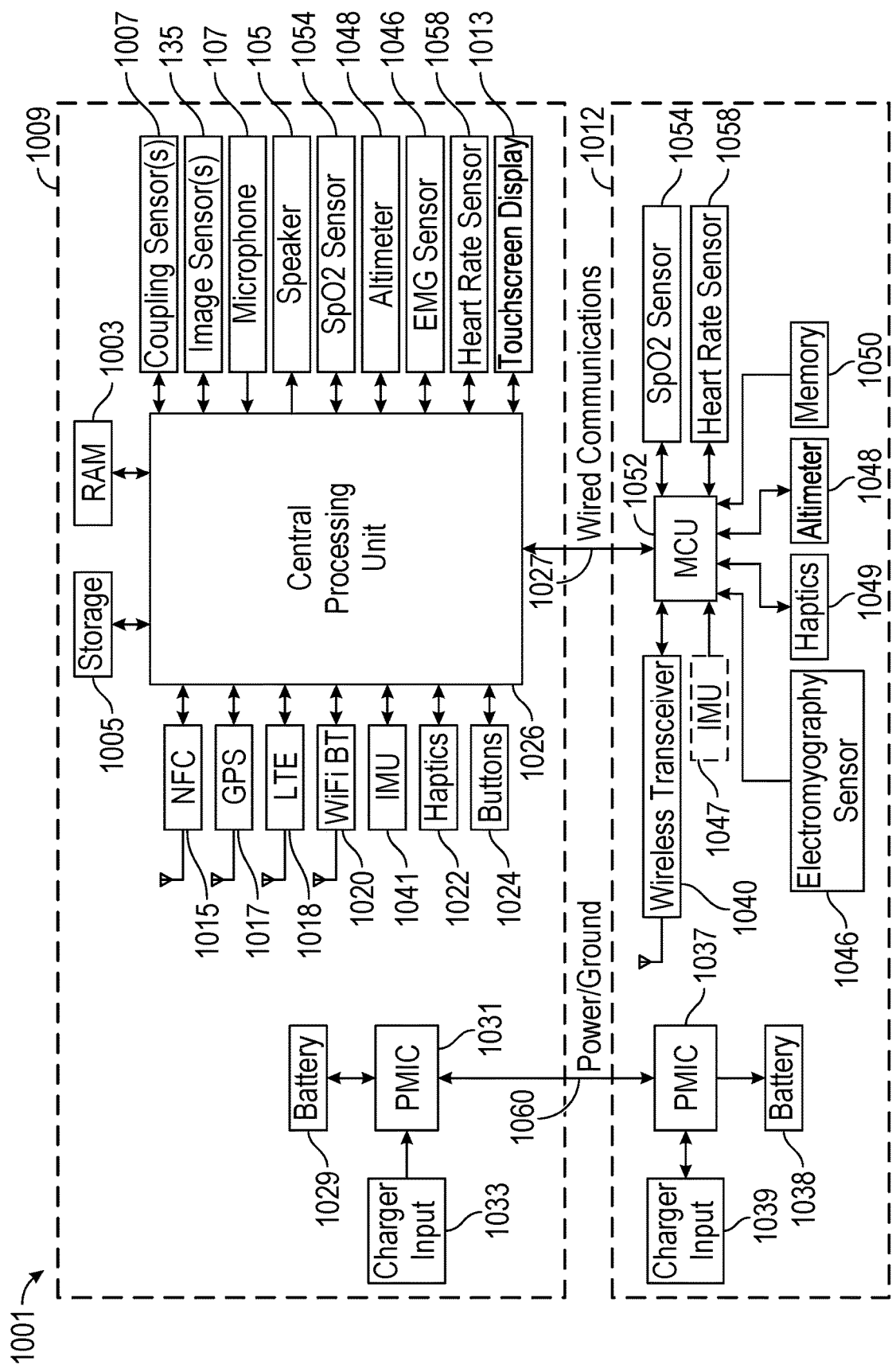
FIG. 7 is a block diagram of a wrist-wearable device system, according to at least one embodiment of the present disclosure.

FIG. 7 is a block diagram of a wrist-wearable device system 1001, according to at least one embodiment of the present disclosure. The wearable device 100 described in detail above is an example wrist-wearable device system 1001, so the wearable device 100 will be understood to include the components shown and described for system below. In some embodiments, the wrist-wearable devices 100, 100A, 200, and those in FIGS. 3A-3F described above in reference to FIGS. 1A-3F include one or more components shown and described for system below (e.g., any of the wearable devices 100, 100A, 200 and those in FIGS. 3A-3F can be an instance of the system). The wrist-wearable device system 1001 can have a split architecture (e.g., a split mechanical architecture, a split electrical architecture) between a watch body 1009 (e.g., a capsule or watch body 954) and a watch band 1012 (e.g., a band portion or watch band 962), which was described above in reference to FIGS. 6A-6B. Each of watch body 1009 and watch band 1012 can have a power source, a processor, a memory, sensors, a charging device, and a communications device that enables each of watch body 1009 and watch band 1012 to execute computing, controlling, communication, and sensing functions independently in watch body 1009, independently in watch band 1012, and/or in communication between watch body 1009 and watch band 1012.

For example, watch body 1009 can include battery 1029, CPU 1026, storage 1005, heart rate sensor 1058, EMG sensor 1046, SpO$_2$ sensor 1054, altimeter 1048, IMU 1041, random access memory 1003, charging input 1033 and communication devices NFC 1015, LTE 1018, and Wi-Fi/Bluetooth 1020. Similarly, watch band 1012 can include battery 1038, microcontroller unit 1052, memory 1050, heart rate sensor 1058, EMG sensor 1046, SpO$_2$ sensor 1054, altimeter 1048, IMU 1041, charging input 1039 and wireless transceiver 1047. In some examples, a level of functionality of at least one of watch band 1012 or watch body 1009 can be modified when watch body 1009 is detached from watch band 1012. The level of functionality that can be modified can include the functionality of at least one sensor (e.g., heart rate sensor 1058, EMG sensor 1046, etc.). Each of watch body 1009 and watch band 1012 can execute instructions stored in storage 1005 and memory 1050 respectively that enables at least one sensor (e.g., heart rate sensor 1058, EMG sensor 1046, etc.) in watch band 1012 to acquire data when watch band 1012 is detached from watch body 1009 and when watch band 1012 is attached to watch body 1009.

Watch body 1009 and watch band 1012 can further execute instructions stored in storage 1005 and memory 1050 respectively that enables watch band 1012 to transmit the acquired data to watch body 1009 (or other computing device such as a head mounted display or other computing device 350; FIG. 3) using wired communications 1027 and/or wireless transceiver 1047. For example, watch body 1009 can display visual content to a user on touchscreen display 1013 (e.g., an instance of display 115) and play audio content on speaker. Watch body 1009 can receive user inputs such as audio input from microphone and touch input from buttons 1024. Watch body 1009 can also receive inputs associated with a user's location and/or surroundings. For example, watch body 1009 can receive location information from GPS 1017 and/or altimeter 1048 of watch band 1012.

Watch body 1009 can receive image data from at least one image sensor 135 (e.g., a camera). Image sensor 135 can include front-facing image sensor 925A (FIG. 6A) and/or rear-facing image sensor 925B (FIG. 6B). Front-facing image sensor 925A and/or rear-facing image sensor 925B can capture wide-angle images of the area surrounding front-facing image sensor 925A and/or rear-facing image sensor 925B such as hemispherical images (e.g., at least hemispherical, substantially spherical, etc.), 180-degree images, 360-degree area images, panoramic images, ultra-wide area images, or a combination thereof. In some examples, front-facing image sensor 925A and/or rear-facing image sensor 925B can be configured to capture images having a range between 45 degrees and 360 degrees. Certain input information received by watch body 1009 (e.g., user inputs, etc.) can be communicated to watch band 1012. Similarly, certain input information (e.g., acquired sensor data, neuromuscular sensor data, etc.) received by watch band 1012 can be communicated to watch body 1009.

Watch body 1009 and watch band 1012 can receive a charge using a variety of techniques. In some embodiments, watch body 1009 and watch band 1012 can use a wired charging assembly (e.g., power cords) to receive the charge. Alternatively, or in addition, watch body 1009 and/or watch band 1012 can be configured for wireless charging. For example, a portable charging device can be designed to mate with a portion of watch body 1009 and/or watch band 1012 and wirelessly deliver usable power to a battery of watch body 1009 and/or watch band 1012.

Watch body 1009 (which can be referred to as the display capsule herein) and watch band 1012 (also referred to as the wearable structure herein that includes a band portion and a cradle portion) can have independent power and charging sources to enable each to operate independently. Watch body 1009 and watch band 1012 can also share power (e.g., one can charge the other) via power management IC 1031 in watch body 1009 and power management IC 1037 in watch band 1012. Power management IC 1031 and power management IC 1037 can share power over power and ground conductors and/or over wireless charging antennas.

Wrist-wearable device system 1001 can operate in conjunction with a health monitoring application that acquires biometric and activity information associated with the user. The health monitoring application can be designed to provide information to a user that is related to the user's health. For example, wrist-wearable device system 1001 can monitor a user's physical activity by acquiring data from IMU 1041 while simultaneously monitoring the user's heart rate via heart rate sensor 1058 and saturated blood oxygen levels via $SpO_2$ sensor 1054. CPU 1026 can process the acquired data and display health related information to the user on touchscreen display 1013.

Wrist-wearable device system 1001 can detect when watch body 1009 and watch band 1012 are connected to one another (e.g., mechanically connected and/or electrically or magnetically connected) or detached from one another. For example, power/ground connections 1060, wireless transceiver 1047, and/or wired communications 1027, can detect whether watch body 1009 and watch band 1012 are mechanically and/or electrically or magnetically connected to one another (e.g., detecting a disconnect between the one or more electrical contacts of power/ground connections 1060 and/or wired communications 1027). In some examples, when watch body 1009 and watch band 1012 are mechanically and/or electrically disconnected from one another (e.g., watch body 1012 has been detached from watch band 1012 as described with reference to FIGS. 6A-6B), watch body 1009 and/or watch band 1012 can operate with modified level of functionality (e.g., reduced functionality) as compared to when watch body 1009 and watch band 1012 are mechanically and/or electrically connected to one another. The modified level of functionality (e.g., switching from full functionality to reduced functionality and from reduced functionality to full functionality) can occur automatically (e.g., without user intervention) when wrist-wearable device system 1001 determines that watch body 1009 and watch band 1012 are mechanically and/or electrically disconnected from one another and connected to each other, respectively.

Modifying the level of functionality (e.g., reducing the functionality in watch body 1009 and/or watch band 1012) can reduce power consumption in battery 1029 and/or battery 1038. For example, any of the sensors (e.g., heart rate sensor 1058, EMG sensor 1046, $SpO_2$ sensor 1054, altimeter 1048, etc.), processors (e.g., CPU 1026, microcontroller unit 1052, etc.), communications elements (e.g., NFC 1015, GPS 1017, LTE 1018, Wi-Fi/Bluetooth 1020, etc.), or actuators (e.g., haptics 1022, 1049, etc.) can reduce functionality and/or power consumption (e.g., enter a sleep mode) when watch body 1009 and watch band 1012 are mechanically and/or electrically disconnected from one another. Watch body 1009 and watch band 1012 can return to full functionality when watch body 1009 and watch band 1012 are mechanically and/or electrically connected to one another. The level of functionality of each of the sensors, processors, actuators, and memory can be independently controlled.

As described above, wrist-wearable device system 1001 can detect when watch body 1009 and watch band 1012 are coupled to one another (e.g., mechanically connected and/or electrically connected) or decoupled from one another. In some examples, watch body 1009 can modify a level of functionality (e.g., activate and/or deactivate certain functions) based on whether watch body 1009 is coupled to watch band 1012. For example, CPU 1026 can execute instructions that detect when watch body 1009 and watch band 1012 are coupled to one another and activate front-facing image sensor 925A. CPU 1026 can activate front-facing image sensor 925A based on receiving user input (e.g., a user touch input from touchscreen display 1013, a user voice command from microphone, a user gesture recognition input from EMG sensor 1046, etc.).

When CPU 1026 detects that watch body 1009 and watch band 1012 are decoupled from one another, CPU 1026 can modify a level of functionality (e.g., activate and/or deactivate additional functions). For example, CPU 1026 can detect when watch body 1009 and watch band 1012 are decoupled from one another and activate rear-facing image sensor 925B. CPU 1026 can activate rear-facing image sensor 925B automatically (e.g., without user input) and/or based on receiving user input (e.g., a touch input, a voice input, an intention detection, etc.). Automatically activating rear-facing image sensor 925B can allow a user to take wide-angle images without having to provide user input to activate rear-facing image sensor 925B.

In some examples, rear-facing image can be activated based on an image capture criterion (e.g., an image quality, an image resolution, etc.). For example, rear-facing image sensor 925B can receive an image (e.g., a test image). CPU 1026 and/or rear-facing image sensor 925B can analyze the received test image data and determine whether the test image data satisfies the image capture criterion (e.g., the image quality exceeds a threshold, the image resolution exceeds a threshold, etc.). Rear-facing image sensor 925B can be activated when the test image data satisfies the image capture criterion. Additionally, or alternatively, rear-facing image sensor 925B can be deactivated when the test image data fails to satisfy the image capture criterion.

In some examples, CPU 1026 can detect when watch body 1009 is coupled to watch band 1012 and deactivate rear-facing image sensor 925B. CPU 1026 can deactivate rear-facing image sensor 925B automatically (e.g., without user input) and/or based on receiving user input (e.g., a touch input, a voice input, an intention detection, etc.). Deactivating rear-facing image sensor 925B can automatically (e.g., without user input) reduce the power consumption of watch body 1009 and increase the battery charge time in watch body 1009. In some examples, wrist-wearable device system 1001 can include a coupling sensor 1007 that senses whether watch body 1009 is coupled to or decoupled from watch band 1012. Coupling sensor 1007 can be included in any of watch body 1009, watch band 1012, or watch band coupling mechanism 960 of FIGS. 6A-6B. Coupling sensor 1007 (e.g., a proximity sensor) can include, without limitation, an inductive proximity sensor, a limit switch, an optical proximity sensor, a capacitive proximity sensor, a magnetic proximity sensor, an ultrasonic proximity sensor, or a combination thereof. CPU 1026 can detect when watch body 1009 is coupled to watch band 1012 or decoupled from watch band 1012 by reading the status of coupling sensor 1007.

Figure 8:
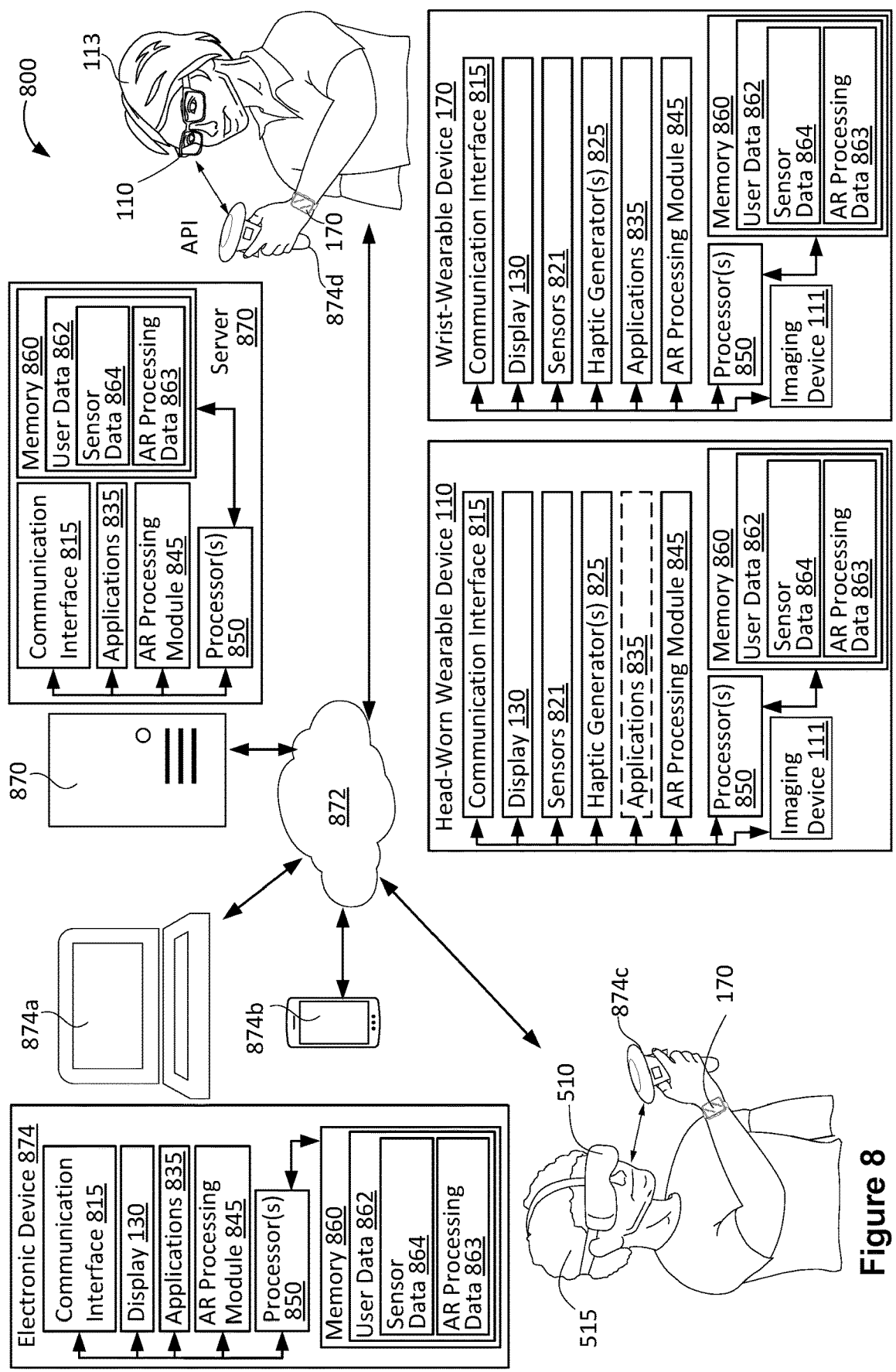
FIG. 8 illustrates a system of one or more devices, which can include a head-wearable device and a wrist-wearable device, which system can be used in conjunction with the techniques described herein (e.g., customized experiences activated by attaching new wearable structures to a display capsule can also be carried over to customize display features at an associated head-wearable device as well), in accordance with some embodiments.

FIG. 8 illustrates a system of one or more devices, which can include a head-wearable device and a wrist-wearable device, which system can be used in conjunction with the techniques described herein (e.g., customized experiences activated by attaching new wearable structures to a display capsule can also be carried over to customize display features at an associated head-wearable device as well), in accordance with some embodiments. The system 800 can include one or more of servers 870, electronic devices 874 (e.g., a computer, 874*a*, a smartphone 874*b*, a controller 874*c*, and/or other devices), head-wearable devices 110, and/or wrist-wearable devices 170. In some embodiments, the one or more of servers 870, electronic devices 874, head-wearable devices 110, and/or wrist-wearable devices 170 are communicatively coupled via a network 872. In some embodiments, the wrist-wearable device 170 is configured to cause one or more operations to be performed by a communicatively coupled head-wearable device 110, and/or the two devices can also both be connected to an intermediary device, such as a smartphone 874*b*, a controller 874*c*, or other device that provides instructions and data to and between the two devices. In some embodiments, the wrist-wearable device 170 is configured to cause one or more operations to be performed by multiple devices in conjunction with the head-wearable device 110. In some embodiments, instructions to cause the performance of one or more operations are controlled via an artificial reality (AR) processing module 845. The AR processing module 845 can be implemented in one or more devices, such as the one or more of servers 870, electronic devices 874, head-wearable devices 110, and/or wrist-wearable devices 170. In some embodiments, the one or more devices perform operations of the AR processing module 845, using one or more respective processors, individually or in conjunction with at least one other device as described herein.

In some embodiments, the wrist-wearable device 170 includes one or more components such as a communication interface 815, one or more sensors 821, one or more haptic generators 825, an AR processing module 845, one or more imaging devices 111 (e.g., a camera), one or more processors 850, and memory 860. In addition, in some embodiments, the wrist-wearable device 170 includes a display 130 and one or more applications 835. In some embodiments, the memory 860 is configured to store sensor data 864 and AR processing data 863. Although not show, in some embodiments, the memory 860 can include application data, device data (e.g., device hardware, device model, etc.), image data, and/or user data (e.g., data collected through use of a device, data collected through use of an application, user preferences, or other information stored by the user). In some embodiments, the one or more components of the wrist-wearable device 170 are housed within a capsule (or watch body) and/or a band of the wrist-wearable device 170.

In some embodiments, the communications interface 815 is configured to communicatively couple the wrist-wearable device 170 to one or more other devices such as the head-wearable device 110, electronic device 874 (e.g., a computer 874*a*, a smartphone 874*b*, a controller 874*c*, a tablet, etc.), and/or one or more servers 870. The communication interface 815 is used establish wired or wireless connections between the wrist-wearable device 170 and the other devices. In some embodiments, the communication interface 815 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol.

The one or more sensors 821 can include heart rate sensors, electromyography (EMG) sensors, $SpO_2$ sensors, altimeters, thermal sensors or thermal couples, ambient light sensors, ambient noise sensors, and/or inertial measurement units (IMU)s. Additional non-limiting examples of the one or more sensors 821 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 821 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 821 can include location sensing devices (e.g., GPS) configured to provide location information. In some embodiment, the data measured or sensed by the one or more sensors 821 is stored in memory 860. In some embodiments, the sensor data is used by the wrist-wearable device 170 for detecting one or more hand gestures and determining one or more control gesture types, such as a camera-control gesture.

The one or more haptic generators 125 can include one or more actuators (e.g., eccentric rotating mass (ERM), linear resonant actuators (LRA), voice coil motor (VCM), piezo haptic actuator, thermoelectric devices, solenoid actuators, ultrasonic transducers, or sensors, etc.). In some embodiments, the one or more haptic generators 125 are hydraulic, pneumatic, electric, and/or mechanical actuators. In some embodiments, the one or more haptic generators 125 are part of a surface of the wrist-wearable device 188 that can be used to generate a haptic response (e.g., a thermal change at the surface, a tightening or loosening of a band, increase or decrease in pressure, etc.). For example, the one or more haptic generators 125 can apply vibration stimulations, pressure stimulations, squeeze simulations, shear stimulations, temperature changes, or some combination thereof to the user. In addition, in some embodiments, the one or more haptic generators 125 include audio generating devices (e.g., speakers and other sound transducers) and illuminating devices (e.g., light-emitting diodes (LED)s, screen displays, etc.). The one or more haptic generators 125 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 835 include social-media applications, banking applications, health applications, messaging applications, web browsers, gaming application, streaming applications, media applications, imaging applications, productivity applications, social applications, etc. In some embodiments, the one or more applications 835 include artificial reality applications. The one or more applications 835 can be configured to provide data to the head-wearable device 110 that can be used to determine variable light-based representations. In some embodiments, the one or more applications 835 can be displayed via an optional display of the head-wearable device 110.

In some embodiments, the AR processing module 845 is configured to detect and determine one or more gestures performed by a user 113 based at least on sensor data. In some embodiments, the AR processing module 845 is configured detect and determine one or more gestures performed by the user 113 based on camera data received that captures at least a portion of the user 115's hand. For example, the wrist-wearable device 170 can receive EMG data and/or IMU data from one or mor sensors 821 based on the user 115's performance of a hand gesture and provide the sensor data to the AR processing module 845 for gesture detection and identification. The AR processing module 845, based on the detection and determination of a gesture, causes a device communicatively coupled to the wrist-wearable device 170 to perform an operation (or action). For example, a hand gesture performed by the user and determined to be a camera-control gesture, based on the sensor data received at the wrist-wearable device 170, causes a head-wearable device 110 or 510 to capture image data as well as the presentation of a representation of the image data at a coupled display (e.g., display 130). In some embodiments, the AR processing module 845 determines different characteristics between the hand gestures performed by the user based on the sensor data and performs one or more operations or actions based on the characteristics of the hand gesture satisfying one or more thresholds (e.g., force thresholds, duration thresholds, contact number thresholds, etc.).

In some embodiments, the one or more imaging devices 111 can include an ultra-wide camera, a wide camera, a telephoto camera, a depth-sensing cameras, or other types of cameras. In some embodiments, the one or more imaging devices 111 are used to capture image data and/or video data via the wrist-wearable device 170. The captured image data can be processed and stored in memory and then presented to a user for viewing. The one or more imaging devices 111 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 111 is stored in memory 860 (which can include volatile and non-volatile memory such that the image data and/or video data can be temporarily or permanently stored, as needed depending on the circumstances).

The one or more processors 850 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 860. The memory 860 may be or include random access memory (RAM), read-only memory (ROM), dynamic random-access memory (DRAM), static random-access memory (SRAM) and magnetoresistive random access memory (MRAM), and may include firmware, such as static data or fixed instructions, basic input/output system (BIOS), system functions, configuration data, and other routines used during the operation of the wrist-wearable device 170 and the processor 850. The memory 860 also provides a storage area for data and instructions associated with applications and data handled by the processor 850.

In some embodiments, the memory 860 stores at least user data 862 including sensor data 864 and AR processing data 863. The sensor data 864 includes sensor data monitored by one or more sensors 821 of the wrist-wearable device 170 and/or sensor data received from one or more devices communicative coupled with the wrist-wearable device 170, such as a head-wearable device 110, smartphone 874b, etc. The sensor data 864 can include sensor data collected over a predetermined period of time that can be used by the AR processing module 845. The AR processing data 863 can include one or more one or more predefined camera-control gestures, user defined camera-control gestures, predefined non-camera-control gestures, and/or user defined non-camera-control gestures. In some embodiments, the AR processing data 863 further includes one or more predetermined threshold for different gestures.

The head-wearable devices 110 and 510 can include a communication interface 815, a display 130, one or more sensors 821, one or more haptic generators 825, one or more imaging devices 111 (e.g., a camera), one or more applications 835, one or more processors 850, and memory 860. In some embodiments, the wrist-wearable device 170 includes smart glasses (e.g., the augmented-reality glasses), artificial reality headsets (e.g., VR/AR headsets), or other head worn device. In some embodiments, one or more components of the head-wearable device 110 are housed within a body of the head-wearable device 110 (e.g., frames of smart glasses, a body of an AR headset, etc.). In addition, in some embodiments, one or more components of the head-wearable device 110 are stored within or coupled with lenses of the head-wearable device 110. The wrist-wearable device 170 is configured to communicatively couple with the head-wearable devices 110 and/or 510 (or other devices (e.g., electronic device 874)) using communication interface 815. In some embodiments, the wrist-wearable device 170 is configured to communicatively couple with the head-wearable device 110 (or other devices (e.g., electronic device 874)) via an application programming interface (API). In some embodiments, the wrist-wearable device 170 operates in conjunction with the head-wearable device 110 to allow for offering the customized experiences discussed herein when the display capsule of a device 170 is coupled with different wearable structures (e.g., by using the customized display features at both the head-wearable device 110 and the wrist-wearable device 170).

Electronic devices 874 can also include a communication interface 815, a display 130, one or more sensors 821, one or more applications 835, an AR processing module 845, one or more processors 850, and memory 860. The electronic devices 874 are configured to communicatively couple with the wrist-wearable device 170 and/or head-wearable device 110 (or other devices) using communication interface 815. In some embodiments, the electronic devices 874 are configured to communicatively couple with the wrist-wearable device 170 and/or head-wearable device 110 (or other devices) via an application programming interface (API). In some embodiments, the electronic devices 874 operate in conjunction with the wrist-wearable device 170 and/or the head-wearable device 110 to determine a hand gesture and cause the performance of an operation or action at a communicatively coupled device. The electronic devices 874, like the head-wearable device 110.

Server 870 includes a communication interface 815, one or more applications 835, an AR processing module 845, one or more processors 850, and memory 860. In some embodiments, the server 870 is configured to receive sensor data from one or more devices, such as the head-wearable device 110, the wrist-wearable device 170, and/or electronic device 874, and use the received sensor data to determine a hand gesture. The server 870 can generate instructions that cause the performance of operations and actions associated with a determined hand gesture at communicatively coupled devices, such as the head-wearable device 110.

Figure 9A:
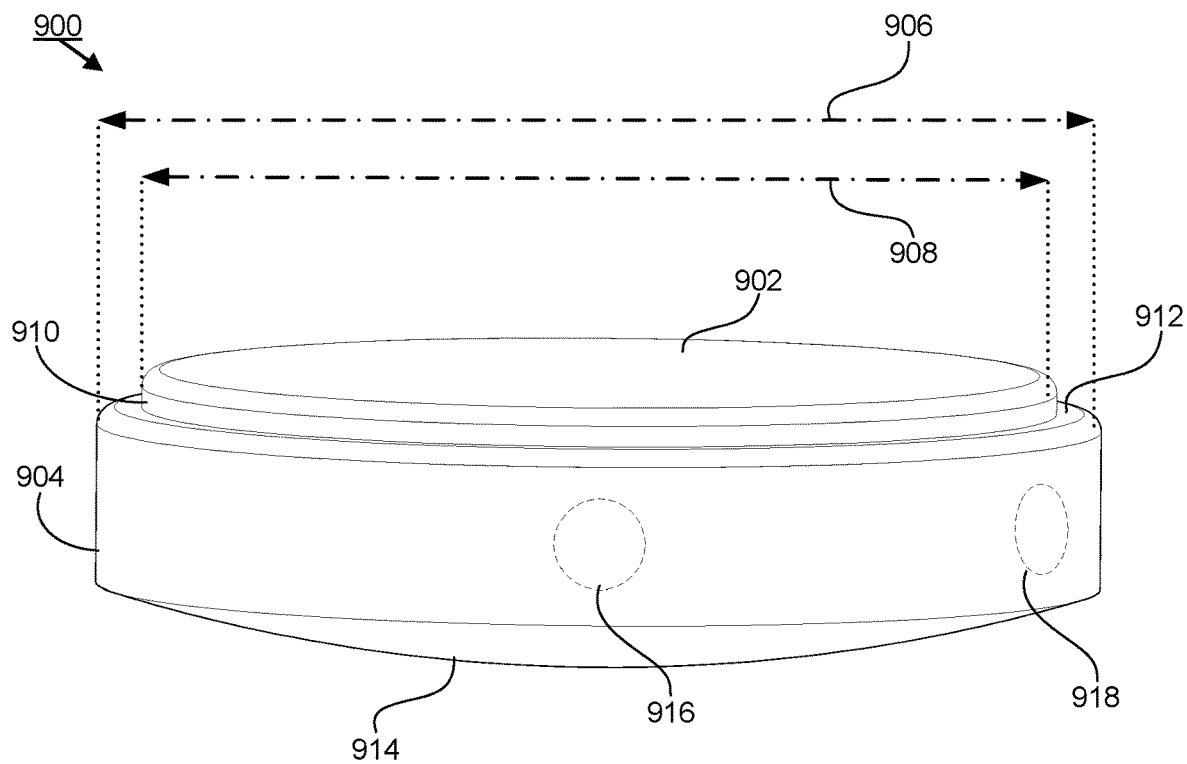
FIGS. 9A-9B illustrate an example display capsule configured to be coupled with a holding structure in conjunction with the techniques described herein, in accordance with some embodiments.
Figure 9B:
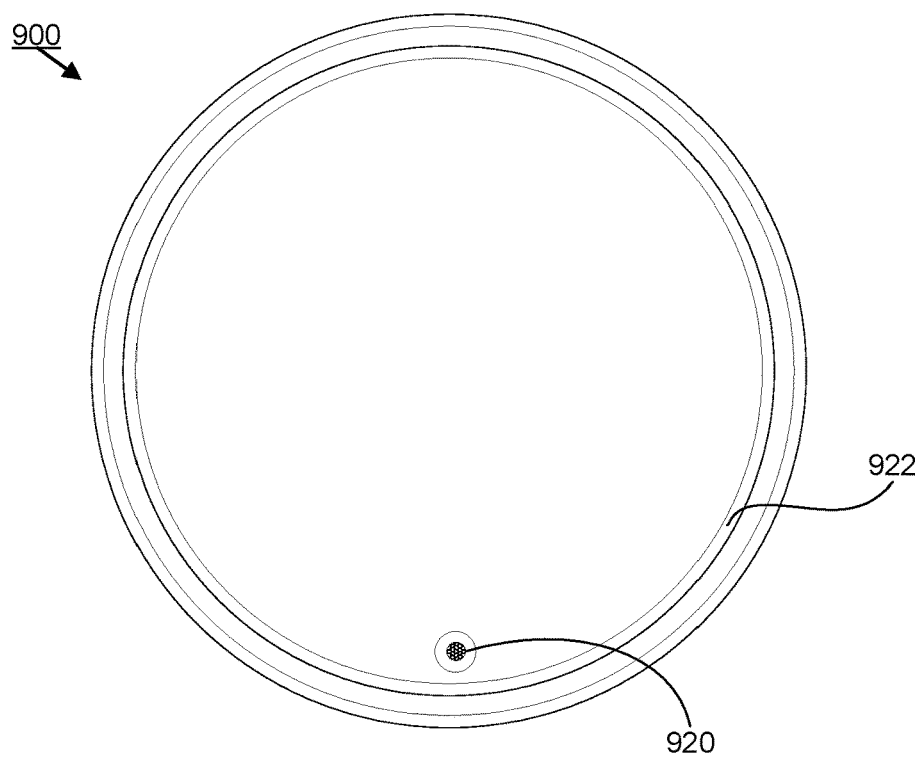

FIGS. 9A-9B illustrate an example display capsule 900 configured to be coupled with a holding structure (e.g., a holding structure 1004 in FIG. 10A, which can also be referred to as a cradle 1004) in conjunction with the techniques described herein, in accordance with some embodiments. The display capsule can be any of the display capsules described above (e.g., display capsules 121, 121A, 201, and those in FIGS. 3A-3F). In some embodiments, the display capsule 900 includes some or all of the components described in any of FIGS. 6-8. The display capsule 900 can be configured to be coupled with any of the holding structures described herein (e.g., a holding structure 1204 attached to a wearable electronic device 1200, a holding structure 1304 attached to handlebars of a bicycle, a holding structure 1324 attached to a necklace, etc.). In some embodiments, characteristics of the user interface, including display characteristics of the display capsule 900, are modified based on a device identifier of the respective holding structure that the display capsule 900 is coupled with.

Further, many of the display capsules described herein are configured to be coupled with holding structures that have their own identifiers, which can cause modifications to characteristics of the user's experience. For example, the display capsule 900 can be coupled with the holding structure 1324 shown in FIG. 13B (e.g., an electronic pendant configured to be worn on a necklace). The holding structure 1324 can be associated with a device identifier (e.g., which can be communicated to the display capsule by way of a characteristic change in a magnetic field sensed by the display capsule, an RFID embedded in the holding structure, or other ways to uniquely identify the holding structure 1324 to the display capsule (e.g., RFID, UWB, NFC, Hall effect sensing)). Upon receipt of the device identifier, the display capsule can then be customized based on a set of customized display characteristics associated with the device identifier.

As described herein, characteristics can be understood as aspects of the user's experience with a computing system that includes or is otherwise associated with the display capsule 900. For example, the display capsule 900 includes a display 902 (which can be an example of the display 130 in FIG. 8, according to some embodiments) that is configured to display visual elements to a user, including user interface elements, such as a clock user interface element (e.g., the clock user interface element 1036 in FIG. 10D). Holding structures with distinct device identifiers can cause the clock user interface element to be displayed with visually perceptible differences at the display 902.

In some embodiments, the display capsule 900 can be in electronic communication with one or more other electronic devices (e.g., a head-wearable device such as AR glasses or VR goggles, and/or another mobile device such as a smartphone, laptop, etc.). The device identifier of the holding structure that the display capsule 900 is coupled with can modify one or more user interfaces of one or more of these other electronic devices. In some embodiments, the display capsule 900 can include default display characteristics, which can be stored in memory (e.g., the memory 860 in FIG. 8) of the display capsule 900 and/or one or more electronic devices coupled with the display capsule 900.

FIG. 9A illustrates a perspective view of the display capsule 900. The display capsule 900 includes a touch-sensitive display 902 (e.g., a display screen), which can be located on a top surface of the display capsule 900. The touch-sensitive display 902 is coupled with a housing 904, which can be integrally formed with the touch-sensitive display 902 of the display capsule 900, according to some embodiments. In some embodiments, the housing 904 can be removably coupled from the display 902 of the display capsule 900. In some embodiments, the entire exterior of the housing is made of a rigid material, such as stainless steel. In some embodiments, at least part of the exterior surface of the housing is made of a soft, flexible material, such as an elastomer material.

The housing 904 defines a first outer perimeter 906 that extends beyond a second outer perimeter 908 of the touch-sensitive display 902. In some embodiments, a display-coupling edge 910 is defined by a portion of the display capsule 900 that extends (e.g., vertically upward) above the first outer perimeter 906 of the housing 904. In some embodiments, a housing-coupling edge 912 is defined by a portion of the housing 904 between the first outer perimeter 906 of the housing 904 and the second outer perimeter 908 of the touch-sensitive display 902. The housing-coupling edge 912 is generally orthogonal to the display-coupling edge 910. Generally, as described herein, orthogonal means within approximately five degrees of a perpendicular relationship between the two edges. In other words, the display-coupling edge 910 and the housing-coupling edge 912 can also be understood as together forming a cornered edge that extends outward beyond the outer perimeter of the touch-sensitive display 902.

In some embodiments, a lower surface 914 (e.g., a bottom surface) of the display capsule 900 includes one or more sensors (e.g., any of the sensors described in FIGS. 6-8). In some embodiments, the lower surface 914 of the display capsule 900 is configured to have an outwardly extending rounded profile that is configured to protrude into the skin of a wearer of the display capsule 900. There can be at least two purposes of such protrusion. First, the one or more sensors on the lower surface 914 of the display capsule 900 can be used to detect signals from the body of the user and/or other conditions of the user's external environment. Further, the protrusion of the lower surface 914 into the skin of the user can cause an upward force towards the housing coupling edge 912, which can be in contact with a coupling edge of a respective holding structure, according to some embodiments. In some embodiments, the lower surface 914 has a rounded surface profile representing the protrusion that a contact point of the lower surface 914 (e.g., a contact point that includes an electrode of one of the sensors) protrudes beyond a plane defined by a lower surface of a lower retaining portion of the holding structure.

In some embodiments, the display capsule 900 includes one or more electrical sensors (e.g., Hall effect sensors), which can be configured to sense a change in an electrical signal associated with the magnetic field at one or more discrete locations of the display capsule 900 (e.g., a magnetic field location 916, a magnetic field location 918, etc.). In some embodiments, the discrete locations can be indicated by visually perceptible features (e.g., button outlines, cutouts, distinct colorways) on an exterior surface of the housing 904. In some embodiments, one or more of the discrete locations are not indicated by any cutouts our other visually perceptible features on the exterior surface of the housing 904. In some embodiments there are depressible elements (e.g., buttons) instead of, or in addition to, the magnetic field locations 916 and 918. In other words, one or more of the magnetic field locations 916 and 918 can coincide with actual physical buttons that can be used instead of the Hall effect sensing capabilities associated with the magnetic field locations. In some embodiments, a device identifier of a holding structure that the display capsule is placed in can cause one or more Hall effect sensors of the display capsule to receive reduced power, increased power, or no power. For example, the display capsule 900 can be configured to couple with a holding structure located in an automatic vehicle (e.g., a car, a dirt bike, etc.). In some embodiments, while the automatic vehicle is moving, one or more of the magnetic field locations of the display capsule (e.g., the magnetic field location 916, and/or the magnetic field location 918) can be configured to be disabled while the respective automatic vehicle is activated (e.g., being driven). For example, the holding structure can be associated with a separate touch screen display that is in communication with separate physical buttons (e.g., a holding structure connected to a dashboard display of a car).

FIG. 9B illustrates a top view of the display capsule 900. The touch-sensitive display can have an inset 922, that can be a hard plastic material according to some embodiments. In some embodiments, a peripheral camera 920 can be located along an edge of the inset 922. In some embodiments, as shown in FIG. 9C, the touch-sensitive display can include a cutout on the inset 922, and the peripheral camera 920 can be located within the cutout. In some embodiments, one or more cameras can be located at other locations of the display capsule 900, including on a rear side of the display capsule 900.

FIGS. 10A-10H illustrate a sequence for coupling the display capsule 900 with an example wearable device 1000 that includes a band portion 1006 and a holding structure 1004, in accordance with some embodiments. The operations of the sequence can be performed at a computing system that includes at least the display capsule 900 and a holding structure 1004, which can be attached to a wearable band (e.g., a band portion 1006) of a wearable electronic device. In some embodiments the band portion 1006 is configured to be worn around a wrist of a user 101. In some embodiments, the one or more band portions can include additional sensors besides the one or more sensors located at the display capsule. In some embodiments, a unitary structure (e.g., one continuous molded piece of plastic) is formed by the combination of the holding structure 1004, and the band portion 1006. In some embodiments, the band portion 1006 includes two or more sub-portions (e.g., a first band portion 1030, and a second band portion 1032), where each of the sub-portions are configured to be coupled by one or more coupling components disposed on at least one of the first band portion 1030 and the second band portion 1032.

Figure 10A:
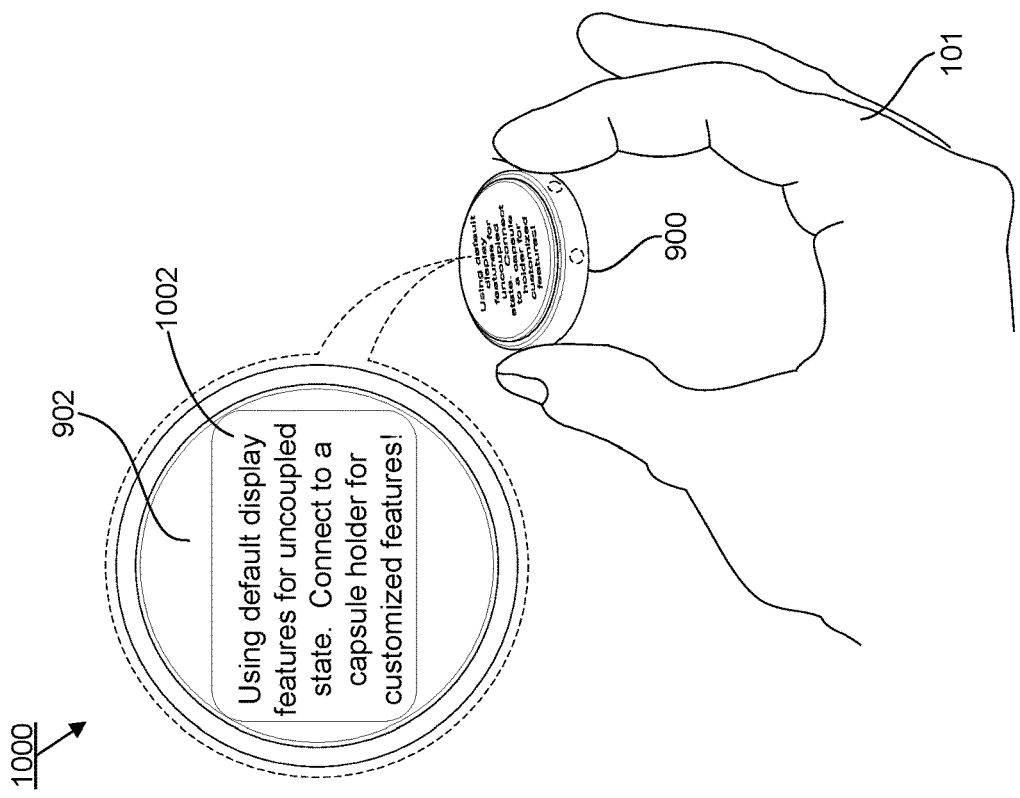
Figure 10D:
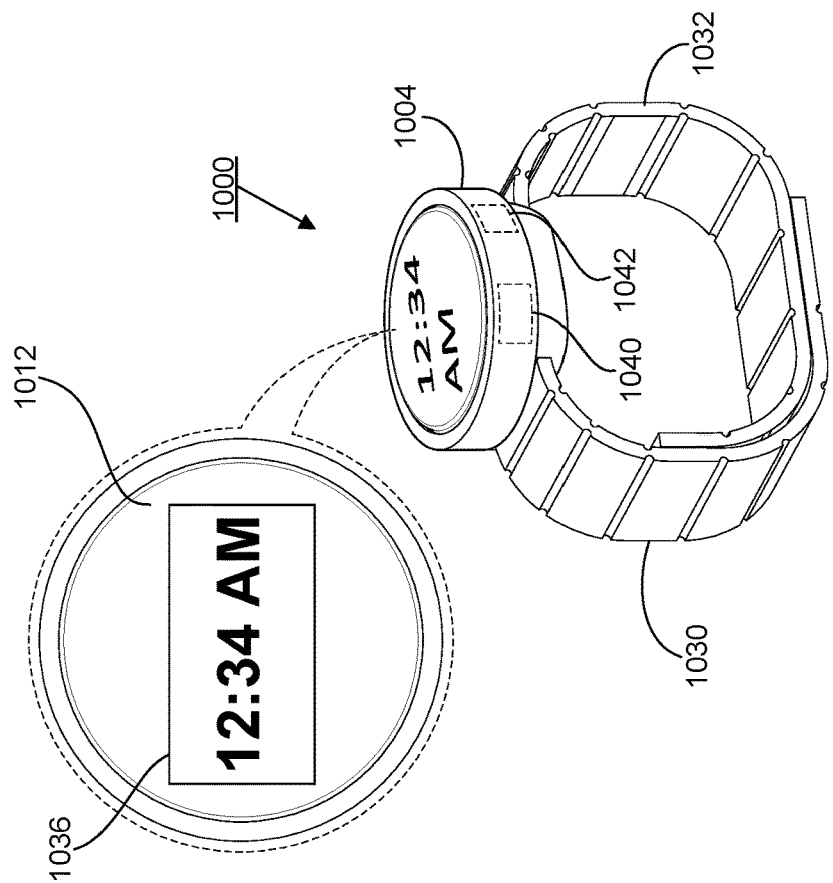

FIG. 10A illustrates a user 101 holding the display capsule 900 in their hand. A notification user interface element 1002 is displayed at the display 902 of the display capsule 900 (stating: "Using default display features for uncoupled state. Connect to a capsule holder for customized features!"). In some embodiments, when the display capsule 900 is uncoupled from any holding structure with a respective device identifier or is coupled with a holding structure that does not include a device identifier, the display capsule 900 is configured to use default display characteristics (e.g., default user interface settings). In some embodiments, the display characteristics of the display capsule 900 are configured to be the same display characteristics that were activated at the display capsule 900 by the holding structure that the display capsule was previously coupled with. In some embodiments, the default display characteristics correspond to a device identifier of the display capsule 900. In some embodiments, one or more of the default display characteristics of the display capsule can be set by another electronic device. In some embodiments, display characteristics of the display capsule can be configured by the user before they purchase the display capsule 900 (e.g., from a dedicated website that is in communication with a remote web server). In some embodiments, users and/or equipment manufacturers can customize the design of one or more of display capsules (e.g., the display capsule 900), holding structures, band portions, and/or any other electronic components that can be associated with the display capsule 900. In some embodiments, the value of the respective device identifier of the customized device can be based on customizations that the respective user makes to the respective components at the remote website.

FIG. 10B illustrates the display capsule 900 being placed into a holding structure 1004 of the wearable electronic device 1000. The holding structure 1004 is physically attached to the band portion 1006 of the wearable electronic device 1000. In some embodiments, the holding structure 1004 can be removably couplable with the band portion 1006. In some embodiments, an external surface of the holding structure includes one or more attachment loops, and each of the attachment loops can be configured to hold at least one part of the band portion 1006. In some embodiments, the holding structure 1004 can be configured to be magnetically coupled with one or more band portions of the respective wearable device (e.g., the band portion 1006).

In some embodiments, there is a lip 1008 on the holding structure 1004 that is configured to receive a coupling edge of a display capsule (e.g., the housing-coupling edge of the display capsule 900). In some embodiments, the lip 1008 extends inward towards a lateral center of an opening defined by the holding structure. In some embodiments, the lip is made of hard plastic. In some embodiments, at least a portion of the exterior surface of the lip includes a silicone material. In some embodiments, the lip 1008 can include hard plastic in certain locations of the inward extension (e.g., a first lateral width of the inward extension), and can include soft elastomer material in other locations of the lip 1008. For example, the innermost portion of the lip 1008 can be made of a soft plastic and/or elastomer material, such that the portion of the lip 1008 that includes hard plastic can extend into the inner lateral edge of the housing-coupling edge (e.g., the corner where the housing-coupling edge joins the display-coupling edge).

As will be discussed below, there can be a second lip 1010 on a lower portion of the holding structure, that can be made of different materials than the lip 1008. In some embodiments, the lip 1008 can be made of a composite material that includes a layer of flexible silicone surrounding a layer of hard metal. In some embodiments, the lower lip 1010 can be configured to surround an outer portion of the lower surface of the display (e.g., the lower surface 917).

In some embodiments, the holding structure 1004 includes one or more embedded magnets. The one or more embedded magnets can be configured to generate a magnetic field at a discrete field location of the holding structure 1004. In some embodiments, at least one electrical sensor disposed within the display capsule 900 (e.g., a Hall effect sensor corresponding to one or both of the magnetic field locations described with respect to the display capsule 900) is configured to sense an adjustment to an electrical signal associated with the magnetic field generated by the one or more embedded magnets. In some embodiments, the holding structure 1004 includes a second group of one or more embedded magnets, where each of the one or more embedded magnets are configured to generate a second magnetic field at a second discrete location of the holding structure 1004, distinct from the first location. In some embodiments, after the display capsule 900 becomes coupled with the holding structure 1004, an indication is provided to the user 101 indicating which Hall effect sensors, and/or discrete magnetic field locations of the display capsule 900 are activated by the respective embedded magnets of the holding structure 1004.

Figure 10C:
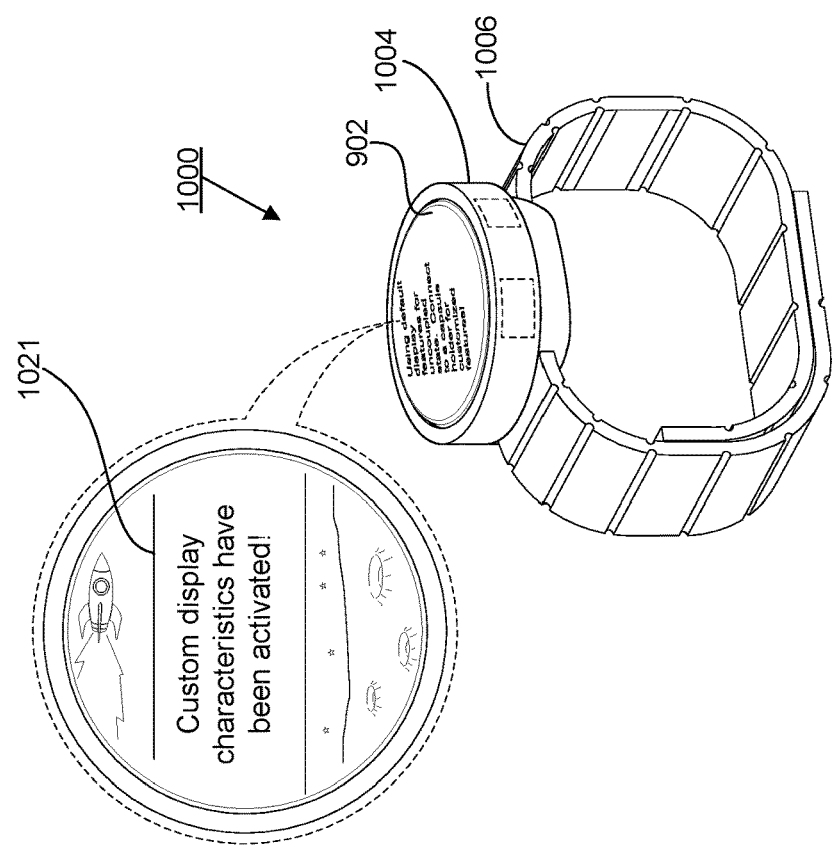

FIG. 10C illustrates a top perspective view of the display capsule 900 after it has been coupled with the holding structure 1004 of the wearable electronic device 1000, such that one or more coupling edges of the display capsule (e.g., the display-coupling edge 1010 and/or the housing-coupling edge 912) are in physical contact with one or more lips (e.g., the lip 1008) of the holding structure 1004. In some embodiments, both of the respective coupling edges of the display capsule 900 are configured to be pressed (e.g., providing an outward normal force) against portions of the lip 1008 of the holding structure 1004, such that the display capsule is held in place by the holding structure 1004 (e.g., snugly fit). In some embodiments, one of the display-coupling edge 1010 or the housing-coupling edge 912 are configured to be rigidly pressed against a hard plastic portion of the holding structure, while the other coupling edge (or a portion thereof) is configured to be encased by a soft elastomer portion of the of the holding structure 1004. In some embodiments, the display capsule is configured to be removably coupled with the holding structure such that the display capsule is pushed through the opening such that the display-coupling edge is fixedly held by the lip of the holding structure when the display-coupling edge and the housing-coupling edge are surrounded by the holding structure.

In some embodiments, an inner surface of the holding structure 1004 is made, at least partially, of a silicone material that is configured to accommodate the size of the display capsule 900 to produce a snug fit. In some embodiments, the silicone material on the inner surface of the display capsule 900 is configured to apply a retaining force to an exterior surface of the display capsule 900, such that respective elements of the holding structure corresponding to one or more Hall effect sensors associated with one or more discrete field locations (e.g., the magnetic field location 916, the magnetic field location 918, etc.) of the display capsule 900 are more performant, while the retaining force is not so much as to cause damage to electronic and/or mechanical components of the display capsule 900 and/or the holding structure 1004.

In some embodiments, upon coupling the display capsule 900 with the holding structure, at least one display characteristic of the display capsule 900 is modified based on the device identifier corresponding to the holding structure 1004. In some embodiments, an indication can be provided to the user 101 when the display capsule 900 becomes sufficiently coupled with the holding structure 1004. For example, in FIG. 10C, a notification user interface element 1021 is displayed on the display 902 of the display capsule 900 (stating: "Custom display characteristics have been activated based on the device identifier of the connected holding structure!"). In some embodiments, the indication includes a haptic event provided at one or more of the display capsule 900, the holding structure 1004, or another electronic device in communication with the display capsule and/or the holding structure 1004. In some embodiments, the indication includes a notification displayed at the display capsule. In some embodiments, the indication causes an outer surface of the display capsule 900, the holding structure and/or another electronic device to change physical appearance. For example, in some embodiments, when the display capsule 900 becomes coupled with a holding structure with a particular device identifier, a glowing effect is applied to the band portion 1006 of the wearable device corresponding to the holding structure 1004.

Display characteristics of the notification user interface element 1021 are customized based on the device identifier of the holding structure 1104 of the wearable electronic device 1000. In some embodiments, one or more non-display characteristics are customized at the display capsule based on the device identifier of the respective holding structure that it is connected to. For example, while the display capsule 900 is connected to the holding structure 1004, an audial rocket noise can be emitted when a notification is received at the display capsule 900.

In some embodiments, the indication that the display capsule 900 is sufficiently coupled with the holding structure 1004 includes an adjustment to a display characteristic of a virtual avatar associated with the user 101. For example, in some embodiments, the virtual avatar associated with the user 101 is configured to be wearing one of several outfits, and the respective outfit that the avatar is wearing after coupling the display capsule 900 with the holding structure 1004 corresponds to the device identifier of the holding structure.

In some embodiments, the device identifier of the holding structure 1004 is an RFID tag, or another device for communicating a unique identifier and/or packets of data related thereto (e.g., RFID, UWB, NFC, Hall effect sensing). In some embodiments, the device identifier of the holdings structure 1004 is a structured data object (e.g., data in a database table (e.g., MySQL), JavaScript Object Notation (JSON), etc.). In some embodiments, the structure data object includes one or more sets of weighted characteristics, and the outfit of the avatar corresponding the device identifier of the holding structure 1004 is based on a calculation that includes one or more of the weighted characteristics. As a prophetic example, the weighted characteristics can include such features as "sportiness," "classiness," "funniness," and "trendiness." And the selection of the avatars outfit, and/or one or more individual aspects of the outfit are based on a calculation involving these characteristics. In some embodiments, the respective outfits (or components thereof) have corresponding identifiers that are used in conjunction with the information in the device identifier in order to cause certain aspects of the avatar's outfit to be selected. In an example embodiment, the display capsule

900, the holding structure 1004, and each of the first band portion 1030 and the second band portion 1032 have device identifiers, that are used in conjunction with one another to determine culminated display characteristics of the display capsule 900. In some embodiments, when the display capsule 900 becomes coupled with a respective holding structure (e.g., the holding structure 1004) for the first time, the avatar associated with the user 101 can receive a content item (e.g., loot box, virtual jersey, etc.) that corresponds to the device identifier of the holding structure 1004. In some embodiments, such content items can be received when the user 101 goes to a particular geographic location (e.g., a trendy night club, a sporting event, a concert, etc.). In some embodiments, the determination that the user 101 has arrived at a certain location can be determined based on GPS coordinates (e.g., via the GPS 1017 in FIG. 7), or by a determination that the user 101 accessed a particular Wi-Fi connection (e.g., via a Wi-Fi or Bluetooth module 1020 in FIG. 7). The received content items can include accessories for an avatar associated with the user 101, custom photo stickers, frames, filters, and the like.

FIG. 10D is a perspective of the wearable electronic device 1000, including the display capsule 900, the holding structure 1004, a first band portion 1030, and a second band portion 1032, while the wearable electronic device 1000 is configured (e.g., sized) with a first circumference to be worn by the user 101. In some embodiments, the first band portion 1030 and/or the second band portion 1032 include internal and/or external magnets, which can be used according to some embodiments to maintain a coupling connection between the first band portion 1030 and the second band portion 1032.

The wearable electronic device 1000 includes two depressible peripheral elements, a first depressible peripheral element 1040, and a second depressible peripheral element 1042. In some embodiments, the first depressible peripheral element 1040 and the second depressible peripheral element 1042 are configured to be in in positional alignment with a mechanical button of a housing of the display capsule 900 while it is held within the holding structure 1004. In some embodiments, one or more of the depressible peripheral elements 1040 and 1042 are configured to be in positional alignment with magnetic field locations (e.g., the magnetic field location 916, the magnetic field location 918, etc.), which can be generated by Hall effect sensors of the display capsule 900, according to some embodiments.

FIG. 10D shows the display 902 of the display capsule 900 displaying a clock user interface element 1036 (e.g., a digital clock), which can have one or more display characteristics that correspond to the device identifier of the respective holding structure that the display capsule 900 is connected to (e.g., the holding structure 1004). In some embodiments, the clock user interface element 1036 is displayed at a home user interface that is configured to be displayed when the user 101 wakes the display capsule 900.

Figure 10E:
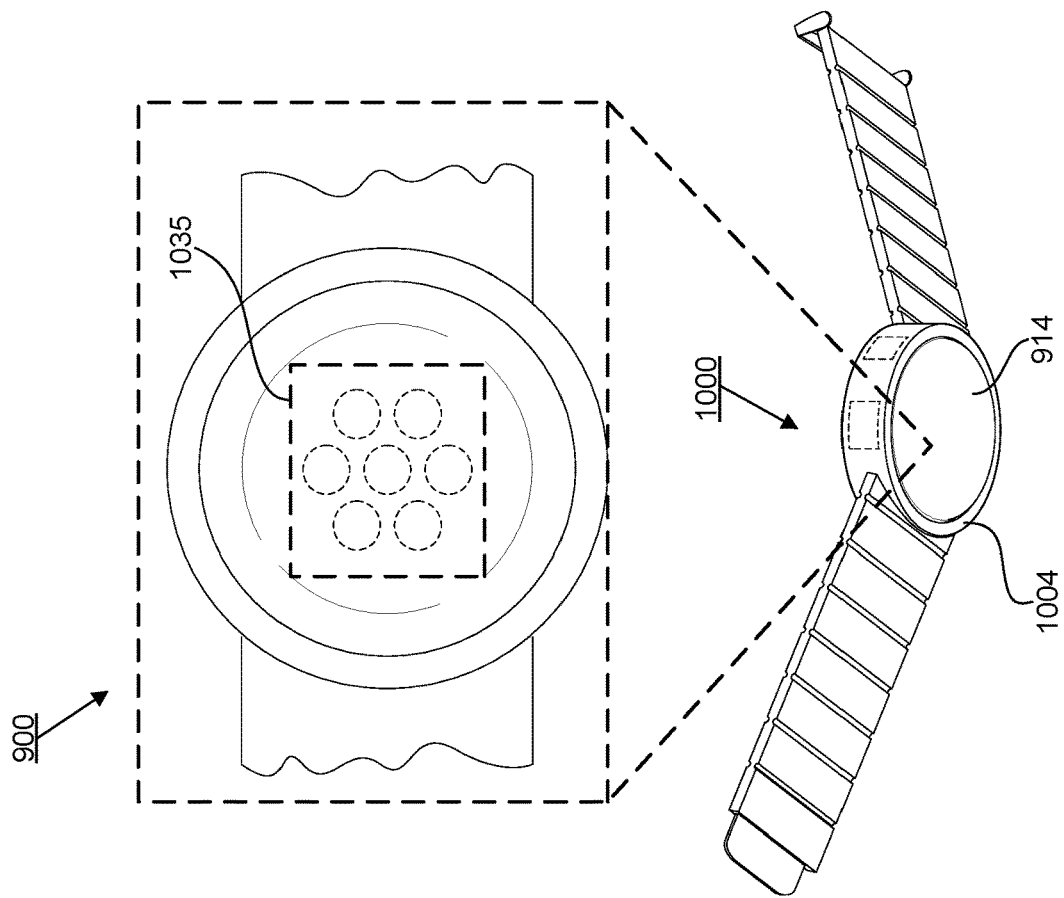

FIG. 10E is a bottom view of the display capsule 900 while the housing-coupling edge 912 is coupled with the holding structure 1004. The lower surface 914 of the display capsule 900 can include one or more sensors (e.g., the set of sensors 1035), which can be distributed at different locations along the lower surface 914. In some embodiments, at least one of the one sensors of the set of sensors 1035 on the lower surface 1016 includes one or more electrodes that can be used to detect neuromuscular signals of the user 101. In some embodiments, the shape of the lower surface 914 of the display capsule 900 is configured to cause the neuromuscular signal sensor(s) on the lower surface to protrude into the user's skin by a certain depth, and/or at a certain location, in order to detect a particular neural signal with a desired level of fidelity. In some embodiments, one or more neuromuscular signal sensors on wearable electronic device need to be located at a certain position on the wrist of the user 101 in order to properly detect neuromuscular signals of the user 101.

Figure 10F:
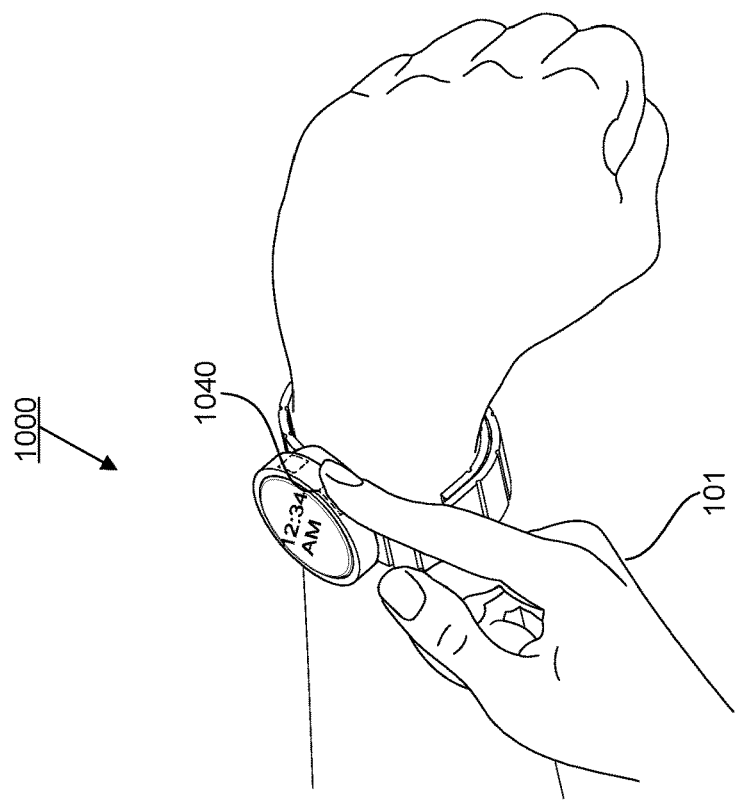
Figure 10G:
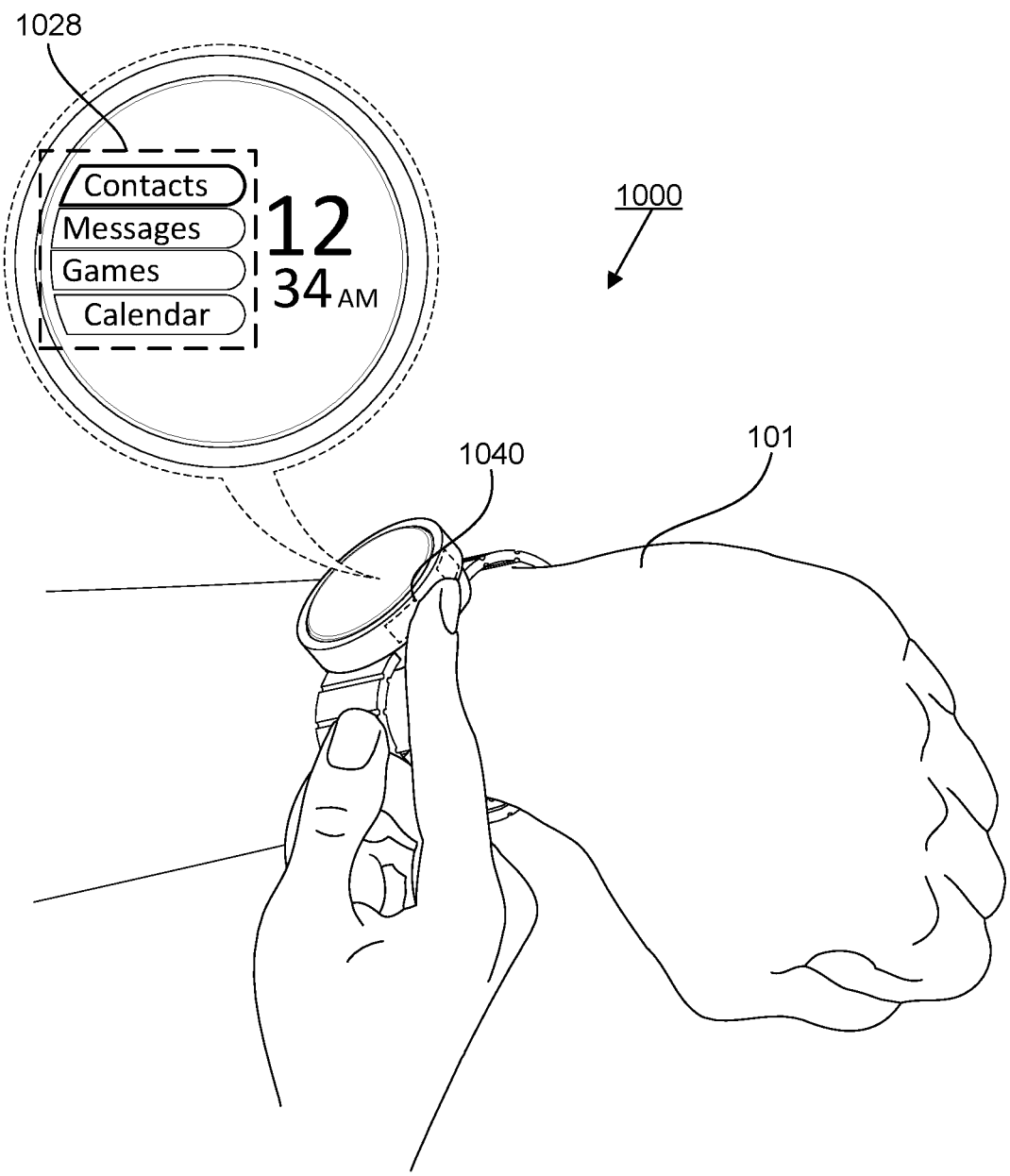

FIG. 10F illustrates the user 101 activating the depressible peripheral element 1040 of the holding structure 1004, which causes a change in magnetic field to be detected by a Hall effect sensor of the display capsule 900. In some embodiments, each of the gestures illustrated by the FIGS. 10F-10H cause different operations to be performed at a user interface displayed at a display of the display capsule 900. In some embodiments, the distinct operations caused by each gesture at some of the user interfaces displayed at the display 902 of the display capsule 900 correspond to a predefined set of navigational operations at the user interface (e.g., a gesture directed to the depressible peripheral element 1040 can correspond to a downward movement in a particular user interface displayed at the display 902 of the display capsule 900, and a gesture directed to the depressible peripheral element 1042 can correspond to an upward movement in the particular user interface displayed at the display 902 of the display capsule 900). In some embodiments, operations corresponding to gestures directed to any depressible peripheral elements of the display capsule 900 can be configured by the user 101. In some embodiments, the sensitivity of the Hall effect sensors activatable by the depressible peripheral elements of the display capsule 900 are configurable by the user 101, and/or can be characteristics adjustable based on the device identifier of the respective holding structure that the display capsule 900 is coupled with.

FIG. 10G illustrates the user 101 activating the depressible peripheral element 1040 of the holding structure 1004 while a menu user interface element 1028 is displayed at the display 902 of the display capsule 900, which can cause a change in magnetic field at a discrete field location of the display capsule 900. The change in magnetic field can be sensed by one or more Hall effect sensors of the display capsule 900. In some embodiments, the control flow of a plurality of user interface elements displayed at the display 902 of the display capsule 900 can be adjusted based on the device identifier of the respective holding structure that the display capsule 900 is coupled with.

Figure 10H:
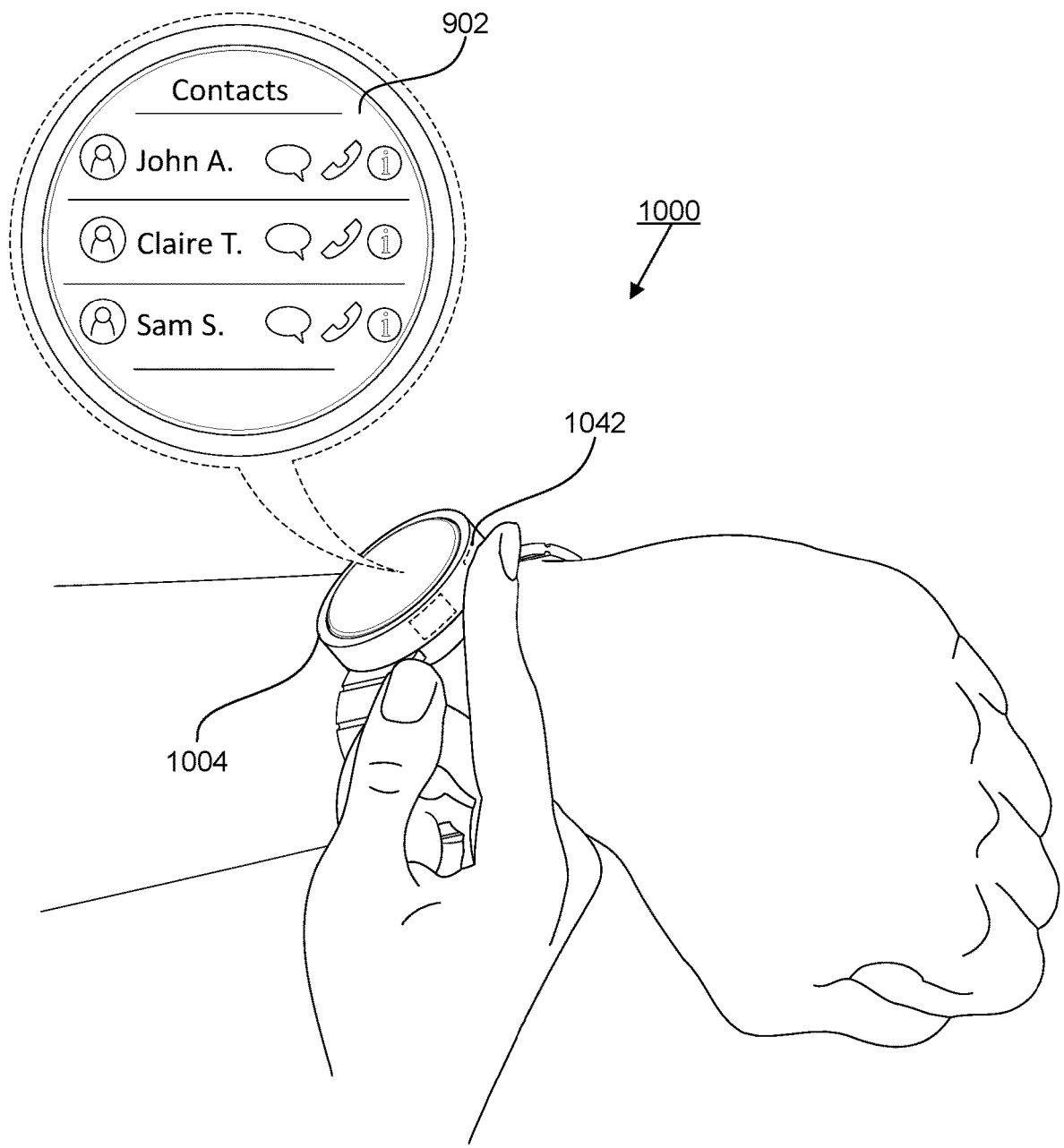

FIG. 10H illustrates the user 101 performing a gesture directed to the depressible peripheral element 1042 of the holding structure 1004 that causes a different operation to be performed within a contact list user interface 1034 displayed at the display 902 of the display capsule 900. In some embodiments, one or more display characteristics of the display capsule 900 are adjusted at individual user interfaces (e.g., the contact list user interface 1034) of the display capsule 900 based on the device identifier of the holding structure 1004.

FIGS. 11A-11E illustrate an example sequence that includes removing the display capsule 900 from a wearable electronic device 1100 that includes a band portion 1106 and a holding structure 1104 and placing the display capsule 900 into another wearable device that includes another band portion and another holding structure, in accordance with some embodiments.

Figure 11A:
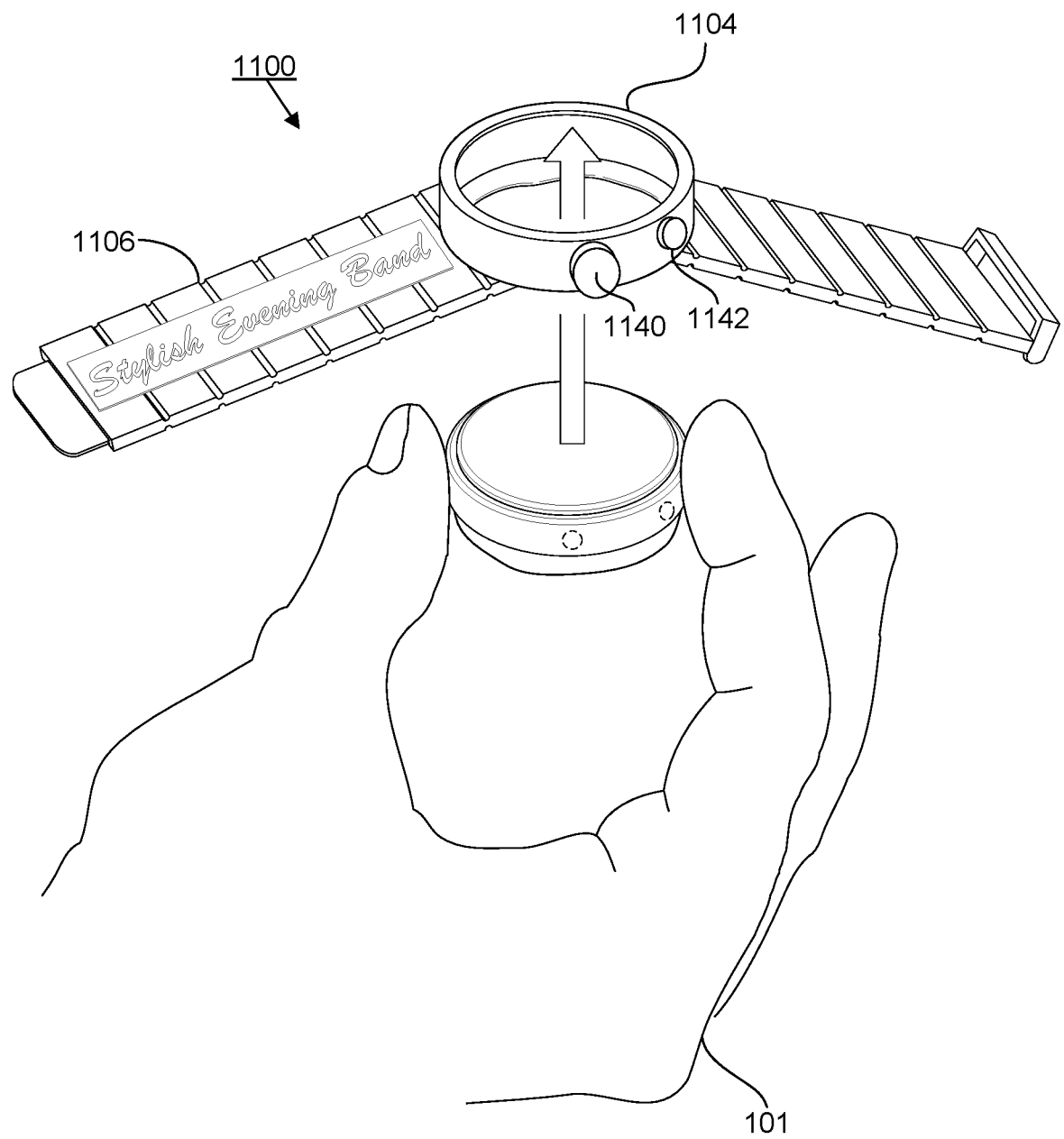
FIGS. 11A-11E illustrate an example sequence that includes removing an example display capsule from a wearable electronic device that includes a band portion and a holding structure and coupling the display capsule with another band portion and another holding structure (to then form another wearable device), in accordance with some embodiments.

FIG. 11A illustrates the user 101 placing the display capsule 900 into another holdings structure 1104 of a wearable electronic device 1100 that is different than the wearable electronic device 1000 in FIGS. 10A-10H. The wearable electronic device 1100 includes at least one device identifier that is distinct from the one or more device identifiers of the respective components illustrated in FIGS. 10A-101 (e.g., the device identifier of the holding structure 1004).

In some embodiments, the holding structure 1104 of the wearable electronic device 1100 includes at least one of the same or similar mechanical components as the holding structure 1004 of the wearable electronic device 1000 in FIGS. 10A-10H. In some embodiments, the holding structure 1104 of the wearable electronic device 1100 includes one or more different activatable mechanical elements than the depressible peripheral elements illustrated in FIGS. 10A-10H. For example, the holding structure 1104 in FIG. 11A includes a twistable dial peripheral element 1140 that the user can activate by a rotational gesture. In some embodiments, the dial peripheral element 1140 can cause a connected mechanical component to be depressed towards a magnetic field location of the display capsule 900. The holding structure 1104 also includes depressible peripheral element 1142.

Figure 11B:
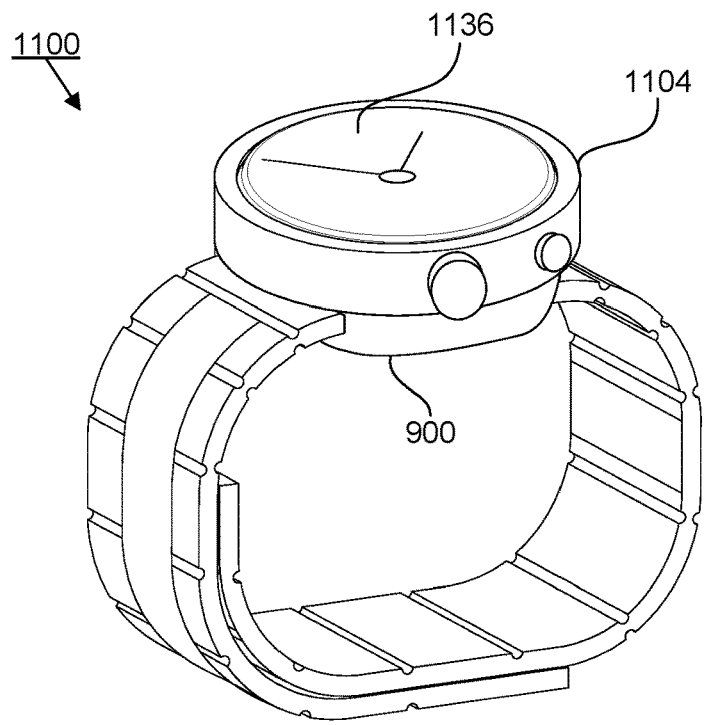

FIG. 11B illustrates the holding structure 1104 of the wearable electronic device 1100 coupled with the display capsule 900. The different device identifier of the holding structure 1104 can cause a dial clock user interface element to be displayed at the display of the display capsule 900 (e.g., a dial clock instead of digital clock).

Figure 11C:
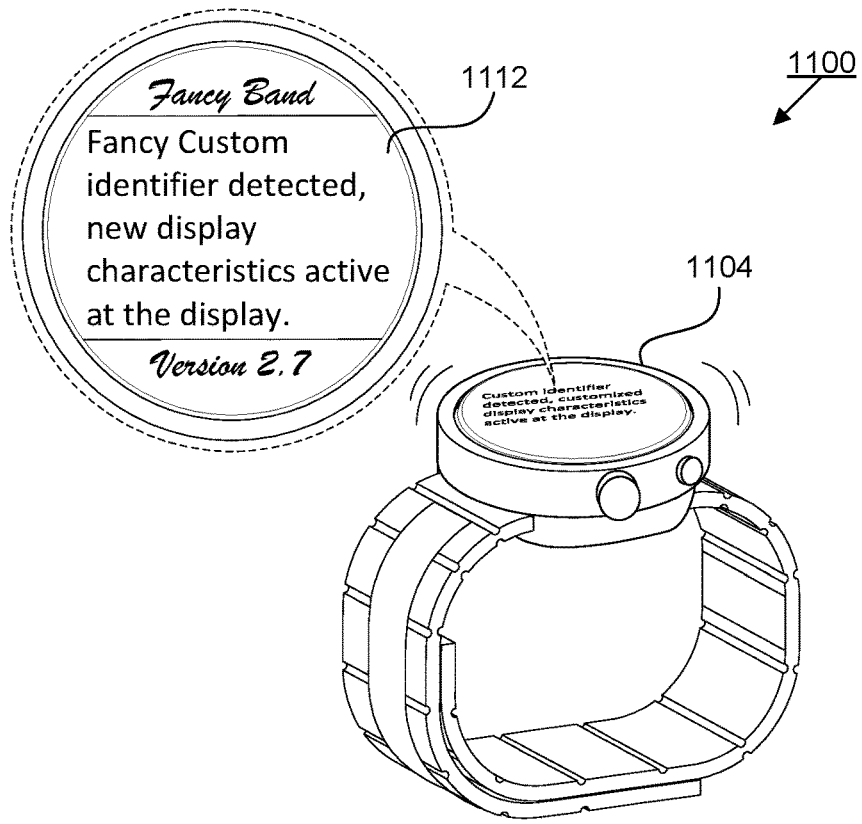

FIG. 11C illustrates a notification user interface element 1112 displayed at the display of the display capsule 900 (stating: "Custom identifier detected, customized display characteristics active at the display."). Display characteristics of the notification user interface element 1112 are customized based on a different customized set of characteristics corresponding to the device identifier of the holding structure 1104 of the wearable electronic device 1100. In some embodiments, one or more non-display characteristics are customized at the display capsule based on the device identifier of the respective holding structure that it is connected to. For example, while the display capsule 900 is connected to the holding structure 1104, a clinking noise of champagne glasses can be emitted when a notification is received at the display capsule 900.

Figure 11D:
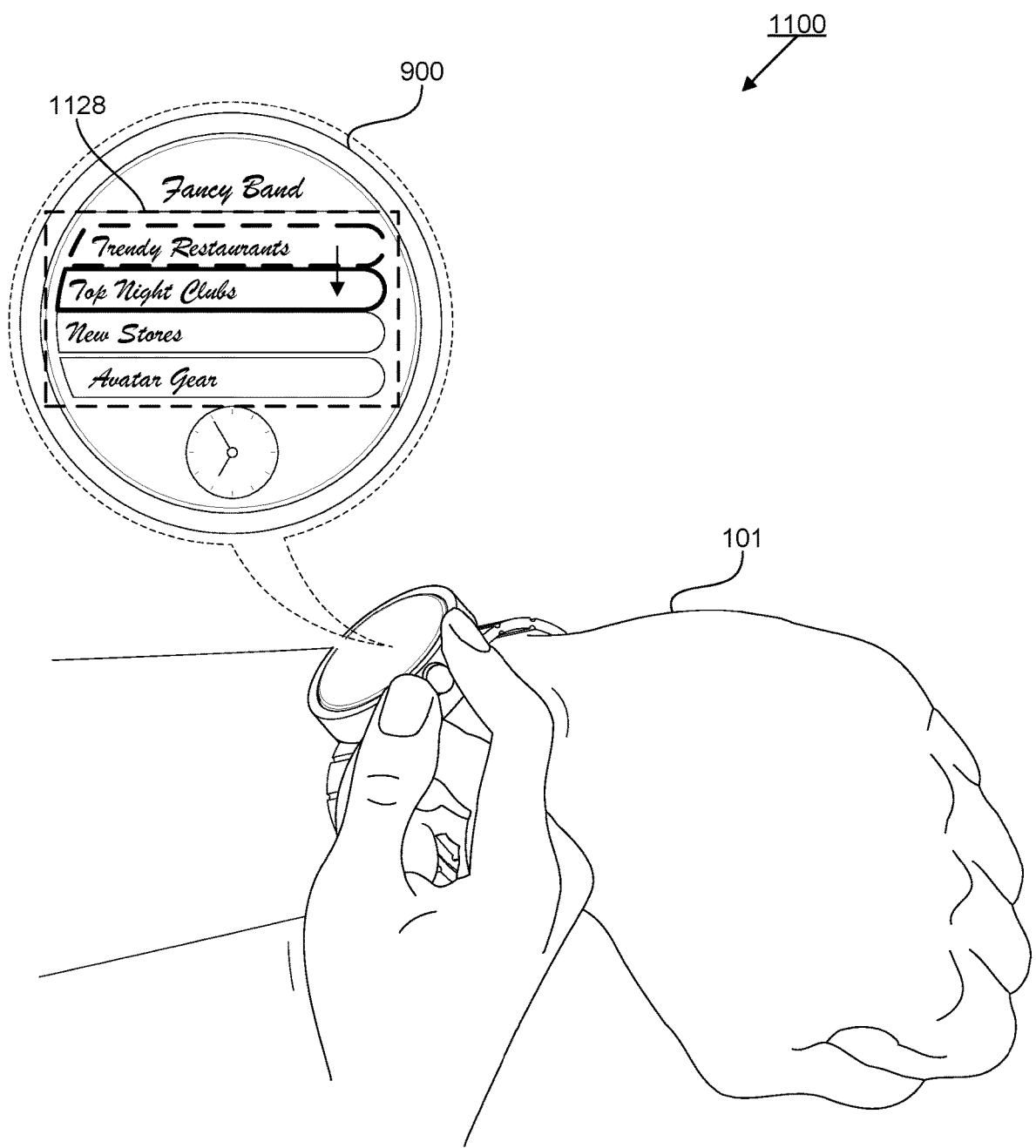

FIG. 11D illustrates the user 101 navigating a user interface displayed at the display capsule 900 based on the user performing a gesture at the peripheral dial element 1140. In some embodiments, different options can be displayed within a respective menu user interface element of the display capsule 900 based on the device identifier of the holding structure 1104. For example, the device identifier of the holding structure 1104 can be focused on social gatherings, and the menu options of the respective menu user interface element 1128 can be related to locations where social gatherings are likely to take place (e.g., "Trendy Restaurants", "Top Night Clubs", "New Stores", and/or "Avatar Gear").

Figure 11E:
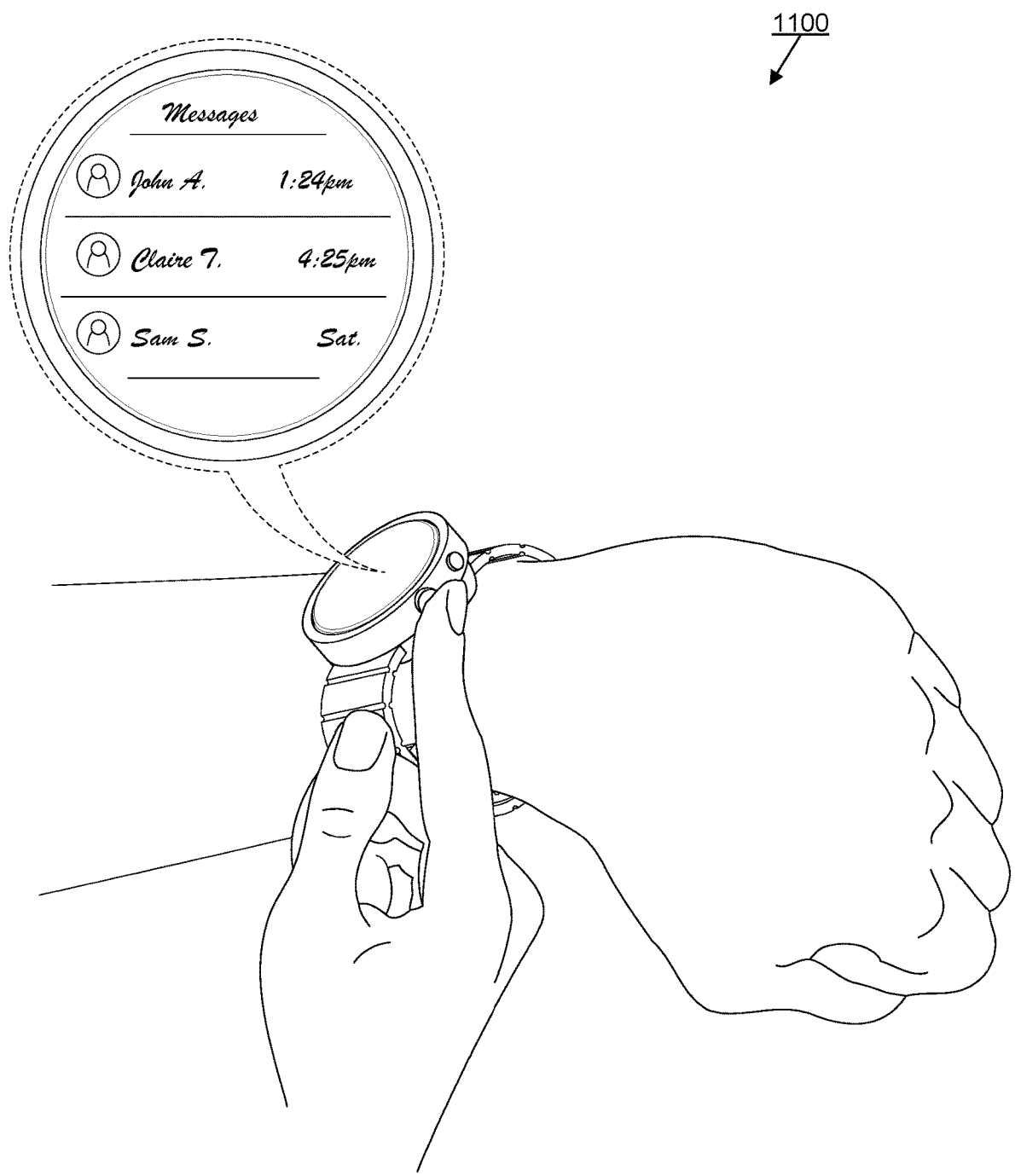

FIG. 11E illustrates the user performing a button press gesture at the peripheral dial element 1140. In some embodiments, different operations can be performed when the user 101 performs a gesture directed to the peripheral dial element 1140 than when the user 101 performs a gesture directed to a depressible peripheral element (e.g., the depressible peripheral element 1040, the depressible peripheral element 1042, the depressible peripheral element 1142, etc.). For example, rotating the peripheral dial element 1140 can cause a navigational operation to be performed, while a gesture directed to the depressible peripheral element 1142 (which is visible in FIGS. 11A-11C) can cause a selection to be performed. In some embodiments, based on performance of the operations from the computer-readable storage media stored in the respective holding structure, functionality and/or data related to such operations can be cached or otherwise stored at the display capsule 900 for later use.

FIGS. 12A-12F illustrate another example sequence that includes removing the display capsule 900 from a wearable electronic device 1200 and placing the display capsule 900 into another wearable electronic device 1200 that includes another band portion 1206 and another holding structure 1204, in accordance with some embodiments. In some embodiments, holding structures that are configured to couple with the display capsule 900 can include non-transitory computer readable storage media (e.g., application software) that can be executed to cause performance of operations at the display capsule to modify the user's experience based on the device identifier of the respective holding structure (e.g., the holding structure 1204 can include computer-readable storage medium related to fitness activity user interface elements, control flows, etc.).

Figure 12A:
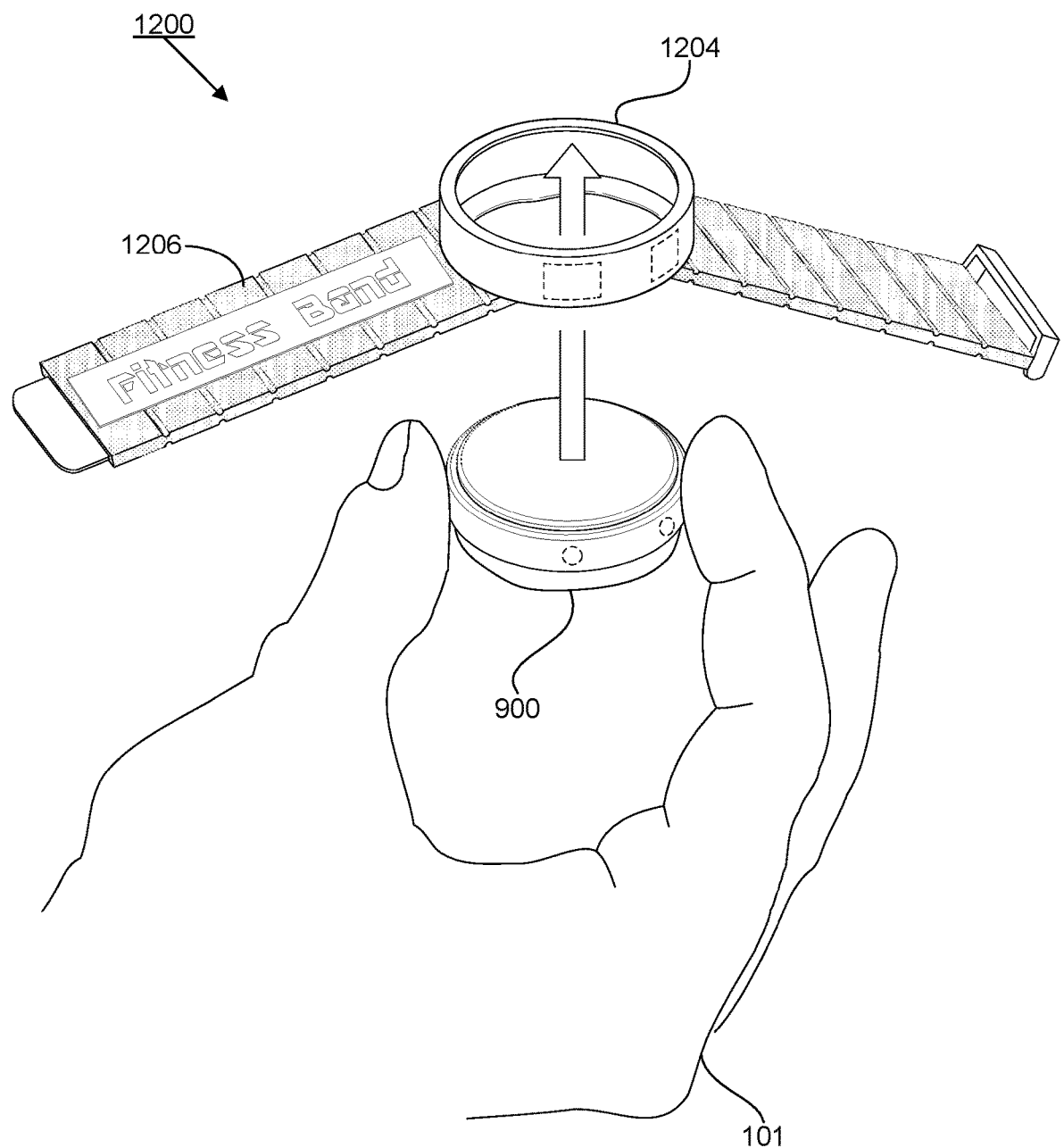
FIGS. 12A-12F illustrate another example sequence that includes removing an example display capsule from a wearable electronic device that includes a band portion and a holding structure and coupling the display capsule with another band portion and another holding structure (to then form another wearable device), in accordance with some embodiments.

FIG. 12A illustrates the user 101 placing the display capsule 900 into the holding structure 1204 of the wearable electronic device 1200. The wearable electronic device 1200 includes at least one device identifier that is distinct from the one or more device identifiers of the respective components illustrated in FIGS. 10A-10H (e.g., the device identifier of the holding structure 1004). As shown in FIG. 12A, the band portion 1206 of the wearable electronic device 1200 includes different aesthetic features than the band portion 1006 of the wearable electronic device 1000, and the band portion 1106 of the wearable electronic device 1100.

Figure 12B:
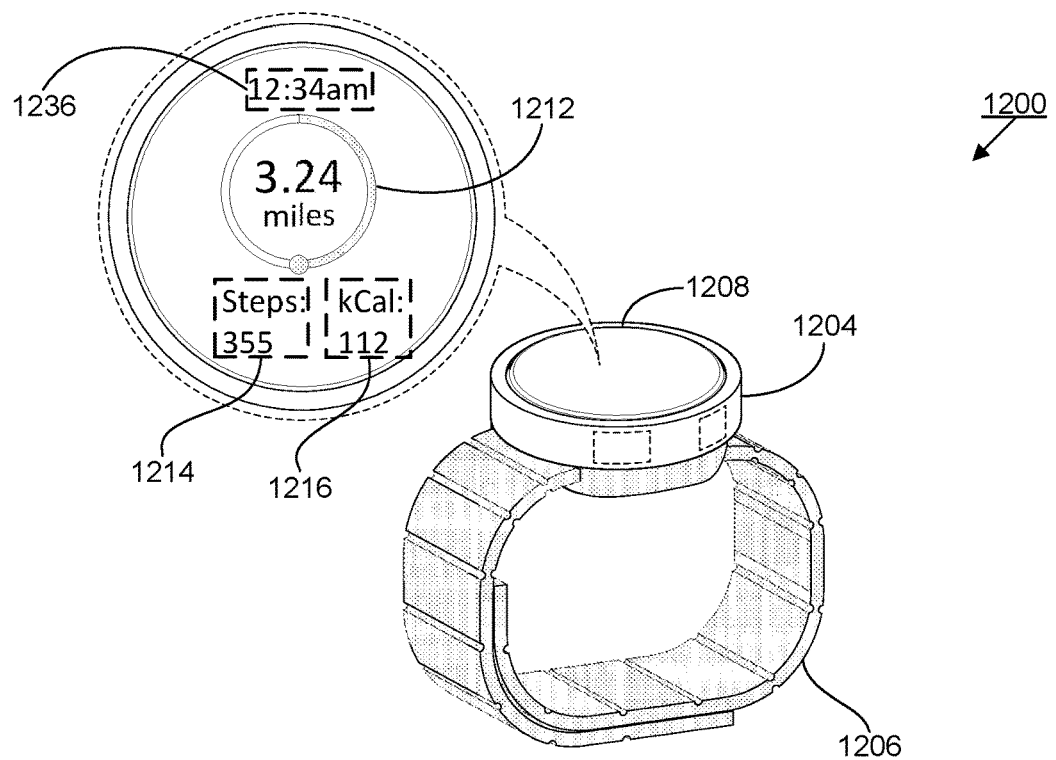

FIG. 12B illustrates the holding structure 1204 of the wearable electronic device 1200 coupled with the display capsule 900. In some embodiments, when the display capsule 900 is coupled with the holding structure 1204, the housing-coupling edge 912 is in physical contact with a lip 1208 of the holding structure 1204. The different device identifier of the holding structure 1104 can cause a clock user interface element 1236 to be displayed within a home user interface displayed at the display 902 of the display capsule 900.

The device identifier of the holding structure 1204 causes different user interface elements to be displayed at the display 902 of the display capsule 900. For example, the device identifier of the holding structure 1204 and/or a device identifier of the band portion 1206 can be fitness-themed, which can cause the display capsule 900 to display user interfaces and user interface elements related to fitness activities (e.g., a fitness-themed user interface element 1212, a fitness-themed user interface element 1214, a fitness-themed user interface element 1216, etc.). In some embodiments, data displayed at one or more of the fitness-themed user interface elements can be based on data collected from one or more sensors on the display capsule and/or one or more sensors on the holding structure 1204. In some embodiments, the control flow of user interfaces that the user 101 can navigate through at the display capsule 900 can be adjusted based on the device identifier of the respective holding structure that the display capsule 900 is coupled with. For example, when the user opens the display capsule 900 from the lock screen while the display is coupled with the holding structure 1204, a user interface element can be displayed suggesting that the user go for a run or allowing the user to select from a variety of physical activities to be performed. In some embodiments, the order of user-interface elements, or the priority of displaying such elements in a limited list at a given user interface can change based on a device identifier of the respective holding structure that the display capsule is coupled with at that time.

Figure 12C:
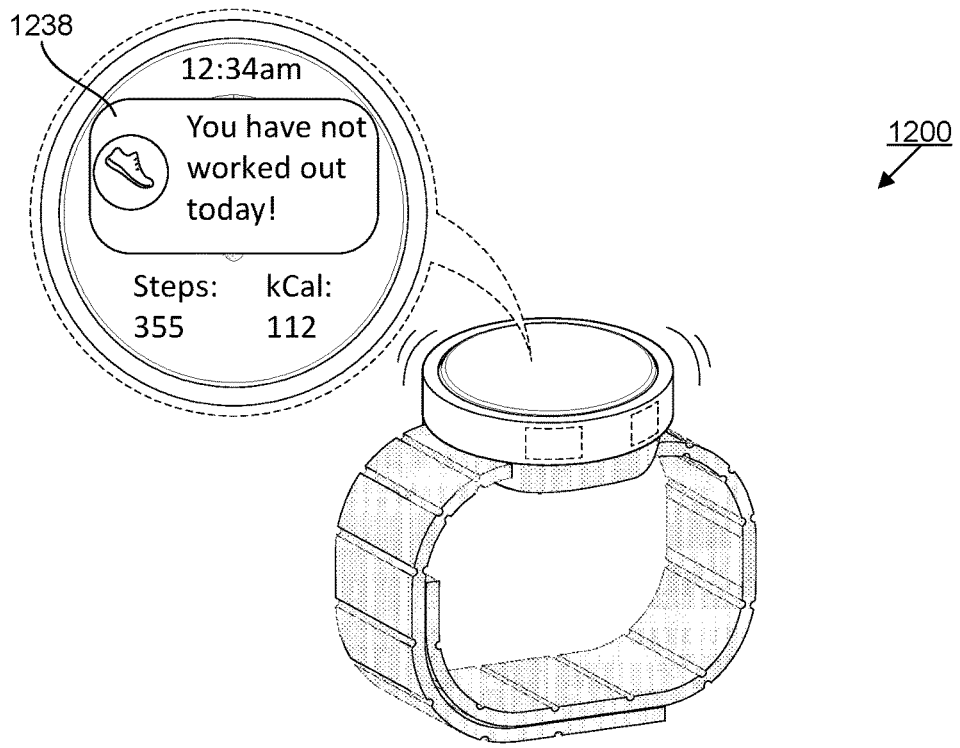

FIG. 12C illustrates the holding structure 1204 of the wearable electronic device 1200 coupled with the display capsule 900. A notification user interface element 1238 is being displayed at the display 902 of the display capsule 900 (stating: "You have not worked out today!"). In some embodiments, notification delivery settings of the display capsule 900 and/or another electronic device in communication with the display capsule (e.g., a smartphone, a laptop, etc.) can be adjusted based on the device identifier of the holding structure 1204. For example, since the holding structure 1204 and band portion 1206 of the wearable electronic device 1200 are fitness-themed, notifications related to fitness activities can be displayed at the display capsule 900 that would not be displayed if the display capsule 900 was coupled with other holding structures and/or other electronic components having different device identifiers that are not fitness-themed.

Figure 12D:
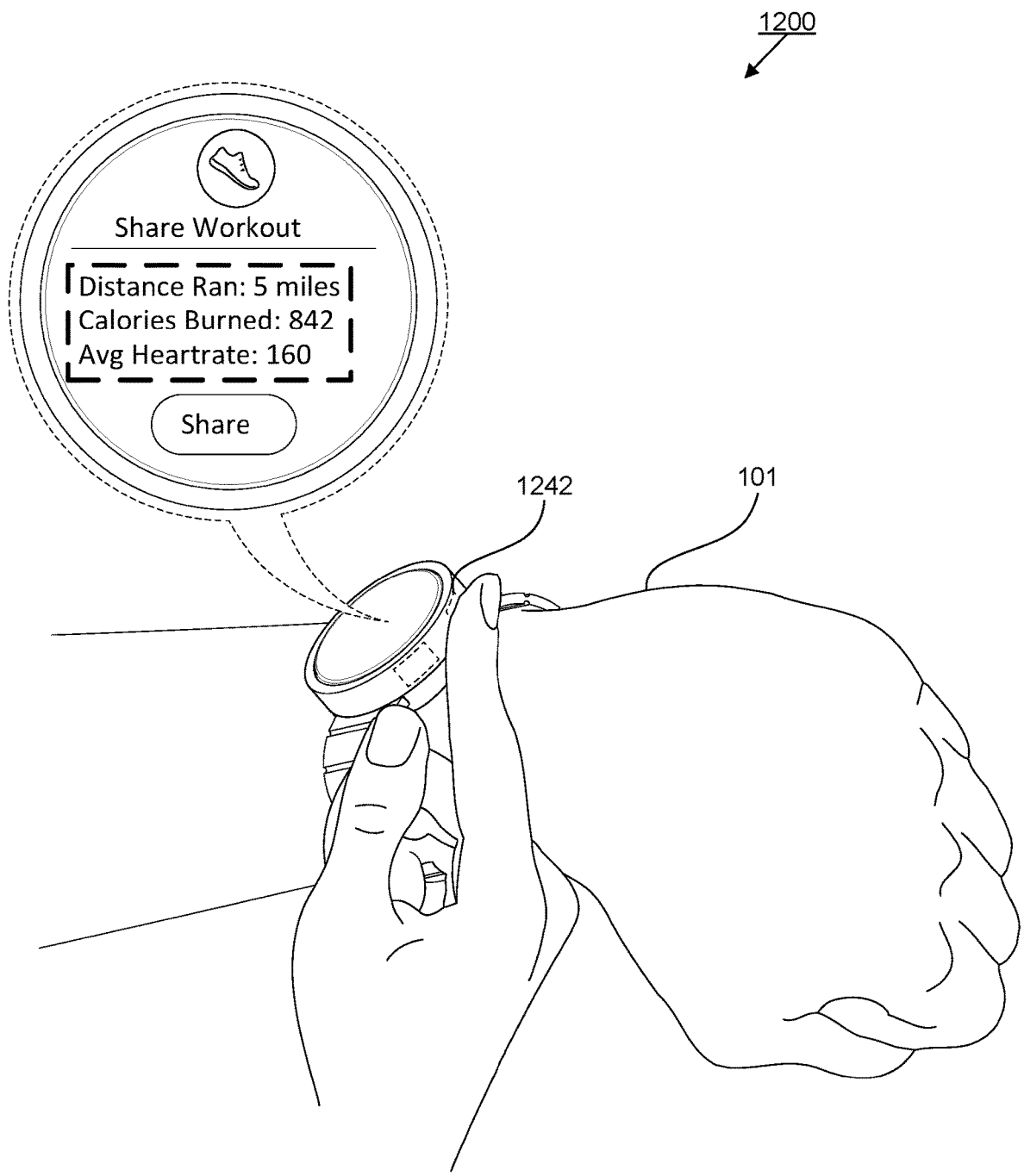

FIG. 12D illustrates the user 101 performing a gesture directed to a depressible peripheral element 1242 of the holding structure 1204. The depressible peripheral elements 1242 are configured to have a lower sensitivity than the depressible peripheral elements 1040 and 1042 on the holding structure 1004 displayed in FIGS. 10B-10F, which can help the user 101 to avoid accidentally depressing a depressible peripheral element 1240 or the depressible peripheral element 1242 while the user is performing a fitness activity. In other words, the lower sensitivity of the depressible peripheral elements 1240 and 1242 can be related to the device identifier of the holding structure 1204.

Figure 12E:
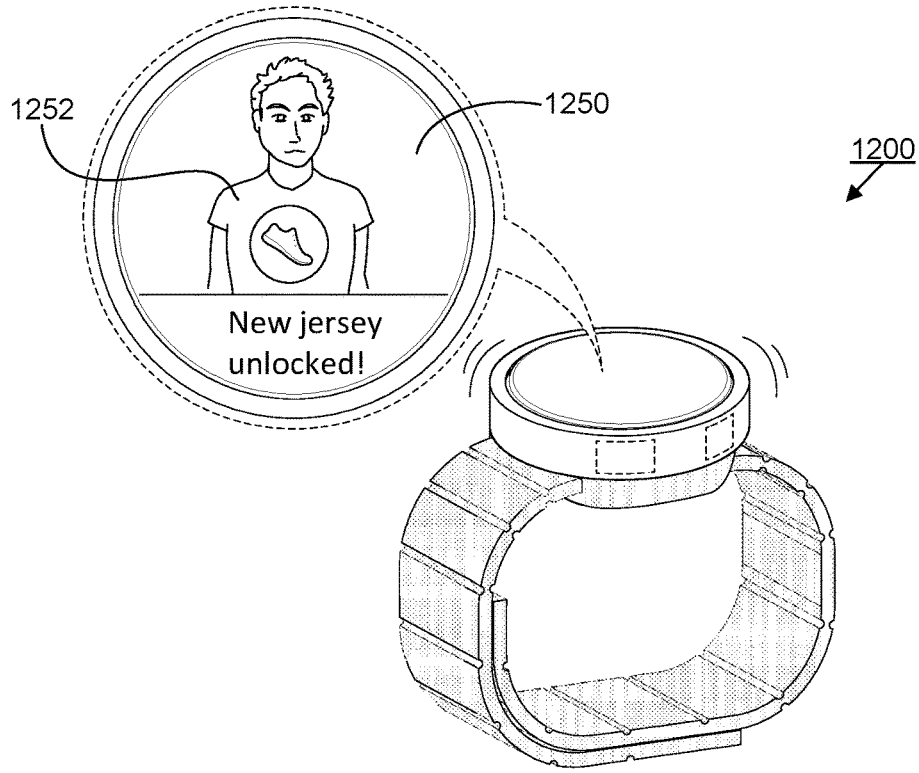

FIG. 12E illustrates the holding structure 1204 of the wearable electronic device 1200 coupled with the display capsule 900. A notification user interface element 1250 is being displayed at the display 902 of the capsule device 900 (stating: "New jersey unlocked!"). The notification user interface element 1250 includes a virtual avatar 1252 of the user 101. In some embodiments, the virtual avatar 1252 of the user 101 can be displayed in conjunction with one or more accessory content items based on the device identifier of the respective holding structure that the display capsule 900 is coupled with.

Figure 12F:
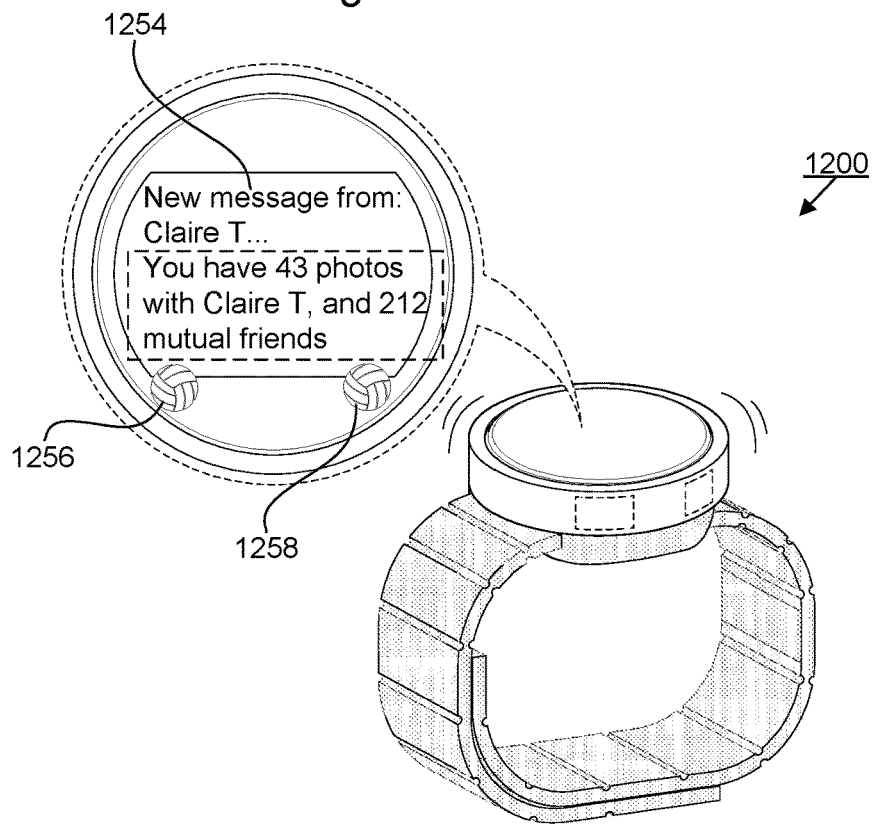

FIG. 12F illustrates the holding structure 1204 of the wearable electronic device 1200 coupled with the display capsule 900. A notification user interface element 1254 is displayed at the display 902 of the display capsule 900 (stating: "New message from: Claire T . . . . You have 43 photos with Claire T, and 212 mutual friends"). There are ornamental user interface elements 1256 and 1258 (e.g., volleyball icons) displayed along with the notification about the new message. A haptic event is occurring at the display capsule 900 in conjunction with the notification user interface element 1254 being displayed at the display 902 of the display capsule 900.

FIGS. 13A-13D illustrate an example sequence that includes placing and removing the display capsule 900 into a plurality of different holding structures of accessory devices that are not configured to be wearable devices, in accordance with some embodiments.

Figure 13A:
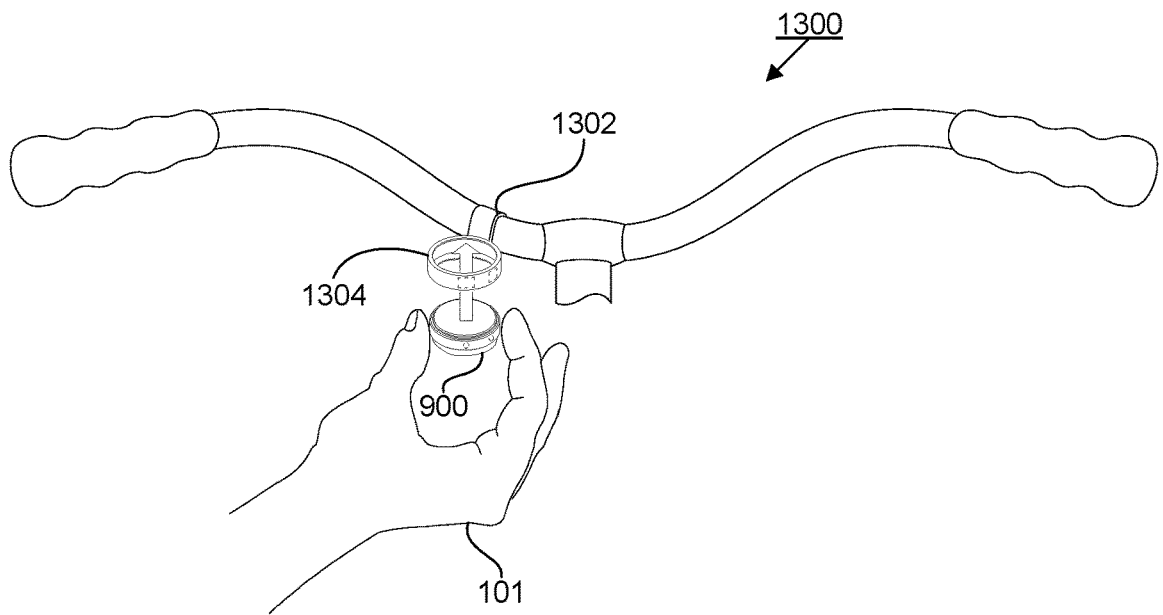
FIGS. 13A-13D illustrate an example sequence that includes placing and removing a display capsule into a plurality of different holding structures of accessory devices, in accordance with some embodiments.

FIG. 13A illustrates the user 101 placing the display capsule 900 into a holding structure 1304 mounted to the handlebars of a physical bicycle 1300. In some embodiments, the holding structure 1304 can optionally be coupled with a wearable electronic device (e.g., the wearable electronic device 1000, the wearable electronic device 1100, the wearable electronic device 1200, etc.) after being de-mounted from the handlebars of the physical bike. In other words, the holding structure 1304 can be coupled with band portions to form a unitary structure that can be worn around the wrist of a user. In some embodiments, power can be reduced to one or more of the peripheral sensors on the lower surface 917 of the display capsule 900, which can be to account for the fact that the peripheral sensors of the display capsule 900 are no longer protruding into the skin of the user 101. In some embodiments, the physical bicycle can have activatable display customizations, which can be activated by the user 101 placing the display capsule 900 into the holding structure 1304 mounted to the handlebars of the physical bicycle by the necklace mount 1302. In some embodiments, the necklace mount 1302 can include a device identifier that can adjust characteristics of the user experience at a computing system that includes or is otherwise associated with the display capsule 900.

Figure 13B:
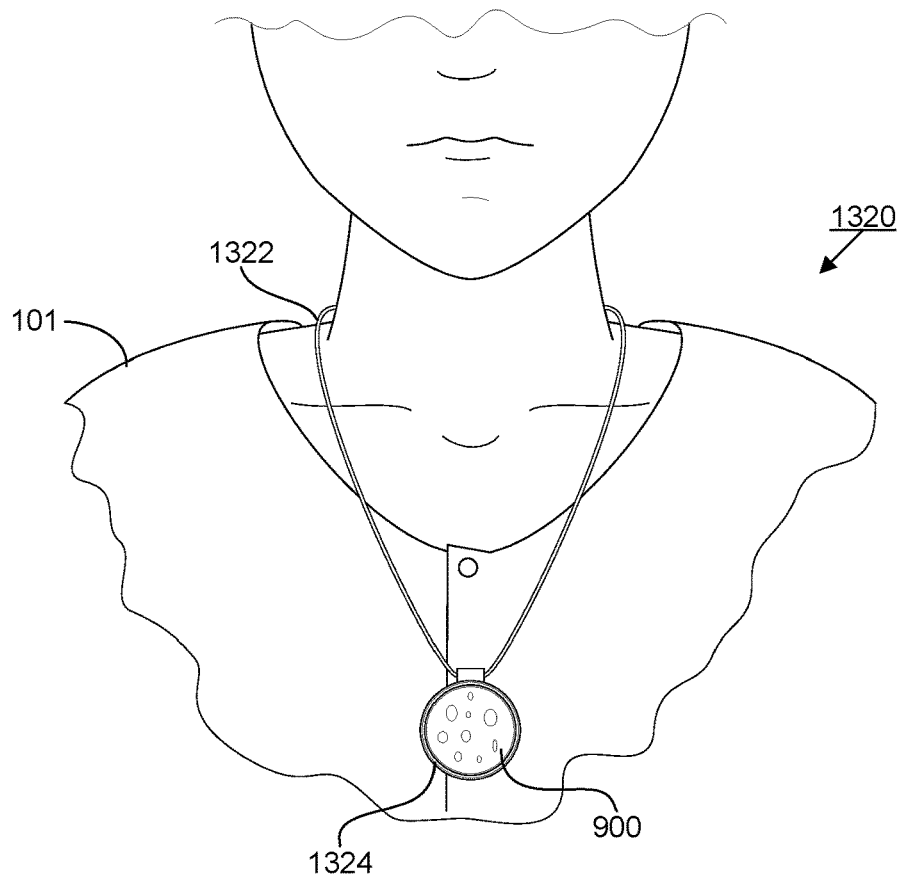

FIG. 13B illustrates the user 101 wearing a necklace structure 1322 that includes another holding structure 1324, and the display capsule 900 is coupled with the holding structure 1324. In some embodiments, the holding structure 1324 can be the same as the holding structure 1304, and the display characteristics can be further customized based on the necklace mount 1302 that the holding structure is mounted to (e.g., the bike mount in FIG. 13A, the pendant in FIG. 13B). In some embodiments, certain device identifiers of certain components of computing systems that include the capsule device 900 (e.g., a computing system 1320 displayed in FIG. 13B) can take priority over device identifiers of other components. In some embodiments, a notification user interface element can be displayed at the display capsule 900 when two device identifiers have different characteristics, and the user can select which device identifiers to prioritize for one or more the individual characteristics, or all of the characteristics. In some embodiments, the display 902 of the display capsule 900 can display abstract shaped and/or other ornate elements, instead of or in addition to user interface elements.

Figure 13C:
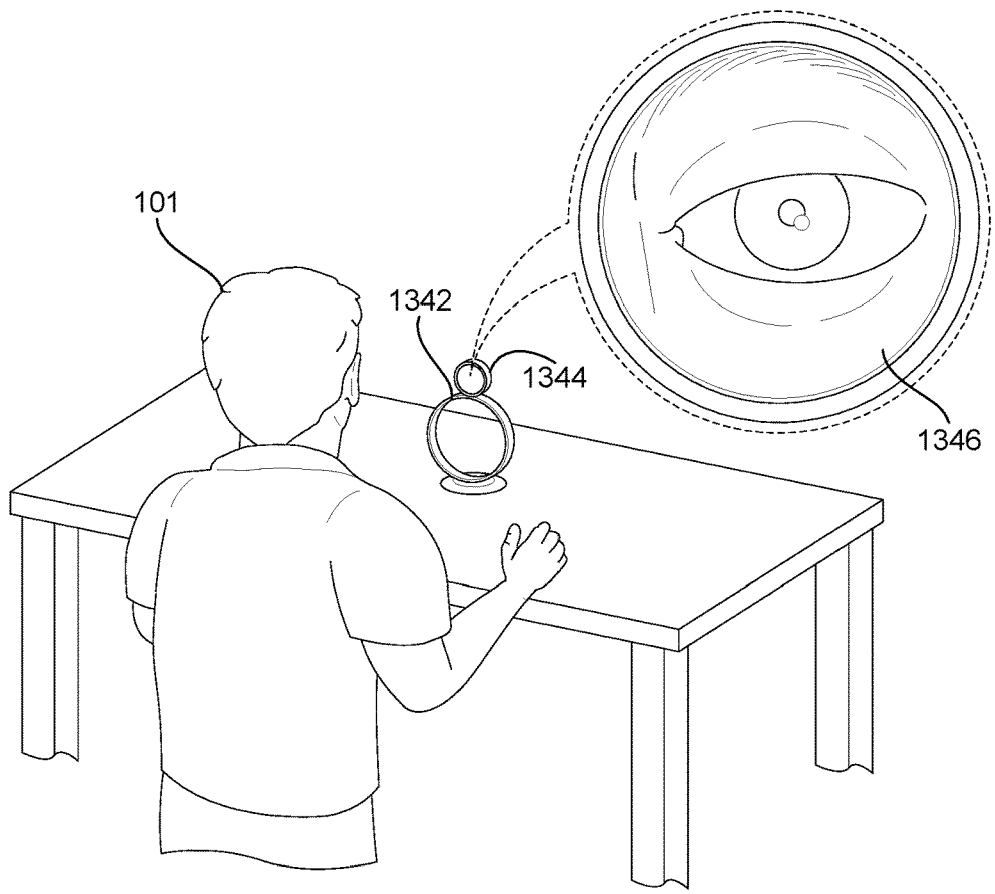

FIG. 13C illustrates the display capsule 900 coupled with a holding structure 1344 that is attached to a desk-mounted loop structure 1342. While the display capsule 900 is coupled with the holding structure 1344 of the desk-mounted loop structure 1342, the display 902 of the display capsule 900 is displaying mirror user interface element 1346. In some embodiments, the mirror user interface element 1346 is the home screen of the display capsule 900 based on the device identifier of either or both of the desk-mounted loop structure 1342 and/or the holding structure 1344.

Figure 13D:
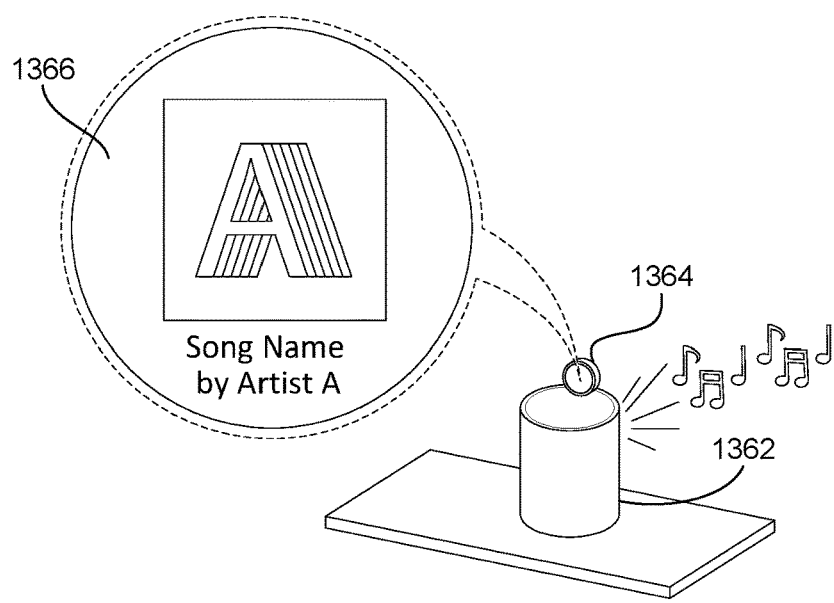

FIG. 13D illustrates the display capsule 900 coupled with a holding structure 1364 that is attached to a home speaker device 1362. While the display capsule 900 is coupled with the holding structure 1364 of the home speaker device 1362, the display capsule can be configured to display exclusive user interfaces of one or more music streaming applications. In some embodiments, the user interfaces displayed by the display capsule 900 when it is coupled with the home speaker device 1362 can only be displayed when the display capsule is coupled with either the holding structure 1364 or the home speaker device 1362.

FIG. 14A-14B illustrate a flow diagram of a method 1400 for using a display capsule that is configured to be coupled with a holding structure.

Turning now to FIG. 14A, the method includes causing (1402) a display capsule, uncoupled from any holding structure, to display a user interface at a touch-sensitive display, where the user interface has a first set of display characteristics. In some embodiments, the first set of display characteristics include a clock user interface element of a user interface displayed at a display of the wrist-wearable device.

The display capsule includes (1404) a touch-sensitive display and a housing integrally formed with the touch-sensitive display.

In some embodiments, the housing defines (1406) a first outer perimeter that extends beyond a second outer perimeter of the touch-sensitive display.

In some embodiments, a display-coupling edge is (1408) defined by the portion of the housing between the first outer perimeter of the housing, and a housing-coupling edge being generally orthogonal to the display-coupling edge.

In some embodiments, the display capsule includes (1410) at least one Hall effect sensor configured to cause an operation to be performed based on a magnetic change detected by the Hall effect sensor.

The method 1400 further includes placing (1412) the display capsule in a holding structure that has a device identifier.

(e.g., a Hall effect sensor) disposed within the display capsule is configured to sense a change in an electrical signal associated with the magnetic field generated by the one or more embedded magnets. In some embodiments, the holding structure includes a second group of one or more embedded magnets, the second group of one or more embedded magnets configured to generate a second magnetic field at a second discrete location of the holding structure.

In some embodiments, the holding structure includes a means for charging the display capsule. In some embodiments, the holding structure includes a means for providing wireless charging signals to the display capsule. In some embodiments, the display capsule includes pogo pins configured to receive a charge from a charging device, and the holding structure includes a charging device configured to couple with the pogo pins of the display capsule while the display capsule is coupled with the holding structure.

display-coupling edge and the housing are configured (1414) to be surrounded by a holding structure, where the holding structure is configured to fixedly hold the display capsule in place.

In some embodiments, the device identifier includes (1416) an RFID tag. In some embodiments, one or more other techniques described herein (e.g., UWB, NFC, Hall effect sensing) can be used in addition and/or instead of RFID.

In some embodiments, the holding structure defines (1418) an opening, and the opening includes a lip that extends towards a lateral center of the opening. In some embodiments, the lower surface of the lip has a first angular profile distinct from a planar surface of the touch-sensitive display (e.g., sloped outward, such that an outer edge of the lower surface extends below an inner edge of the lower surface). In some embodiments, an upper surface of the display-coupling edge of the display capsule has a second angular profile distinct from the planar surface of the touch-sensitive display. In some embodiments, the second angular profile corresponds to the first angular profile, such that the retaining first and second angular profiles can be fit together to form so that the respective surfaces are in contact along the outer surface.

In some embodiments, the display capsule is (1420) configured to be removably coupled with the holding structure such that the display capsule is pushed through the opening such that the display-coupling edge is fixedly held by the lip of the holding structure when the display-coupling edge and the housing-coupling edge are surrounded by the holding structure. In other words, the first outer perimeter of the housing is sized to fit through the second end of the opening and can be pushed towards the first end until the coupling edge of the housing contacts the retaining edge of the holding structure.

In some embodiments, the opening of the holding structure has an interior surface that includes a formed silicone material (e.g., flexible silicone that is capable of deforming outward to accommodate the exterior surface of the display capsule). While the display-coupling edge and the housing-coupling edge are surrounded by the holding structure such that the display-coupling edge is retained by the lip of the holding structure, the formed silicone material is configured to apply a retaining force to an exterior surface of the display capsule. In other words, for example, the opening of the holding structure can be sized to have a slightly smaller circumferential cross-section than a cross-section of the exterior surface of the coupling edge, such that the formed silicone material flexes outward to receive the display capsule, and therefore applies force to the exterior surface of the coupling edge based on the resulting flexure. In some embodiments, a lower portion of the holding structure is comprised of a flexible formed silicone material, and the lip includes a non-flexible hard plastic.

In some embodiments, the holding structure includes (1422) a peripheral button structure that is configured to align with the Hall effect sensor locations of the display capsule. In some embodiments, the holding structure includes more than one peripheral button structures. The peripheral button structures can include mechanical button components (e.g., a button cap, a stem, and/or a depressible coil spring). In some embodiments, respective mechanical buttons of respective holding structures that are associated with discrete field locations (e.g., have the same relative locations of their respective structures, such that they are aligned when the display capsules are housed or otherwise coupled with the holding structure). In other words, while the holding structure is surrounding the housing, a mechanical button of the holding structure is configured to cover a discrete field location (or, for example, a separate mechanical button) of the housing of the display capsule. In some embodiments, a notification user interface element is provided at a user interface displayed by the display capsule, or another device in electronic communication with the wrist-wearable device (e.g., a head-wearable device), based on the first mechanical button and the second mechanical button having sufficient positional alignment (e.g., "The button on your watch band is now in communication with your capsule device!").

In some embodiments, the holding structure includes a hard plastic casing that surrounds the depressible element of the holding structure. In other words, the hard plastic casing can have a gap wherein there is only a soft material (e.g., a formed silicone material) that corresponds to the peripheral affordance, such that the user can press the peripheral affordance towards the discrete field location of the magnetic field generated by the embedded magnets of the display capsule.

As mentioned briefly above, in some embodiments, respective mechanical components of the display capsule and the holding structure can be used to activate operations at the display capsule, in addition to or as an alternative to the Hall effect sensors. For example, a mechanical button located on the housing of the display capsule can be configured to be in positional alignment with mechanical button of the holding structure, and the mechanical button of the housing can be activated by a user gesture directed to the mechanical button of the holding structure.

In some embodiments, the embedded magnets of the display capsule have distinct physical characteristics. In some embodiments, a peripheral component of a respective holding structure includes a pivotable dial in addition to or in alternative to a mechanical button functionality. In some embodiments, respective holding structures have different actuators for providing haptic events in response to events (e.g., received message notifications). In some embodiments, respective holding structures have different mechanical components (e.g., speakers, sensors, etc.).

In some embodiments, the peripheral button structure includes a depressible element at a discrete field location of the magnetic field generated by the one or more embedded magnets while the display capsule is housed within the holding structure. In some embodiments, in response to the change in the electrical signal associated with the magnetic field generated by the one or more embedded magnets, causing an operation to be performed at a user interface displayed via the touch-sensitive display of the display capsule, wherein the change is caused by an interaction with the depressible element.

In some embodiments, a unitary structure is formed (1424) by the combination of the holding structure and a band portion configured to be worn around a wrist of the user. In some embodiments, while the band portion is being worn around the wrist of the user, the holding structure is disposed at a discrete location along a circumference of the wrist of the user. In other words, the holding structure is not a discrete component separate and/or separable from the band portion but is instead integrated with the band portion as one unitary structure.

In some embodiments, the holding structure is (1426) attached to an accessory device that is not configured to be worn by a user.

The method 1400 further includes upon coupling (1428) the display capsule with the holding structure, the holding structure is configured to customize at least one display characteristic of the display capsule based on the device identifier. For example, in some embodiments, a first holding structure includes an identifier that, when detected by the display capsule, causes the display capsule to display a user interface having a first set of display characteristics (e.g., default characteristics). In some embodiments, when the capsule device is placed within a different holding structure having a different identifier, the capsule device is caused to display a different user interface having a second set of display characteristics (e.g., customized display characteristics).

In some embodiments, the default set of display characteristics include a home user interface that includes a digital clock display and a color-based style that corresponds to a default display color associated with an operating system that is causing operations to be performed at the display capsule. And another set of display characteristics (e.g., customized display characteristics) cause include a home user interface that includes a watch-face style dial clock. In some embodiments, the customization further causes an adjustment to input functionality corresponding to the button inputs of the peripheral embedded magnets. In some embodiments, a non-display setting associated with the button inputs of the peripheral embedded magnets is adjusted based on the adjustment to the default characteristics. In some embodiments, the button inputs of the display capsule can be used to respond to notifications, and the adjusting causes the inputs to perform different operations when the gestures are detected in response to received notifications.

In some embodiments, the at least one display characteristic includes (1430) display properties of a clock user interface element of a user interface of the display capsule. For example, a clock user interface element caused to be displayed by the display capsule when the display capsule is placed in a first holding structure can be a standard digital clock user interface element, with display aspects that correspond to system settings of the holding structure or its corresponding device (e.g., a wrist-wearable device).

In some embodiments, the holding structure is (1432) configured to customize at least one non-display characteristic of the display capsule based on the device identifier. Non-display characteristics can include functionality related to the user interface of the display capsule and or mechanical components of the display capsule. For example, in some embodiments, power is reduced to one or more sensors of the display capsule based on the device identifier of the holding structure. For example, the holding structure may be associated with an electronic fitness machine, such that one or more sensors of the display capsule will not be in contact with a user's skin or otherwise able to detect aspects of the user and are thereby turned off while the display capsule is coupled with the holding structure, so that excess power (e.g., battery power) is not consumed by the display capsule.

In some embodiments, the at least one non-display characteristic includes (1434) a notification delivery preference of the user. For example, a device identifier of one respective holding structure can cause the display capsule to display notifications to the user related to their health and/or the performance of a physical activity. And another device identifier of a different holding structure can cause the display capsule to display notifications to the user related to their work schedule (e.g., a notification user interface element stating: "Matt just scheduled a meeting with you that starts fifteen minutes from now, titled "discuss patent application"). In some embodiments, when the display capsule becomes coupled with the holding structure, a notification user interface element can be displayed at the touch-sensitive display of the display capsule, requesting whether the user would like to change the display capsule's default notification settings based on the device identifier of the holding structure.

In some embodiments, the non-display characteristic is (1436) customized based on the display capsule not being surrounded by another holding structure with a different device identifier.

In some embodiments, the method 1400 further includes after (1438) the holding structure has customized at least one display characteristic or non-display characteristic of the display capsule, cause an operation to be performed at the holding structure, based in part on the device identifier of the holding structure.

In some embodiments, the non-display characteristic is (1440) based on usage data associated with the device identifier of the holding structure. For example, the usage data can indicate that while a user is wearing a holding structure having a particular device identifier, the user is more likely to perform a physical activity (e.g., a hike). In some embodiments, the display capsule can be caused to open an application based on the usage data associated with the device identifier. For example, if the usage data indicates that the user is more likely to do a cardio workout (e.g., a stair stepper workout) then the display capsule can be caused to display a workout-related user interface.

In some embodiments, while (1442) the display-coupling edge and the housing-coupling edge are surrounded by the holding structure, a lower retaining portion of the holding structure is configured (e.g., sized, formed, etc.) to surround a bottom edge of the housing of the display capsule that extends below the coupling edge. In other words, a flexible formed silicone material, similar to that comprising the interior surface of the holding structure, can extend toward the lateral center of the opening of the holding structure, such that after the display capsule is pushed through the second end of the opening up to where the coupling edge contacts the retaining edge, the flexible formed silicone material extends inward towards the center of the opening such that it retains a portion of the bottom edge of the display capsule.

In some embodiments, a bottom surface of the bottom edge of the housing includes (1444) one or more peripheral sensors configured to contact a user, and the lower retaining portion of the holding structure defines a sensor gap, such that while the lower retaining portion is surrounding the bottom edge of the housing, the one or more peripheral sensors on the bottom surface of the housing are exposed via the sensor gap, and not covered by the lower retaining portion.

In some embodiments, the lower retaining portion of the holding structure defines (1446) a sensor gap, such that while the lower retaining portion is surrounding the bottom edge of the housing, at least one of the peripheral sensors on the bottom surface of the housing are exposed to a user's body via the sensor gap.

Further embodiments also include various subsets of the above embodiments including embodiments described with reference to FIGS. 1A-5 combined or otherwise re-arranged.

Figure 15A:
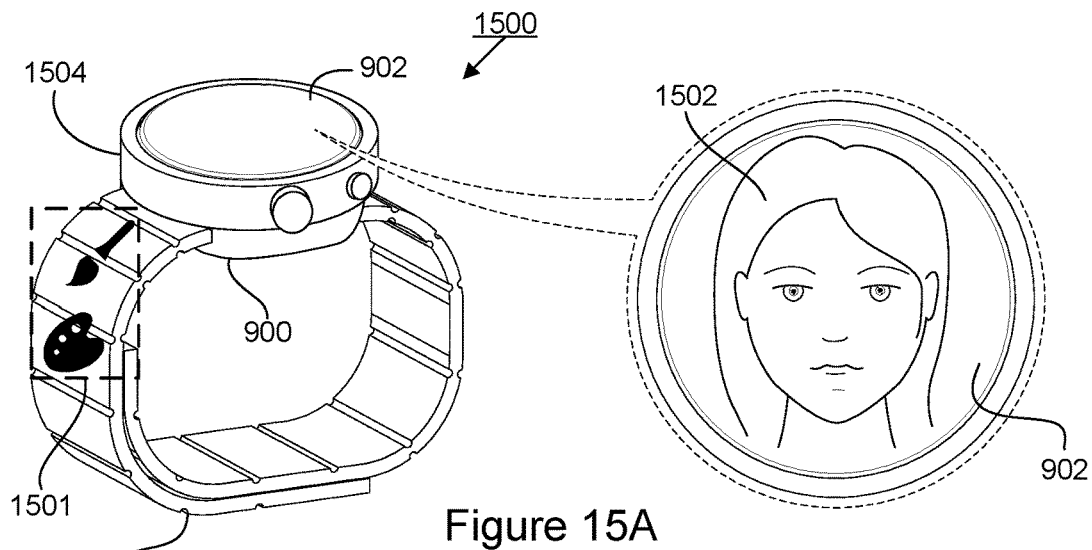
FIGS. 15A-15C illustrate an example sequence in which a background user interface (e.g., which can be display on a lock-screen user interface and/or home screen user interface) is adjusted to visually alert a user to an indication associated with a received electronic message.
Figure 15B:
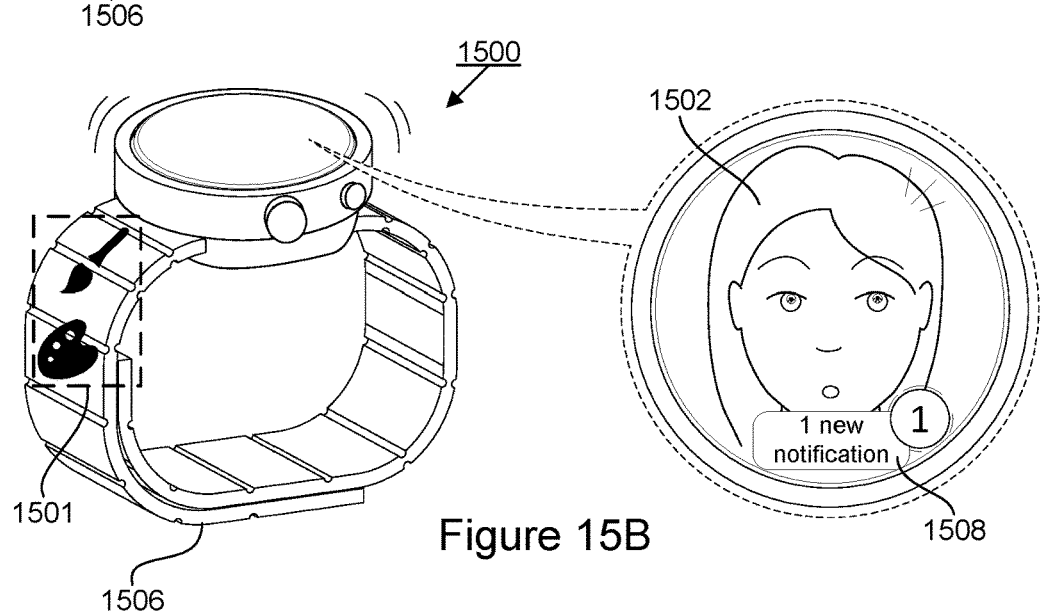
Figure 15C:
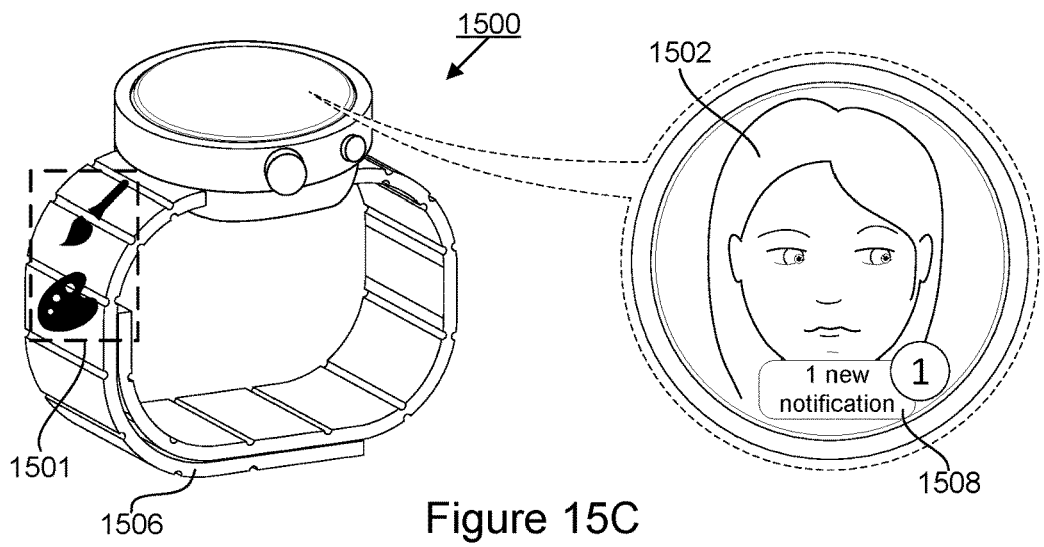

FIGS. 15A-15C illustrate an example sequence at a user interface of the display capsule 900 that is coupled with a holding structure 1504 of a wearable electronic device 1500 that includes a band portion 1506.

FIG. 15A shows the display capsule 900 coupled with a holding structure 1504 of a wearable electronic device 1500 that includes a band portion 1506. The band portion 1506 includes aesthetic features 1501, which can be an indication of a type of device identifier of the band portion 1506 and/or the holding structure 1504. In some embodiments, users can customize the aesthetic features of the band portion 1506 and/or the holding structure 1504 from within a web page hosted by a remote server. In some embodiments, users can also customize aspects of the respective device identifiers of the customizable components.

In some embodiments, images that the user 101 takes can modified by an artistic filter, which can be applied based on the device identifier of the respective holding structure that the display capsule 900 is attached to. In some embodiments, such artistic filters can also be applied to a face and/or other body part of an avatar associated with the user. In some embodiments, the artistic filter applied to the image(s) and/or avatar(s) associated with the user 101 can be based on the device identifier of the holding structure or other component that the display capsule 900 is coupled with at that time.

An artistic rendering 1502 of a user's avatar is displayed at the display 902 of the display capsule 900. In some embodiments, the artistic rendering 1502 is displayed at a home-screen user interface of the display capsule 900. In some embodiments a home screen or other displayed element of another electronic device associated with the user (e.g., a phone background) is also updated to have a theme related to the new band on watch (e.g., once new band is attached to watch, the user is also provided with an option to apply the new theme on other smart devices, including laptop, smartphone, tablet, etc.). In some embodiments, the updated theme can be automatically pushed to one or more of the user's other devices based on the user 101 coupling the display capsule with a holding structure or other connected electronic device that is associated with the background theme (e.g., via the device identifier). In some embodiments, a device identifier of one or more of the holding structure 1504 and the band portion 1506 indicates a style of artistic rendering, and/or a specific artist's style, and the artistic rendering 1502 is adjusted based on the style of artistic rendering and/or the specific artist's style. In some embodiments, the holding structure 1504 and the band portion 1506 each include different device identifiers that indicate different styles of artistic rendering and/or specific artists' styles, and the artistic rendering 1502 is a combination of the styles.

FIG. 15B shows a haptic event occurring at the display capsule 900 based on the display capsule receiving a notification (the lines extending from the corners of the holding structure 1504 indicate that the display capsule 900 is vibrating). which is also indicated by the notification user interface element 1508 that is displayed on the display 902 of the display capsule 900. The artistic rendering 1502 is reacting to the receipt of the notification (e.g., making a surprised face).

FIG. 15C shows the artistic rendering 1502 directing a focus towards the notification user interface element 1508 (the pupils of the artistic rendering 1502 are pointed in a direction toward the notification user interface element 1508). In some embodiments, the artistic rendering 1502 and/or other user interface elements can cause non-visual aspects of the user interface to be directed to a received notification. For example, an audial or haptic event can be emitted in a direction of the user interface element representing the notification.

In some embodiments, the visual characteristics of a lock screen image and/or background image of the display capsule 900 can adjust based on other events besides received notifications. For example, environmental context of the display capsule 900 can cause the background image to adjust. As a specific example, the artistic rendering 1502 can be caused to squint based on the user being in a sunny or otherwise bright environment. The artistic rendering 1502 can appear sleepy or otherwise weary in response to an alarm (e.g., a wake-up alarm) that is activated at the display capsule 900.

A method for performing the operations described in FIGS. 15A to 15C will now be described in detail. A display of an electronic device can be configured to adjust a background image on a lock-screen user interface to identify an electronic notification. The method includes displaying, on a lock-screen user interface of an electronic device, a background image having a default value for a visual characteristic. And the method includes, in response to receiving an electronic notification: (i) updating the lock-screen user interface to include an indication that the electronic notification was received, and (ii) modifying presentation of the background image displayed on the lock-screen user interface such that a notification-alert value for the visual characteristic is utilized instead of the default value for the visual characteristic. The notification-alert value for the visual characteristic causes the background image to visually direct a user of the electronic device to the indication that the electronic notification was received.

In some embodiments, the electronic device is a wrist-wearable device that includes a holding structure with a device identifier and at least one band portion.

In some embodiments, the background image is a representation of an avatar associated with a user, and the default value of the visual characteristic of the avatar associated with the user corresponds to eyes of the avatar facing in a forward-looking direction.

In some embodiments, the notification-alert value for the visual characteristic corresponds to eyes of the avatar facing towards a location on the lock-screen user interface at which the indication is displayed.

Figure 16A:
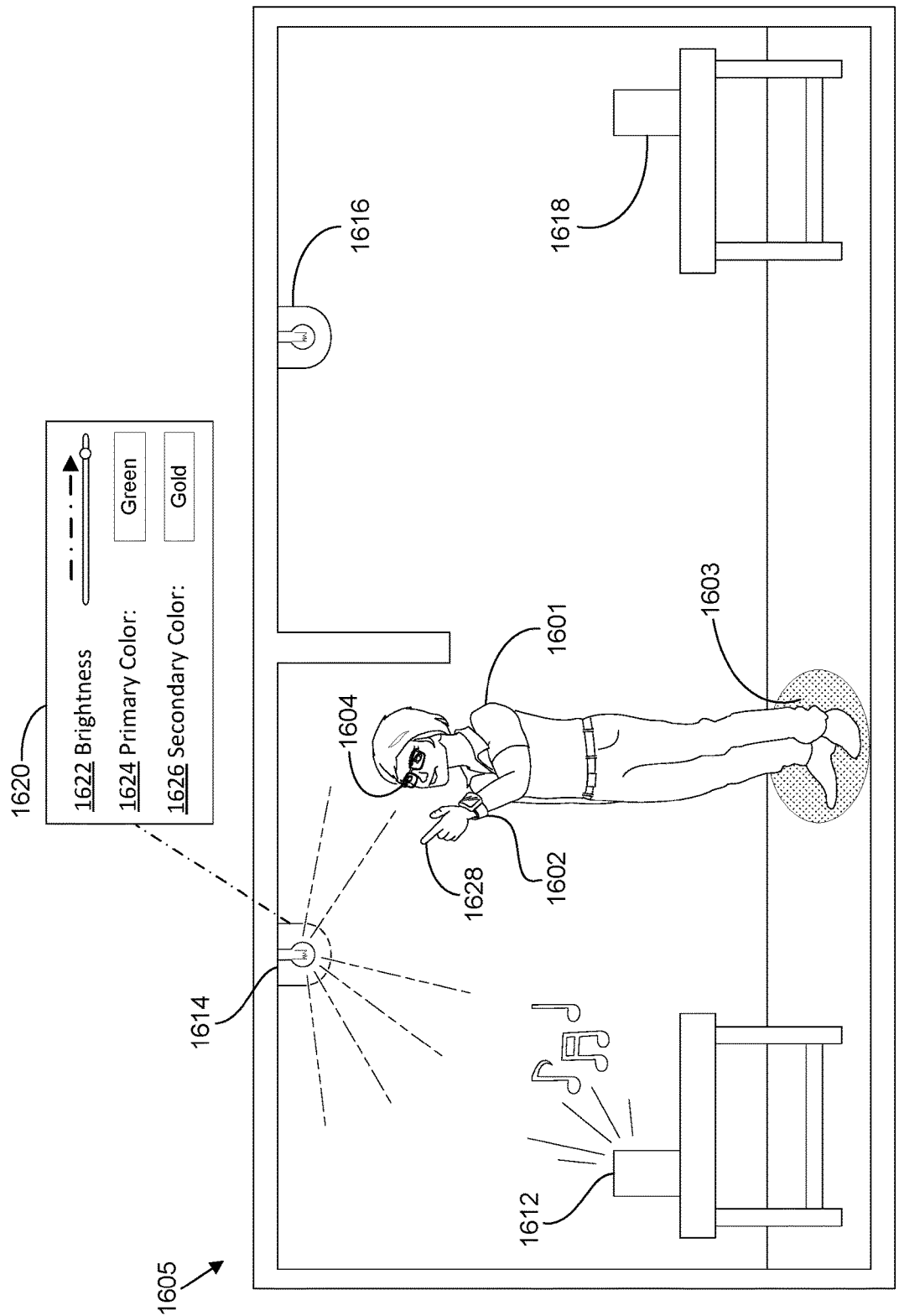
FIGS. 16A-16B illustrate an example sequence in which a user performs gestures that cause operations to be performed at respective electronic devices of a set of electronic devices.
Figure 16B:
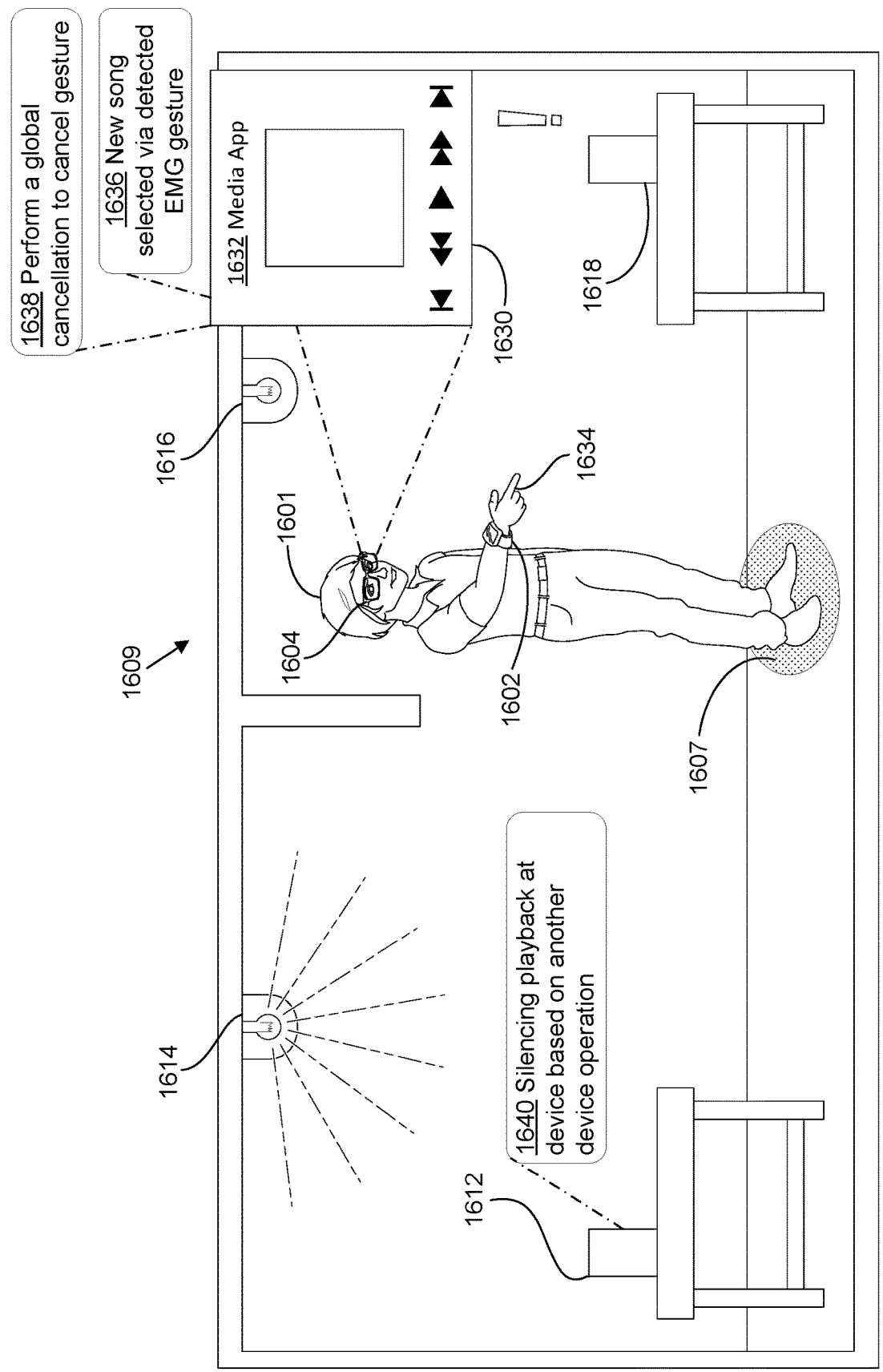

FIGS. 16A-16B illustrate an example sequence where a user 1601 is performing gestures that cause operations to be performed at respective electronic devices of particular sets of electronic devices. The user 1601 is wearing a wrist-wearable device 1602 that includes at least one EMG sensor. The wrist-wearable device 1602 can further include some or all of the components of any of the wrist-wearable devices described herein (e.g., the IMU 1041 show in FIG. 7). The wrist-wearable device 1602 can further include one or more constituent components, such as the display capsule 900 and the holding structure 1008, as described in FIGS. 10A-10H.

The user 1601 is further wearing a head-wearable device 1604. The head-wearable device 1604 can be configured to (i) detect a gaze direction and/or a pupil direction of the user to determine which electronic device of a set of electronic device that a gesture is directed to, and/or (ii) present a user interface (e.g., at a display of the head-wearable device 1604 that is configured to display an artificial-reality environment).

In FIG. 16A, the user 1601 is shown standing in a first room 1605, where the room that the user 1601 is in includes a plurality of electronic devices (e.g., electronic speaker devices 1612 and 1618, and adjustable electronic lights 1614 and 1616), which together can form a set of access-control devices, in accordance with some embodiments. Specifically, the user 1601 standing in a first location 1603 within the room 1605 and is turned in a direction that is substantially facing the electronic speaker device 1612 and the adjustable electronic light 1614.

In some embodiments, one or more of the plurality of electronic devices are added to a set of electronic devices that is capable of being interacted with by the user based on the user's relative proximity to a respective electronic device. In some embodiments, a threshold proximity can be preconfigured for each respective electronic device, separately. For example, a first proximity threshold can be associated with the electronic speaker device 1612, and a second proximity threshold can be associated with the adjustable electronic light 1614. In some embodiments, the threshold proximity can be based on a physical aspect of a space that the user is in when they are performing a respective gesture that targets the respective electronic device.

In FIG. 16A, the user is performing a gesture 1628 (e.g., an in-air gesture) that is directed towards the adjustable electronic light 1614. In some embodiments, a gesture can be determined to be directed to a particular electronic device despite the gesture not being made physically in the direction of the respective electronic device. For example, a gesture can have a particular gesture profile, and the particular gesture profile can be associated with a particular device of the set of electronic devices. Based on the user performing the gesture 1628, a brightness value 1622 of the adjustable electronic light 1614 increases. In some embodiments, the adjustment of a particular value associated with a respective electronic device (e.g., the adjustable electronic light 1614) can depend on a value detected by an EMG sensor of the wrist-wearable device 1602.

In FIG. 16B, the user 1601 is shown standing in a second location 1607 in another room 1609. Based on the user being in the second location 1607, another set of electronic devices, different than the first set, can have operations that are accessible to the user via in-air hand gestures detected by neuromuscular-signal sensors of the wrist-wearable device 1602. In some embodiments, the second set of electronic devices that are available to the user 1601 at the second location 1607 can be any of a plurality of electronic devices that are within a threshold proximity of the user 1601. In some embodiments, one or more additional proximity criteria can be used to determine which electronic devices of the second set of electronic devices are accessible to the user 1601 to cause operations to be performed based on gestures detected by an EMG sensor of the wrist-wearable device 1602. In some embodiments, the wrist-wearable device 1602 is associated with one or more device identifiers, which can correspond to: (i) a device identifier of a holding structure of the wrist-wearable device, (ii) a device identifier of a display capsule of the wrist-wearable device 1602, (iii) one or more device identifiers of one or more band portions of the wrist-wearable device 1602, etc. In some embodiments, two or more device identifiers of different constituent components of a wrist-wearable device can be combined to cause a combined customization of a display property.

As shown in FIG. 16B, the user's movement from the location 1603 to the other location 1607 can cause notifications to be provided from electronic devices of the set of electronic devices that were accessible to the user for causing operations to be performed based on gestures detected by neuromuscular-signal sensors of the wrist-wearable device 1602.

The head-wearable device 1604 is causing several user interface elements to be presented to the user in FIG. 16B. For example, the user interface element 1630 displays information about a media application 1632 that is configured to provide audio output via the electronic speaker device 1618. The head-wearable device 1604 is further presenting a notification user interface element 1638 and another user interface element 1636, which provide textual prompts for the user indicating information about gestures that are currently available to the user 1601. One or more of the electronic devices from the first set of electronic devices can also be accessible via user input gestures detectable by neuromuscular-signal sensors (e.g., EMG sensors) of the wrist-wearable device 1602.

FIGS. 17A-17E illustrate an example sequence that shows a user performing a multi-part gesture, where the multi-part gesture causes an operation to be performed at a protected resource electronic device (e.g., a kiosk 1704). The operations of the sequence can be performed at a computing system that includes at least the display capsule 900 and the holding structure 1004 described with respect to FIGS. 10A-10H. When the display capsule 900 is coupled with the holding structure 1004, they can together form a unitary wrist-wearable device (e.g., the wrist-wearable device 1702 in FIGS. 17A-17E). In some embodiments, the operations discussed with respect to FIGS. 17A-17E can be made available to the user as part of a third-party payment application (e.g., a payment application configured to secure payment transactions via one or more authentication techniques). In some embodiments, the operations discussed with respect to FIGS. 17A-17E are part of an access-control technique (e.g., a technique for ensuring secure access to a physical establishment).

In FIG. 17A, the user 1701 is wearing a wrist-wearable device 1702, and the user 1701 is standing next to a kiosk 1704. The kiosk 1704 is configured to provide user access to a protected resource (e.g., user credentials and/or restricted content). In some embodiments, the protected resource is a monetary resource.

There is a user interface element 1706 shown in FIG. 17A, which can be configured to be presented by the wrist-wearable device 1702 or a head-wearable device (e.g., the head-worn wearable device 110 described in FIG. 8). FIG. 17A also shows a hardware component 1708 for facilitating provisioning of the gesture space for providing access to the protected resource. The hardware component 1708 can be configured to enable additional sensing capabilities for detecting an aspect of the user 1701 and/or a gesture performed by the user to authenticate the user 1701 to access the protected resource, which may be associated with the kiosk 1704. There is a textual prompt 1712 located at the kiosk 1704 that is displaying a message to the user indicating that access to the protected resource is required ("Access to protected resource is required."). There is another textual prompt 1710 at the hardware component 1708, which is prompting the user to place the user's hand near the hardware component 1708. In some embodiments, in addition to and/or alternatively to the textual prompts 1710 and 1712, additional indications can be provided at the wrist-wearable device 1702 and/or another electronic device associated with the user 1701. For example, a haptic event can be provided at the wrist-wearable device 1702, which can be accompanied by a message or other visual notification to the user 1701 that an authentication gesture is required. In some embodiments, when the wrist-wearable device is in proximity to the kiosk 1704 and/or the hardware component 1708, power can be provided and/or reduced to one or more sensors, including EMG sensors, of the wrist-wearable device 1702 in conjunction with providing the capability to the user to perform the authentication gesture.

Figure 17B:
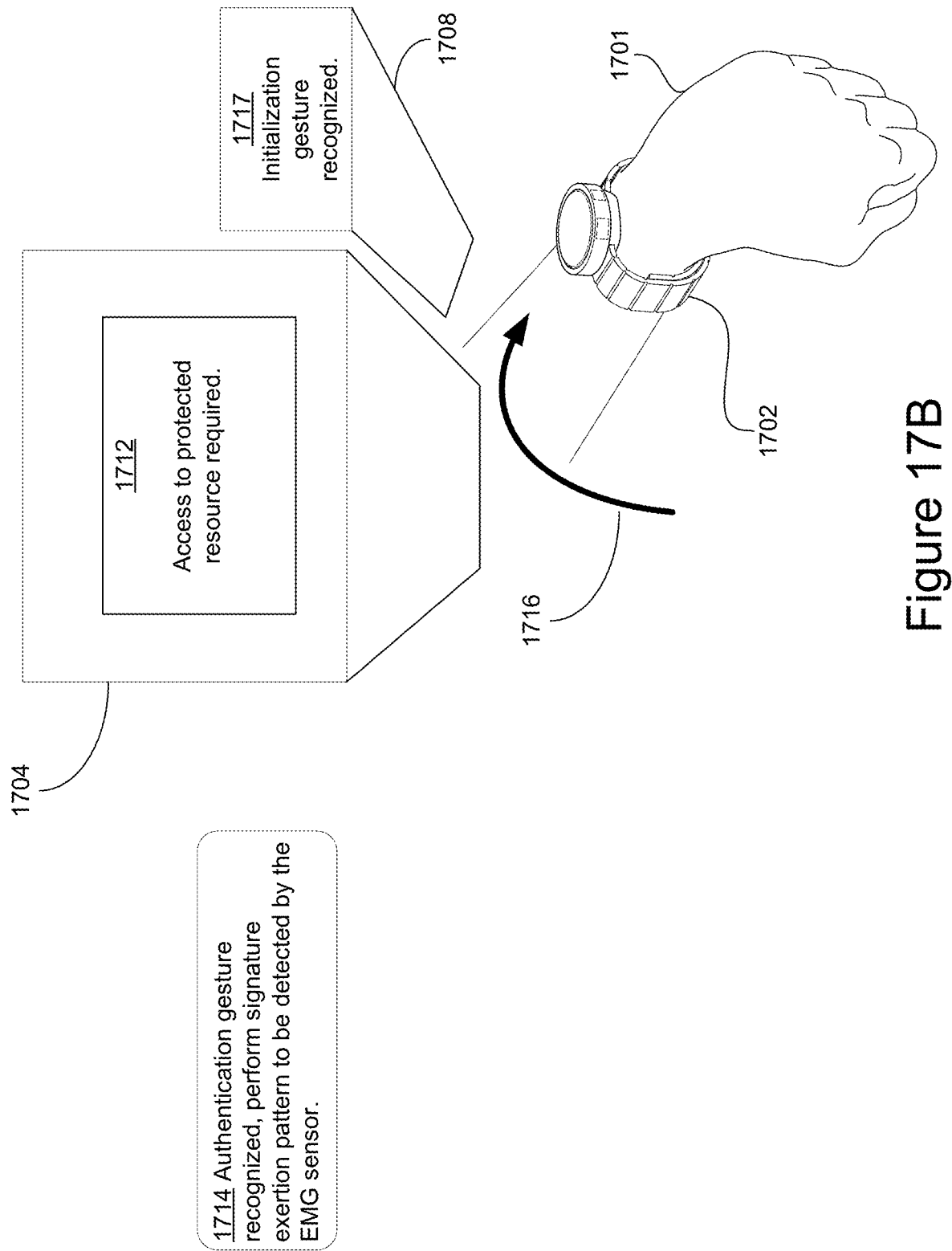

In FIG. 17B, the user 1701 is performing a rolling wrist gesture 1716 near the hardware component 1708. In some embodiments, the rolling wrist gesture 1716 is a context-agnostic gesture corresponding to a context-agnostic operation that can be used in conjunction with authentication techniques of one or more third-party applications. In some embodiments, one or more aspects of the rolling wrist gesture are part of an authentication technique for the kiosk. In some embodiments, the rolling wrist gesture 1716 must include a threshold level of exertion by one or more EMG sensors and/or EMG sensor channels of the wrist-wearable device 1702 in order to be received as an authentication gesture at the hardware component 1708 and/or the kiosk 1704. The hardware component 1708 is displaying a textual notification 1717 to the user indicating to the user 1701 that the initialization gesture was recognized.

Figure 17C:
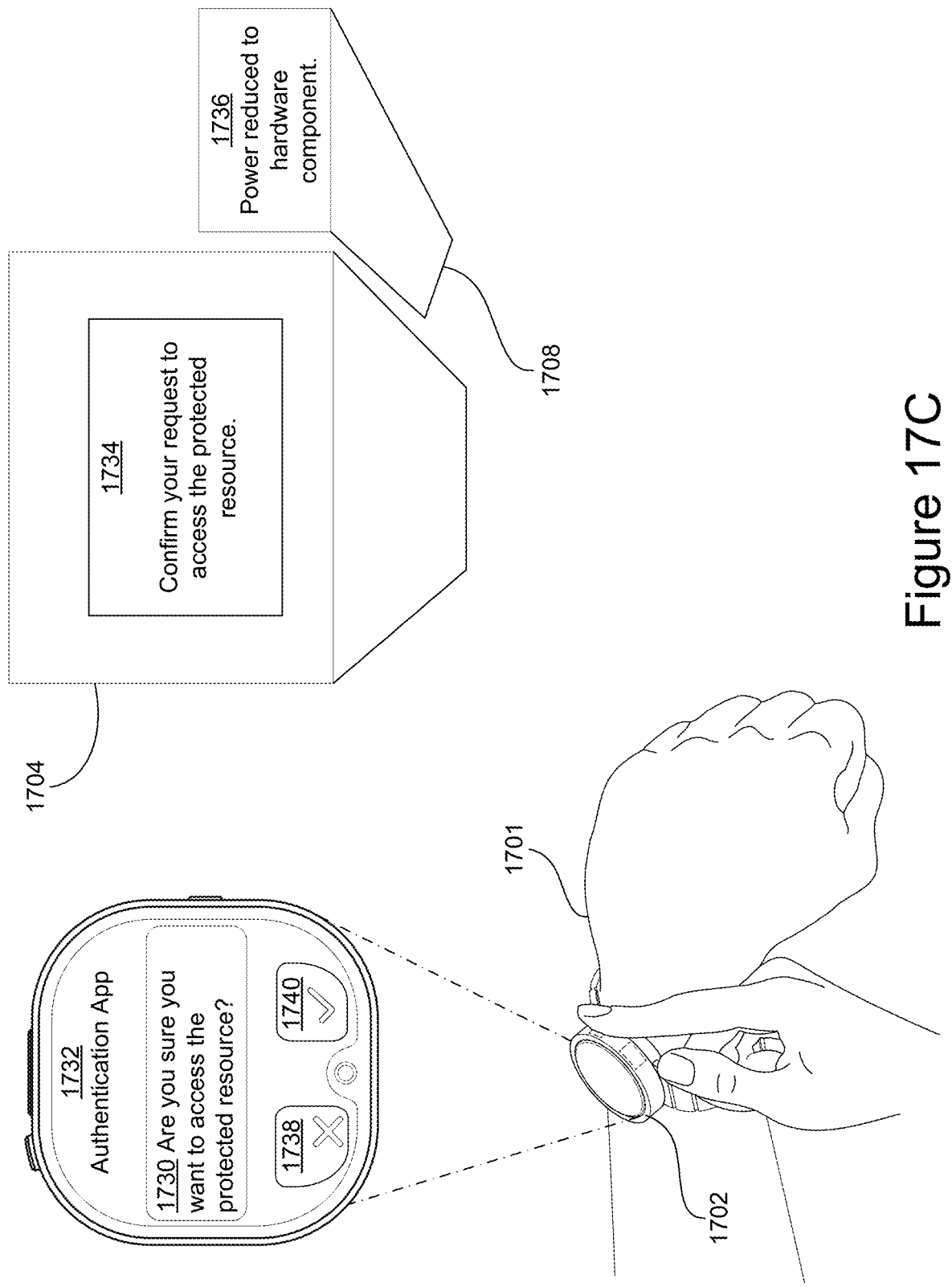

In FIG. 17C, the user is receiving a notification user interface element 1730 within an authentication application user interface 1732 at the display of the wrist-wearable device 1702, which is asking the user to confirm that the user 1701 is intending to authenticate themselves in order to access the protected resource at the kiosk 1704. There is a cancellation user interface element 1738, and confirmation user interface element 1740, that are configured to receive user inputs regarding intentions of the user 1701 to access the resource. In embodiments, one or more additional sensors are disposed, so as to be in electronic communication with a touch-sensitive surface of the display of the wrist-wearable device 1702, which can be configured to detect a biometric aspect of the user's identity (e.g., a fingerprint, and/or a current body temperature of the user) while the user provides an input to the selectable user interface elements 1738 and 1740. In some embodiments, software is made available, via electronic communication signals from the kiosk 1704 and/or the hardware component 1708, to the wrist-wearable device 1702, based on the user 1701 being in proximity to the means for accessing the protected resource(s). In some embodiments, additional textual prompts can be provided at the kiosk 1704, and/or the hardware component 1708. For example, the textual prompt 1734, stating: "Confirm your request to access the protected resource" and the other textual prompt 1736, stating: "Power reduced to hardware component." In some embodiments, power (e.g., from a battery) is reduced to one or more sensors of the wrist-wearable device 1702 and/or the hardware component 1708, after the user 1701 has performed the gesture 1716.

Figure 17D:
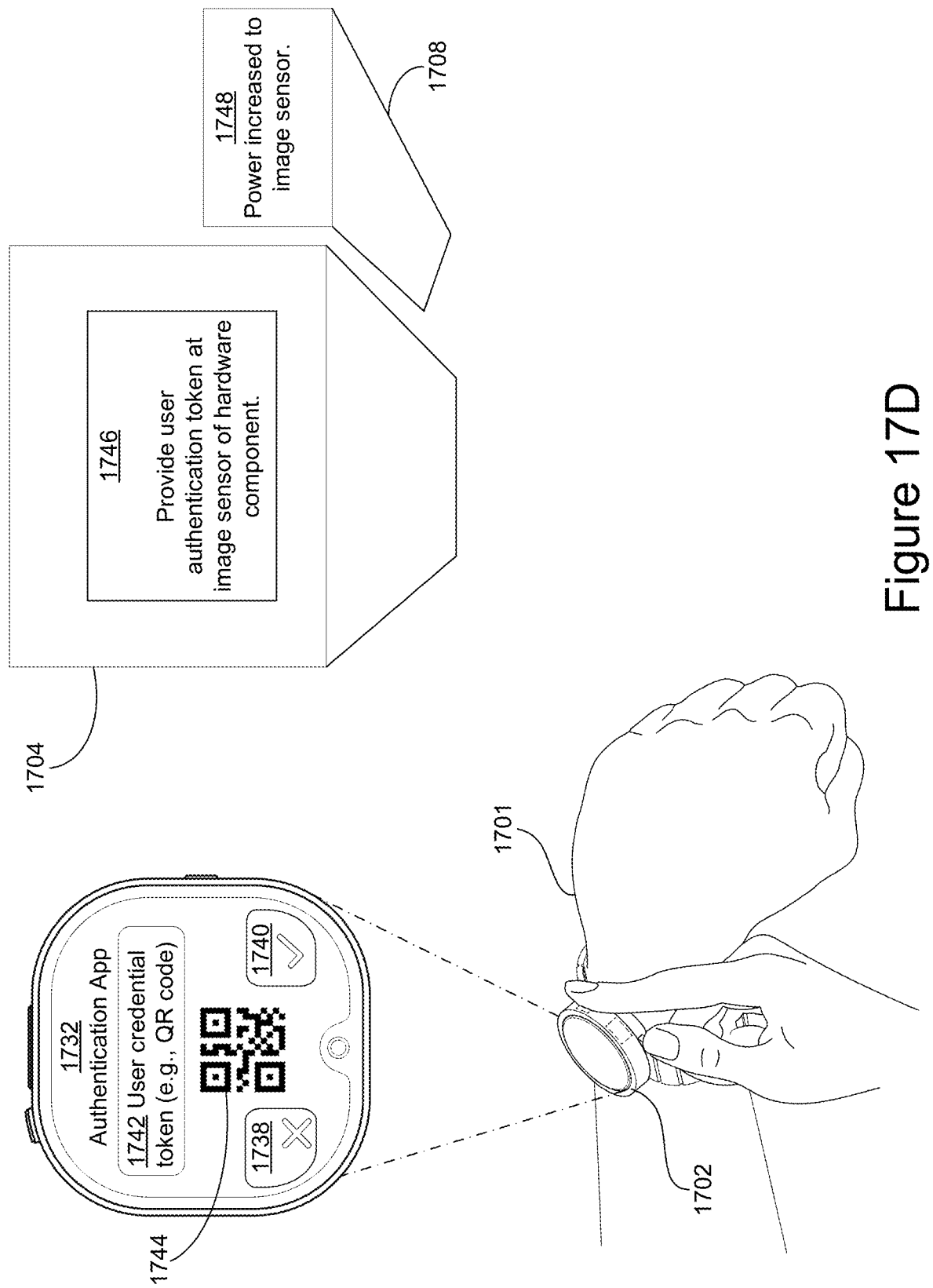

FIG. 17D shows the display of the wrist-wearable device 1702 displaying a notification element 1742 indicating that a user credential token is being displayed at the display of the wrist-wearable device 1702 (stating: "User credential token (e.g., QR code)"). Additional textual prompts can be displayed at the kiosk 1704 and/or the hardware component 1708, which can provide indications, and/or prompts to the user regarding the user's access to the protected resource. For example, a textual prompt 1746 states: "Provide user authentication token at image sensor of hardware component," and a textual prompt 1748 states: "Power increased to image sensor." In some embodiments, one or more sensors at the wrist-wearable device 1702, the kiosk 1704, and/or the hardware component 1708 can receive increased power for a second part of a multi-part gesture, and not a first part of the multi-part gesture, and vice versa.

Figure 17E:
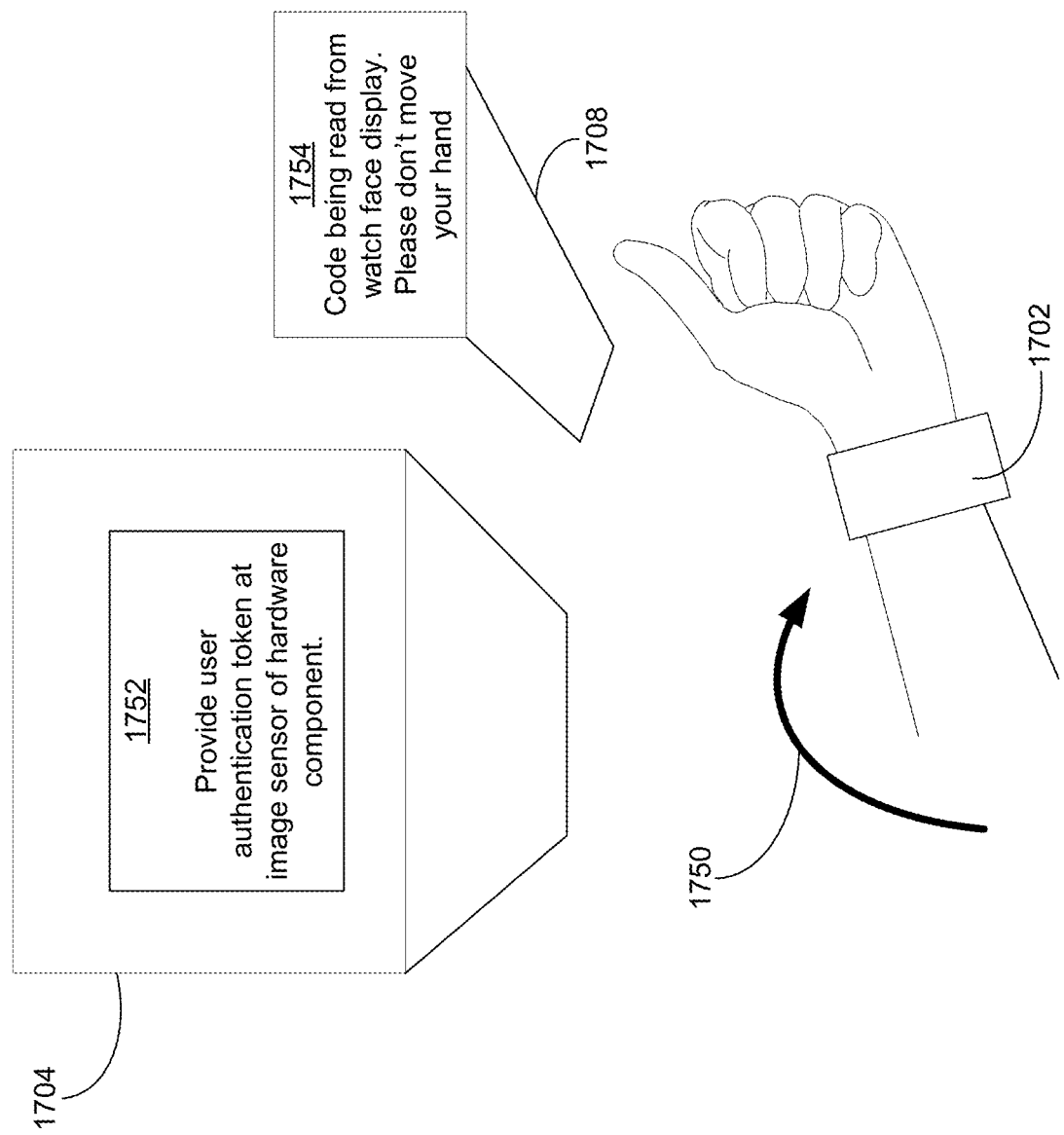

FIG. 17E shows the user performing a gesture 1750, which can be part of a multi-part gesture performed by the user 1701 to access a protected resource. The hardware component 1708 is displaying a textual prompt 1754, that states: "Code being read from watch face display. Please don't move your hand." In some embodiments, at least a portion of the gesture 1750 includes a rolling wrist motion that can be detected by an IMU sensor of the wrist-wearable device 1702. In some embodiments, detecting the rolling wrist motion by the IMU sensor of the wrist-wearable device 1702 cause power to be increased to one or more EMG sensors of the wrist-wearable device 1702.

FIGS. 18A-18K illustrate an example sequence in which a user communicates an electronic message with another electronic device of a different user. The operations of the sequence can be performed at a computing system that includes at least the display capsule 900 and the holding structure 1004 described with respect to FIGS. 10A-10H. When the display capsule 900 is coupled with the holding structure 1004, they can together form a unitary wrist-wearable device. That is, the wrist-wearable device 1802 in FIGS. 18A-18K.

FIG. 18A shows a user 1801 that is wearing a wrist-wearable device 1802 and a head-wearable device 1804. The user 1801 is performing a gesture 1806 that is detected by sensors 1850, which can be located at one or more of the wrist-wearable device 1802 and/or the head-wearable device 1804. As shown as by the block diagram for the sensors 1850, the EMG sensors 1852 can detect voltage signals corresponding to user gestures detected at the wrist-wearable device. The sensor channel 1859-a illustrated by the block diagram can be one of a set of EMG sensor channels that can correspond to a plurality of EMG electrodes disposed at different locations along the inner surface of the wrist-wearable device 1802. In some embodiments, an aspect of one or more operations corresponding to the gesture 1806 is based on a signal amplitude 1857 (e.g., a voltage amplitude). In addition to the EMG sensors 1852, there can one or more sensors of the wrist-wearable device 1802 and/or another electronic device in communication with the wrist-wearable device 1802 (e.g., the head-wearable device 1804) that are not EMG sensors. For example, an electronic device used in conjunction with detecting the gesture can include one or more IMU sensors 1854, one or more imaging sensors 1856, one or more time-of-flight sensors 1857, and/or one or more photoplethysmography (PPG) sensors 1858. In some embodiments, an IMU sensor of the IMU sensors 1854 can be used to determine a first aspect of the gesture 1806 (e.g., a direction of movement of one or more appendages of the hand involved in the gesture 1806), and the EMG sensors 1852, either alone or in combination with another set of sensors, can be used to detect one or more levels of exertion associated with the gesture 1806. In some embodiments, the gesture 1806 is a context-agnostic gesture based on an operating-system-level interface that includes a gesture space (e.g., a context-agnostic operation), and the user 1801 can interact with an application-specific interface by performing gestures that corresponds to the operating-system-level interface.

While the user 1801 is performing the gesture 1806 to select the emotion selector user interface element 1808, a display 1805 of the wrist-wearable device is displaying a message-thread user interface and a selectable emotion selector input 1808. The gesture 1806 also causes the focus selector 1810 to move in a direction corresponding to the direction of a thumb movement of the gesture 1806. In some embodiments, the thumb movement of the user gesture causes the wrist-wearable device to cause operations corresponding to selecting the emotion selector user interface element 1808. In some embodiments, a threshold exertion detected by the EMG sensor 1852 is required to activate the selectable user interface element 1808.

FIG. 18B shows the user 1801 performing another gesture at a different user interface 1822. The user interface 1822 includes a plurality of user interface elements 1824-*a*-1824-*f* (e.g., "Happy" 1824-*a*, "Confused" 1824-*b*, "Sad" 1824-*c*, "Angry" 1824-*d*, "Surprised" 1824-*e*, and "Bored" 1824-*f*) associated with a plurality of predefined moods, which can correspond to emotions having a predefined set of representations corresponding to a magnitude (e.g., an amount). In some embodiments, the predefined emotions displayed by the emotion selector can be determined based on configuration data by the user, and/or a device identifier associated with the wrist-wearable device (e.g., a device identifier of a display capsule of the wrist-wearable device 1802, and/or a device identifier of a holding structure and/or band portion of the wrist-wearable device that is configured to receive the display capsule). In some embodiments, one or more of the predefined sets of representations corresponding to each of the emotions in the emotion selector can be adjusted with by a device identifier associated with the wrist-wearable device 1802. As described herein, an emotion is a type of selectable entity describing a reaction of a user (e.g., the user 1801). In some embodiments, emotions have magnitudes, and different magnitudes of an emotion can correspond to distinct reactions of a user (e.g., the user 1801).

The user 1801 is performing the gesture 1812, and a block diagram of a group of sensors 1850 that can be located at one or both of the wrist-wearable device 1802 and the head-wearable device 1804. As shown in the block diagram for the sensors 1850, different voltages can be measured at different points in time. In some embodiments, the voltages over a period of time (e.g., the time between $t_0$ and $t_1$ on the time axis of the graphical representation of the EMG sensor signals) can be represented as a spectral density graph, where the spectral density graph can correspond to an aggregated, or otherwise transformed value for the EMG sensor signals. In some embodiments, the magnitude of the adjustment in location of the focus selector can correspond to a magnitude of an aspect of the gesture 1812. For example, if the gesture 1812 has a threshold glide exertion based on the voltages detected by the EMG sensors, the focus selector 1810 can move further (e.g., in the direction of a thumb movement corresponding to the gesture 1810).

FIG. 18C shows the user 1801 during performance of another gesture 1818 to adjust magnitude of a selected user interface element 1820, which can correspond to a magnitude of the selection gesture 1812 shown in FIG. 18B. In some embodiments, the gesture 1806 was a priming gesture that caused power to be provided to one or more neuromuscular-signal sensors at the wrist-wearable device, and one or more of these neuromuscular-signal sensors are used to detect, at least in part, the other gesture 1818. The size of the selected user interface element 1820 can be dependent on an exertion of the user 1801 during performance of the gesture 1818, which can be detected, at least in part, by the EMG sensors 1852 of the wrist-wearable device 1801. In some embodiments the user can perform a thumb movement like the one shown in FIG. 18B to change the selected user interface element while adjusting the magnitude of exertion of the gesture 1818. In some embodiments, the user 1801 can perform an eye movement that is tracked by an eye-tracking module at the head-wearable device 1804 to cause a different adjustment to the selected user interface element 1820 while adjusting the exertion of the gesture 1818.

FIG. 18D shows the user 1801 continuing the gesture 1818, and increasing the exertion detected by the EMG sensors 1852. By adjusting the magnitude of the gesture 1818, the size 1826 of the selected user interface element 1820 changes corresponding to the adjustment. In some embodiments, the size 1826 of the selected user interface element 1820 changes linearly based on the amount of exertion provided by the user via the gesture 1818. In some embodiments, the increase in exertion is based on a number of oscillations that are performed by one or more micro-crystals enclosed by the wrist-wearable device while threshold exertion levels are measured by the wrist-wearable device. In some embodiments, the micro-crystals are part of a time-keeping operation performed by the wrist-wearable device (e.g., at the display capsule) As shown in by the EMG sensor 1852, the user is increasing a level of exertion detected by the EMG sensor channel 1859-*a* (which can correspond to one of the sensor channels 2212*a*-2212*f* in FIG. 22C). The emotion selector user interface element 1822 illustrates the difference in magnitude of exertion of the gesture 1818. In some embodiments, as the user 1801 applies more exertion, detected by the EMG sensors 1852, the focus selector 1828 moves between a predefined list of message objects (e.g., emojis related to the emotion). In some embodiments, the individual message objects shown in the predefined list corresponding to the selected emotion can include at least one message object related to a device identifier associated with the wrist-wearable device 1802.

FIG. 18E shows the user 1801 continuing to increase the exertion of the gesture 1818. Based on the increase in exertion of the gesture 1818, which can be detected by the EMG sensors 1852 of the wrist-wearable device 1802, the user interface displays a different message object 1832 that is also in the list of message objects 1830 that correspond to the selected emotion at the emotion selector 1822. In some embodiments, the message object corresponding to the gesture 1818 changes when the size 1826 of the message object reaches a threshold magnitude. In some embodiments, when the message object associated with the gesture 1818 changes, the size of the message object returns to the original size (e.g., the size 1826 shown in FIG. 18C.

FIG. 18F shows the user 1801 performing a release gesture 1836, which causes the selected user interface element, after the adjustment to the magnitude of the selected user interface element (e.g., the adjusted user interface element 1832 shown in FIG. 18E) to be sent to another user of a different electronic device. In some embodiments, an aspect of a message object sent to another user of a different electronic device is based on an aspect of the release gesture 1836 that is detected by sensors (e.g., the EMG sensors 1852) of the wrist wearable device. In some embodiments, the message object is an animated message object.

The display 1805 of the wrist-wearable device 1802 is displaying a user textual prompt 1840 within a notification user interface element, indicating to the user that the message was sent to the other user. The display 1805 is also displaying a textual prompt 1842 within another notification element, prompting the user to return to the message-thread user interface (e.g., to share additional content with another user of another different electronic device). The user is performing a tracked eye movement to cause the focus selector 1810 to move over the selectable user interface element 1843. In some embodiments, the gesture can include the tracked eye movement to move the focus selector 1810, and another gesture detected by an EMG sensor of the wrist wearable device 1802 can cause the user interface element 1843 to actually be selected. In some embodiments, a different set of EMG sensor channels (e.g., the EMG sensor channel 1859-*a*) can be used to detect the selection gesture than was used to detect the release gesture. For example, the release gesture can be detected by between four to six different channels, corresponding to at least that many EMG electrodes (e.g., of the electrodes 2212*a*-22120, and then the subsequent selection gesture can be detected by a single electrode (e.g., the electrode 2212*e*) that corresponds to exertion levels detected by one finger of the user's hand.

FIG. 18G shows the user 1801 performing a gesture 1846 that includes a thumb movement in vertically upward direction (e.g., a "+z" direction based on a particularly oriented three-dimensional axis). The gesture 1846 causes the focus selector 1810 to move upward within the display 1805 of the wrist-wearable device 1802 to move over the selectable emotion selector user interface element 1808.

FIG. 18H shows the user 1801 performing a signature gesture 1848 (e.g., a "thumbs up" gesture) that corresponds to an emotion of the predefined emotion elements 1824-*a*-1824-*f*. Based on the user performing the signature gesture 1848, the emotion selector element 1824-*a* is automatically selected since the associated emotion (e.g., "Happy") corresponds to the signature gesture 1848. In some embodiments, the user 1801 can configure which signature gestures correspond to respective emotion selector elements. In some embodiments, the signature gestures for causing operations to be performed at the wrist-wearable device 1802 are configured based on a device identifier associated with the wearable electronic device 1802.

FIG. 18I shows the user 1801 continuing the performance of the same signature gesture 1848 shown in FIG. 18H. In some embodiments, a gesture corresponding to a selection of a user interface element can be the same gesture that is detected by the EMG sensor 1852 to determine a magnitude of an aspect of a resulting representation of the user interface element, which can be saved and/or sent to another user of a different electronic device.

As shown by the respective voltage magnitudes 1871 and 1873 in FIG. 18H and 18I, corresponding to respective portions of the signature gesture 1848, the same gesture can be associated with different levels of exertion detected by one or more channels (e.g., the EMG sensor channel 1859-*a*) of the EMG sensors 1852 at the wrist-wearable device, at different points in time. In some embodiments, different sensor channels can be used to detect different aspects of the gesture 1848. For example, a first EMG sensor channel 1859-*a* can be used to determine that the user 1801 has exerted a threshold exertion at an EMG sensor channel corresponding to the user's thumb movement in performing the thumbs-up signature gesture 1848, and a different EMG sensor channel can be used to detect an amount of exertion at one of the fingers, collectively forming first portion of the signature gesture 1848.

FIG. 18J shows the user continuing the gesture 1848 that is shown in FIGS. 18G-18H. A signal amplitude 1875 detected at the EMG sensor channel 1859-*a* of the wrist-wearable device 1802 meets a threshold exertion level to cause the emotion selector application 1822 to select a different emotion user interface element 1864 to be display at the display 1805 of the wrist-wearable device 1853. In some embodiments, the threshold for selecting a different emotion user interface element 1864 is based on the previous emotion user interface element 1862 reaching a maximum size (which can be configured by the user 1801, according to some embodiments). Based on the emotion selector application 1822 selecting a different emotion user interface element 1864, the focus selector 1828 of the message object list 1830.

FIG. 18K shows the display 1805 of the wrist-wearable device 1802 displaying the representation of the emotion user interface element 1864 with a customization applied based on the device identifier of the wrist-wearable device 1802.

Figure 18L:
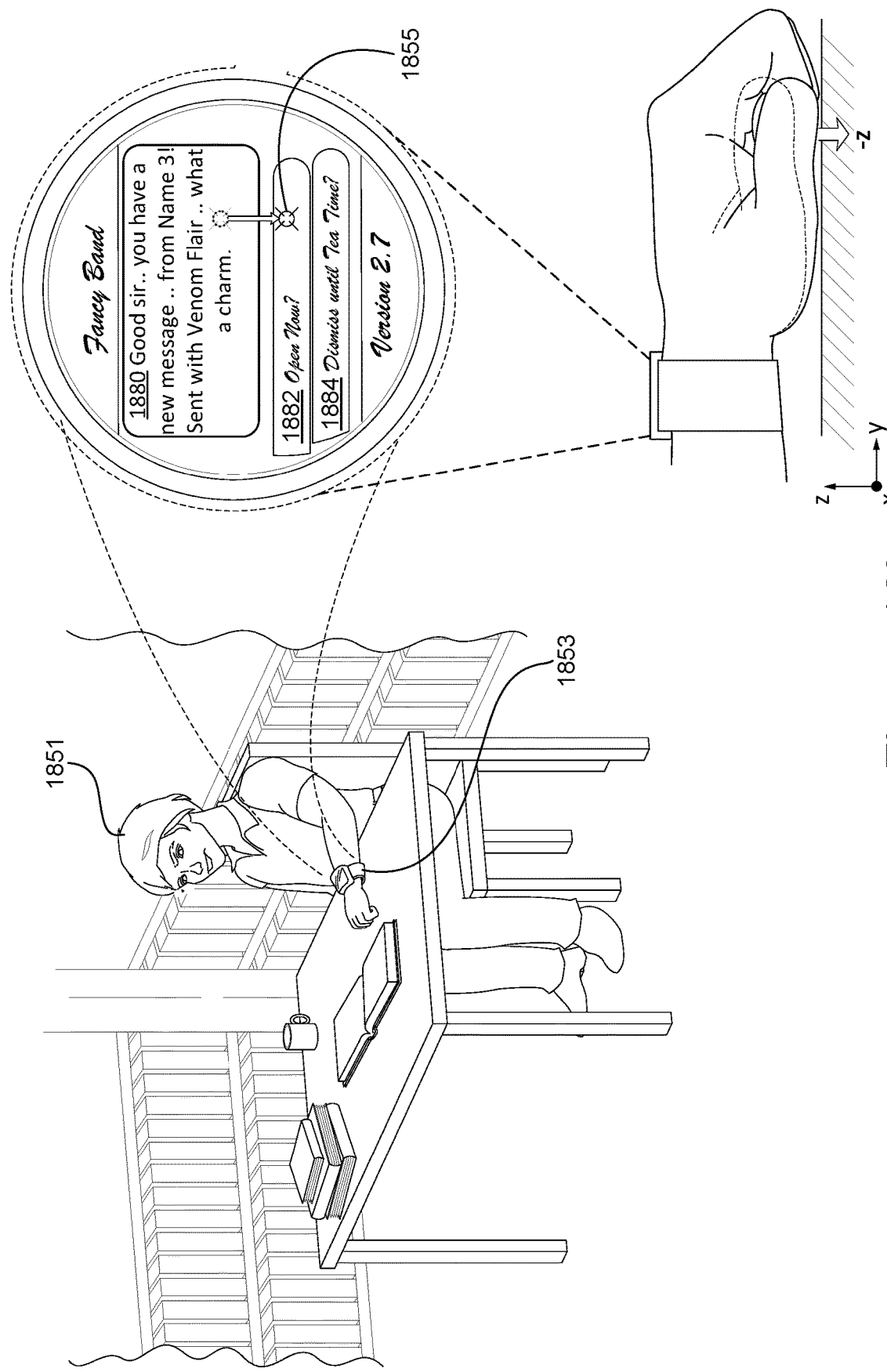
FIGS. 18A-18N illustrate an example sequence in which a user communicates an electronic message with another electronic device of a different user.

FIG. 18L shows another user 1851 that is wearing a different wrist-wearable device 1853. The wrist-wearable device 1853 can include some or all of the components of any of the wrist-wearable devices described herein. However, the wrist-wearable device 1853 includes a device identifier that is different than device identifiers associated with the wrist-wearable device 1802. The device identifier associated with the wrist-wearable device 1853 can be the same device identifier as that of the wearable electronic device 1100. The wrist-wearable device 1802 is displaying a textual-prompt user interface 1880, which includes a subset of flavor text (e.g., "Good sir," "what a charm"), which is based on a device identifier associated with the wrist-wearable device 1802. The wrist-wearable device is also displaying to selectable user interface elements 1882 and 1884, which can be used to interact with message objects. In some embodiments, notification-delivery preferences associated with the delivery of such messages can be adjusted based on a device identifier of the user's respective wrist-wearable device.

Figure 18M:
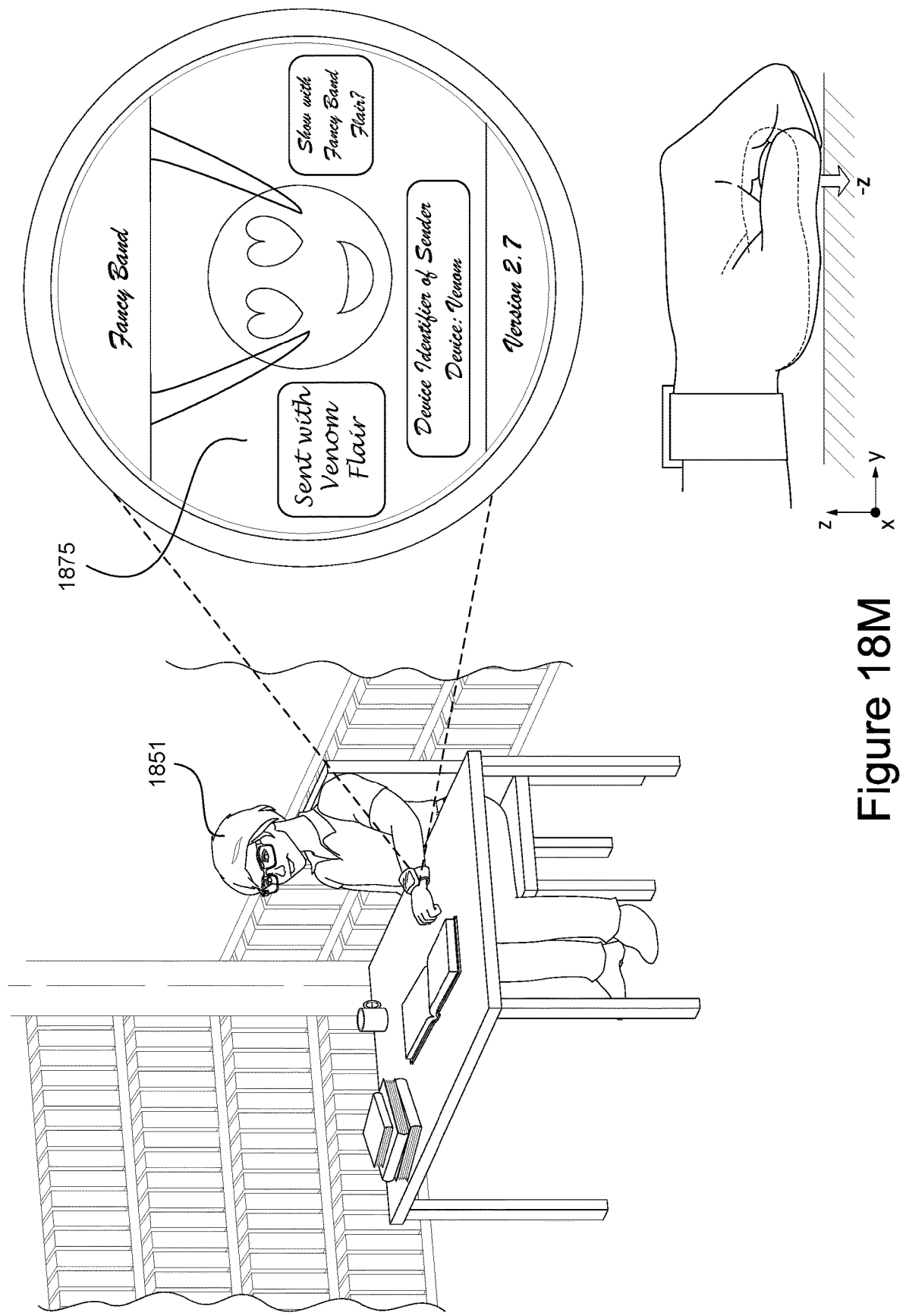

FIG. 18M shows the display 1853 displaying a representation 1875 of the emotion user interface element 1864 with a customization applied based on the device identifier of the wrist-wearable device 1802. The representation 1875 of the emotion user interface element 1864 includes additional user interface options that were not visually present in the display 1805 of the emotion user interface element 1864 at the wrist-wearable device 1802 of the user 1801.

Figure 18N:
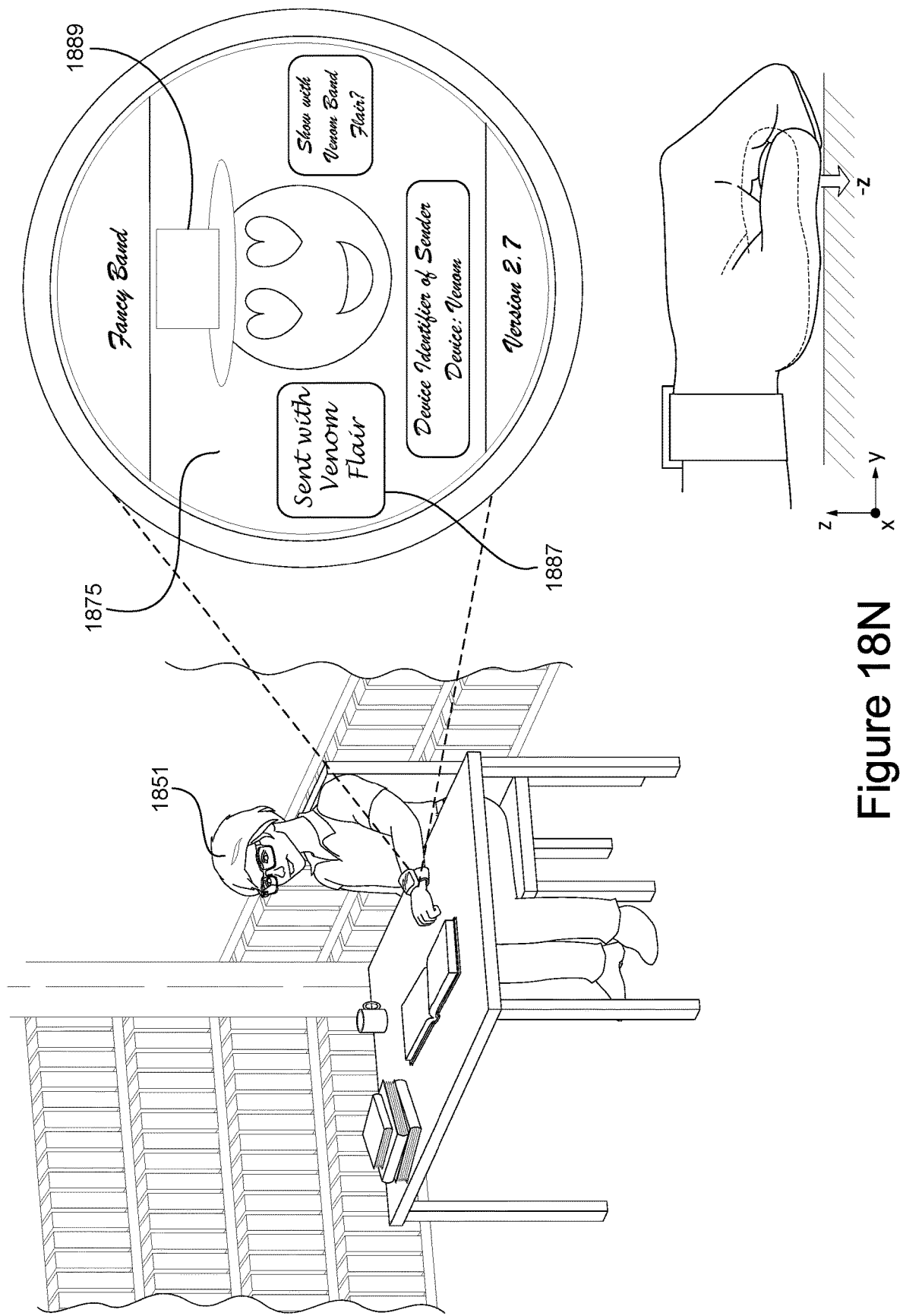

FIG. 18N shows the representation 1875 of the emotion user interface element 1864. But the representation 1875 has been customized based on a device identifier of the wrist-wearable device 1853 of the user 1851. In some embodiments the emotion user interface element 1864 is replaced with a different user interface element (e.g., a smiley face can be modified to be represented as a "thumbs-up" gesture) based on a determination that there is no corresponding representation available at the wrist-wearable device of the respective user receiving the message. The representation 1875 of the emotion user interface element 1864 includes an accessory item 1889 that is associated with a device identifier of the wrist-wearable device 1802. The wrist-wearable device is also displaying a flair identifier user interface element 1887 which is based on the device identifier associated with the wrist-wearable device 1802 of the user 1801.

FIGS. 19A-19F illustrate another example sequence in which a user is performing gesture to cause an operation to be performed at a wrist-wearable device 1901. Specifically, the user performs gestures that cause different watch faces to be displayed at the wrist-wearable device of the user. In some embodiments, one or more of the watch faces discussed below are included at the wrist-wearable device 1901 based on respective device identifiers associated with the wrist-wearable device 1901.

Figure 19A:
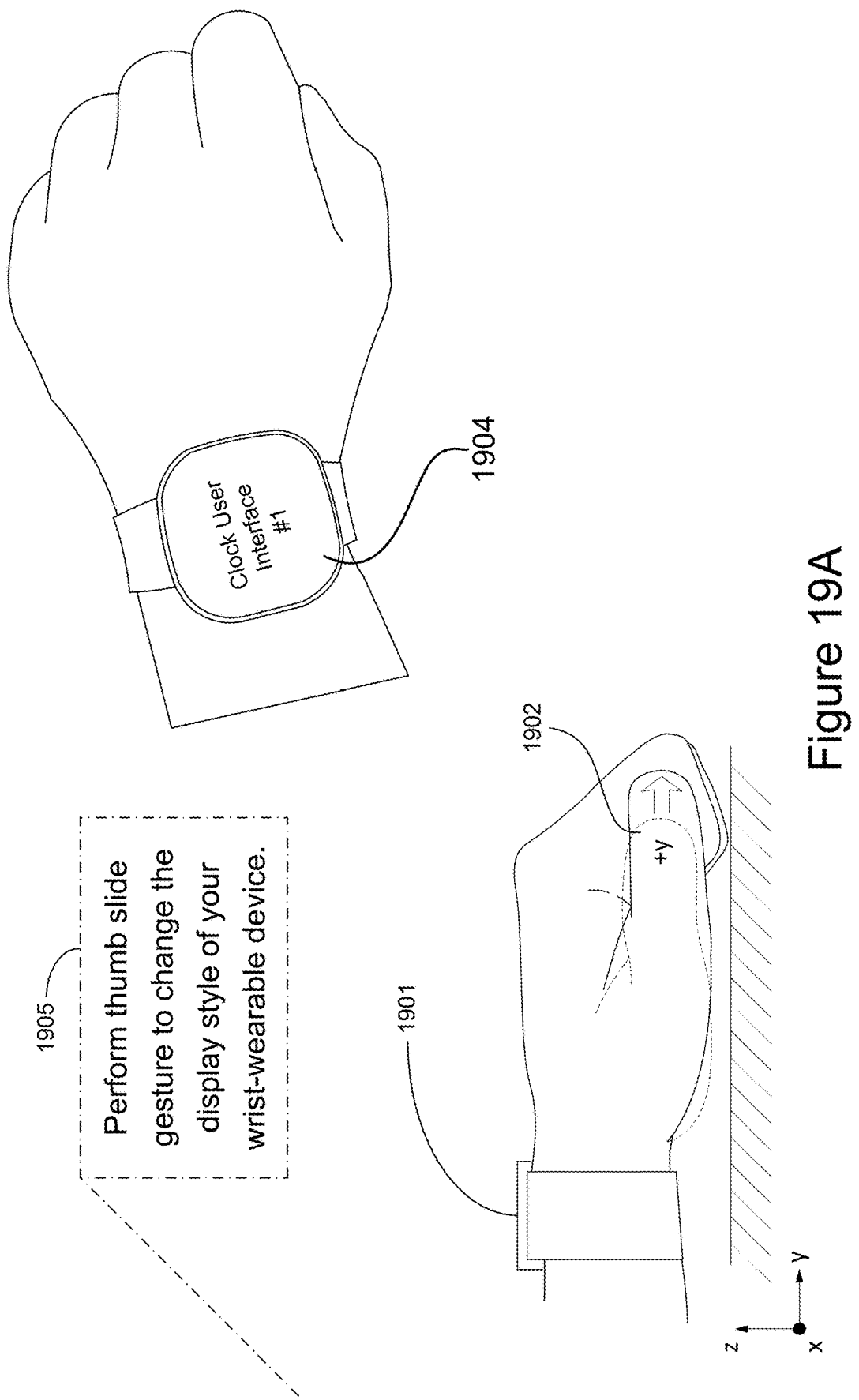

FIG. 19A shows a user performing a gesture 1902 while a clock user interface 1904 is displayed at a wrist-wearable device worn by the user. The gesture 1902 includes a thumb movement in the +y direction and causes the clock user interface to be displayed.

Figure 19B:
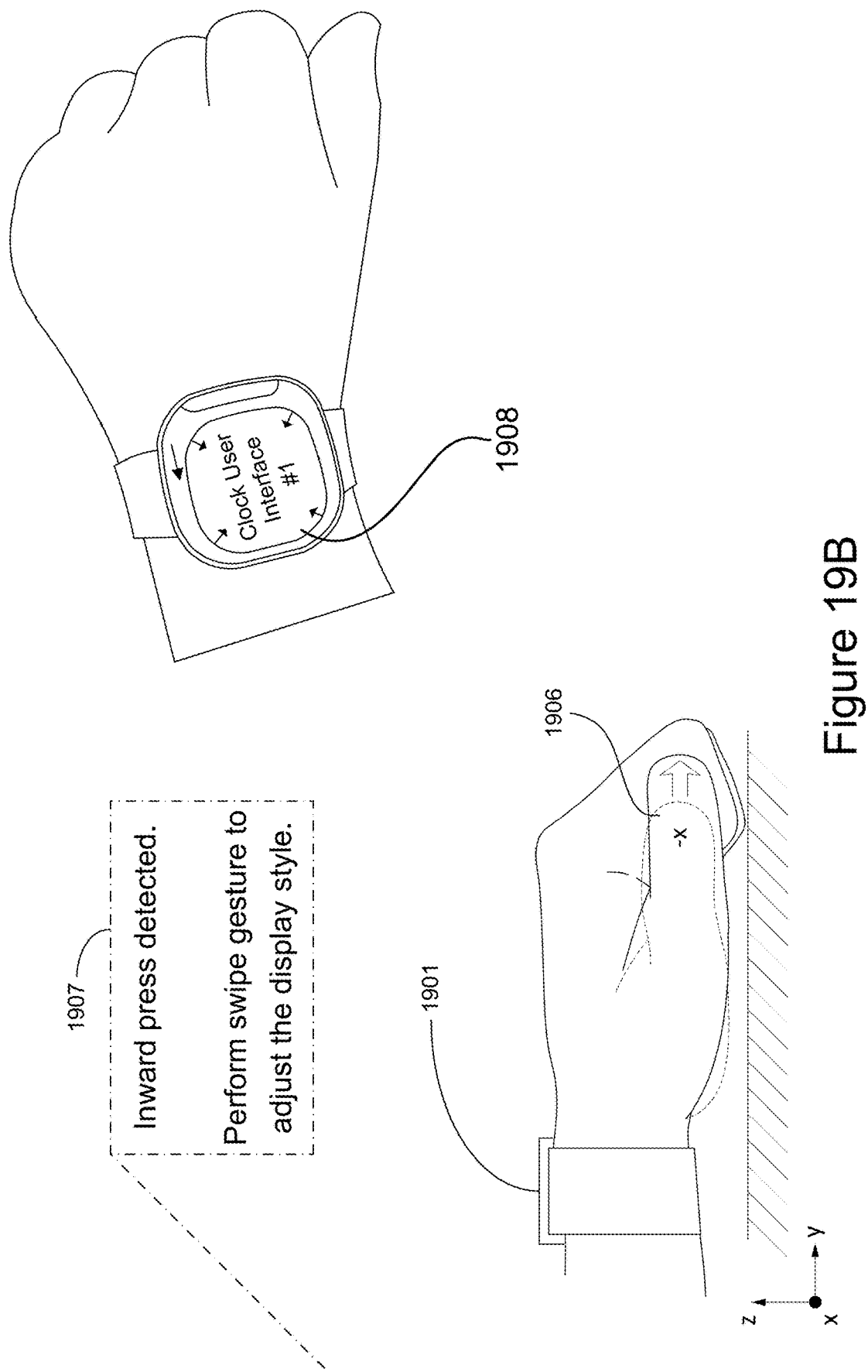

FIG. 19B shows the user performing a gesture 1906 while another user interface 1908 is displayed at the wrist-wearable device. The gesture involves a pressing motion in the −x direction (e.g., towards the user's knuckle). Based on the user performing the gesture 1906, the watch face shrinks slightly as a scrollable watch face selector user interface is displayed at the wrist-wearable device.

Figure 19C:
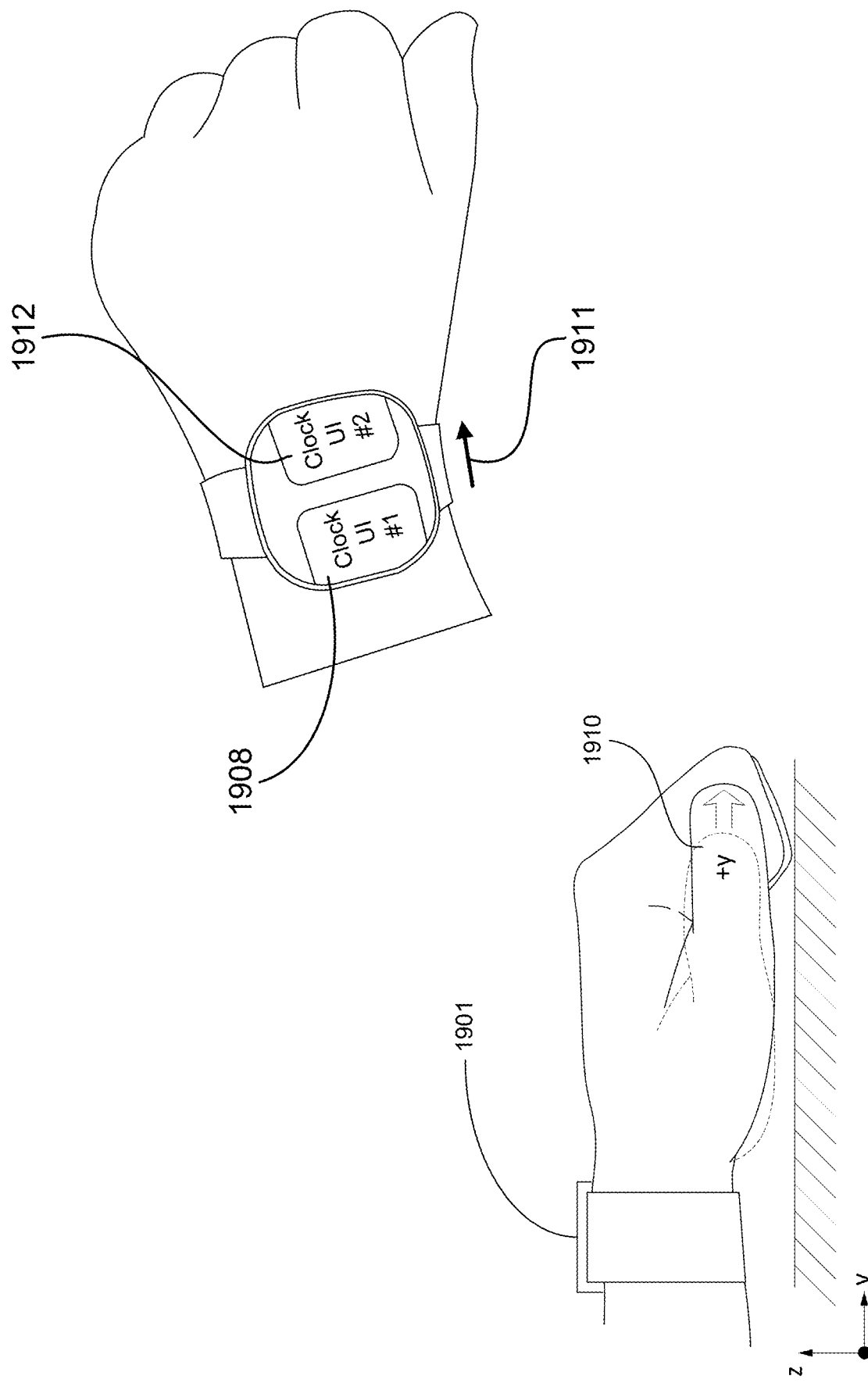

FIG. 19C shows the user performing another gesture 1910 while another user interface 1912 is displayed. The gesture 1910 includes a thumb movement in the +y direction and causes the scrollable watch face selector user interface to scroll horizontally through a plurality of watch faces available at the wrist-wearable device.

FIG. 19D shows the user performing another gesture 1914 while another user interface 1916 is displayed. The gesture 1914 includes a thumb movement in the −y direction and causes the scrollable watch face selector user interface to scroll in the opposite direction from the direction of scrolling illustrated in FIG. 19C.

Figure 19E:
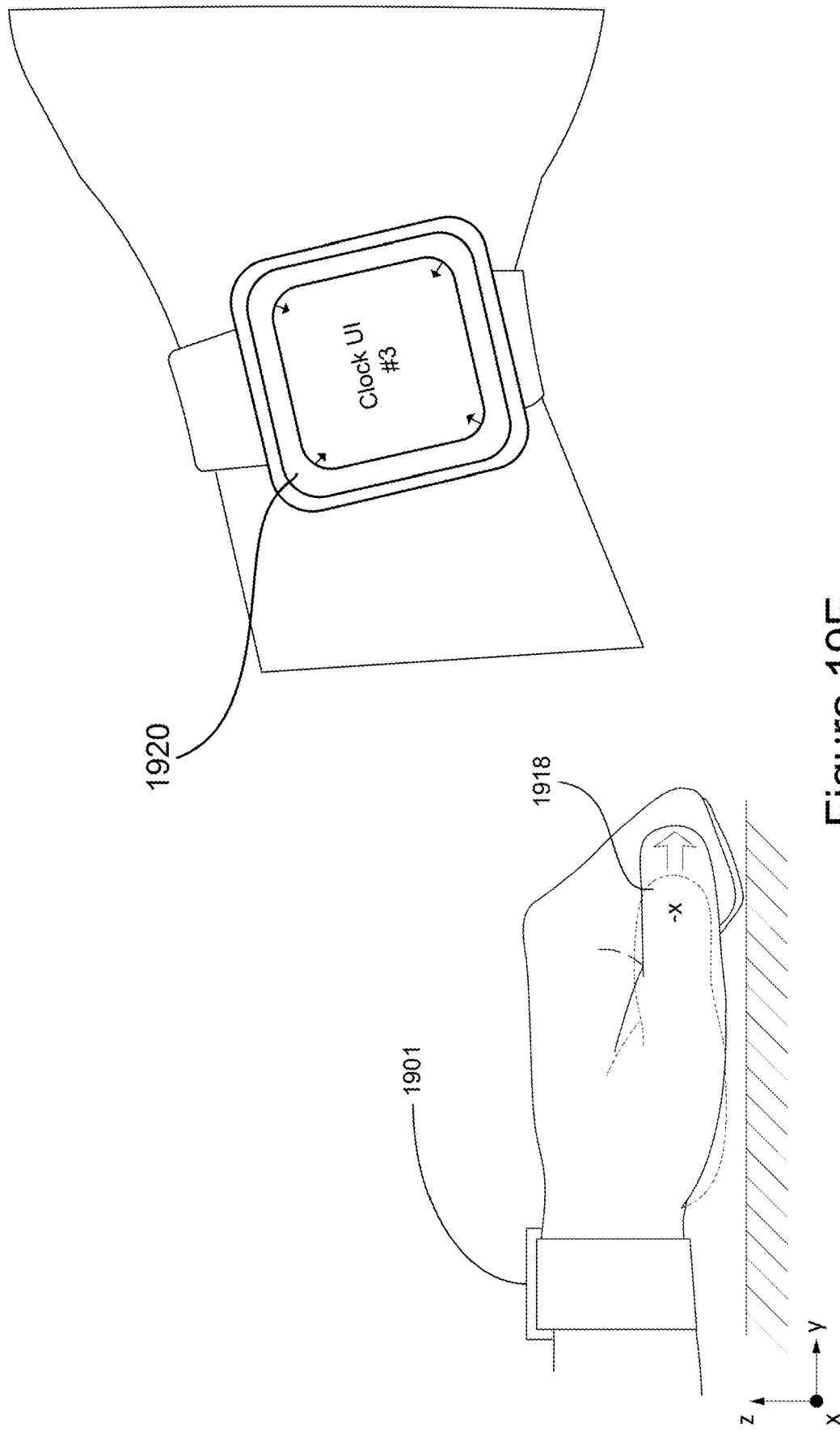

FIG. 19E shows the user performing another gesture 1918 while another user interface 1920 is displayed. The gesture includes a thumb movement in the −x direction (e.g., a pressing motion towards the user's knuckle).

FIG. 19F shows another user interface 1924 displayed at the wrist-wearable device. The new watch face displayed in the user interface is different than the watch face displayed in the user interface 1904 shown in FIG. 19A.

Figure 20:
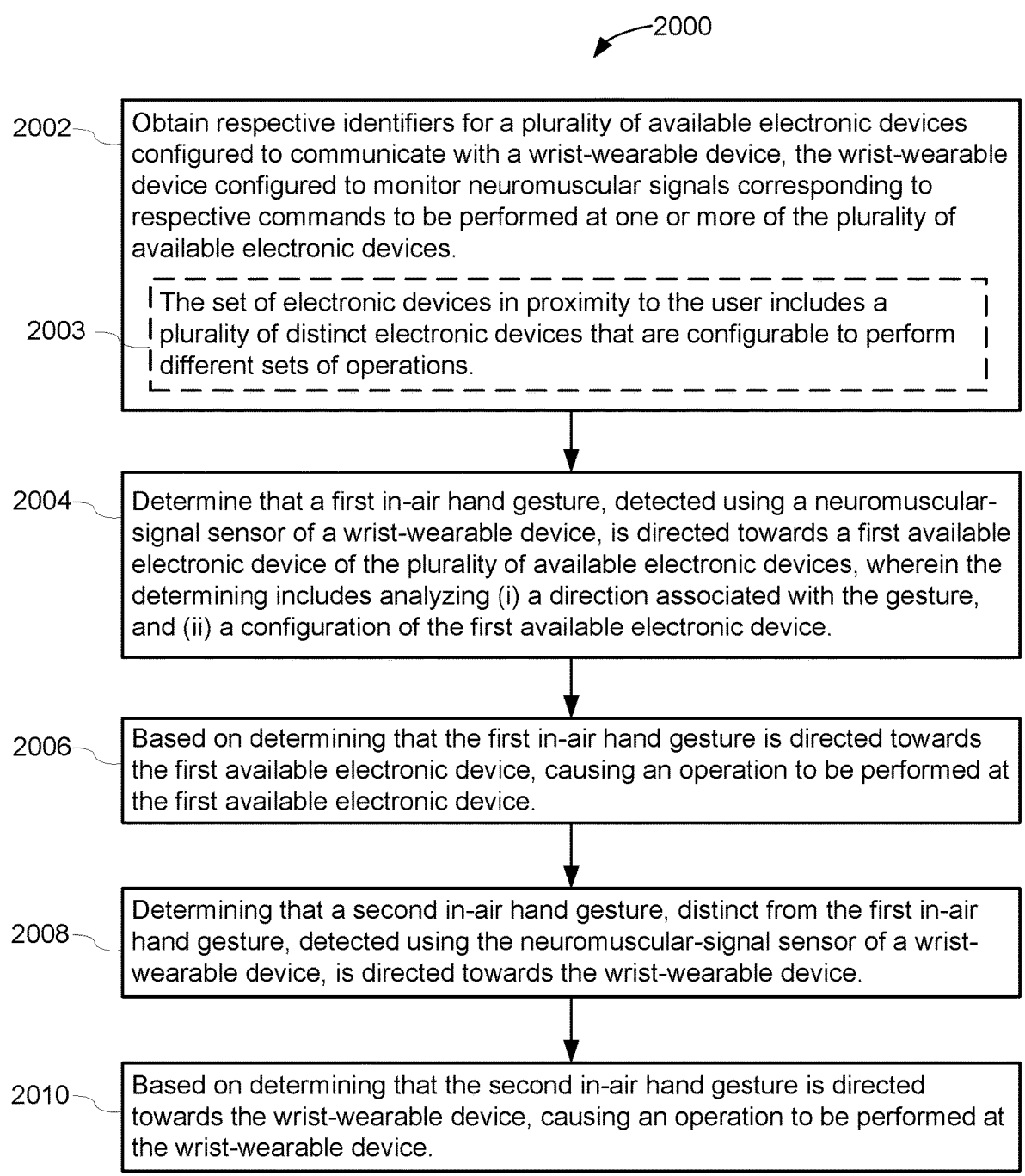
FIG. 20 illustrates a method of determining an operation performed in a gesture space corresponding to operations of a communication interface between a wrist-wearable device and respective electronic devices of a set of electronic devices that are in proximity to a user.

FIG. 20 illustrates a method 2000 of determining an operation performed in a gesture space corresponding to operations of a communication interface between a wrist-wearable device and respective electronic devices of a set of electronic devices that are in proximity to a user.

The method 2000 includes obtaining (2002) respective identifiers for a plurality of available electronic devices configured to communicate with a wrist-wearable device, the wrist-wearable device configured to monitor neuromuscular signals corresponding to respective commands to be performed at one or more of the plurality of available electronic devices. As described herein, a set of electronic devices can include one or more respective electronic devices.

In some embodiments, the set of electronic devices in proximity to the user includes (2003) a plurality of distinct electronic devices that are configurable to perform different sets of operations.

The method 2000 further includes detecting (2004) using an EMG sensor of a wrist-wearable device, a gesture directed toward an electronic device of the of the set of electronic devices, where determining that the gesture is directed to the electronic device includes analyzing (e.g., separately or in combination) (i) a direction associated with the guest, and (ii) a configuration of the particular electronic device. In some embodiments, the direction can be the direction of motion of the gesture itself. In some embodiments, the direction can be associated with another direction of a different electronic device.

The method 2000 further includes, based on (2006) the gesture detected using the EMG sensor of the wrist-wearable device, causing an operation (e.g., a volume control operation, a song selection operation) to be performed at the particular electronic device corresponding to the respective user interface. As described herein, a user interface can be a visual interface presented by an electronic device (e.g., a display of the wrist-wearable device). ISE, the operation is a sharing operation that includes sharing a representation of a user interface element displayed at the wrist-wearable device with another user of a different electronic device.

In some embodiments, the method 2000 further includes, based on (2008) a determination that the user has a different orientation, detect, based on wireless communication signals, that each respective device of a second set of electronic devices, distinct from the first set of electronic devices, is within proximity to the user. In some embodiments, one or more of the same devices are in the first set of electronic devices and the second set of electronic devices. That is, the sets of electronic devices are not necessarily mutual exclusive, in accordance with some embodiments.

In some embodiments, the difference in orientation of the user includes (2010) one or more of (i) a location of the user, and (ii) a gaze direction of the user. As described herein, a difference in orientation detected by a difference in gaze direction can correspond to a difference in pupil location detected by an eye-tracking module, and/or a different orientation of a user's head that does not correspond to a direction of the user's actually gaze (e.g., based on their pupil position).

Figure 21:
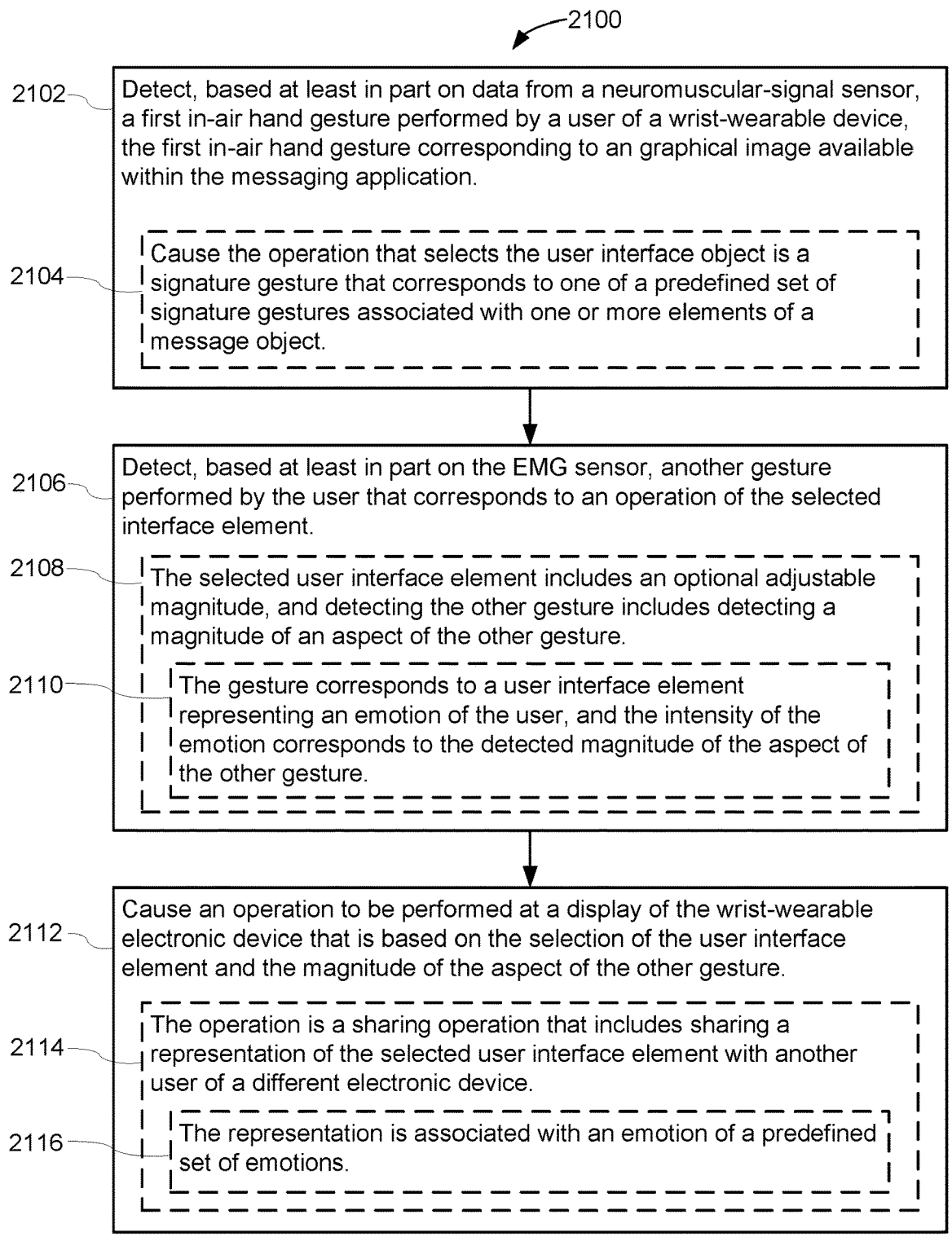
FIG. 21 illustrates a method of causing operations to be performed at a wrist-wearable device based on a user performing a multi-part gesture.

FIG. 21 illustrates a method 2100 of causing operations to be performed at a wrist-wearable device based on a user performing a multi-part gesture.

The method 2100 includes detecting (2102), based at least in part on the EMG sensor (e.g., the EMG sensor 1852 in FIGS. 18A-18G), a gesture performed by a user of the wrist-wearable device, corresponding to an operation at the user interface of the wrist-wearable device, wherein the operation causes a selection of a user interface element associated with the user interface of the wrist-wearable device (e.g., the selection of the emotion user interface element 1824-*c* (corresponding to "Sad") in FIG. 18B).

In some embodiments, the method 2100 includes causing (2104) the operation that selects the user interface object is a signature gesture that corresponds to one of a predefined set of signature gestures associated with one or more elements of a message object. For example, the thumbs up signature gesture 1848 shown in FIG. 18H causes an automatic selection of the emotion user interface element 1824-a).

The method 2100 includes detecting (2106), based at least in part on the EMG sensor, another gesture performed by the user that corresponds to an operation of the selected interface element. In some embodiments, the selected user interface element includes (2108) an optional adjustable magnitude, and detecting the other gesture includes detecting a magnitude of an aspect of the other gesture. In some embodiments, the gesture corresponds (2110) to a user interface element representing an emotion of the user, and the intensity of the emotion corresponds to the detected magnitude of the aspect of the other gesture.

The method 2100 includes causing (2112) an operation to be performed at a display of the wrist-wearable electronic device that is based on the selection of the user interface element and the magnitude of the aspect of the other gesture. In some embodiments, the operation is (2114) a sharing operation that includes sharing a representation of the selected user interface element with another user of a different electronic device. In some embodiments, the representation is (2116) associated with an emotion of a predefined set of emotions.

Figure 22A:
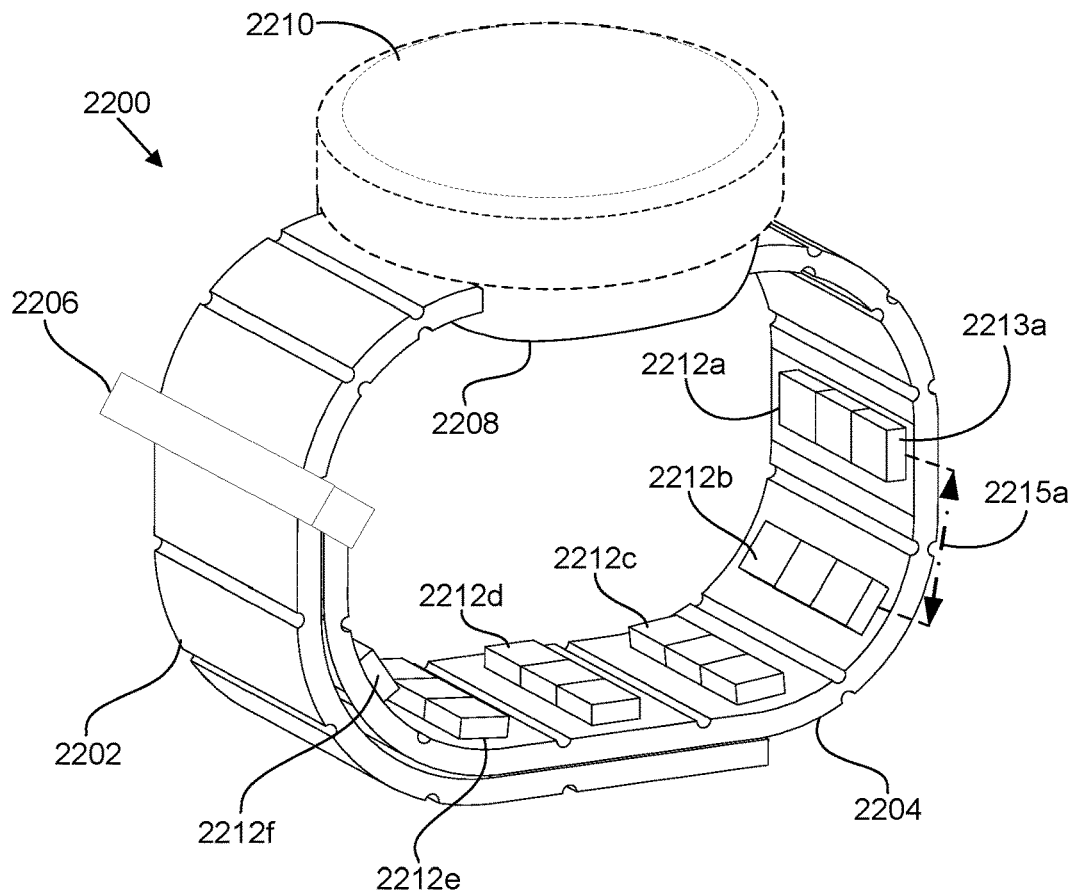
FIGS. 22A-22C illustrate an example of a wearable electronic device (e.g., a wrist-wearable device, an ankle-wearable device, an arm-wearable device) that can sense neuromuscular signals of a user.
Figure 22B:
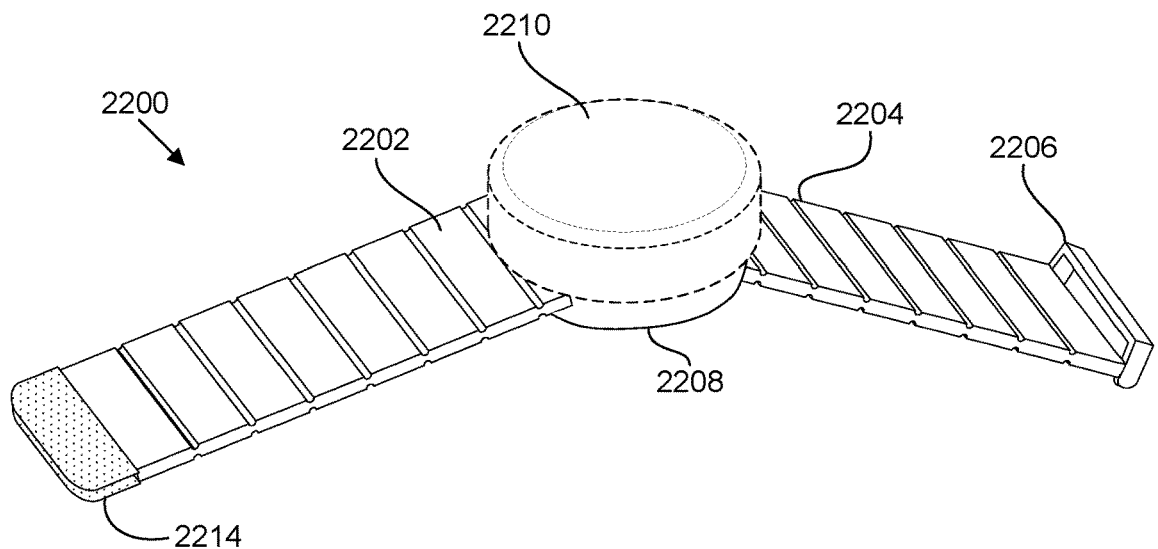
Figure 22C:
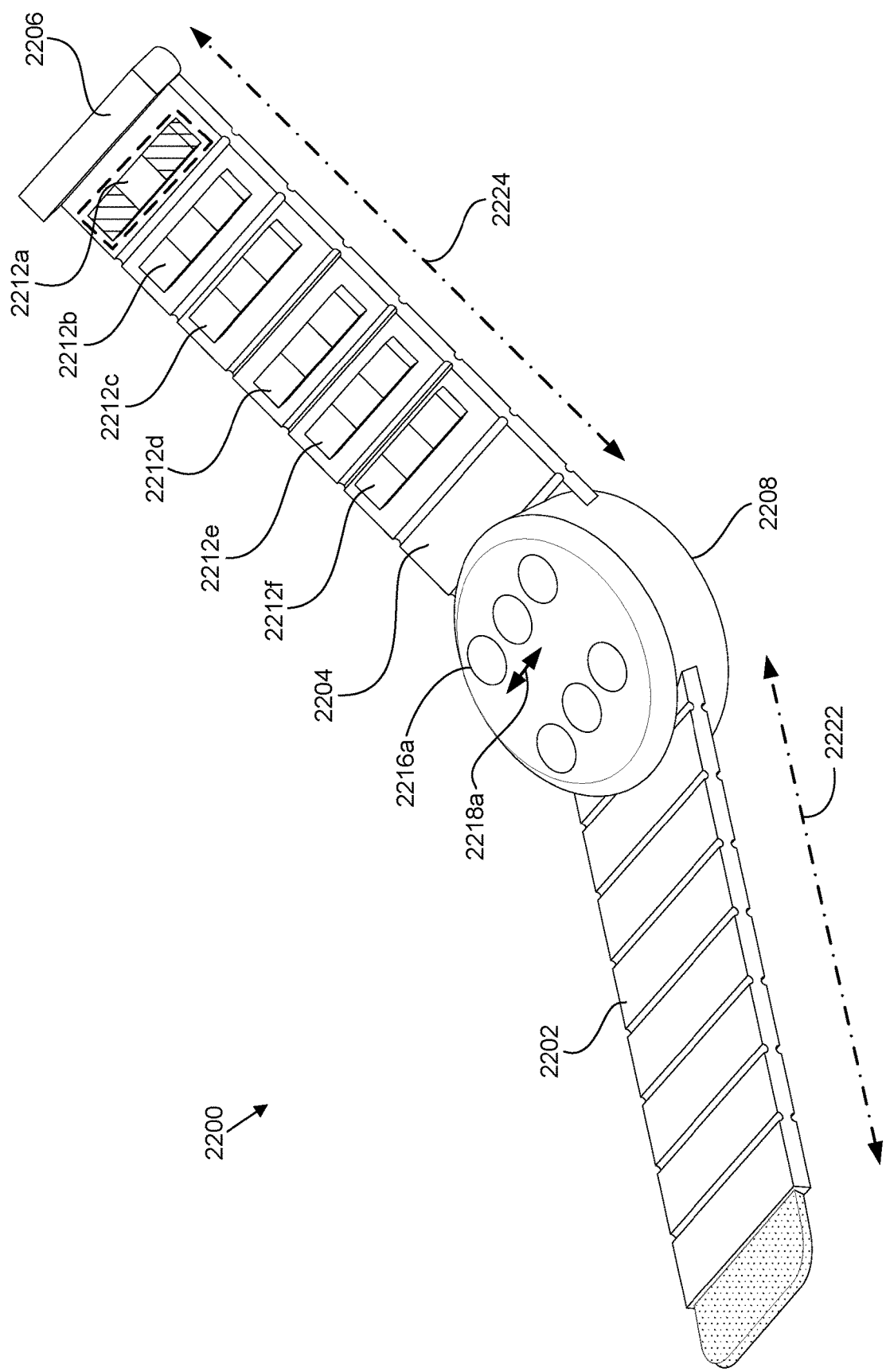

FIGS. 22A-22C illustrate an example of a wearable electronic device 2200 (e.g., a wrist-wearable device, an ankle-wearable device, an arm-wearable device) that can sense neuromuscular signals of a user. The wrist-wearable device 102 in FIGS. 1A-2G can include all of the components of the wearable electronic device 2200, in accordance with some embodiments. The wearable electronic device 2200 is a band-shaped electronic device (e.g., a smart watch, a sensor-laden band with no display) which can be worn on a wrist of a user.

FIG. 22A illustrates a perspective view of the wearable electronic device 2200. The wearable electronic device 2200 has a first band portion 2202, a second band portion 2204, a cinch structure 2206, a compute core 2208, an optional display 2210, and a plurality of neuromuscular-signal sensing structures 2212a-2212f distributed along a length of the second band portion 2204. In some embodiments, the wearable electronic device 2200 does not include the display 2210. In some embodiments, the display 2210 is detachable from the wearable electronic device 2200. In some embodiments, the first band portion 2202 and the second band portion 2204 are separated by a compute core 2208. The first band portion 2202 and the second band portion 2204 are secured via the cinch structure 2206 to form an adjustable loop that has a circumference, which can be sized to fit around a user's wrist. In some embodiments, the second band portion 2204 does not include any electronic components.

FIG. 22B illustrates a perspective top view of the wearable electronic device 2200, where the wearable electronic device 2200 is unstrapped. That is, the first band portion 2202 and the second band portion 2204 are shown uncoupled and extending outward in substantially opposite directions. The first band portion 2202 has a distal end 2214, which can be made of a different material and/or have a different geometry than a separate part of the length of the first band portion, such that it is configured to be fed through an opening defined by the cinch structure 2206. For example, the distal end 2214 can include an elastomeric material. The elastomeric material can be stiffer than the rest of the first band portion 2202, which can make the distal end 2214 easier to feed through an opening of the cinch structure 2206 without bending the distal end 2214 while it is fed through the cinch structure 2206.

FIG. 22C illustrates a perspective bottom view of the wearable electronic device 2200. In addition to the neuromuscular-signal sensing structures 2212a-2212f distributed across the second band portion 2204, the wearable electronic device 2200 includes a plurality of sensors (e.g., a sensor 2216a) on a bottom surface of the compute core 2208. In some embodiments one or more of the sensors on the bottom surface of the compute core 2208 are EMG sensors. In some embodiments, there is a minimum separation distance 2218a between each contact point on the bottom surface of the compute core 2208. In some embodiments, sensors having at least the separation distance 2218a can be associated with separate EMG sensor channels (e.g., the EMG sensor channel 1859-a). The first band portion 2202 and the second band portion 2204 can have respective lengths 2222 and 2224, which can be sized from 75-175 millimeters, respectively. In some embodiments, the respective lengths of each of the band structures can be distinct, but still sum to a total length of between 150-350 millimeters based on the respective stock keeping unit (e.g., small, medium large) of the wearable electronic device that includes the first band portion 2202 and the second band portion 2204.

Figure 23:
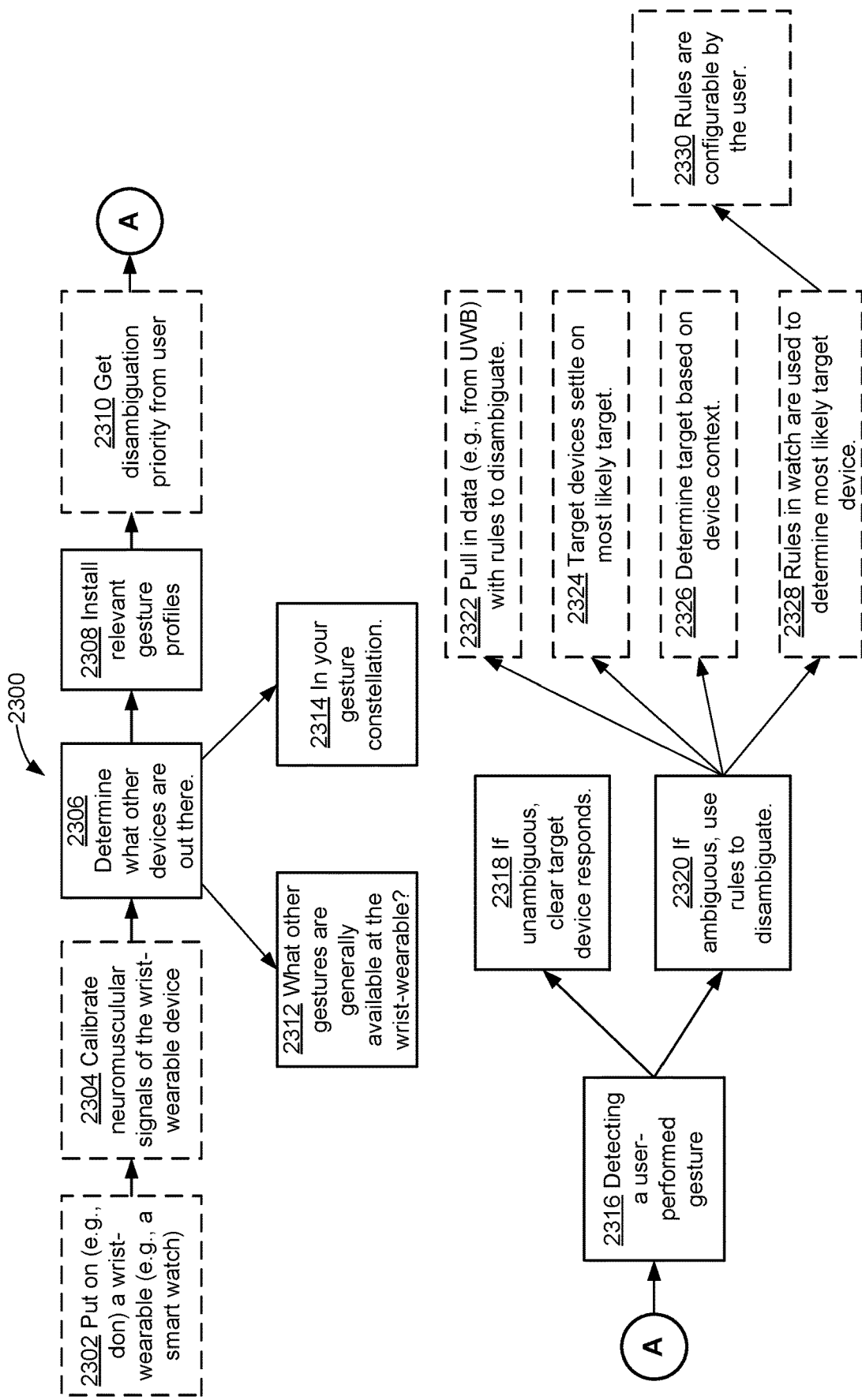
FIG. 23 illustrates a flow diagram of a method for a user to interact with a plurality of electronic devices using at least one predefined set of gestures.

FIG. 23 illustrates a flow diagram of a method 2300 for a user to interact with a plurality of electronic devices using at least one predefined set of gestures. The method can be performed by a user with a wrist-wearable device, which can be any of the wrist-wearable devices described herein.

In some embodiments, the method 2300 includes putting on (2302) (e.g., donning) a wrist-wearable device (e.g., a smart watch). In some embodiments, a haptic event can be provided at the wrist-wearable device based on, for example, a device identifier within the wrist-wearable device.

In some embodiments, the method 2300 includes calibrating (2304) one or more neuromuscular-signal sensors of the wrist-wearable device. For example, a user can select a particular device identifier of a set of device identifiers associated with the respective wrist-wearable device and/or other electronic devices that are in communication with the wrist-wearable device.

The method 2300 includes determining (2306) a set of electronic devices that are in proximity to a user of the respective wrist-wearable device associated with the method 2300.

In some embodiments, in accordance with determining what other electronic devices are in proximity to the user, the method 2300 includes determining (2312) what other gestures are generally available at the wrist-wearable device, which can be used to determine what gesture spaces should be created for each electronic device that is in proximity to the user. In some embodiments, the gestures that are generally available are based on a user interface that is concurrently being displayed at the wrist-wearable device.

In some embodiments, in accordance with determining what other electronic devices are in proximity to the user, the method 2300 further includes (2314) what gestures are in the user's constellation of gesture spaces. In some embodiments, the user's constellation of gesture spaces is based on one or more additional wearable devices being worn by the user. For example, the user can be wearing a head-wearable device, and there can be one or more gestures that are configured to be detected (e.g., by the wrist-wearable device or by sensors (e.g., imaging sensors) of the head-wearable device).

The method 2300 includes installing (2308) one or more relevant gesture profiles at the wrist-wearable device in accordance with one or more electronic devices that are determined to be in proximity to the user.

In some embodiments, the method further includes getting (2310) disambiguation priorities from the user. For example, a notification can be provided to the user about a gesture that is available in more than one gesture space (e.g., a gesture conflict). And the user can provide an indication as to what gesture space to associate with a respective gesture.

The method 2300 includes detecting (2316), via one or more sensors of the wrist-wearable device and/or another electronic device that is in electronic communication with the wrist-wearable device, a gesture performed by the user.

The method 2300 includes determining whether a respective gesture performed by the user unambiguously applies to one gesture space. In accordance with the gesture unambiguously applying to one gesture space, the method includes targeting (2318) the electronic device corresponding to the respective user gesture. In accordance with an ambiguation as to which gesture space the respective gesture corresponds to, the method 2300 includes applying rules to disambiguate which gesture space the respective gesture applies to.

In some embodiments, applying rules to disambiguate which gesture space a respective gesture applies to includes using data (2322) (e.g., from a UWB connection) which electronic device the respective gesture is most likely to apply to.

In some embodiments, the respective plurality of electronic devices which the gesture is applies to collectively settle (2324) on the mostly target of the respective gesture.

In some embodiments, a device context is (2326) utilized to determine which device is most likely to be targeted by the respective gesture.

In some embodiments, disambiguation rules of the wrist-wearable device are used (2328) to determine which electronic device is most likely to be the target of a respective gesture performed by the user. In some embodiments, the rules are (2330) configurable by the user of the wrist-wearable device.

Figure 24A:
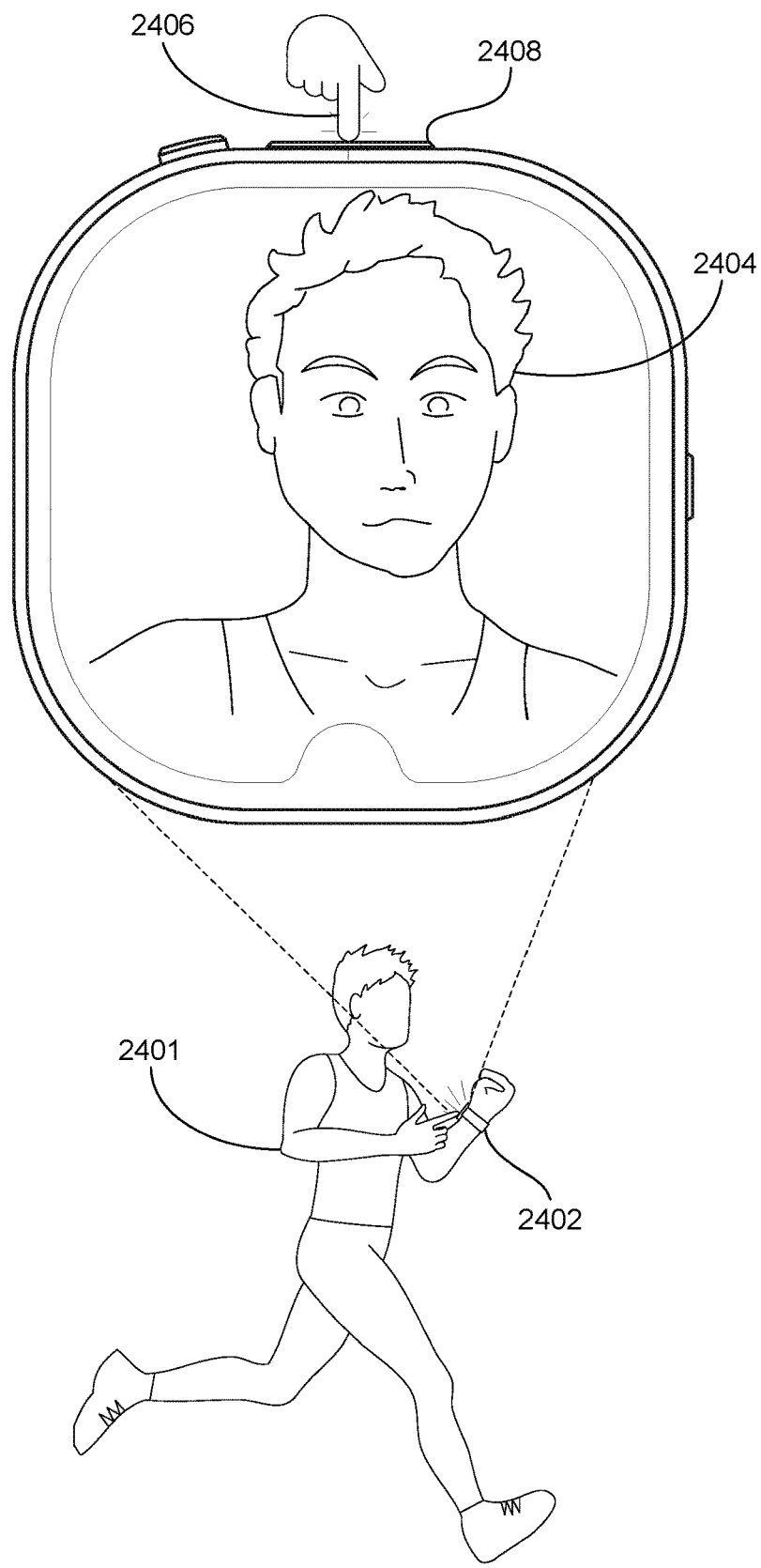
FIGS. 24A-24C illustrate an example sequence in which a user captures an image and display customizations are caused to be applied to the captured image, in accordance with some embodiments.
Figure 24B:
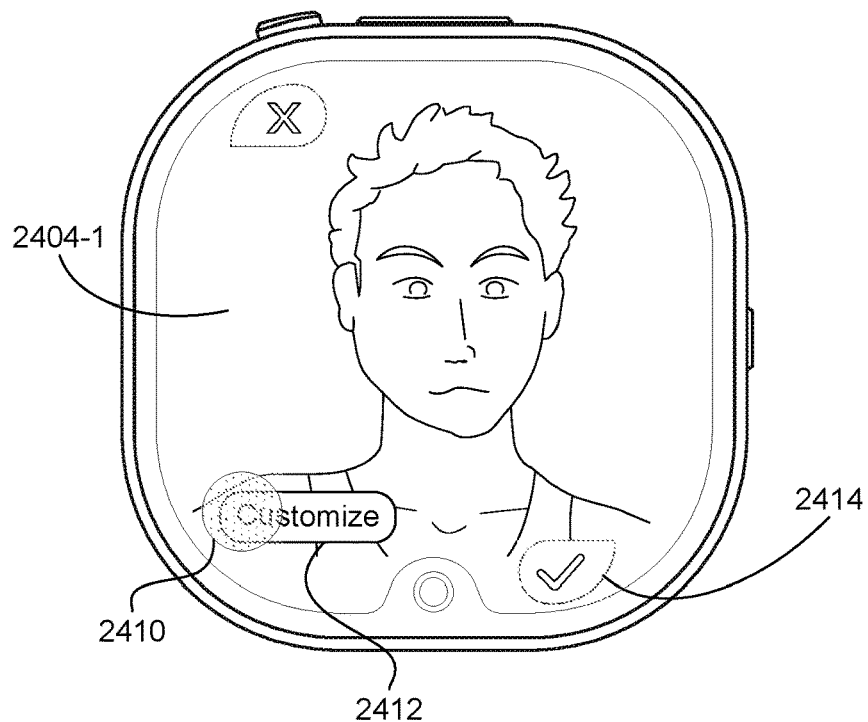
Figure 24C:
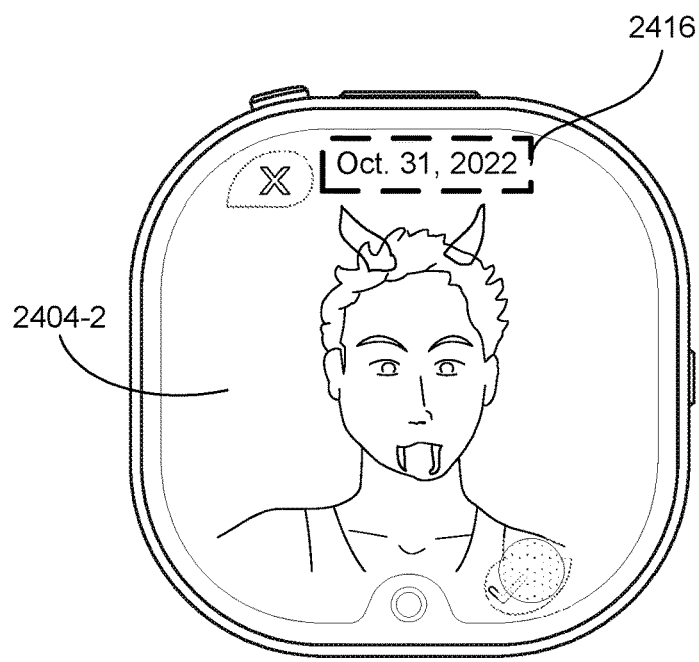

FIGS. 24A-24C illustrate an example sequence in which a user captures an image and display customizations are caused to be applied to the captured image, in accordance with some embodiments.

FIG. 24A shows a user 2401 performing a physical activity (e.g., running). The user 2401 is wearing a wrist-wearable device 2401 that includes a display capsule and a holding structure as described in FIGS. 9A-10H. The user is depressing a button contact 2408 with a press gesture 2406, which corresponds to a field location associated with one or more Hall effect sensors of the wrist-wearable device 2402. Based on the press gesture 2406, an image 2404 of the user 2401 is captured at the wrist-wearable device (e.g., a selfie). In some embodiments, a device identifier associated with the wrist-wearable device 2402 can cause neuromuscular-signal sensed gestures to cause operations for capturing the image 2404 without the user providing the input at the button contacts 2408.

FIG. 24B shows the display of the wrist-wearable device 2402 displaying a default representation 2404-1 of the image 2404, which can be configured to be displayed with a first filtering effect based on one or more device identifiers associated with the wrist-wearable device 2402 (e.g., a lighting filter, a venom flair filter as described with respect to FIGS. 18A-18K). A customization user input 2412 is presented in conjunction with the default representation 2404-1, which the user 2401 is selecting with a selection input 2410. In some embodiments, the display of the wrist-wearable device 2402 is a touch-sensitive display, and the selection input 2410 can be selected by a touch input directed to the touch-sensitive display. In some embodiments, the user 2401 can select the customization input 2412 via a gesture detected by neuromuscular-signal sensors of the wrist-wearable device 2402. In some embodiments, the customization input 2412 can be selected by a gesture directed to a field location generated by one or more Hall effect sensors of the wrist-wearable device 2402.

FIG. 24C shows, based on the selection of the customization input 2412, a customized representation 2404-2 that includes customized display elements (e.g., fangs, horns), which can be based on a current event associated with a date and/or time of capture (e.g., the displayed date 2416 indicating that it is Halloween). In some embodiments, the customized display elements can be based on a combination of a current event and one or more device identifiers of the wrist-wearable device 2402. That is, if the wrist-wearable device 2402 has a different device identifier, a similar selection of the customization input 2412 in FIG. 24B could cause the customized representation 2404-2 to include a zombified version of the image 2404.

FIGS. 25A-25B illustrate an example sequence in which a user performs a gesture that causes an audio track to be obtained, in accordance with some embodiments.

FIG. 25A shows a user 2501 wearing a wrist-wearable device 2502, which can include some or all of the components of any of the wrist-wearable devices described herein. The user 2501 is performing a gesture 2512 that includes a thumb movement in +y direction according to a particular coordinate plane associated with the gesture 2512. The gesture 2512 is detected by one or more neuromuscular-signal sensors of the wrist-wearable device 2502.

Concurrently with the gesture 2512 being performed, an instrument selector user interface 2522 is displayed at a display of the wrist-wearable device 2502. The instrument selector user interface 2522 includes a plurality of user interface elements 2524-a-2524-f, which correspond to a plurality of musical instruments. In some embodiments, one or more of the plurality of user interface elements 2524-a-2524f can correspond to one or more predefined musical tracks (e.g., musical tracks associated with a media providing service (e.g., a music streaming service) available at the wrist-wearable device 2502.

The gesture 2512 performed by the user 2501 causes a focus selector 2510 to move within the user interface 2522 to select one or more of the user interface elements 2524-a-2524-f (e.g., a guitar user interface element 2524-a). Based on a selection caused by the gesture 2512, subsequent user gestures and/or continuations of the user gesture 2512 can cause an audio track to be obtained that is based on the selected user interface element 2524-a.

FIG. 25B shows the user performing another gesture 2518 (e.g., an in-air hand gesture) that is caused to be detected by one or more neuromuscular-signal sensors of the wrist-wearable device 2502. Based on the gesture 2518, an audio track to be obtained based on the combination of the gesture 2512 and 2518 can be adjusted (e.g., adjusting a respective volume, tone, pitch, chord, and/or chord pattern associated with the audio track). For example, an exertion level corresponding to the gesture 2518 can correspond to a chord to be selected by the gesture 2518 (e.g., a higher level of exertion can correspond to a chord having a first tone, and a lower level of exertion can correspond to a chord having a second tone).

In some embodiments, after the user completes the gesture 2518, an audio track is caused to be obtained at the wrist-wearable device 2502, where the audio track can be automatically sent in a message to another user of a different electronic device. In some embodiments, after the user completes the gesture 2518, the user can perform another user gesture to further modify the obtained audio track (e.g., causing another chord and/or chord pattern to be selected). In some embodiments, the obtained audio track, while being provided for playback at the other electronic device with the different device identifier, can be adjusted based on one or more device identifiers at the other electronic device. Such adjustment can include a disambiguation related to the availability of the musical instrument and/or the selected audio track at the other user's electronic device. For example, if a particular selected instrument and/or audio track is not available for playback at the other electronic device, a different electronic device and/or audio track can be determined to be suitable for playback of the selected audio track based on, for example, a similarity between the obtained audio track and another audio track that is available at the other electronic device.

Figure 26:
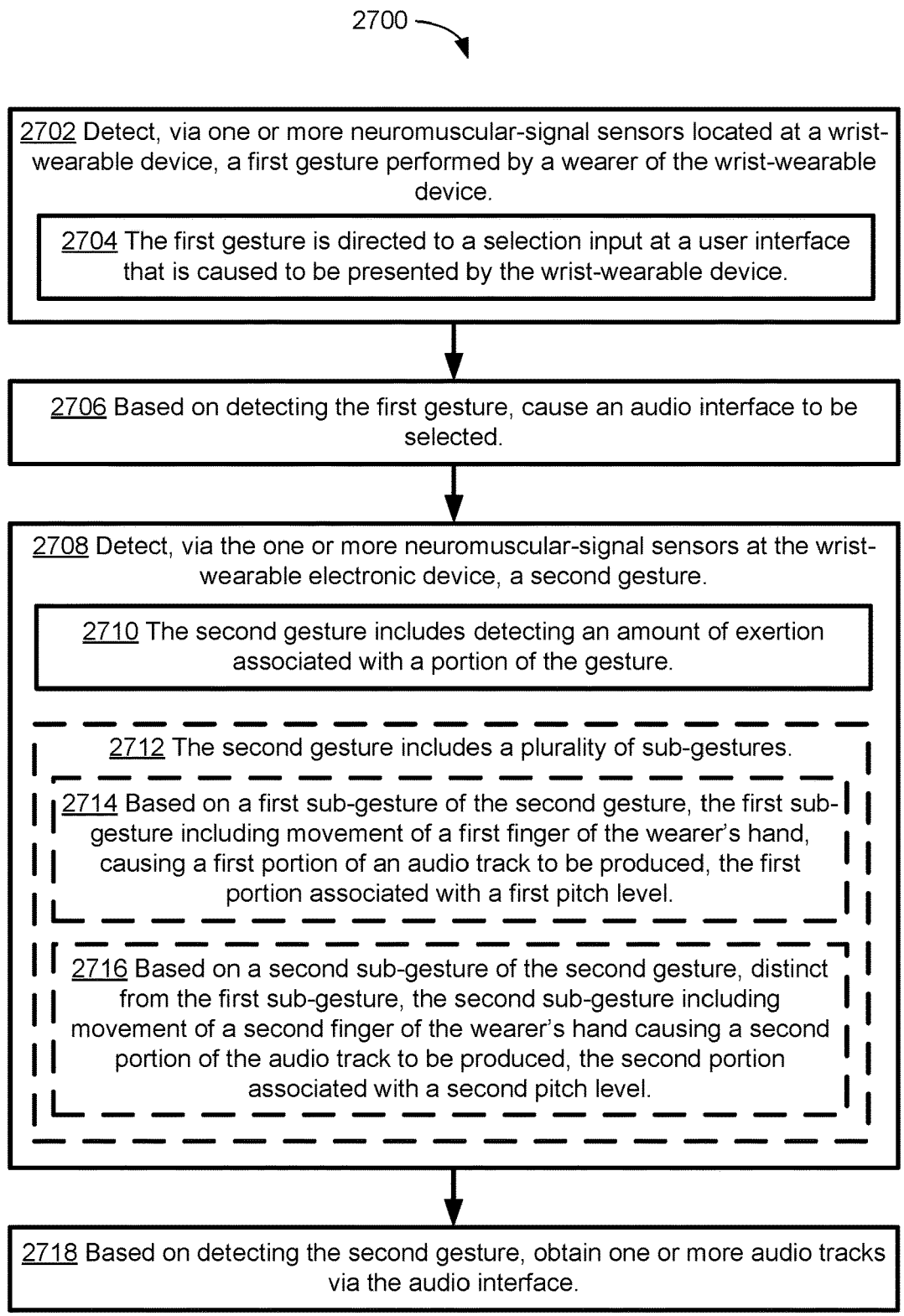
FIG. 26 illustrates an example method of translating signals detected by one or more neuromuscular-signal sensors into an audio track, in accordance with some embodiments.

FIG. 26 illustrates an example method 2700 of translating signals detected by one or more neuromuscular-signal sensors into an audio track, in accordance with some embodiments. In some embodiments, the audio track can be a single musical note.

The method 2700 includes detecting (2702), via one or more neuromuscular-signal sensors located at a wrist-wearable device, a first gesture performed by a wearer of the wrist-wearable device. The first gesture is (2704) directed to a selection input at a first user interface that is caused to be presented, at least in part, by the wrist-wearable device. In some embodiments, one or more elements of the user interface can be caused to be presented by other electronic devices (e.g., a head-wearable device) that are in electronic communication with the wrist-wearable device.

The method includes, based on detecting (2706) the first gesture, causing an audio interface to be selected (e.g., a list of sample tracks associated with a particular instrument, a set of sample tracks of a particular song, a mixer, etc.).

The method includes, detecting (2708), via the one or more neuromuscular-signal sensors at the wrist-wearable electronic device, a second gesture. The second gesture includes (2710) detecting an amount of exertion associated with a portion of the second gesture (e.g., a maximum level of exertion detected during the gesture, an average of a plurality of individual levels of exertion detected during the gesture).

In some embodiments, the second gesture is an in-air hand gesture that includes (2712) a plurality of sub-gestures (e.g., individual finger movements, such as two distinct movements of the same finger that correspond to different levels of exertion).

In some embodiments, based on (2714) a first sub-gesture of the second gesture, the first sub-gesture including movement of a first finger of the wearer's hand, causing a first portion of an audio track to be produced, where the first audio track is associated with a first pitch level (e.g., a high-pitch tone). In some embodiments, the method includes, based on (2716) a second sub-gesture of the second gesture, distinct from the first sub-gesture, the second sub-gesture including movement of a second finger of the wearer's hand, causing a second portion of the audio track to be produced, where the second portion of the audio track is associated with a second pitch level (e.g., a low-pitch tone). In some embodiments, the first finger and the second finger can be the same finger.

The method includes, based on detecting (2718) the second gesture, obtaining one or more audio tracks via the musical interface. In some embodiments, an audio track can be a single note, a portion of a song, a composition that includes a plurality of instruments, a remix of a song, and the like. In some embodiments of B1-B9, obtaining the one or more audio tracks via the musical interface includes providing a representation of the first gesture and the second gesture to a Musical Instrument Digital Interface (MIDI).

In some embodiments, the method 2700 includes, based on a third sub-gesture, distinct from the first sub-gesture and the second sub-gesture of the second gesture, the third sub-gesture including movement of a third finger of the wearer's hand, causing one of the first portion of the audio track and the second portion of the audio track to have a particular tone.

In some embodiments, the audio track includes a chord (e.g., a guitar chord) that includes a plurality of individual musical notes. In some embodiments, the chord includes a tone and a tension, where one or more of the tone and the tension are based on a level of exertion of the second gesture. In some embodiments, the audio track includes a chord pattern having a plurality of chords, and each respective chord of the chord pattern includes a plurality of individual musical notes.

In some embodiments, the method 2700 includes providing the audio track to another user of a different electronic device. In some embodiments, providing the audio track to the other user includes providing a selectable user interface element to the other user, and the selectable user interface element is associated with a multi-player game related to the audio track. In some embodiments, the method 2700 further includes, after providing the audio track to the other user of the different electronic device, receiving another audio track from the other user of the different electronic device. In some embodiments, the other audio track received from the other user is a remix of the audio track provided to the user.

Figure 27:
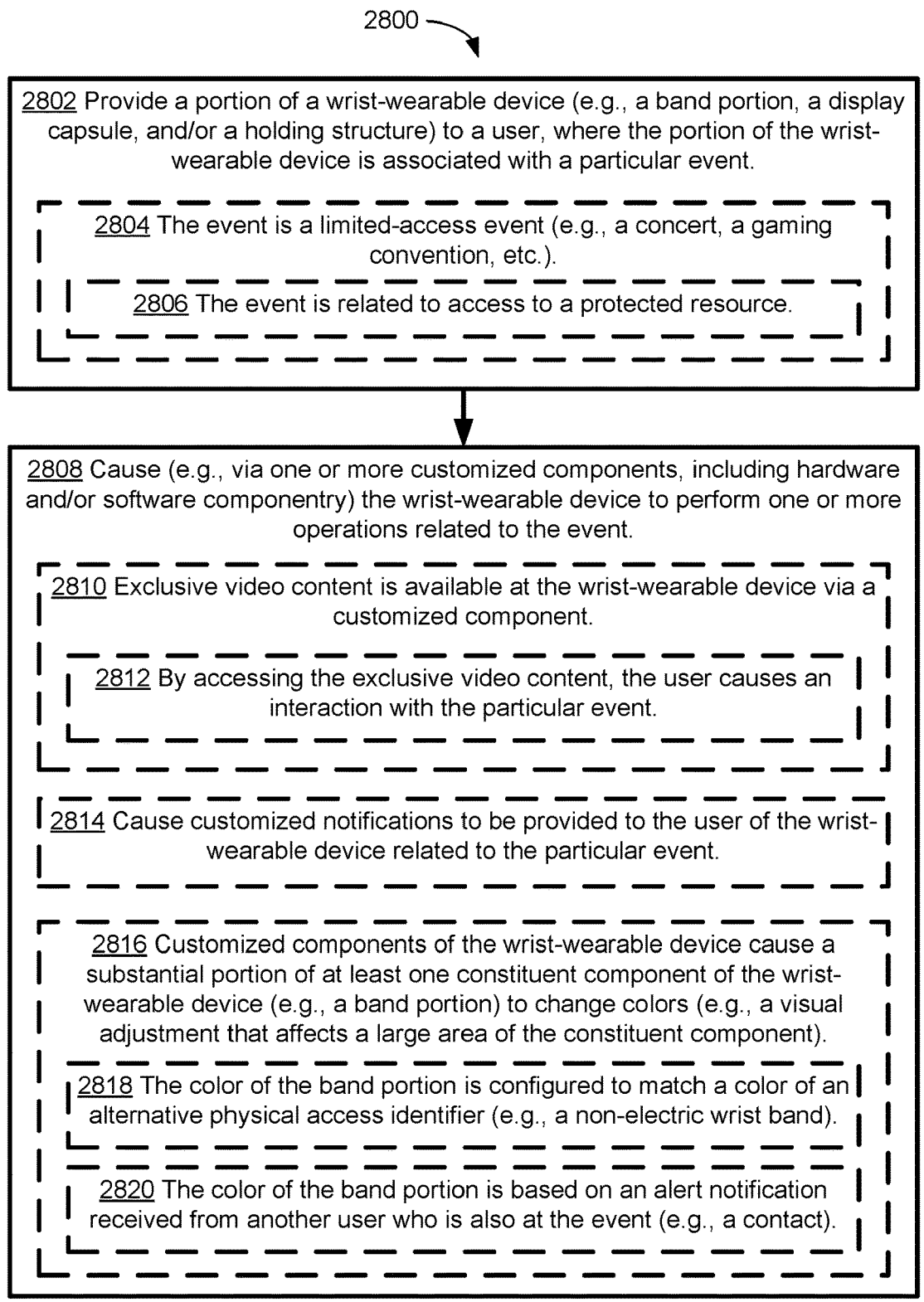
FIG. 27 illustrates an example method for providing custom componentry for use in conjunction with a wrist-wearable device at an event (e.g., a concert, a sports game, a movie theater, an amusement park, etc.), in accordance with some embodiments.

FIG. 27 illustrates an example method 2800 for providing custom componentry for use in conjunction with a wrist-wearable device at an event (e.g., a concert, a sports game, a movie theater, an amusement park, etc.), in accordance with some embodiments. The method 2800 can include some or all of the operations described herein (e.g., the operations discussed above with respect to the Example Aspect B (Customized and/or Dynamic Display Elements and Customized User Experiences on Wrist-Wearable Device).

The method 2800 includes providing (2802) a portion of a wrist-wearable device (e.g., a band portion, a display capsule, and/or a holding structure) to a user, where the portion of the wrist-wearable device is associated with a particular event. In some embodiments, the event is (2804) a limited access event. In some embodiments, the event is (2806) related to access to a protected resource. For example, the kiosk 1704 in FIG. 17A-17E can be an example of a protected resource access point. In some embodiments, a particular hardware component is used in conjunction with allowing the user to access the protected resource (e.g., the hardware component 1708). In some embodiments, the kiosk is and/or is associated with a locked physical object. For example, the kiosk can include a locked safe-like object, and/or the kiosk may be an access-point for an establishment (e.g., an office building).

The method 2800 includes causing (2808) (e.g., via one or more customized components, including hardware and/or software componentry) the wrist-wearable device to perform one or more operations related to the event. In some embodiments, exclusive video content is (2810) available at the wrist-wearable device via a customized component. In some embodiments, by accessing (2812) the exclusive video content, the user causes an interaction with the particular event.

In some embodiments, the method 2800 includes causing (2814) customized notifications to be provided to the user of the wrist-wearable device related to the particular event. For example, the wrist-wearable device can be caused to provide a summary recap of a respective event that the user attended, where the summary recap can include data captured by the wrist-wearable device while the user was at the particular event.

In some embodiments, the customized components of the wrist-wearable device cause (2816) a substantial portion of at least one constituent component of the wrist-wearable device (e.g., a band portion) to change colors (e.g., a visual adjustment that affects a large area of the constituent component. In some embodiments, the color of the band portion is (2818) configured to match a color of an alternative physical access identifier (e.g., a non-electric wrist band). In some embodiments, the color of the band portion is (2820) based on an alert gesture received from another user who is also at the event (e.g., a contact).

Figure 28:
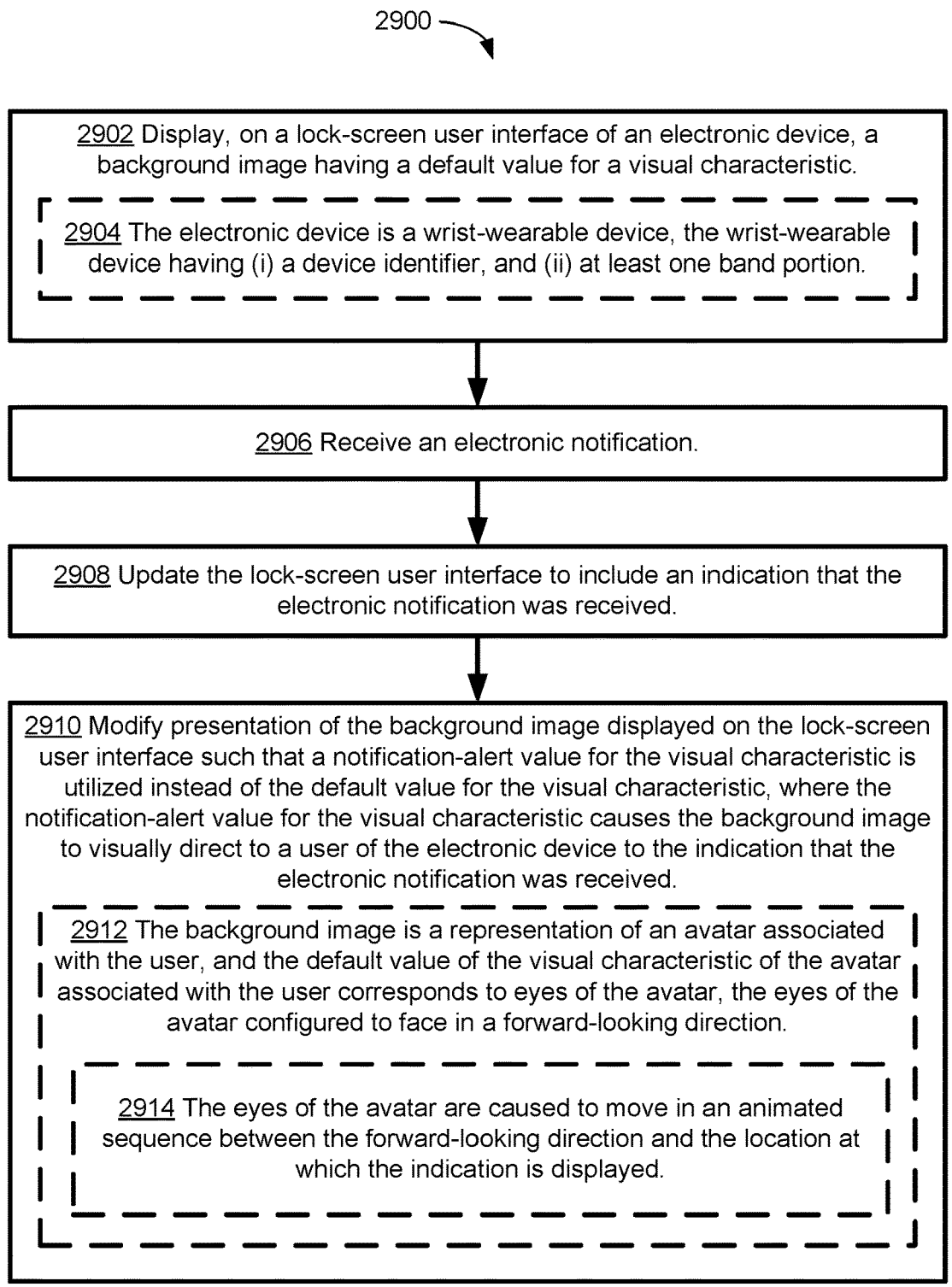
FIG. 28 illustrates an example method 2900 of adjusting a background image on a lock-screen user interface to identify an electronic notification, in accordance with some embodiments.

FIG. 28 illustrates an example method 2900 of adjusting a background image on a lock-screen user interface to identify an electronic notification, in accordance with some embodiments. The method 2900 can include some or all of the operations described herein (e.g., the operations discussed above with respect to FIGS. 15A-15C, which can be performed in conjunction with any of the other sequences described herein)).

The method 2900 includes displaying (2902), on a lock-screen user interface of an electronic device, a background image that has a default value for a visual characteristic.

In some embodiments, the electronic device is (2904) a wrist-wearable device that includes a holding structure with a device identifier and at least one band portion.

The method 2900 includes receiving (2906) an electronic notification. the method further includes updating the lock-screen user interface to include an indication that the electronic notification was received.

In accordance with receiving the electronic the electronic notification, the method 2900 includes updating (2908) the lock-screen user interface to include an indication that the electronic notification was received.

The method 2900 includes modifying (2910) presentation of the background image displayed on the lock-screen user interface such that a notification-alert value for the visual characteristic is utilized instead of the default value for the visual characteristic, wherein the notification-alert value for the visual characteristic causes the background image to visually direct a user of the electronic device to the indication that the electronic notification was received.

In some embodiments, the background image (2912) is a representation of an avatar associated with a user, and the default value of the visual characteristic of the avatar corresponds to eyes of the avatar facing in a forward-looking direction.

In some embodiments, the notification-alert value for the visual characteristic corresponds to eyes of the avatar facing towards a location at which the indication is displayed.

In some embodiments of the method 2900, the eyes of the avatar are caused to move (2914) in an animated sequence between the forward-looking direction and the location at which the indication is displayed.

Other Example Aspects

A discussion of certain example aspects will now be provided. The example methods 400, 500, 1400, 2000, 2100, 2300, 2700, 2800, and 2900, described above, as well as the features depicted and described with reference to FIGS. 1A-3F, 9A-13D, 15A-19F, and 24A-25B, can also be used in conjunction with additional Example Aspects, and each of these additional Example Aspects will now be briefly described below. Any of the example aspects discussed below can be used in conjunction with any of the devices and/or systems discussed with respect to FIGS. 6-8, and 22A-22C.

Example Aspect A: Custom-Designed Wrist-Wearable Device and/or Constituent Components Thereof (e.g., "Event Bands" for Use at Live Events)

The wrist-wearable device can be configured to offer a digital canvas for the user to design their own watch face from scratch (e.g., at a dedicated remote website and/or a subset of webpages of a respective remote website). This digital canvas can offer creation tools (e.g., digital pens, paint brushes, stickers, templates, pre-made art, design themes) to make it easier to customize the new watch-face user interface to the user's liking. In some embodiments, creating/designing a new watch-face user interface can also include creating a portion of the watch-face user interface dynamically by taking a picture of outfit or colors that inspire the user and using that as a seed to autogenerate a starting point of a new watch-face user interface. This example aspect can be extended to allow users to customize watch-face user interfaces for their friends and/or partners as well, provided that, in some embodiments, those friends and/or partners have opted-in to participate in such an experience. This can include the ability to control a friend/partner's watch face in real-time—e.g., could include artistic customization (e.g., a drawing/sketch) or a message (e.g., good luck).

In some embodiments, a customized watch face interface and/or a custom display capsule, band portion, and/or holding structure can be designed to be used at a specific event (e.g., a concert). In some embodiments, different components can be used to indicate different levels of access. For example, a particular band portion can indicate a general access entry pass to an event, and the particular band portion in addition to a particular holding structure for holding a display can be used to indicate an elevated entry pass (e.g., VIP).

In some embodiments, in addition to and/or alternatively to custom components, custom software can be provided to a wrist-wearable device and/or constituent components thereof that perform one or more particular operations corresponding to the event that they are intended for. For example, a software application can cause a recap summary to be generated by the wrist-wearable device, for presentation to the user and/or sharing with a different user of a different electronic device. In some embodiments, the summary can include videos and/or pictures that the user captured during the concert, which can be accompanied by songs (e.g., live recordings) therefrom. In some embodiments, sensors at the wrist-wearable device and/or another electronic device in communication with the wrist-wearable device can be used to detect health attributes of the user during the event (e.g., a number of calories burned by the user). In some embodiments, the custom componentry and/or software can include additional sensors and/or other computing components to enable the user to access all of the provided functionality.

In some embodiments, in addition to and/or alternatively to custom components and/or custom software, custom media content (e.g., images, videos, music, etc.) can be provided with a customized wrist-wearable device and/or constituent component. For example, a customized component of a wrist-wearable device can cause video content to be displayed at the wrist-wearable device. In some embodiments, the respective user of the customized wrist-wearable device can interact with an aspect of the event by consuming the content provided at the custom component. For example, by accessing video content at a wrist-wearable device that includes a customized component for a concert, the user can make themselves eligible to be displayed on public visual display (e.g., a jumbotron) located at the concert.

In some embodiments, a custom component of a wrist-wearable device can cause one or more customized notifications to be surfaced at the wrist-wearable device. For example, a custom component designed for a concert can provide custom notifications, which can be based on real-time data, about when a particular artist is on stage and/or playing a particular song during the concert. In some embodiments, the customized notification about when a particular artist is about to come on stage can include navigational directions, which can be provided to the user based on the user's current location. In some embodiments, notifications provided at the wrist-wearable device can include lyrics (e.g., based on real-time data) of a song that is currently being played at the concert.

In some embodiments, the wrist-wearable device can be caused to change color to a same color (e.g., neon green) as physical access bands for a particular event, in addition, or in alternative to other means of authenticating the user's access at the event. For example, a security resource may check whether the user's wrist-wearable device is glowing with a particular color that corresponds with physical event bands for the same event. In some embodiments, the color or other visual features of the band can further signify that the user is eligible for a particular elevated level of access (e.g., a "fast-track" line, a private suite).

In some embodiments, a user can provide an alert gesture at their own wrist-wearable device. And based on the alert gesture, the wrist-wearable device can cause other wrist-wearable devices associated with other users that are at a particular event to receive a customized notification experience that is different than the conventional notification experience for the respective wrist-wearable device (e.g., the entire wrist-wearable device can be caused to glow a certain color). The inventors recognized that this functionality allows users to be notified quickly and efficiently, even when normal capacities are made unavailable (e.g., based on noise or crowd movement at a concert that could prevent a user from checking their notifications for messages and/or responding to phone calls). In some embodiments, a user can cause a post on a social-media application (e.g., related to a local sports team) to receive a reaction based on a user-performed gesture while the user is in proximity to an event that is associated with the post. As a first example, consider a user of a wrist-wearable device is at a sporting event, and the jumbotron displays information related to a post on a social-media application. The user performs a thumbs up gesture that is detected by one or more neuromuscular-signal sensors (e.g., EMG sensors) at the user's wrist-wearable device.

In some embodiments, a user can use the wrist-wearable device to interact with, or be interacted with the physical surroundings of an event. For example, the bass or other musical qualities associated with an event can caused haptic events at one or more haptic devices at the wrist-wearable device. In some embodiments, the user can use EMG gestures (e.g., directed to particular electronic devices, as discussed in further detail with respect to FIGS. 16A and 16B) to cause visual aspects of the electronic devices at the event to be adjusted. For example, the user can point to particular lights on the ceiling of an event venue, and provide an EMG-detectable input, and the gesture can cause the appearance of the lights to change. In some embodiments, the adjustment to the visual aspect of the electronic device can be based on a number of users that perform the gesture within a predefined interval.

In some embodiments, an event band can have a display capsule with a physical background (e.g., non-digital) that can be displayed in conjunction with, or as an alternative to the digital display of the wrist-wearable device. In some embodiments, an artist and/or artwork associated with the artwork (e.g., an album cover) can be displayed, either via the touch-sensitive display, or via the physical background. In some embodiments, the event band can include exclusive video content (e.g., artist stories) that are not otherwise accessible to other users that do not have the particular event band.

In some embodiments, an event band can have customized event triggers (e.g., instructing a user to capture a picture at a certain moment, and/or record live audial output from the event. In some embodiments, such captures can be provided to a publicly-displayed live stream at the event. In some embodiments, the captures can be used to generate a customized recap of the event (e.g., a highlight video) which the user can save to their wrist-wearable device and/or share via one or more sharing applications available at the wrist-wearable device and/or another electronic device that is in communication with the wrist-wearable device.

Example Aspect B: Customized and/or Dynamic Display Elements and Customized User Experiences on Wrist-Wearable Device In accordance with some embodiments, an aspect of a watch-face user interface of the wrist-wearable device can be visually adjusted (e.g., an increased brightness, fills up, changes in size such as increases and then decreases in size, etc.) when there is an incoming communication from another user in the social network (e.g., a friend or even a designated subset of friends selected by the user of the wrist-wearable device) of the user of the wrist-wearable device.

For example, in some embodiments, there can be an artistic face presented in the background of a watch-face user interface (e.g., the artistic face 1502 shown in FIGS. 15A-15C) and simultaneously and/or sequentially, a heart icon can be presented as well that glows a particular color (e.g., red), which can signify receipt of a notification from a contact (e.g., a significant other) of a wrist-wearable device. In this way, notifications can be presented in a more artistic fashion and aspects of the notification can be embedded in the watch-face user interface itself (e.g., the watch-face user interface can change away from displaying certain default or wearable-structure-specific features to instead display the artistic notification features when a message is received from the designated other users).

In some embodiments, customizations can be applied to user interface elements based on other aspects besides the respective device identifiers of one or more constituent components of a wrist wearable electronic device.

In one example, a Halloween theme can be applied throughout the operating system, such that Halloween-themed characters and/or colorways can be presented in conjunction with and/or as an alternative to the standard user interface elements that are normally displayed by the wrist-wearable device.

In another example, a theme can be applied based on a specific object (e.g., an animal, such as a dragon) such that the respective theme can be applied to a plurality of user interface elements throughout the respective operating system of the wrist-wearable device.

In another example, as shown in FIGS. 24A-24C, the wrist-wearable device can be configured to have a particular theme, and images and/or other media content captured by the wrist-wearable device can be adjusted based on the theme. In some embodiments, reactions (e.g., thumbs-up applied to a message from another user, a "poke," etc.) can be caused to have a corresponding customization applied thereto. For example, a user with a wrist-wearable device that has a particular display customization can send a thumbs-up reaction to another user, and the reaction can be caused to be a fireball symbol instead of the typical thumbs-up symbol.

In some embodiments, different art collections and/or artists may cause their own particular styles to be presented at the wrist-wearable device (including visual and/or non-visual artistic elements). In some embodiments, stylistic elements can be unique to device identifiers associated with one or more particular artists. In some embodiments, a camera application that is available at the wrist-wearable device can be caused to transfer one or more artistic style elements to filters that can be used in conjunction with the camera application of the wrist-wearable device.

In some embodiments, a respective user of the wrist-wearable device can apply an artistic style filter at one or more of a pre-capture state (e.g., before capturing a photograph or video) and a post-capture state (e.g., after capturing an image or video) by performing user inputs directed to user interface controls, which can be made available at the wrist-wearable device after an image is captured using the camera of the wrist-wearable device. For example, a user that enjoys art by D'Artagnan might select a filter that turns an image that they have taken of themselves into an artistic rendering in the style of Picasso (or another artist of their choosing). In some embodiments, one or more artistic style elements include three-dimensional visual aspects. In some embodiments, three-dimensional visual aspects of artistic style elements can be configured to account for movement. For example, the user can rotate their face within a field of view of a camera that is located at the wrist-wearable device, based on the rotation of the user's face, the artistic rendering will track those movements (e.g., on a display of a wrist wearable device).

Customized experiences can be provided across one or more applications and/or a respective operating system of the wrist-wearable device (e.g., this includes operating-system-provided features such as the watch-face user interface, notification-delivery mechanism, in-app experiences facilitated by the operating system, etc.) based on culturally relevant moments (like holidays, major events, your own birthday). In some embodiments, watch face user interfaces can be updated based on the occurrence of a particular event reunion (e.g., like a Christmas face) that includes customization to basic utility (e.g., like Santa's hands replace clock hands) and also adds fun/delightful moments (e.g., like snow falling on the face).

In some embodiments, the particular events that are associated with the customization are not widely-celebrated events (e.g., national holidays), but significant events for the individual wearer of the electronic device (e.g., a birthday and/or anniversary of one or more contacts of the wearer). In some embodiments, general customizations of features can be caused by specific events.

In some embodiments, customized experiences change notification-delivery experiences (e.g., a bird-themed customization can cause notifications to appear to be delivered by a bird flying across the display screen of the wrist-wearable device) or cause modifications to application experiences as well (e.g., like Santa encouraging the user of the wrist-wearable device to reach their step goals during the holiday season).

Time doesn't matter—hide time when you are in a concert or an event. When you have a good time, time doesn't matter. In some embodiments, one or more elements are caused to be hidden from the display at the wrist-wearable device based on contextual conditions of the user. For example, the wrist-wearable sensor can detect (e.g., via a location sensor, or by detecting a device identifier corresponding to a kiosk at a concert hall) that the user is currently attending a concert, and the wrist-wearable can cause a notification to be provided to the user, where the notification states "time doesn't matter." In some embodiments, the clock can be hidden based on a sensed tenseness of the user (e.g., detected by the EMG sensors of the wrist-wearable device).

In some embodiments, vintage user interface elements of a particular social-media application (e.g., the Facebook poke) can be provided based on the user celebrating a birthday (e.g., "remember this"). In some embodiments, based on the type of event (e.g., "Mother's Day") user's can be notified about providing specific messages and/or reactions to specific other users of the respective social-media application (e.g., "Wish xxx a Happy Mothers' day!"). In some embodiments, quick reactions that can be applied from a preset list of quick reactions (e.g., reactions that can be provided via one or more signature gestures can be adjusted based on a temporal event associated with the time in which the user is wearing the wrist-wearable device).

Example Aspect C: Wrist-Wearable Devices Use Watch-Face User Interface Drops from a Social-Media Application (e.g., Instagram)

In accordance with some embodiments, individual shareable and otherwise usable content items (e.g., watch-face user interface layouts and/or collections of watch-face user interfaces) drop on the social-media application (e.g., via a product-dedicated account from a provider of the wrist-wearable device and, in some embodiments, via accounts associated with business partners of the provider of the wrist-wearable device). In some embodiments, the individual sharable and usable content items will either be available to anyone to download, or available to a predefined limited number of users to access the shareable and usable content items (e.g., the first hundred people, etc.) to create a sense of buzz and limited availability.

Certain of the individual sharable and usable content items can also be available on occasion only for people who "hit" a certain goal or engagement level, e.g., only users who hit their daily fitness goal that week are eligible to access or download a certain individual sharable and usable content item. In another example, a user may receive a content drop by keeping a streak of activity at a social-media application (e.g., a number of days in a row of sharing a certain type of content). Other examples of the individual sharable and usable content items include unique stickers that can be released on the social-media platform (e.g., on Instagram, including Instagram Stories sticker packs/collections). For example, a social-media application can include a feature for sharing time-limited content (e.g., stories). And the shareable content can be graphical representations (e.g., stickers) for causing presentation of in conjunction with other shareable content. These sticker drops can be associated with certain collaborations (e.g., a collaboration between sports teams, such as soccer teams) with external companies (e.g., sports vendors) and/or "unlocked" via hitting certain achievements.

Figure 3F:
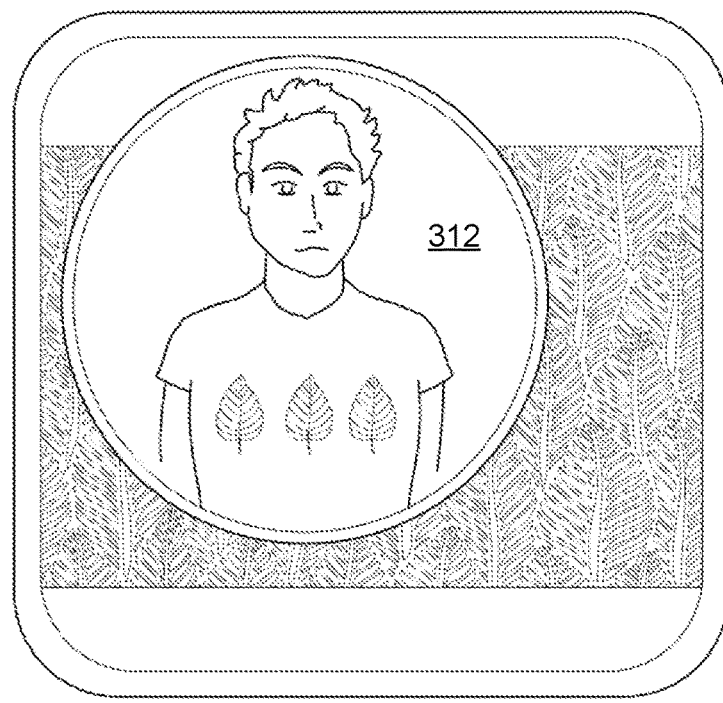

Non-sticker special effects drops are also contemplated, including dropping clothing for use with a user's virtual avatar. For example, as shown in the example of FIG. 3F, the user's avatar has been dressed up (e.g., equipped) using attire that corresponds to the hidden user-interface element that was revealed in FIG. 3E. In one example, multiple types of sharable and usable content items can be released as a content item package (e.g., a limited set). In some embodiments, a content item package includes two or more of a watch-face user interface associated with a manufacturing company (e.g., a fashion clothing company), virtual stickers associated with that same manufacturing company, and attire from that same manufacturing company for the user's avatar. In some embodiments, content item packages can be revealed and/or otherwise made usable after a user couples their respective wrist-wearable device and/or display capsule to a wearable structure from that same fashion company.

In addition to avatar dress up features, this example aspect could also be extended to some embodiments to also include operating-system-level effects, such as a particular notification-delivery style (e.g., a certain cartoon character delivers incoming messages as an animated sequence shown on the display capsule of a wrist-wearable device). In some embodiments, the usable content items can be released in accordance with the user arriving at or near a certain geographic location and/or event (e.g., the empire state building, a concert, a corgi convention, and the like). In some embodiments, one or more content drops may first be accessed and/or otherwise received by a first electronic device (e.g., a user's smartphone) and then the respective one or more content items can be made available at a wrist-wearable device of the user.

In some embodiments, the locational drops of content items can be related to a particular item-collection application (e.g., a trading guard game and/or superhero action figure (physical, and/or virtual) collection application).

As was described earlier in conjunction with FIGS. 3A-3F, certain embodiments can gradually reveal hidden user-interface features. One other example of a hidden user-interface feature is a watch-face user interface that can auto populate (e.g., reveals itself piece by piece) as a user of the wrist-wearable device crosses more self-care completion thresholds (e.g., health or fitness related thresholds). For example, when the user hits 30% of a walking or fitness activity or breathe daily goal, 30% of the watch-face user interface can then be filled in. When the user hits 100% of the daily goal, then the whole watch-face user interface can then be filled in. This watch-face user interface, in some embodiments, can be a piece of artwork that unveils itself throughout the day (e.g., the artistic drawing of leaves in the example of FIGS. 3A-3F), or another creative format.

Example Aspect D: Activity Status Sharing

A user of the wrist-wearable device can show their passive status across activity, location, and other dimensions (e.g., indicate to other users that they are walking, driving, at the office, sleeping, running, at home). This passive status may manifest through plain text ("jane is running") but also could manifest as a digital avatar (see jane's avatar running), and these manifestations can be communicated to other user's devices (so the user of the wrist-wearable device can see status indicators for other user's avatars and those other users can see status indicators by looking at the user's avatar on their own devices).

In some embodiments, the wrist-wearable device and/or a constituent component of the wrist-wearable device can be used to present a physical status to different users of different electronic devices (e.g., a persistent group message). For example, a user of a particular wrist-wearable device can be at an event (e.g., a concert) with a group of other users of different electronic devices (e.g., other wrist-wearable devices). The user can cause a red indication to be displayed at a component (e.g., a display of a wrist-wearable device) to indicate that the user would like other users to meet up at a particular location (e.g., a designated meetup location). In some embodiments, each of the respective other users can receive directions in addition to the alert, where the respective directions are based on the respective locations of the users from where they are receiving the alert.

Example Aspect E: Mirror App with the Encouraging Art/Quote that can be Provided on the Wrist-Wearable Device In some embodiments, a respective electronic device (e.g., a removable display capsule of a wrist-wearable device) can be configured to provide one or more operations of a mirror application to a user. In some embodiments, the mirror application allows a respective user of a wrist-wearable device to use the camera of the wrist-wearable device as a quick reference for checking the user's appearance (e.g., is eyeliner smearing, applying lipstick), lighting, and/or surroundings. The mirror app can default to a more zoomed-in view similar to a pocket mirror's fields of view, such that when the camera application is normally opened to take a picture a first zoom level is used but when the mirror app is used image data from the camera is presented at a second zoom level that is higher than the first zoom level. Gestures including pinch/double tap can allow for zooming in and out within the mirror app. Mirror app can have digital designs (e.g., colorful frames) or inspirational text (e.g., hello, gorgeous!) as a confidence booster to the user of the wrist-wearable device.

Example Aspect F: Additional EMG Functionality

In some embodiments, a user can perform a gesture detected by a neuromuscular-signal sensor of a sensor-laden wrist-wearable device, where the gesture includes a rotation movement of the user's hands and/or fingers. Based on the rotational movement, watch hands on the display of the wrist-wearable device (or corresponding digits on a digital clockface) are caused to be adjusted in accordance with the rotational movement. In some embodiments, as the clockface display is caused to be adjusted, notification user interface elements can be caused to be provided at the wrist-wearable device based on one or more events that the user has planned at the time passed. The inventors have recognized that such quick and efficient scheduling review can motivate users to perform tasks more quickly so they can move on to other endeavors. In some embodiments, user gestures detected by neuromuscular-signal sensors of wrist-wearable devices can be used to perform interactive games with another user (e.g., physically, in a virtual-reality environment, etc.).

In some embodiments, a signature gesture (e.g., the signature gesture 1848 discussed with respect to FIG. 18H) can be the user drawing a particular symbol (e.g., a heart) with one or more of the user's fingers, which can be detected by one or more of (i) neuromuscular-signal sensors, and (ii) IMU sensors at the wrist-wearable device. In some embodiments, when the user performs the signature gesture, the respective message is automatically sent to another user of a different electronic device, without further instructions by the user. In some embodiments, there can be a predefined set (e.g., six shortcuts) of signature gestures that are always available to the user while they are wearing the wrist-wearable device. In some embodiments, one or more of the predefined shortcuts are based on a device identifier associated with the wrist-wearable device.

As was mentioned above, these additional Example Aspects A-F can be added to, or used as alternatives to, certain features made available on the wrist-wearable devices discussed herein and shown in the associated Figures. In accordance with some embodiments, a system including a wrist-wearable device is configured to perform or cause performance of the Example Aspects A-F and/or other alternatives described herein. In accordance with some embodiments, a non-transitory, computer-readable storage medium including instructions that, when executed by a wrist-wearable device and/or an intermediary device in communication with wrist-wearable device, cause performance of the Example Aspects A-F and/or other alternatives described herein. In another aspect, a means on a wrist-wearable device and/or intermediary device for performing or causing performance of the Example Aspects A-F and/or other alternatives described herein.

Any data collection performed by the devices described herein and/or any devices configured to perform or cause the performance of the different embodiments described above in reference to FIGS. 1A-29, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
    while a display capsule is configured to use a default set of display characteristics in conjunction with a plurality of operating-system-level or application-level user interfaces available via the display capsule:
        receiving identifying information, at the display capsule, for a respective wearable structure of a plurality of wearable structures, the display capsule being configured to detachably couple to one of the plurality of wearable structures to form a wrist-wearable device; and
    in accordance with a determination that the display capsule should be adjusted based on the identifying information for the respective wearable structure:
        adjusting the display capsule (i) to cease using the default set of display characteristics in conjunction with the plurality of operating-system-level or application-level user interfaces and (ii) to use a customized set of display characteristics associated with the respective wearable structure, wherein the customized set of display characteristics is distinct from the default set of display characteristics and is also used in conjunction with the operating-system or application-level user interfaces.

2. The method of claim 1, further comprising, after adjusting the display capsule to use the customized set of display characteristics:
    receiving, at the display capsule, identifying information for a different wearable structure of the plurality of wearable structures, the different wearable structure having an aesthetic theme that is distinct from an aesthetic theme for the respective wearable structure; and in accordance with a determination that the display capsule should be adjusted based on the identifying information for the different wearable structure:
adjusting the display capsule (i) to cease using the customized set of display characteristics in conjunction with the operating-system or application-level user interfaces and (ii) to use a different customized set of display characteristics associated with the different wearable structure, wherein the different customized set of display characteristics is distinct from the customized set of display characteristics and from the default set of display characteristics and is also used in conjunction with the operating-system or application-level user interfaces.

3. The method of claim 1, wherein one or more display characteristics of the set of display characteristics corresponds to a manner in which an electronic message is presented, and
the method further comprises:
while the display capsule is configured to use the default set of display characteristics, receiving a first electronic message, and presenting a static representation of the first electronic message on the display capsule; and
while the display capsule is configured to use the customized set of display characteristics associated with the respective wearable structure, receiving a second electronic message, and presenting a dynamic representation of the second electronic message such that the dynamic representation of the second electronic message moves along with a representation of a character associated a theme of the respective wearable structure.

4. The method of claim 1, wherein the display characteristics include one or more of a color palette used in conjunction with the operating-system-level user interfaces, icons associated with applications available via the display capsule, a style used to present notifications on the display capsule, an animation style used by the display capsule, and a manner in which faces of avatars are presented on the display capsule.

5. The method of claim 1, further comprising:
in conjunction with adjusting the display capsule to instead use the customized set of display characteristics, adjusting the wrist-wearable device to use a new non-display setting associated with the respective wearable structure.

6. The method of claim 5, wherein the new non-display setting is a setting used to generate haptic responses at the wrist-wearable device.

7. The method of claim 1, wherein the customized set of display characteristics are used to generate a watch-face user interface that is presented via the display capsule while it is attached to the respective wearable structure.

8. The method of claim 1, wherein the determination that the display capsule should be adjusted based on the identifying information for the respective wearable structure is:
made after a camera of the display capsule is used to scan a QR code associated with the respective wearable structure, and/or
made based on data communicated to the display capsule from the respective wearable structure.

9. The method of claim 1, wherein the adjusting the display capsule is performed only after the display capsule has been attached to the respective wearable structure.

10. The method of claim 1, wherein the respective wearable structure is associated with a company, and a user of the wrist-wearable device is granted access to limited-access user interface elements associated with the company while using the respective wearable structure.

11. The method of claim 10, wherein the limited-access user interface elements include one or more of stickers for adding to images and attire used to dress up an avatar of a user of the wrist-wearable device.

12. The method of claim 1, further comprising:
adjusting one or more additional visual characteristics at the display capsule when it is determined that a predetermined event is occurring.

13. The method of claim 1, wherein:
the respective wearable structure is one integrated structure that includes a band that is configured to be worn around a user's wrist and a cradle to which the display capsule is attached, and
the display capsule is attached to the cradle by pushing the display capsule in an upward direction to fit into the cradle such that a perimeter of the cradle is securely coupled around a portion of the display capsule.

14. The method of claim 1, wherein the respective wearable structure includes two band portions that are each separately attached to the display capsule to form the wrist-wearable device.

15. A non-transitory, computer-readable storage medium including instructions that, when executed by a wrist-wearable device or a display portion thereof, cause performance of operations for:
while a display capsule is configured to use a default set of display characteristics in conjunction with a plurality of operating-system-level or application-level user interfaces available via the display capsule:
receiving, at the display capsule, identifying information for a respective wearable structure of a plurality of wearable structures, the display capsule being configured to detachably couple to one of the plurality of wearable structures to form a wrist-wearable device; and
in accordance with a determination that the display capsule should be adjusted based on the identifying information for the respective wearable structure:
adjusting the display capsule (i) to cease using the default set of display characteristics in conjunction with the plurality of operating-system-level or application-level user interfaces and (ii) to instead use a customized set of display characteristics associated with the respective wearable structure, wherein the customized set of display characteristics is distinct from the default set of display characteristics and is also used in conjunction with the operating-system or application-level user interfaces.

16. The non-transitory computer-readable storage medium of claim 15, further including instructions for, after adjusting the display capsule to use the customized set of display characteristics:
receiving identifying information, at the display capsule, for a different wearable structure of the plurality of wearable structures, the different wearable structure having an aesthetic theme that is distinct from an aesthetic theme for the respective wearable structure; and
in accordance with a determination that the display capsule should be adjusted based on the identifying information for the different wearable structure:
adjusting the display capsule (i) to cease using the customized set of display characteristics in conjunction with the operating-system or application-level user interfaces and (ii) to instead use a different customized set of display characteristics associated with the different wearable structure, wherein the different customized set of display characteristics is distinct from the customized set of display characteristics and from the default set of display characteristics and is also used in conjunction with the operating-system or application-level user interfaces.

17. The non-transitory computer-readable storage medium of claim 15, wherein one or more display characteristics of the set of display characteristics corresponds to a manner in which an electronic message is presented, and
the non-transitory computer-readable storage medium further including instructions for:
while the display capsule is configured to use the default set of display characteristics, receiving a first electronic message, and presenting a static representation of the first electronic message on the display capsule; and
while the display capsule is configured to use the customized set of display characteristics associated with the respective wearable structure, receiving a second electronic message, and presenting a dynamic representation of the second electronic message such that the dynamic representation of the second electronic message moves along with a representation of a character associated a theme of the respective wearable structure.

18. The non-transitory computer-readable storage medium of claim 15, wherein the display characteristics include one or more of a color palette used in conjunction with the operating-system-level user interfaces, icons associated with applications available via the display capsule, a style used to present notifications on the display capsule, an animation style used by the display capsule, and a manner in which faces of avatars are presented on the display capsule.

19. The non-transitory computer-readable storage medium of claim 15, further including instructions for:
in conjunction with adjusting the display capsule to instead use the customized set of display characteristics, adjusting the wrist-wearable device to use a new non-display setting associated with the respective wearable structure.

20. A wrist-wearable device or a display portion thereof configured to perform or cause performance of operations for:
while a display capsule is configured to use a default set of display characteristics in conjunction with a plurality of operating-system-level or application-level user interfaces available via the display capsule:
receiving identifying information, at the display capsule, for a respective wearable structure of a plurality of wearable structures, the display capsule being configured to detachably couple to one of the plurality of wearable structures to form a wrist-wearable device; and
in accordance with a determination that the display capsule should be adjusted based on the identifying information for the respective wearable structure:
adjusting the display capsule (i) to cease using the default set of display characteristics in conjunction with the plurality of operating-system-level or application-level user interfaces and (ii) to instead use a customized set of display characteristics associated with the respective wearable structure, wherein the customized set of display characteristics is distinct from the default set of display characteristics and is also used in conjunction with the operating-system or application-level user interfaces.

* * * * *